United States Patent
Kusumoto et al.

(10) Patent No.: US 6,326,772 B2
(45) Date of Patent: Dec. 4, 2001

(54) POWER SUPPLY APPARATUS WITH ENERGY RETURN FOR REUSE

(75) Inventors: Keiichi Kusumoto, Nishinomiya; Akira Matsuzawa, Yawata, both of (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/735,272

(22) Filed: Dec. 12, 2000

Related U.S. Application Data

(62) Division of application No. 09/284,141, filed as application No. PCT/JP97/03568 on Oct. 6, 1997, now Pat. No. 6,201,382.

(30) Foreign Application Priority Data

| Oct. 8, 1996 | (JP) | 8-267619 |
| Dec. 6, 1996 | (JP) | 8-327345 |
| Jun. 6, 1997 | (JP) | 09149742 |

(51) Int. Cl.[7] .................................... H02M 3/06
(52) U.S. Cl. .................. 320/166; 307/109; 323/356
(58) Field of Search ............... 327/551; 323/364, 323/356, 233, 365; 320/166, 140; 307/108, 109

(56) References Cited

U.S. PATENT DOCUMENTS

| 4,857,822 | 8/1989 | Tabisz et al. . |
| 4,860,184 | 8/1989 | Tabisz et al. . |
| 4,931,716 | 6/1990 | Jovanovic et al. . |
| 4,999,761 | 3/1991 | Bingham et al. . |
| 5,072,355 | 12/1991 | Huillet . |
| 5,353,215 | 10/1994 | Dinwiddie et al. . |
| 5,528,132 | 6/1996 | Doluca . |
| 5,548,206 | 8/1996 | Soo . |
| 6,118,678 | * 9/2000 | Limpaecher et al. ............ 363/60 |

FOREIGN PATENT DOCUMENTS

| 0436515 | 7/1991 | (EP) . |
| 0534379 | 3/1993 | (EP) . |
| 2542522 | 3/1983 | (FR) . |
| 5175941 | 6/1976 | (JP) . |
| 60226774 | 11/1985 | (JP) . |
| 63131625 | 6/1988 | (JP) . |
| 02046693 | 2/1990 | (JP) . |
| 04033522 | 2/1992 | (JP) . |
| 04325866 | 11/1992 | (JP) . |
| 05091745 | 4/1993 | (JP) . |
| 06121528 | 4/1994 | (JP) . |
| 07095765 | 4/1995 | (JP) . |

OTHER PUBLICATIONS

"Simplified Modern Filter Design", by Philip R. Geffe, John F. Rider Publisher, Inc., New York, NY 1963 (no month).

* cited by examiner

*Primary Examiner*—Shawn Riley
(74) *Attorney, Agent, or Firm*—Renner, Otto, Boisselle & Sklar

(57) ABSTRACT

A power supply apparatus 200 comprises an energy supplying circuit 210 for supplying energy at a predetermined timing, and an energy preserving circuit 220 for receiving the energy supplied from the energy supplying circuit 210 and preserving the energy. The energy preserving circuit 220 includes an inductor 221, a capacitance 223 connected to one end of the inductor 221 at a node 222, and a capacitance 225 connected to the other end of the inductor 221 at a node 224. Energy is supplied to a load via at least one of the node 222 and the node 224.

5 Claims, 74 Drawing Sheets

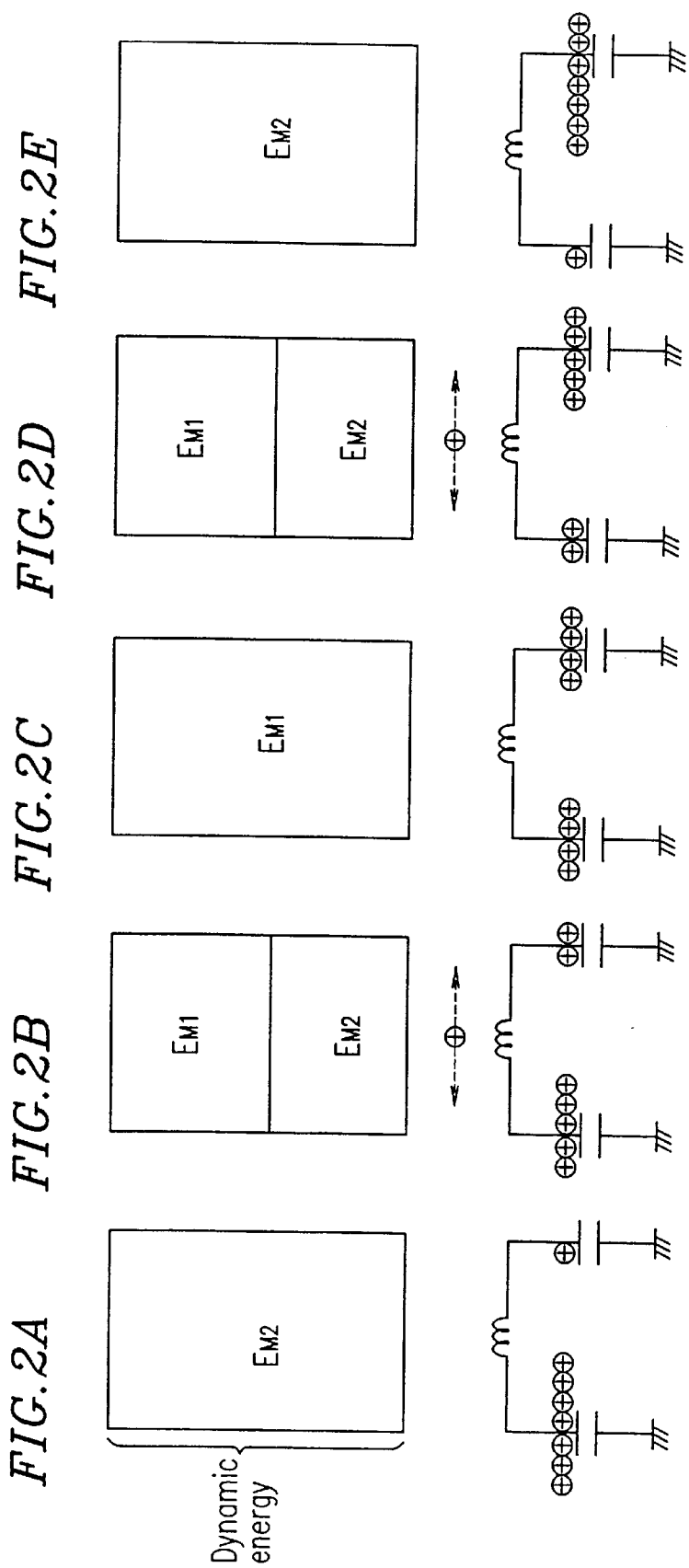

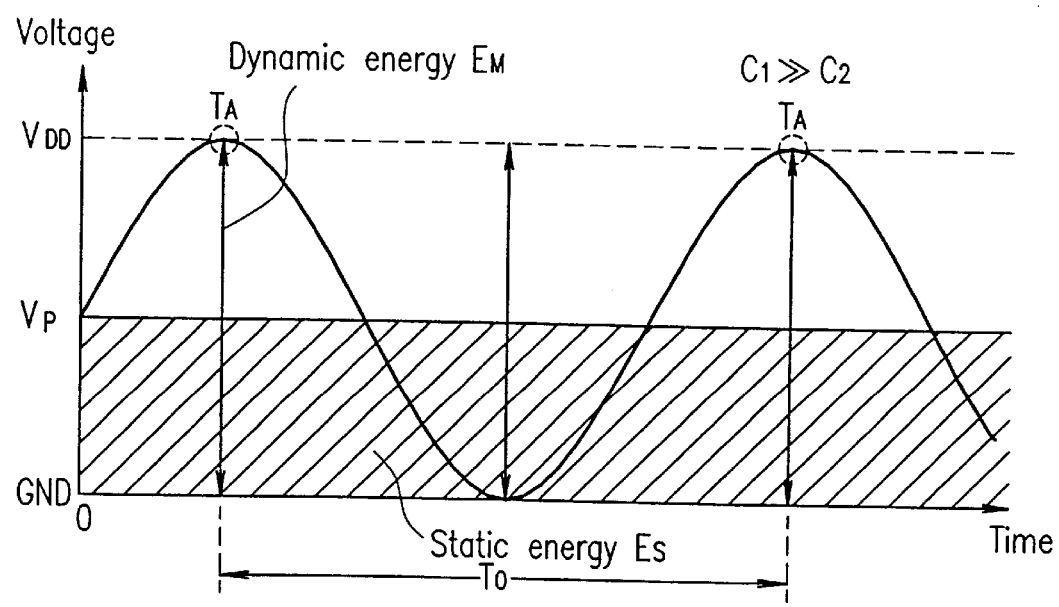

FIG.5
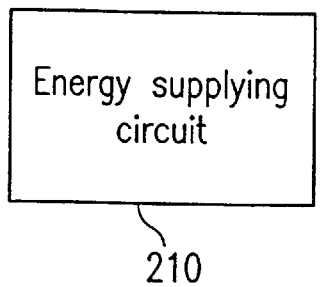
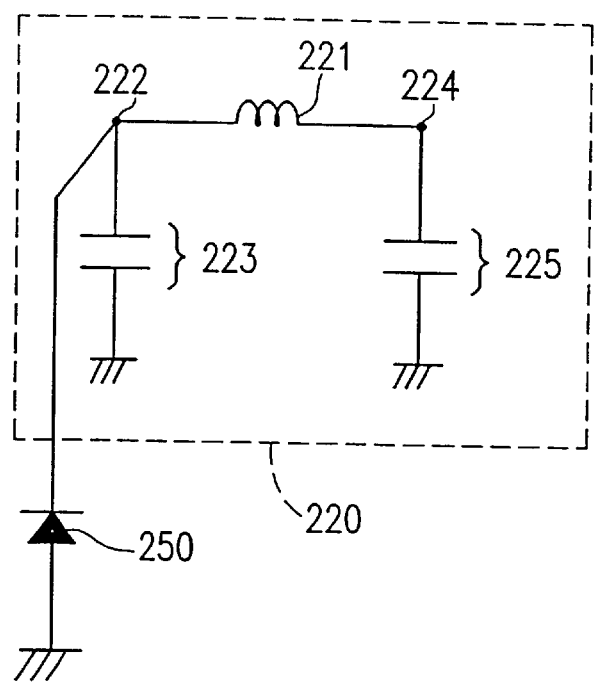

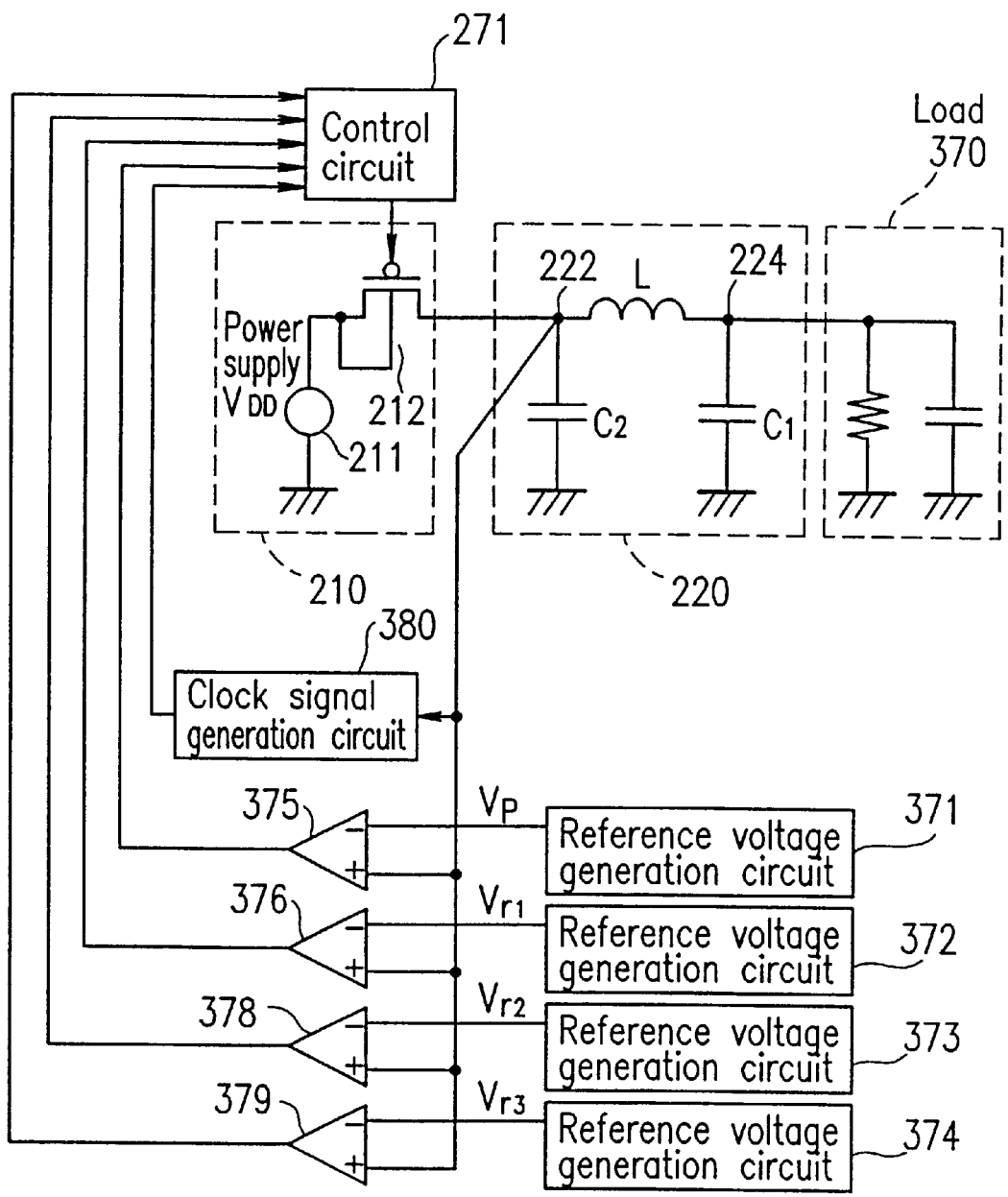

$C_1 \gg C_2$
$C_1 \approx C_2$

Period T₁

Period T₂

Period T₃

Period T₄

$C_1 \gg C_2$

I, III : Only voltage converter 20 operates

II : Voltage converter 20 and DC/DC converter 61 operate concurrently

Present invention

Present invention

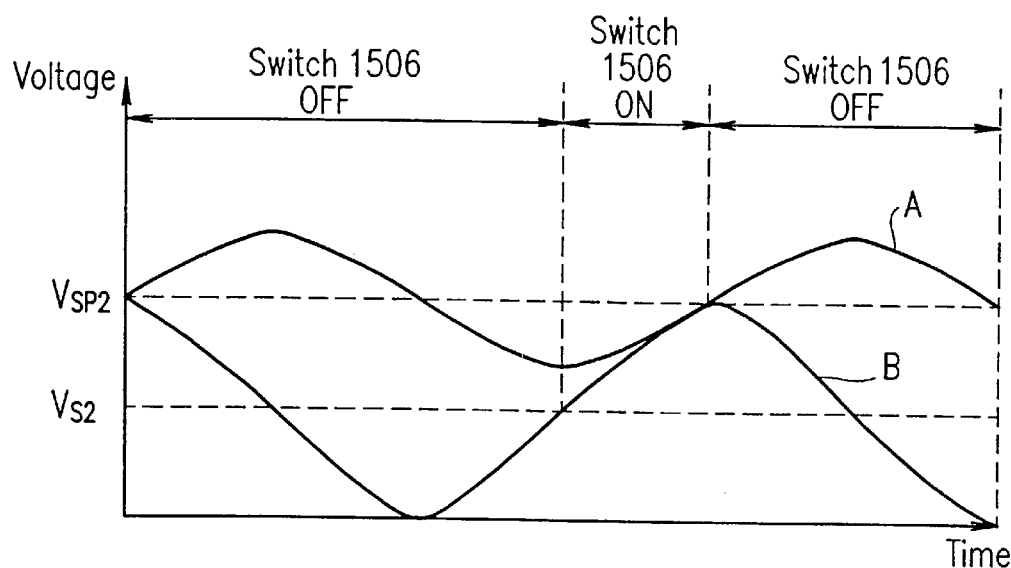
FIG. 63A  When synchronized
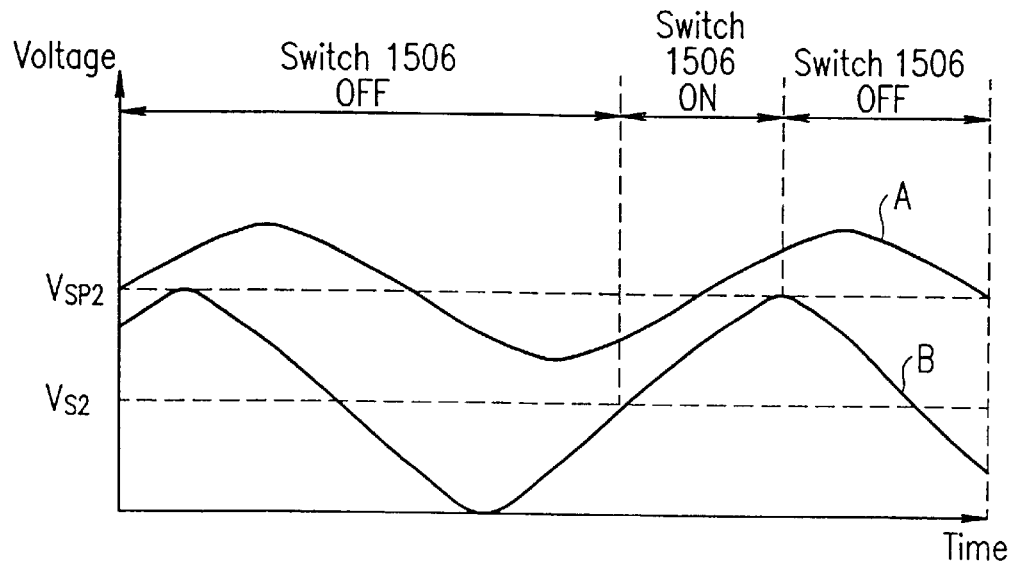
FIG. 63B  When not sufficiently synchronized

POWER SUPPLY APPARATUS WITH ENERGY RETURN FOR REUSE

This a division of application Ser. No. 09/284,141, filed Jun, 11. 1999 now U.S. Pat. No. 6,201,382 which is a 371 of PCT/JP97/03568 filed Oct. 6, 1997.

TECHNICAL FIELD

The present invention relates to a power supply apparatus and a voltage converter suitable for a low power LSI.

BACKGROUND ART

Circuits for increasing, decreasing and inverting a direct-current input voltage value to a different direct-current output voltage value include DC/DC converters. In view of the conversion efficiency and the amount of heat generated, a DC/DC converter has a better conversion efficiency and generates a smaller amount of heat than those of a regulator. They have a smaller device volume in comparison with a transformer. For these characteristics, they are used in work stations and personal computers, which are demanding in terms of the conversion efficiency, amount of heat generated, and device volume.

FIGS. 51A and 51B illustrate a structure of a conventional DC/DC converter 61. FIG. 51A illustrates a section for decreasing and outputting an input voltage. A power supply voltage is provided to a voltage input terminal. According to a pulse signal provided to a signal input terminal A and a signal input terminal B, NMOS transistors 50 and 51 are changed between an open state and a closed state. When the NMOS transistor 50 is closed while the NMOS transistor 51 is opened, a current is supplied to an LC section. The change in the supplied current over time is converted by an inductance L into a voltage, and a voltage increases faster at the terminal A than at an output terminal. Next, when the NMOS transistor 50 is opened while the NMOS transistor 51 is closed, a current is discharged from the LC section. The ratio between the supplied current and the discharged current determines the output voltage. When a period of time for which the NMOS transistor 50 is closed is longer than a period of time for which the NMOS transistor 51 is closed, the output voltage increases. When the period of time for which the NMOS transistor 50 is closed is shorter than the period of time for which the NMOS transistor 51 is closed, the output voltage decreases. For example, assume that the output voltage is 1.5 V when the period of time for which the NMOS transistor 50 is closed is equal to the period of time for which the NMOS transistor 51 is closed. Then, when the period of time for which the NMOS transistor 50 is closed is longer than the period of time for which the NMOS transistor 51 is closed, the output voltage is a voltage higher than 1.5 V. When the period of time for which the NMOS transistor 50 is closed is shorter than the period of time for which the NMOS transistor 51 is closed, the output voltage is a voltage lower than 1.5 V.

As illustrated in FIG. 51B, signals instructing the open/closed states of the NMOS transistors 50 and 51 are input through the signal input terminals A and B, and pulse signals input to the signal input terminals A and B are generated by a pulse generation section 55. The cycle and pulse width of an output pulse of the pulse generation section 55 are controlled by a control section 57. The control section 57 compares the voltage output from a reference voltage generation section 56 and the voltage at a monitor terminal of a voltage conversion section 54 with each other, and controls the cycle and pulse width of the pulse signal output from the pulse generation section so that the voltage at the monitor terminal is at a target voltage.

Recently, it has also been proposed to use a DC/DC converter in portable apparatuses such as a portable telephone or a PHS in order to prolong the life of a lithium ion battery. This is because there is a possibility that, by decreasing the output voltage of a lithium ion battery, which has a 3 V output voltage, to a voltage near 1 V by means of a DC/DC converter, and by operating an LSI used in a portable telephone at the voltage near 1 V, the power consumption of the LSI may be reduced.

However, in order to realize such a prolongation of battery life, it is necessary for the DC/DC converter to simultaneously solve the following problems (1) and (2).

(1) The conversion efficiency should not decrease even when converting the battery voltage to a voltage which is half or less than half of the battery voltage.

The output voltage of a lithium ion battery used in a portable telephone is 3 V. In order to reduce the power consumption of the LSI, it is necessary to efficiently decrease the output voltage of the lithium ion battery to 1 V. However, when it is attempted to effect such a voltage decrease using the conventional DC/DC converter 61 (FIG. 51B), the conversion efficiency decreases. This is because the power consumption of a control system circuit 58 in the conventional DC/DC converter 61 is large. For example, when the power supply voltage is 1 V, the power consumption of the LSI is about 10 mW, whereas the power consumption of the control system circuit 58, which includes the pulse generation section 55, the control section 57 and the reference voltage generation section 56, is about 100 mW. Thus, a cause of the decrease in conversion efficiency is that when the power supply voltage is low, the power consumption of the control system circuit 58 of the DC/DC converter 61 is larger than the power consumption of the LSI.

(2) The voltage conversion section should have an efficiency of 90% or more.

In the conventional DC/DC converter 61, the decrease in efficiency of the voltage conversion section 54 occurs due to currents flowing through the NMOS transistors 50 and 51. In the voltage conversion section 54, a doubled decrease in efficiency results for one cycle. This is because the NMOS transistors 50 and 51 are opened in a single cycle in the voltage conversion section 54.

Moreover, problems associated with the on-chip technique include (3) below.

(3) On-chip implementation should be easy.

In the conventional DC/DC converter 61, the value of the inductor 52 is about 100 µH. However, it is difficult to form an inductor having such a large value on a silicon substrate. This is because it is only possible to form an inductor of about 200 nH, at best, on a silicon substrate. When an inductor of about 100 µH is used, there is a possibility that radiating electromagnetic noise may cause malfunctioning of other LSIs.

Moreover, in order to realize a conversion efficiency of 80% or more in the conventional DC/DC converter 61, a resistance while the NMOS transistors 50 and 51 are closed (ON resistance) needs to be about 0.1 mΩ. However, it is difficult to form a switch having such a small ON resistance on a silicon substrate. This is because it is only possible to form a switch whose ON resistance is about 500 mΩ, at best, on a silicon substrate. When a switch having an ON resistance of about 500 mΩ is used, the conversion efficiency decreases to 60% or less.

Thus, any of the problems (1)–(3) cannot be solved with the conventional DC/DC converter 61.

An object of the present invention is to simultaneously solve the above-described problems (1)–(3) while providing a voltage converter which realizes a high-efficiency voltage conversion even when a small output current is output.

Moreover, the present invention is a basic invention of a power supply apparatus suitable for a low power LSI. The present invention has an objective to provide a power supply apparatus which has the following characteristics: (1) having substantially no energy loss; (2) being capable of generating various types of voltage waveforms; and (3) being suitable as a power supply for an LSI.

Furthermore, the present invention has an objective to provide a semiconductor integrated circuit comprising a power supply apparatus, including an LC resonance circuit, and at least one circuit block to which a power supply voltage is supplied from the power supply apparatus, wherein it is possible to reduce noise generated by the operation of the LC resonance circuit.

DISCLOSURE OF THE INVENTION

A power supply is provided In accordance with an aspect of the present invention. The power supply includes an energy supply which supplies energy at predetermined timing. In addition, the power supply includes an energy preserving circuit which receives the energy supplied from the energy supply and preserves the energy. The energy preserving circuit includes an inductor, a first capacitance connected to one end of the inductor at a first node, and a second capacitance connected to another end of the inductor at a second node. The energy is supplied to a load by the first node and/or the second node, and at least a portion of the energy supplied from the power supply to the load is returned to the power supply for reuse.

According to the present invention as defined by claim 1, the inductor included in the energy preserving means, the first capacitance and the second capacitance form a closed system having substantially no leakage of energy to the outside of the energy preserving means. Because the energy does not substantially leak to the outside of the energy preserving means, there is substantially no loss of energy in the power supply apparatus. Thus, it is possible to provide a low power consumption type power supply apparatus.

Moreover, according to the present invention as defined by claim 1, by setting the first capacitance and the second capacitance to predetermined values, respectively, it is possible to supply various types of voltage waveforms from the first node and the second node, respectively, to the load. For example, it is possible to supply a direct-current voltage waveform to the load from one of the first node and the second node. Alternatively, it is possible to supply an alternating-current voltage waveform to the load from one of the first node and the second node. Alternatively, it is possible to supply a direct-current voltage waveform to the load from one of the first node and the second node, while supplying an alternating-current voltage waveform to the load from the other one of the first node and the second node. Alternatively, it is possible to supply an alternating-current voltage waveform to the load from both of the first node and the second node.

In one embodiment, the load is a semiconductor circuit having a structure which provides a rectification function. The power supply apparatus of the present invention as defined by claim 1 is suitable for supplying a power supply to such a load. This is because the power supply apparatus of the present invention as defined by claim 1 has a structure in which a current never flows to the load in a concentrated manner.

In another embodiment, a direct-current voltage waveform is supplied to the load from one of the first node and the second node.

In still another embodiment, an alternating-current voltage waveform is supplied to the load from one of the first node and the second node.

In still another embodiment, a direct-current voltage waveform is supplied to the load from one of the first node and the second node, and an alternating-current voltage waveform is supplied to the load from another one of the first node and the second node.

In still another embodiment, an alternating-current voltage waveform is supplied to the load from one of the first node and the second node, and an alternating-current voltage waveform is supplied to the load from another one of the first node and the second node.

In still another embodiment, the power supply apparatus and the load are formed on a single semiconductor chip.

In still another embodiment, at least a portion of the energy supplied from the power supply apparatus to the load is returned to the power supply apparatus for reuse.

In still another embodiment, at least a portion of the energy supplied from the power supply apparatus to the load is returned to the power supply apparatus via one of the first node and the second node which is used when supplying the energy to the load.

In still another embodiment, at least a portion of the energy supplied from the power supply apparatus to the load is returned to the power supply apparatus via one of the first node and the second node which is different from one used when supplying the energy to the load.

A voltage converter of the present invention comprises: a voltage conversion section for converting a first voltage supplied from a power supply to a second voltage and supplying the second voltage to a voltage receiving circuit: and a control section for controlling the voltage conversion section so as to supply from the power supply to the voltage conversion section a power which is substantially equal to a power consumed by the voltage receiving circuit, thereby realizing the above-described objectives.

In one embodiment, the control section comprises a first detector for detecting that the second voltage output from the voltage conversion section has decreased below a desired voltage; and the control section controls the voltage conversion section when the first detector detects that the second voltage output from the voltage conversion section has decreased below the desired voltage.

Another voltage converter of the present invention comprises: a voltage conversion section for converting a first voltage supplied from a power supply to a second voltage and supplying the second voltage to a voltage receiving circuit; and a control section for controlling the voltage conversion section, wherein: the voltage conversion section includes a resonance circuit including an inductor, a first capacitance connected to one end of the inductor at a first node, and a second capacitance connected to another end of the inductor at a second node, and a switch having a first terminal and a second terminal, the first terminal being connected to the power supply, and the second terminal being connected to the first node of the resonance circuit; and the control section controls opening/closing of the switch. Thus, the above-described objectives are realized.

In one embodiment, the control section comprises a first detector for detecting that the second voltage output from the voltage conversion section has decreased below a desired voltage; and the control section controls opening/closing of the switch when the first detector detects that the second voltage output from the voltage conversion section has decreased below the desired voltage.

In another embodiment, the control section controls the opening/closing of the switch in a period during which a voltage at the first node is smaller than the first voltage supplied from the power supply and larger than the desired voltage.

In still another embodiment, the control section further comprises: a second detector for detecting that a voltage at the first node has reached a predetermined first reference voltage; and a third detector for detecting that the voltage at the first node has reached a predetermined second reference voltage which is larger than the predetermined first reference voltage, wherein: when the second detector detects that the voltage at the first node has reached the predetermined first reference voltage, the control section controls the switch so that a state of the switch changes from an open state to a closed state; and when the third detector detects that the voltage at the first node has reached the predetermined second reference voltage, the control section controls the switch so that the state of the switch changes from the closed state to the open state.

In still another embodiment, the first detector initiates operation thereof in synchronization with a timing at which the voltage receiving circuit operates.

In still another embodiment, the control section comprises a fourth detector for detecting that the second voltage output from the voltage conversion section has reached a predetermined reference voltage; in response to a reset signal, the control section controls the switch so that a state of the switch changes from an open state to a closed state; and when the fourth detector has detected that the second voltage output from the voltage conversion section has reached the predetermined reference voltage, the control section controls the switch so that the state of the switch changes from the closed state to the open state.

In still another embodiment, the control section further comprises: a clock signal generator for generating a clock signal according to a voltage change at the first node; and a circuit for outputting the reset signal when detecting that a frequency of the clock signal is different from a predetermined frequency.

In still another embodiment, the control section further comprises a circuit for outputting the reset signal when detecting that a maximum value of a voltage change at the first node is smaller than a predetermined reference voltage.

In still another embodiment, the control section further comprises a first reference voltage generator for generating the desired voltage: and the first reference voltage generator only operates in a period during which the first detector operates.

In still another embodiment, the control section further comprises a first reference voltage generator for generating the desired voltage; and the first reference voltage generator varies the desired voltage according to a signal sent from the voltage receiving circuit.

In still another embodiment, the control section further comprises a second detector for detecting that a voltage at the first node has reached a predetermined first reference voltage; when the second detector detects that the voltage at the first node has reached the predetermined first reference voltage, the control section controls the switch so that a state of the switch changes from an open state to a closed state; and the control section controls the switch so that the state of the switch changes from the closed state to the open state after passage of a predetermined time since when the state of the switch has changed from the open state to the closed state.

In still another embodiment, the control section controls the opening/closing of the switch in a period during which the voltage at the first node is increasing.

In still another embodiment, the control section controls the opening/closing of the switch in a period during which the voltage at the first node is decreasing.

In still another embodiment, the voltage conversion section further comprises storage means for temporarily storing a return current which flows through the switch from the inductor toward the power supply.

Still another voltage converter of the present invention is a voltage converter for converting a voltage supplied from a power supply to a desired voltage and supplying the desired voltage to a voltage receiving circuit, the voltage converter comprising: a first voltage converter having a first conversion efficiency; a second voltage converter having a second conversion efficiency which is higher than the first conversion efficiency when a current smaller than a predetermined current flows from the voltage converter to the voltage receiving circuit; and a current detector for detecting a current flowing from the voltage converter to the voltage receiving circuit, wherein the first voltage converter operates when a current detected by the current detector is larger than the predetermined current, whereas the second voltage converter operates when the current detected by the current detector is smaller than the predetermined current. Thus, the above-described objectives are realized.

Still another voltage converter of the present invention comprises: a voltage conversion section for converting a first voltage supplied from a power supply to a second voltage and supplying the second voltage to a voltage receiving circuit; and a control section for controlling the voltage conversion section, wherein the voltage conversion section includes: a first resonance circuit including a first inductor, a first capacitance connected to one end of the first inductor at a first node, and a second capacitance connected to another end of the first inductor at a second node, a first switch having a first terminal and a second terminal, the first terminal being connected to the power supply, and the second terminal being connected to the first node of the first resonance circuit, a second resonance circuit including a second inductor, a third capacitance connected to one end of the second inductor at a third node, and a fourth capacitance connected to another end of the second inductor at a fourth node, and a second switch having a third terminal and a fourth terminal, the third terminal being connected to the second node of the first resonance circuit, and the fourth terminal being connected to the third node of the second resonance circuit; and the control section controls opening/closing of the first switch and the second switch. Thus, the above-described objectives are realized.

Still another voltage converter of the present invention comprises: a voltage conversion section for converting a first voltage supplied from a power supply to a second voltage and supplying the second voltage to a voltage receiving circuit, and a control section for controlling the voltage conversion section, wherein the voltage conversion section includes: a resonance circuit including a first inductor, a first capacitance connected to one end of the first inductor at a first node, and a second capacitance connected to another end of the first inductor at a second node, a first switch having a first terminal and a second terminal, the first terminal being connected to the power supply, and the second terminal being connected to the first node of the resonance circuit, and a modulation resonance circuit including a second inductor, a third capacitances and a second switch having a third terminal and a fourth terminal, one end of the second inductor being connected to the second capacitance at a third node, another end of the second inductor being connected to the second node, the third terminal of the second switch being connected to the power supply, and the fourth terminal of the second switch being connected to the third node; and the control section controls opening/closing of the first switch and the second switch. Thus, the above-described objectives are realized.

Still another voltage converter of the present invention comprises: a voltage conversion section for converting a first voltage supplied from a power supply to a second voltage and supplying the second voltage to a voltage receiving circuit; and a control section for controlling the voltage conversion section, wherein the voltage conversion section includes: a resonance circuit including a first inductor, a first capacitance connected to one end of the first inductor at a first node, and a second capacitance connected to another end of the first inductor at a second node, a first switch having a first terminal and a second terminal, the first terminal being connected to the power supply, and the second terminal being connected to the first node of the resonance circuit, and a modulation resonance circuit including a second inductor, a third capacitance, and a second switch having a third terminal and a fourth terminal, one end of the second inductor being connected to the first node, another end of the second inductor being connected to the third capacitance at a third node, the third terminal of the second switch being connected to the power supply, and the fourth terminal of the second switch being connected to the third node; and the control section controls opening/closing of the first switch and the second switch. Thus, the above-described objectives are realized.

A semiconductor integrated circuit of the present invention comprises: a power supply apparatus including an LC resonance circuit; and at least one circuit block to which a power supply voltage is supplied from the power supply apparatus, wherein a resonance frequency of the LC resonance circuit is set so that an intensity of noise which is determined based on the resonance frequency is equal to or less than a predetermined value within a frequency band used by the at least one circuit block. Thus, the above-described objectives are realized.

The power supply apparatus and the at least one circuit block may be formed on a single semiconductor chip.

The power supply apparatus and the at least one circuit block may be formed on different semiconductor chips.

The power supply apparatus may supply a direct-current voltage to the at least one circuit block.

BRIEF DESCRIPTION OF THE DRAWINGS

FIGS. 2A–2E are diagrams schematically illustrating dynamic energy being kept constant while moving between a capacitance 223 and a capacitance 225 via an inductor 221 in an energy preserving circuit 220.

FIG. 3 is a diagram illustrating an exemplary alternating-current voltage waveform at a node 222 when $C_1 \gg C_2$.

FIG. 5 is a diagram illustrating an equivalent circuit when an LSI including a parasitic diode 250 is connected to the node 222 of the power supply apparatus 200.

FIG. 8 is a diagram illustrating a structure of a power supply apparatus 1301.

FIGS. 63A and 63B are diagrams each illustrating a timing at which the switch 1506 is turned ON/OFF.

BEST MODE FOR CARRYING OUT THE INVENTION

1. Basic Principle of Power Supply Apparatus of the Present Invention

Figure 1:
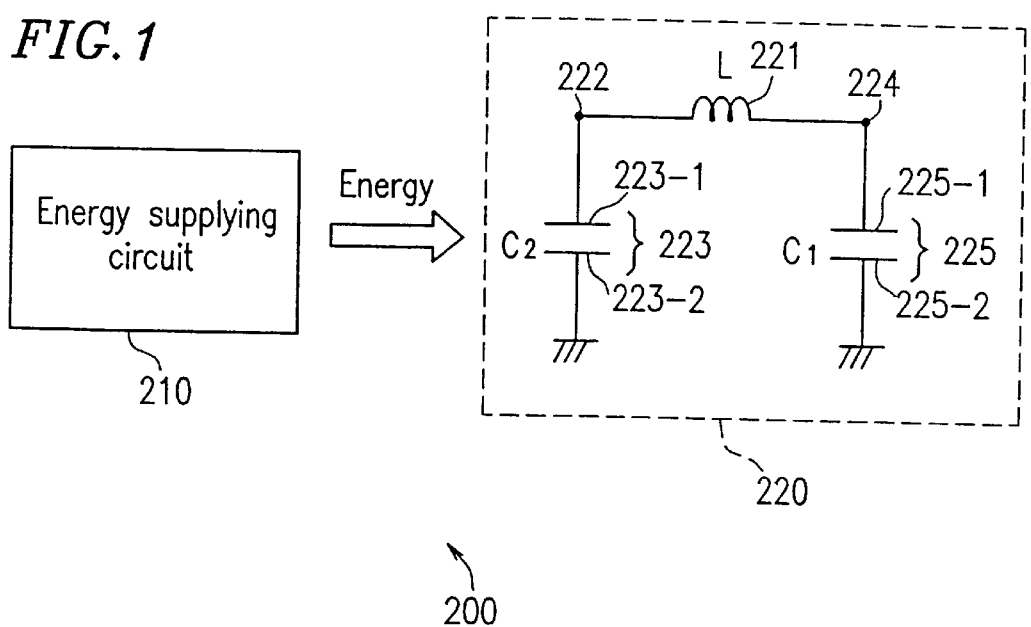
FIG. 1 is a diagram illustrating a structure of a power supply apparatus 200 according to the present invention.

FIG. 1 illustrates a structure of a power supply apparatus 200 according to the present invention. The power supply apparatus 200 includes an energy supplying circuit 210 and an energy preserving circuit 220.

The energy supplying circuit 210 supplies energy to the energy preserving circuit 220 at a predetermined timing. The energy supplied from the energy supplying circuit 210 may be any energy. For example, the energy supplied from the energy supplying circuit 210 is electric energy (power), optical energy, magnetic energy, or radiation energy.

The energy preserving circuit 220 receives the energy supplied from the energy supplying circuit 210, and preserves the energy. The energy preserving circuit 220 includes an inductor 221, a capacitance 223 connected to one end of the inductor 221 at a node 222, and a capacitance 225 connected to the other end of the inductor 221 at a node 224. Herein, L denotes the inductance of the inductor 221, $C_1$ denotes a capacitance value of the capacitance 225, and $C_2$ denotes a capacitance value of the capacitance 223.

The energy preserved in the energy preserving circuit 220 is supplied to a load (not shown in FIG. 1) via at least one of the node 222 and the node 224.

The power supply apparatus 200 and the load may be formed on a single semiconductor chip. As will be described later, a relatively small value is sufficient as the value of the inductor used in the power supply apparatus 200. For example, the value of such an inductor is about 100 nH. Therefore, it is easy to form the power supply apparatus 200 on a silicon substrate.

The power supply apparatus 200 has the following characteristics (1)–(3):

(1) there is substantially no energy loss in the power supply apparatus 200;

(2) the power supply apparatus 200 is capable of generating various types of voltage waveforms; and (3) the power supply apparatus 200 is suitable as a power supply for an LSI.

Characteristic 1: Substantially No Energy Loss

As illustrated in FIG. 1, the capacitance 223 has a pole plate 223-1 and a pole plate 223-2. The pole plate 223-1 and the pole plate 223-2 are electrically insulated from each other. The pole plate 223-1 is connected to the node 222, and the pole plate 223-2 is connected to the ground. Similarly, the capacitance 225 has a pole plate 225-1 and a pole plate 225-2. The pole plate 225-1 and the pole plate 225-2 are electrically insulated from each other. The pole plate 225-1 is connected to the node 224, and the pole plate 225-2 is connected to the ground.

Energy supplied from the energy supplying circuit 210 generates a charge in a closed system from the pole plate 223-1 of the capacitance 223 via the inductor 221 to the pole plate 225-1 of the capacitance 225. The charge thus generated cannot move to the outside of the closed system. This is because there is no passage for the charge to move from the pole plate 223-1 to the pole plate 223-2 since the pole plate 223-1 and the pole plate 223-2 are electrically insulated from each other, and there is no passage for the charge to move from the pole plate 225-1 to the pole plate 225-2 since the pole plate 225-1 and the pole plate 225-2 are electrically insulated from each other.

Thus, the amount of charge in the closed system is kept constant. This means that the amount of static energy is kept constant in the energy preserving circuit 220. This is because static energy is represented by the amount of charge in the closed system. The amount of static energy preserved in the energy preserving circuit 220 is represented by $1/2 \cdot (q_1 + q_2)^2 / (C_1 + C_2)$. Herein, $q_1$ denotes the amount of charge stored in the capacitance 225, and $q_2$ denotes the amount of charge stored in the capacitance 223. In other words, static energy may be considered as energy which the closed system has when the voltages at the terminals included in the closed system no longer change and become constant, i.e., when the voltages become stationary, so to speak.

FIGS. 2A–2E schematically illustrate dynamic energy being kept constant while moving between the capacitance 223 and the capacitance 225 via the inductor 221 in the energy preserving circuit 220. The state of the dynamic energy in the energy preserving circuit 220 transitions from the state illustrated in FIG. 2A to the state illustrated in FIG. 2E, and then transitions from the state illustrated in FIG. 2E to the state illustrated in FIG. 2A. Thereafter, such a state change is repeated.

The dynamic energy is classified into energy stored in the inductor 221 and energy based on the difference in the amount of charge (potential difference) between the capacitance 223 and the capacitance 225. In FIGS. 2A–2E, $E_{M1}$ denotes the energy stored in the inductor 221, and $E_{M2}$ denotes the energy based on the difference in the amount of charge (potential difference) between the capacitance 223 and the capacitance 225. ($E_{M1} + E_{M2}$) is kept constant. $E_{M1} = 1/2 \cdot L i_1^2$. Herein, $i_1$ denotes a current flowing through the inductor 221. $E_{M2} = |1/2 \cdot q_1^2 / C_1 - 1/2 \cdot q_2^2 / C_2|$. Herein, $q_1$ denotes the amount of charge stored in the capacitance 225, and $q_2$ denotes the amount of charge stored in the capacitance 223. In other words, the dynamic energy may be considered as energy which can make the voltages at the terminals included in the closed system oscillate, i.e., which can move the voltages, so to speak.

The energy $E_{M1}$ stored in the inductor 221 acts to move the charge from the capacitance 223 toward the capacitance 225 (or from the capacitance 225 toward the capacitance 223). Therefore, until the energy $E_{M1}$ stored in the inductor 221 becomes zero, the movement of the charge from the capacitance 223 toward the capacitance 225 (or from the capacitance 225 toward the capacitance 223) continues.

When the energy $E_{M1}$ stored in the inductor 221 is zero, the energy $E_{M2}$ based on the difference in the amount of charge (potential difference) between the capacitance 223 and the capacitance 225 is maximized. Therefore, the charge starts moving in such a direction as to eliminate the difference in the amount of charge (potential difference) between the capacitance 223 and the capacitance 225. As the charge passes through the inductor 221, the energy $E_{M1}$ is stored in the inductor 221. Thereafter, such a process is repeated.

Thus, the energy preserving circuit 220 keeps the static energy and the dynamic energy substantially constant. In other words, there is substantially no leakage of static energy and the dynamic energy to the outside of the energy preserving circuit 220. Herein, "substantially" means that there is no energy leakage except for unintentional energy leakage such as leakage of static energy due to a leakage current flowing between the pole plates of the capacitances 223 and 225, or leakage of the dynamic energy due to decay based on the resistance of the inductor 221. This means that there is generally no loss of energy in the power supply apparatus 200. Thus, it is possible to provide a low power consumption type power supply apparatus.

Characteristic 2: Capable of Generating Various Types of Voltage Waveforms

By setting the capacitance value of the capacitance 223 and the capacitance value of the capacitance 225 so as to satisfy the relationship $C_1 \gg C_2$, it is possible to generate an alternating-current voltage waveform at the node 222 and a direct-current voltage waveform at the node 224. Such voltage waveforms can be obtained based on resonance in the energy preserving circuit 220. The mathematical basis for the voltage waveforms will be described later with reference to (Expression 1)–(Expression 17).

Moreover, by setting the capacitance value of the capacitance 223 and the capacitance value of the capacitance 225 so as to satisfy the relationship $C_1 \approx C_2$, it is possible to generate an alternating-current voltage waveform at both the node 222 and the node 224.

Furthermore, by adjusting the ratio between a part of the energy supplied from the energy supplying circuit 210 which is preserved in the energy preserving circuit 220 as static energy and a part of the energy which is preserved in the energy preserving circuit 220 as dynamic energy, it is possible to arbitrarily set the center of the amplitude of the alternating-current voltage waveform and the amplitude of the alternating-current voltage waveform. This is because the static energy determines the center of the amplitude of the alternating-current voltage waveform, and the dynamic energy determines the amplitude of the alternating-current voltage waveform.

FIG. 3 illustrates an exemplary alternating-current voltage waveform at the node 222 when $C_1 \gg C_2$. By appropriately providing the static energy $E_S$ and the dynamic energy $E_M$ as described above, it is possible to obtain an alternating-current voltage waveform such that the center of the amplitude thereof is at the voltage $V_P$ and the amplitude thereof is $1/2\, V_{DD}$. Note that the voltage at the node 222 is always higher than or equal to the ground voltage.

When $C_1 \gg C_2$, the voltage waveform at the node 222 can be approximated to a sinusoidal wave which oscillates with a cycle $T_0 = 2\pi(\sqrt{LC_2})$. Therefore, by making the product ($LC_2$) of the inductance L of the inductor 221 and the capacitance value $C_2$ of the capacitance 223 variable, it is possible to adjust the cycle $T_0$ of the voltage waveform at the node 222 to any value. $LC_2$ may be previously adjusted to a predetermined value before the operation of the power supply apparatus 200, and be fixed to the predetermined value during the operation of the power supply apparatus 200. Alternatively, $LC_2$ may be dynamically controlled by a control circuit during the operation of the power supply apparatus 200. For example, the control circuit controls $LC_2$ so that the cycle $T_0$ is longer as the energy supplied from the energy supplying circuit 210 to the energy preserving circuit 220 is smaller, and controls $LC_2$ so that the cycle $T_0$ is shorter as the energy supplied from the energy supplying circuit 210 to the energy preserving circuit 220 is larger.

By controlling the cycle $T_0$ as described above, the number of times in a time unit that the voltage at the node 222 comes close to the power supply voltage $V_{DD}$ can be increased as the energy supplied from the energy supplying circuit 210 to the energy preserving circuit 220 is larger. Therefore, by controlling the timing of energy supply so that the energy is supplied from the energy supplying circuit 210 to the energy preserving circuit 220 in a period of time (period $T_A$ in FIG. 3) during which the voltage at the node 222 is close to the power supply voltage $V_{DD}$, it is possible to minimize the energy loss which occurs when the energy is supplied from the energy supplying circuit 210 to the energy preserving circuit 220. This is because the most efficient energy supply is to supply the energy from the energy supplying circuit 210 to the energy preserving circuit 220 in a period of time (period $T_A$ in FIG. 3) during which the voltage at the node 222 is close to the power supply voltage $V_{DD}$.

Moreover, by making L and $C_2$ variable under a condition that $LC_2$ is kept constant, it is possible to adjust the ratio between the static energy $E_S$ and the dynamic energy $E_M$ contained in the energy supplied from the energy supplying circuit 210 without changing the cycle $T_0$. By decreasing the inductance L of the inductor 221 by increasing the capacitance value $C_2$ of the capacitance 223, it is possible to increase the energy stored in the capacitance 223 and the capacitance 225 (static energy), and to reduce the energy stored in the inductor 221 (dynamic energy). Conversely, by increasing the inductance L of the inductor 221 by decreasing the capacitance value $C_2$ of the capacitance 223, it is possible to reduce the energy stored in the capacitance 223 and the capacitance 225 (static energy), and to increase the energy stored in the inductor 221 (dynamic energy).

Exemplary adjustment of the capacitance value $C_2$ and the inductance L has been described above. Moreover, by adjusting the capacitance value $C_1$, the capacitance value $C_2$ and the inductance L, it is possible to more specifically adjust the ratio between the static energy $E_S$ and the dynamic energy $E_M$.

For example, assume that a current $i_0$ flows from the node 222 by the energy supplying circuit 210. Assume that a part of the current $i_0$ which flows into the capacitance 223 is a current $i_1$, and a part of the current $i_0$ which flows into the capacitance 225 is a current $i_2$. The ratio between the current $i_1$ and the current $i_2$ can be set to any value by adjusting the capacitance value $C_1$, the capacitance value $C_2$ and the inductance L. The energy stored in the capacitance 223 and the capacitance 225 (static energy) is represented by $1/2 \cdot (q_1+q_2)^2/(C_1+C_2)$, and the energy stored in the inductor 221 (dynamic energy) is represented by $1/2 \cdot L i_1^2$. Herein, $q_1$ denotes the amount of charge stored in the capacitance 225, and $q_2$ denotes the amount of charge stored in the capacitance 223. Therefore, by adjusting the ratio between the current $i_1$ and the current $i_2$, it is possible to adjust the energy stored in the capacitance 223 and the capacitance 225 (static energy) and the energy stored in the inductor 221 (dynamic energy).

The capability of freely controlling the center of the amplitude or the amplitude of an alternating-current voltage waveform as described above is suitable for charging a capacitive load utilizing the "principle of adiabatic charging". The "principle of adiabatic charging" is a principle regarding charging of a capacitive load using an alternating-current voltage waveform. It is known that according to the "principle of adiabatic charging", when the capacitive load is charged over a longer period of time, the energy loss associated with the charging can be reduced.

Figure 4A:
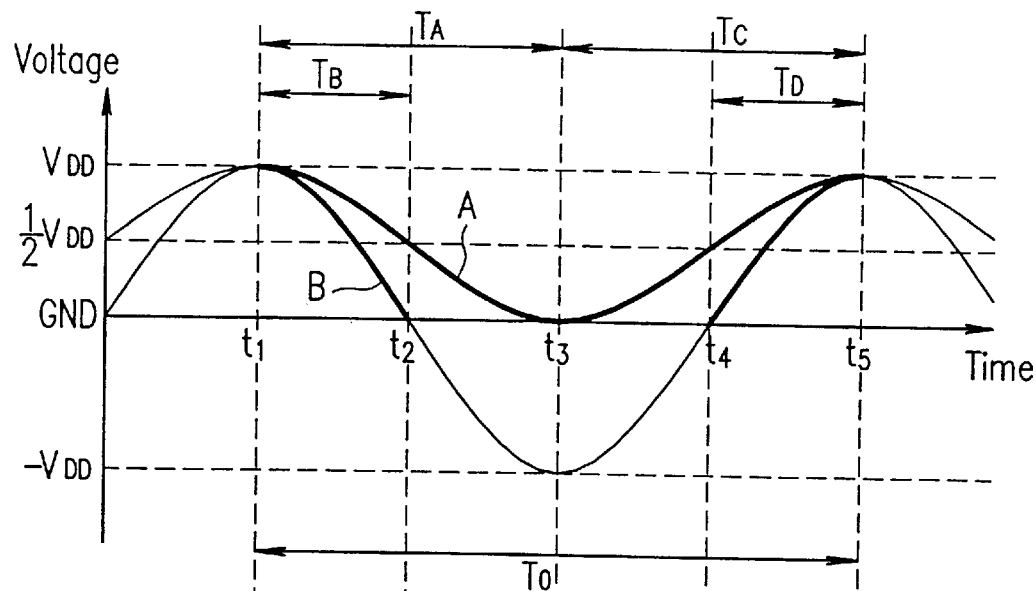
FIGS. 4A and 4B are diagrams each illustrating an exemplary alternating-current voltage waveform.

FIG. 4A illustrates an alternating-current voltage waveform (A) which oscillates between the power supply voltage $V_{DD}$ and the ground voltage GND in the cycle $T_0$ in comparison with an alternating-current voltage waveform (B) which oscillates between the power supply voltage $V_{DD}$ and a voltage $-V_{DD}$ in the cycle $T_0$. In adiabatic charging from the power supply voltage $V_{DD}$ to the ground voltage GND, the length of an adiabatic charging period $T_A$ for the alternating-current voltage waveform (A) is twice as much as the length of an adiabatic charging period $T_B$ for the alternating-current voltage waveform (B). Therefore, it can be seen that it is advantageous to perform the adiabatic charging using the alternating-current voltage waveform (A) because the energy loss is smaller. This is similarly true in adiabatic charging from the ground voltage GND to the power supply voltage $V_{DD}$.

Figure 4B:
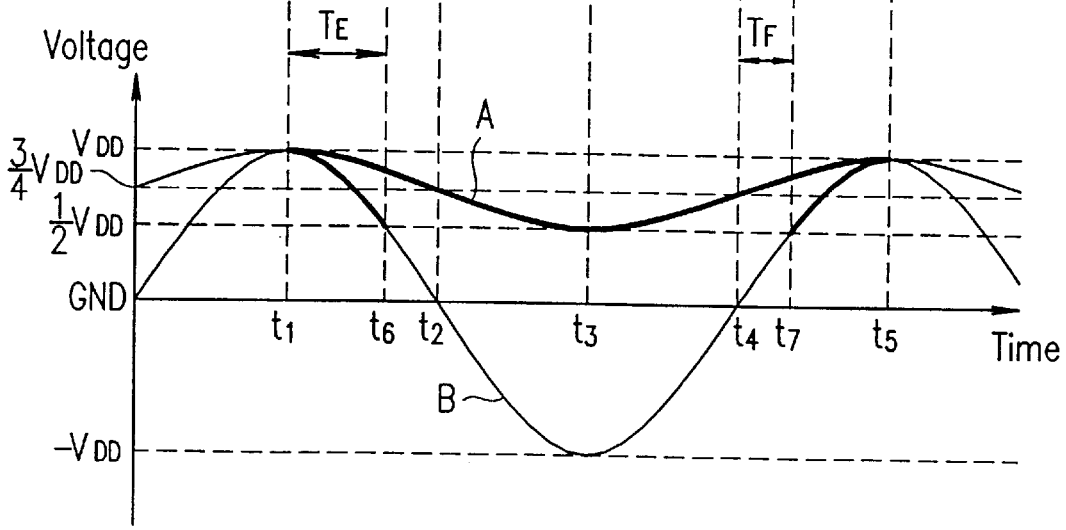

FIG. 4B illustrates an alternating-current voltage waveform (A) which oscillates between the power supply voltage $V_{DD}$ and the voltage $1/2\ V_{DD}$ in the cycle $T_0$ in comparison with an alternating-current voltage waveform (B) which oscillates between the power supply voltage $V_{DD}$ and the voltage $-V_{DD}$ in the cycle $T_0$. In adiabatic charging from the power supply voltage $V_{DD}$ to the voltage $1/2\ V_{DD}$, the length of the adiabatic charging period $T_A$ for the alternating-current voltage waveform (A) is about four times as much as the length of an adiabatic charging period $T_E$ for the alternating-current voltage waveform (B). Therefore, it can be seen shown that it is advantageous to perform the adiabatic charging using the alternating-current voltage waveform (A) because the energy loss is smaller. This is similarly true in adiabatic charging from the voltage $1/2\ V_{DD}$ to the power supply voltage $V_{DD}$.

Moreover, a comparison between FIG. 4A and FIG. 4B shows that a smaller amplitude of an alternating-current voltage waveform is more effective in performing adiabatic charging.

Characteristic 3: Suitable as Power Supply for LSI

Consider a case where an LSI is connected as a load at the node 222 of the power supply apparatus 200. An LSI always includes a parasitic diode. In the present specification, a parasitic diode is defined to refer to a semiconductor circuit having a structure which provides a rectification function. For example, a protection diode which is provided to protect the inside of an LSI against an inrush current occurring outside the LSI is a parasitic diode. When the LSI uses a bipolar transistor, a parasitic diode is formed between the base and the emitter and between the base and the collector, for example. When the LSI uses a MOS transistor, a parasitic diode is formed between the source and the well and between the drain and the well, for example.

FIG. 5 illustrates an equivalent circuit when an LSI including a parasitic diode 250 is connected to the node 222 of the power supply apparatus 200. When the voltage at the node 222 is lower than the ground voltage GND, a forward current flows through the parasitic diode 250. Thus, a power is consumed in the parasitic diode 250. As a result, an energy loss occurs. Moreover, the flow of the forward current through the parasitic diode 250 may damage the parasitic diode 250. This is because the energy stored in the inductor 221 may be consumed by the parasitic diode 250 in a concentrated manner.

On the contrary, with the power supply apparatus 200 according to the present invention, it is possible to control an alternating-current voltage waveform so that the voltage at the node 222 is always higher than or equal to the ground voltage GND, as described in Characteristic 2. Under such a control, a forward current never flows through the parasitic diode 250. Therefore, an energy loss never occurs due to the parasitic diode 250 included in the LSI.

Moreover, even if a forward current flows through the parasitic diode 250, it never results in destruction of the parasitic diode 250. This is because the dynamic energy stored in the inductor 221 is converted to static energy and preserved in the energy preserving circuit 220.

Conventionally, it has been common to form an LSI by integrating digital circuits, SRAMs (static random access memories), or ROMs (read only memories). In recent years, there is a trend to form an LSI by integrating flash memories, DRAMs (dynamic random access memories) or analog circuits for a range from a high frequency to a low frequency. It is expected that this trend will grow further in the future, and we will enter a new integrated circuit era in ten years. In order for the respective circuit blocks of such a integrated circuit to operate in a higher control domain, a power supply is necessary which generates with high efficiency various voltages required by the respective circuit blocks. This is because it is possible to realize an improved system operation of an integrated circuit by reducing the power consumption of various types of circuit block. Moreover, a low noise characteristic is demanded in certain frequency domains.

The power supply apparatus of the present invention realizes, as a single power supply, high efficiency conversion from dynamic energy to static energy and high efficiency supply of an alternating-current power supply and a direct-current power supply to a load. By combining a plurality of such single power supply apparatuses, a multi power supply apparatus can be obtained. A multi power supply apparatus generates a plurality of power supply voltages. The multi power supply apparatus may be one obtained by combining a plurality of power supply apparatuses of the same type, or one obtained by combining a plurality of power supply apparatuses of different types.

Figure 6A:
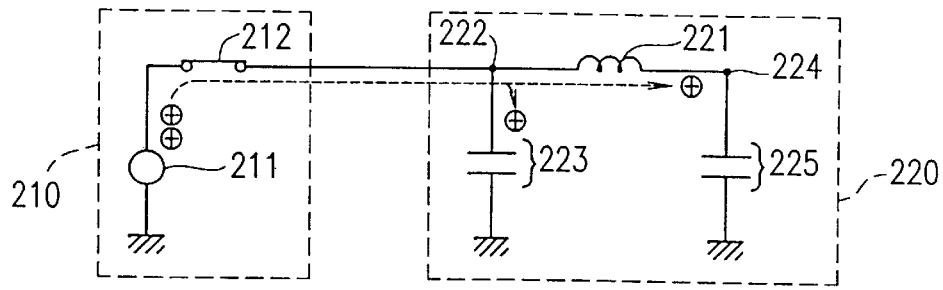
FIGS. 6A–6D are diagrams each illustrating a structure of an energy supplying circuit 210.

FIG. 6A illustrates a structure of the energy supplying circuit 210. The energy supplying circuit 210 supplies electric energy (power) to the node 222 of the energy preserving circuit 220. The energy supplying circuit 210 is connected to the energy preserving circuit 220 at the node 222.

The energy supplying circuit 210 as illustrated in FIG. 6A includes a direct-current power supply 211, and a switch 212 provided between the direct-current power supply 211 and the node 222.

When the switch 212 is turned ON, charge from the direct-current power supply 211 is supplied to the energy preserving circuit 220 via the switch 212. By controlling the timing to turn ON the switch 212, it is possible to supply the charge from the direct-current power supply 211 to the energy preserving circuit 220 at a predetermined timing.

An alternating-current power supply may be used instead of the direct-current power supply 211. By switching the power from the alternating-current power supply at a predetermined timing, the alternating-current power supply can be considered as a direct-current power supply.

Moreover, instead of the direct-current power supply 211, a power supply which supplies a voltage having a pulse-like waveform may be used. The magnitude of the power supplied from such a power supply may be controlled by a pulse width modulation, for example. When such a power supply is used, the switch 212 is no longer necessary.

Figure 6B:
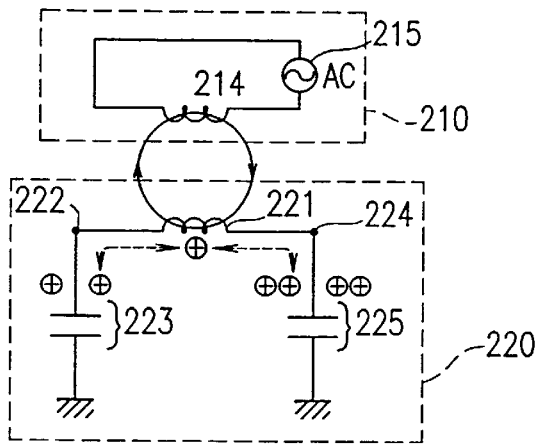

FIG. 6B illustrates another structure of the energy supplying circuit 210. The energy supplying circuit 210 supplies magnetic energy to the inductor 221 of the energy preserving circuit 220. The energy supplying circuit 210 and the energy preserving circuit 220 are not in contact with each other.

The energy supplying circuit 210 illustrated in FIG. 6B includes an inductor 214, and an alternating-current power supply 215. A current flowing through the inductor 214 of the energy supplying circuit 210 generates a magnetic field, and a current flows through the inductor 221 of the energy preserving circuit 220 due to the magnetic field. Due to the current flowing though the inductor 221, dynamic energy is stored in the inductor 221. Thus, the magnetic energy supplied from the energy supplying circuit 210 is received by the inductor 221 of the energy preserving circuit 220 and is preserved in the energy preserving circuit 220 as dynamic energy.

Figure 6C:
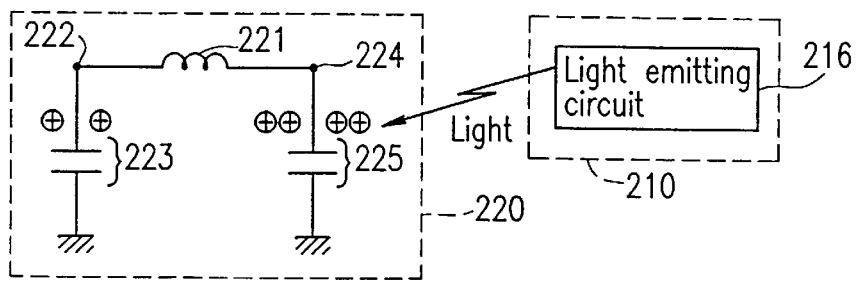

FIG. 6C illustrates another structure of the energy supplying circuit 210. The energy supplying circuit 210 supplies optical energy to at least one of the capacitance 223 and the capacitance 225 of the energy preserving circuit 220. The energy supplying circuit 210 and the energy preserving circuit 220 are not in contact with each other.

The energy supplying circuit 210 illustrated in FIG. 6C includes a light emitting circuit 216 which radiates light. At least one of the capacitance 223 and the capacitance 225 has a function of converting received light to electricity. Thus, optical energy supplied from the energy supplying circuit 210 is received by the capacitance 223 (or the capacitance 225) of the energy preserving circuit 220 and is preserved in the energy preserving circuit 220 as static energy. For example, the capacitance 223 (or the capacitance 225) may be a photodiode or a solar battery.

Figure 6D:
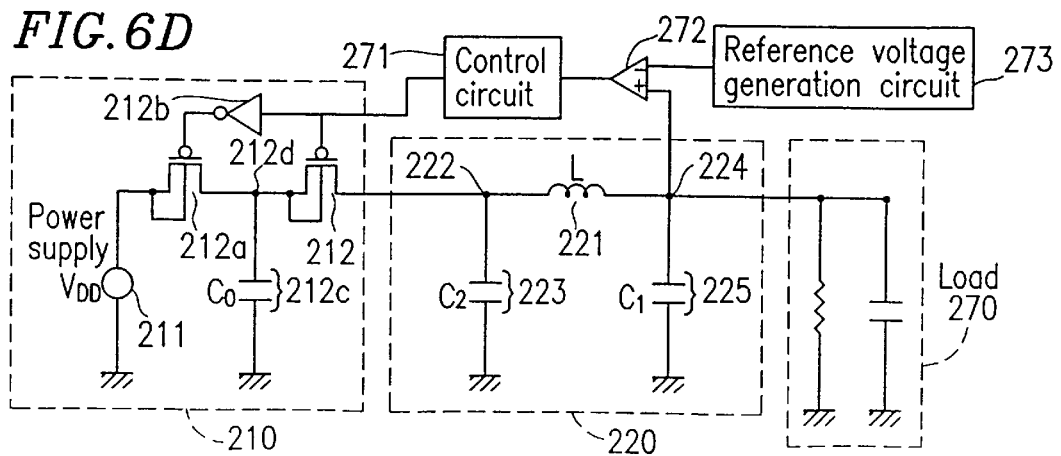

FIG. 6D illustrates another structure of the energy supplying circuit 210.

The energy supplying circuit 210 illustrated in FIG. 6D includes a power supply 211, a switch 212, a switch 212a, an inverter 212b and a capacitance 212c.

In the energy preserving circuit 220, when the voltage at the node 222 is increasing, typically, a current is flowing through the inductor 221 from the capacitance 225 toward the capacitance 223. When the switch 212 is turned ON while such a current is flowing, a current temporarily flows though the switch 212 from the inductor 221 toward the power supply 211. Herein, this current is referred to as a "return current". The return current is stored in the power supply 211. However, when the power supply 211 is a power supply which is not of an energy storing type (e.g., a type of power supply in which the output stage generally draws in the current and discards it to the ground), or when the power supply 211 is a power supply, such as a battery, etc., which has a large parasitic internal resistance (e.g., a lithium ion battery), the loss of energy increases. This is because the return current is discarded through the power supply 211 to the ground in a power supply which is not of an energy storing type, whereas the energy is lost due to the parasitic internal resistance in a battery.

The switch 212a and the capacitance 212c are provided to prevent the return current from flowing into the power supply 211. The switch 212a is provided between the power supply 211 and the switch 212. The capacitance 212c is connected to a node 212d between the switch 212a and the switch 212. The capacitance 212c has a capacitance value $C_0$.

When the switch 212 is ON, the switch 212a is turned OFF. In such a case, the return current is stored in the capacitance 212c. Thus, energy is stored in the capacitance 212c. The energy stored in the capacitance 212c may be supplied to the energy preserving circuit 220.

When the switch 212 is OFF, the switch 212a is turned ON. As a result, a current flows from the power supply 211 to the capacitance 212c, and the voltage at the capacitance 212c becomes equal to the power supply voltage $V_{DD}$.

The inverter 212b is used to alternately turn ON/OFF the switch 212 and the switch 212a. The above-described operation is repeated by alternately turning ON/OFF the switch 212 and the switch 212a.

Figure 58A:
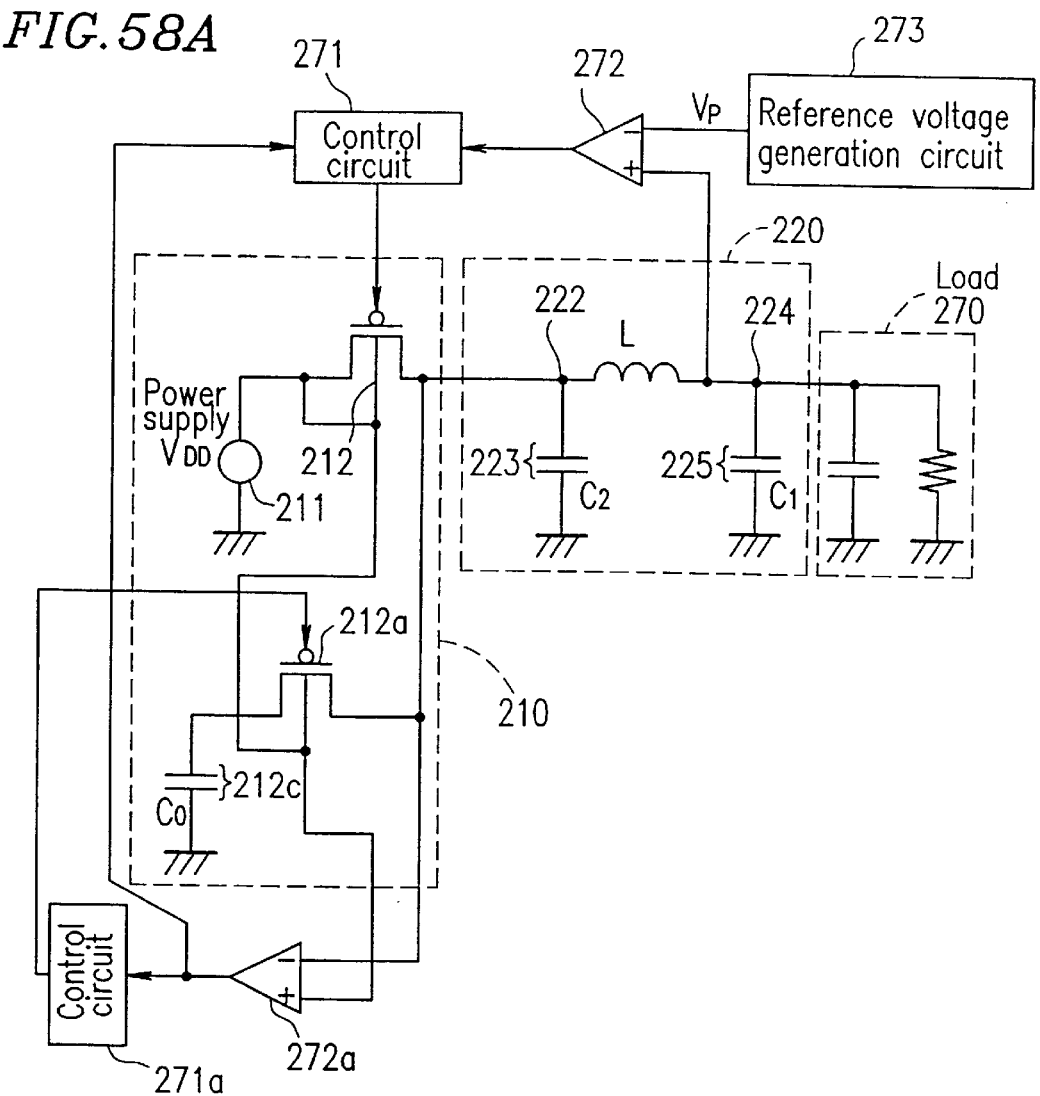
FIG. 58A is a diagram illustrating another structure of energy supplying circuit 210.

FIG. 58A illustrates another structure of the energy supplying circuit 210.

The energy supplying circuit 210 illustrated in FIG. 58A includes a power supply 211, a switch 212, a switch 212a and a capacitance 212c. The capacitance 212c temporarily stores a return current.

Figure 58B:
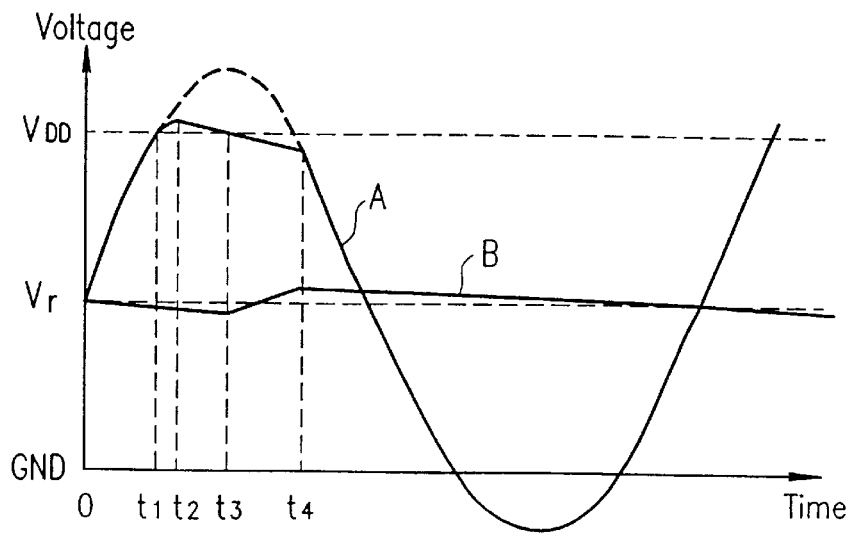
FIG. 58B is a diagram illustrating a voltage change at the node 222 (waveform (A)) and a voltage change at the node 224 (waveform (B)).

FIG. 58B illustrates a voltage change at the node 222 (waveform (A)) and a voltage change at the node 224 (waveform (B)).

At time $t_1$, a comparator 272a detects that the voltage at the node 222 has reached the power supply voltage $V_{DD}$, and outputs a detection signal to a control circuit 271a. In response to the detection signal, the control circuit 271a causes the switch 212a to change from the OFF state to the ON state.

When there is a return current, the voltage at the node 222 increases toward a voltage which is higher than the power supply voltage $V_{DD}$ during a period between time $t_1$ and time $t_2$. Such a voltage change indicates that a return current flows from the node 222 toward the capacitance 212c and that the return current is temporarily stored in the capacitance 212c.

At time $t_2$, the voltage at the node 222 reaches the peak, and then the voltage at the node 222 starts decreasing.

During the period between time $t_2$ to time $t_3$, a current starts flowing from the capacitance 212c to the energy preserving circuit 220.

At time $t_3$, the comparator 272a detects that the voltage at the node 222 has reached the power supply voltage $V_{DD}$ again, and outputs a detection signal to the control circuit 271a. In response to the detection signal, the control circuit 271a causes the switch 212a to change from the ON state to the OFF state.

Moreover, at time $t_3$, the control circuit 271 causes the switch 212 to change from the OFF state to the ON state. Then, the switch 212 is kept ON until time $t_4$. In the period of time during which the switch 212 is ON, energy is supplied from the power supply 211 via the switch 212 to the energy preserving circuit 220.

Thus, the return current is temporarily stored in the capacitance 212c without returning to the power supply 211.

2. Adjustment of Ratio Between Dynamic Energy and Static Energy

When the energy supplying circuit 210 has a structure illustrated in FIG. 6A, it is possible to adjust the ratio between the dynamic energy and the static energy supplied to the energy preserving circuit 220 by adjusting the timing to turn ON the switch 212.

The period during which the switch 212 is turned ON is classified into the following four periods in view of the magnitude of the voltage v at the node 222 and the direction of the current $i_1$ flowing through the inductor 221. Herein, it is assumed that the current $i_1$ has a positive value when the current $i_1$ flows in a direction from the node 224 to the node 222, and the current i has a negative value when the current $i_1$ flows in a direction from the node 222 to the node 224.

Period I: A period during which the difference between the power supply voltage $V_{DD}$ and the voltage v is smaller than a predetermined voltage $V_{TH}$ while the current $i_1$ has a positive value.

Period II: A period during which the difference between the power supply voltage $V_{DD}$ and the voltage v is smaller than a predetermined voltage VTH while the current $i_1$ has a negative value.

Period III: A period during which the difference between the power supply voltage $V_{DD}$ and the voltage v is larger than a predetermined voltage $V_{TH}$ while the current $i_1$ has a positive value.

Period IV: A period during which the difference between the power supply voltage $V_{DD}$ and the voltage v is larger than a predetermined voltage $V_{TH}$ while the current $i_1$ has a negative value.

Figure 7A:
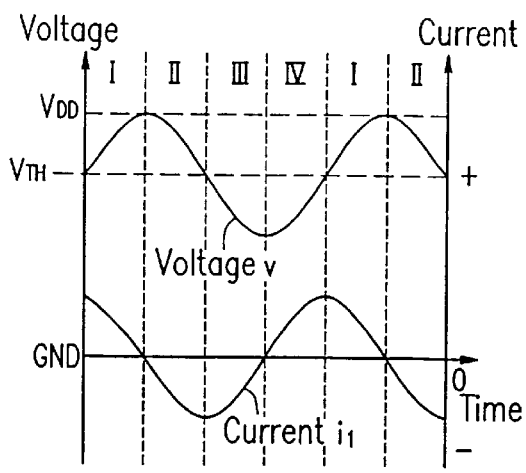
FIGS. 7A–7E are diagrams each illustrating a waveform of a voltage v and a waveform of a current $i_1$.

FIG. 7A illustrates the relationship among the periods I–IV, the waveform of the voltage v, and the waveform of the current $i_1$. The waveform of the voltage v is a sinusoidal waveform which oscillates about the predetermined voltage $V_{TH}$ which is the center voltage. The waveform of the current $i_1$ is a sinusoidal waveform which oscillates about zero which is the center voltage.

In order to minimize the energy loss which occurs when the energy is supplied from the energy supplying circuit 210 to the energy preserving circuit 220, it is required to turn ON the switch 212 when the inter-terminal voltage of the switch 212 is as small as possible. This is based on the "principle of adiabatic charging"; when charging a capacitance with a charge, by minimizing the voltage which is applied across a resistor existing between the power supply and the capacitance, the energy loss due to the resistor can be minimized. Therefore, in order to minimize the energy loss, the switch 212 is preferably turned ON during period I or period II during which the difference between the power supply voltage $V_{DD}$ and the voltage v is small.

The ratio between the dynamic energy and the static energy supplied to the energy preserving circuit 220 during period I and period II will now be described.

Figure 7B:
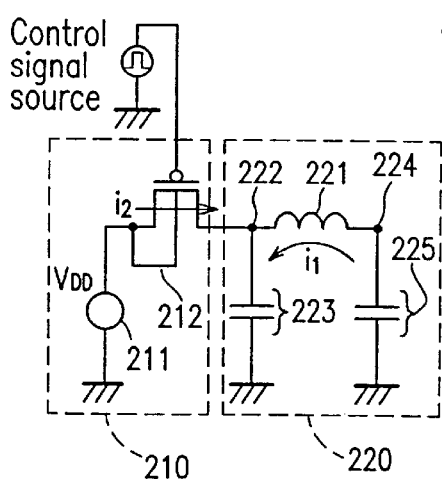
Figure 7C:
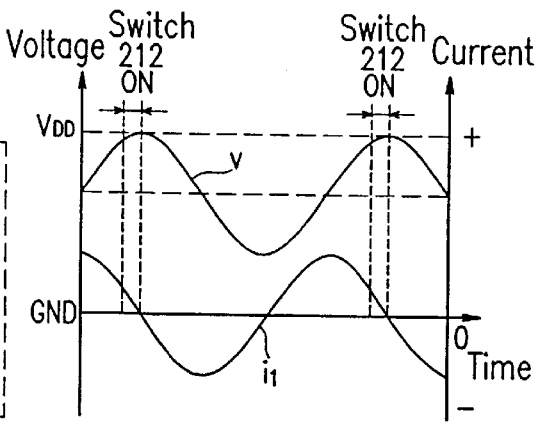

FIG. 7B illustrates the current $i_1$ flowing through the inductor 221 and the current $i_2$ flowing through the switch 212 during period I, and FIG. 7C illustrates a timing at which the switch 212 is turned ON during period I.

As illustrated in FIG. 7B, during period I, the current $i_1$ flows in a direction opposite to the direction of the current $i_2$. As a result, the current $i_2$ flows more toward the capacitance 223 than toward the inductor 221. This means that more static energy than dynamic energy is supplied to the energy preserving circuit 220 during period I. This is because dynamic energy is mainly generated due to a current flowing through the inductor 221.

Figure 7D:
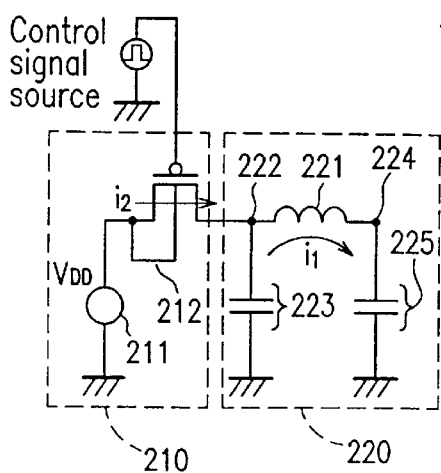
Figure 7E:
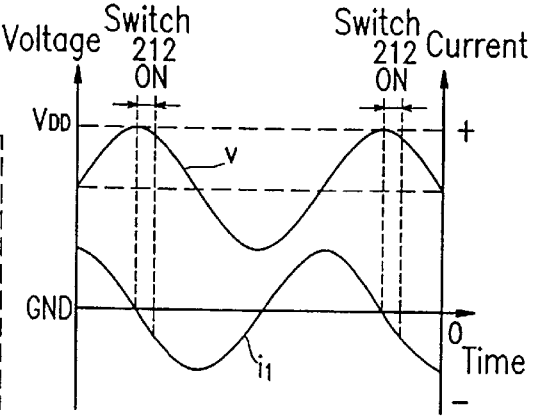

FIG. 7D illustrates the current $i_1$ flowing through the inductor 221 and the current $i_2$ flowing through the switch 212 during period II, and FIG. 7E illustrates a timing at which the switch 212 is turned ON during period II.

As illustrated in FIG. 7D, during period II, the current $i_1$ flows in a direction identical to the direction of the current $i_2$. As a result, the current $i_2$ flows more toward the inductor 221 than toward the capacitance 223. This means that more dynamic energy than static energy is supplied to the energy preserving circuit 220 during period II. This is because dynamic energy is mainly generated due to a current flowing through the inductor 221.

By selecting one of period I and period II as a timing to turn ON the switch 212, as described above, it is possible to adjust the ratio between the dynamic energy and the static energy supplied from the energy supplying circuit 210 to the energy preserving circuit 220.

3. Detection of Dynamic Energy and Static Energy

The energy preserving circuit 220 preserves dynamic energy and static energy. Depending upon the property of a load connected to the energy preserving circuit 220 (i.e., whether the capacitive property thereof is stronger or the resistive property thereof is stronger), the amount of dynamic energy which is consumed by the load and the amount of static energy which is consumed by the load vary.

In order to keep constant the amount of dynamic energy and the amount of static energy preserved in the energy preserving circuit 220, it is necessary to separately detect the amount of decrease in the dynamic energy and the amount of decrease in the static energy, so as to supply energy from the energy supplying circuit 210 to the energy preserving circuit 220 according to the amount of decrease in the dynamic energy and to supply energy from the energy supplying circuit 210 to the energy preserving circuit 220 according to the amount of decrease in the static energy.

The detection of the dynamic energy and the static energy and the supply of dynamic energy and static energy based on the detection will now be described. Herein, it is assumed that the energy supplying circuit 210 has a structure illustrated in FIG. 6A. However, the method for detecting the dynamic energy and the static energy and the method for supplying the dynamic energy and the static energy which will be described below can be applied in the case where the energy supplying circuit 210 has another structure (e.g., a structure illustrated in FIG. 6B or FIG. 6C).

FIG. 8 illustrates a structure of a power supply apparatus 1301 having a function of detecting dynamic energy and static energy. A load 370 is connected to the power supply apparatus 1301 at the node 224. The load 370 includes at least one of a capacitance component and a resistance component.

In addition to the basic elements, i.e., the energy supplying circuit 210 and the energy preserving circuit 220, the power supply apparatus 1301 further includes the control circuit 271, reference voltage generation circuits 371–374, comparators 375–379 and a clock signal generation circuit 380.

The capacitance value $C_1$ and the capacitance value $C_2$ are set so as to satisfy the relationship $C_1 \gg C_2$. Thus, an alternating-current voltage waveform is obtained at the node 222, and a direct-current voltage waveform is obtained at the node 224.

Figure 9A:
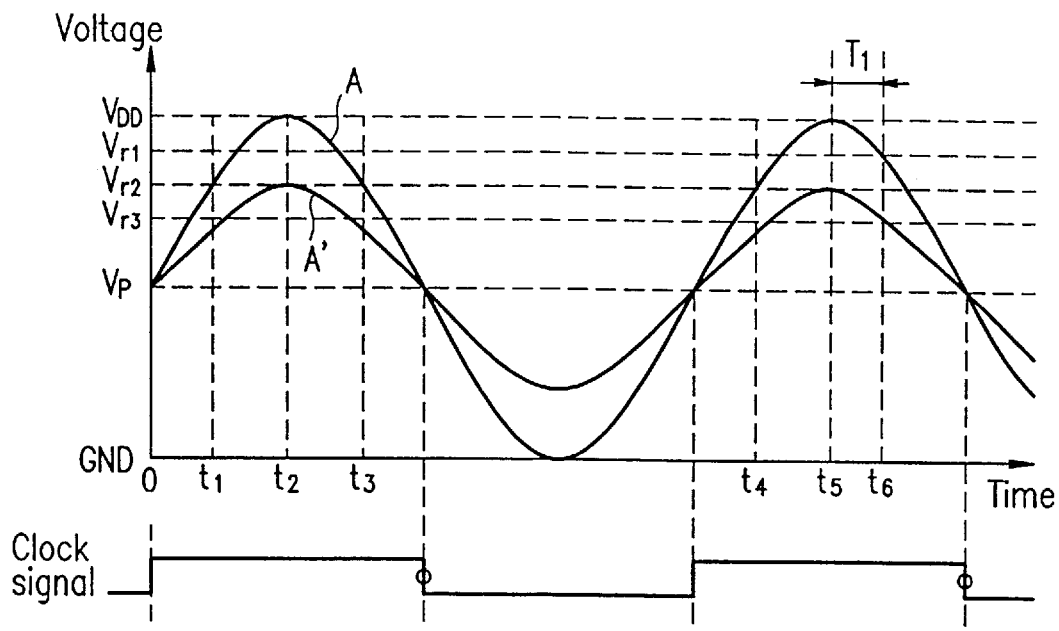
FIGS. 9A and 9B are diagrams each illustrating a voltage waveform at a node.

FIG. 9A illustrates an alternating-current voltage waveform (A') in comparison with the alternating-current voltage waveform (A). Herein, the alternating-current voltage waveform (A) represents a change in the voltage at the node 222 with respect to time in the case where the dynamic energy preserved in the energy preserving circuit 220 is kept constant, and the alternating-current voltage waveform (A') represents a change in the voltage at the node 222 with respect to time in the case where the dynamic energy preserved in the energy preserving circuit 220 decreases. As illustrated in FIG. 9A, when the dynamic energy preserved in the energy preserving circuit 220 decreases, the center of the oscillation of the alternating-current voltage waveform at the node 222 does not change, but the oscillation amplitude decreases.

Figure 9B:
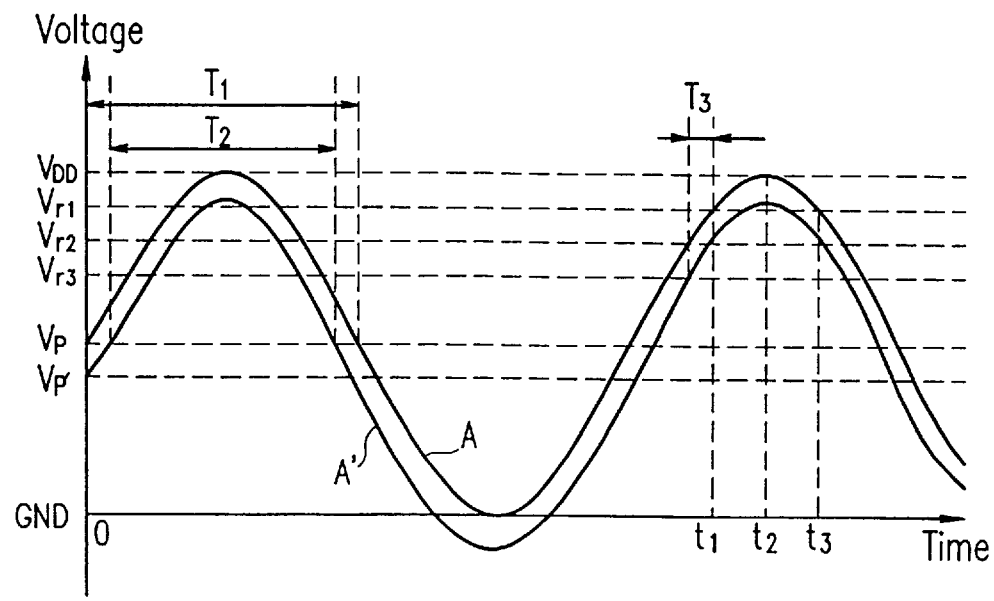

FIG. 9B illustrates the alternating-current voltage waveform (A') in comparison with the alternating-current voltage waveform (A). Herein, the alternating-current voltage waveform (A) represents a change in the voltage at the node 222 with respect to time in the case where the static energy preserved in the energy preserving circuit 220 is kept constant, and the alternating-current voltage waveform (A') represents a change in the voltage at the node 222 with respect to time in the case where the static energy preserved in the energy preserving circuit 220 decreases. As illustrated in FIG. 9B, when the static energy preserved in the energy preserving circuit 220 decreases, the center of the oscillation of the alternating-current voltage waveform at the node 222 shifts.

Figure 10A:
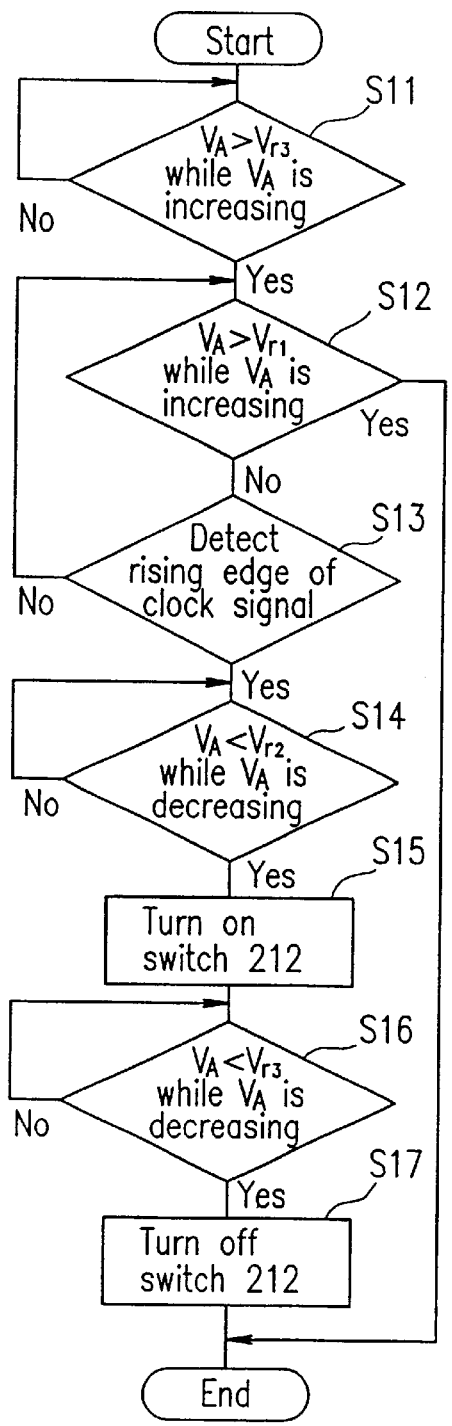
FIG. 10A is a flow chart illustrating a procedure of a process for detecting dynamic energy.

FIG. 10A illustrates a procedure of a process for detecting dynamic energy. This process is executed by the control circuit 271 (see FIG. 8) for every predetermined period of time. Herein, $V_A$ denotes a voltage at the node 222, $V_P$, $V_{r1}$, $V_{r2}$ and $V_{r3}$ denote reference voltages output from the reference voltage generation circuits 371–374, respectively, and $V_{DD}$ denotes the power supply voltage. These voltages satisfy the relationship $V_P<V_{r3}<V_{r2}<V_{r1}<V_{DD}$. Moreover, a clock signal having a cycle identical to that of the alternating-current voltage waveforms (A) and (A') is generated by the clock signal generation circuit 380 (see FIG. 8). The waveform of the clock signal is illustrated in FIG. 9A.

In step S11, it is determined whether the voltage $V_A$ has exceeded the voltage $V_{r3}$ while the voltage $V_A$ is increasing. That the voltage $V_A$ has exceeded the voltage $V_{r3}$ while the voltage $V_A$ is increasing is detected by a change in the output signal of the comparator 379 from L level to H level. When the voltage $V_A$ has exceeded the voltage $V_{r3}$ while the voltage $V_A$ is increasing, the process proceeds to step S12.

In step S12, it is determined whether the voltage $V_A$ has exceeded the voltage $V_{r1}$ while the voltage $V_A$ is increasing. That the voltage $V_A$ has exceeded the voltage $V_{r1}$ while the voltage $V_A$ is increasing is detected by a change in the output signal of the comparator 376 from L level to H level. When the voltage $V_A$ has exceeded the voltage $V_{r1}$ while the voltage $V_A$ is increasing, the process terminates without supplying dynamic energy from the energy supplying circuit 210 to the energy preserving circuit 220. This is because it is determined that the dynamic energy preserved in the energy preserving circuit 220 has not so decreased that dynamic energy needs to be supplied.

On the other hand, when a trailing edge of the clock signal is detected without the voltage $V_A$ having exceeded the voltage $V_{r1}$ while the voltage $V_A$ is increasing (step S13), it is determined that dynamic energy needs to be supplied from the energy supplying circuit 210 to the energy preserving circuit 220. This is because the voltage $V_A$ cannot possibly reach the voltage $V_{r1}$ until the next cycle of the alternating-current voltage waveform (A'). Therefore, in this case, the process proceeds to step S14.

In step S14, it is determined whether the voltage $V_A$ has decreased below the voltage $V_{r2}$ while the voltage $V_A$ is decreasing. That the voltage $V_A$ has decreased below the voltage $V_{r2}$ while the voltage $V_A$ is decreasing is detected by a change in the output signal of the comparator 378 from H level to L level. When the voltage $V_A$ has decreased below the voltage $V_{r2}$ while the voltage $V_A$ is decreasing, the control circuit 271 turns ON the switch 212 (step S15).

In step S16, it is determined whether the voltage $V_A$ has decreased below the voltage $V_{r3}$ while the voltage $V_A$ is decreasing. That the voltage $V_A$ has decreased below the voltage $V_{r3}$ while the voltage $V_A$ is decreasing is detected by a change in the output signal of the comparator 379 from H level to L level. When the voltage $V_A$ has decreased below the voltage $V_{r3}$ while the voltage $V_A$ is decreasing, the control circuit 271 turns OFF the switch 212 (step S17).

Thus, when the dynamic energy preserved in the energy preserving circuit 220 decreases, the switch 212 is turned ON in the period $T_1$ during which the voltage $V_A$ is in the vicinity of the power supply voltage $V_{DD}$ and is decreasing. It is thus possible to supply dynamic energy from the energy supplying circuit 210 to the energy preserving circuit 220.

Figure 10B:
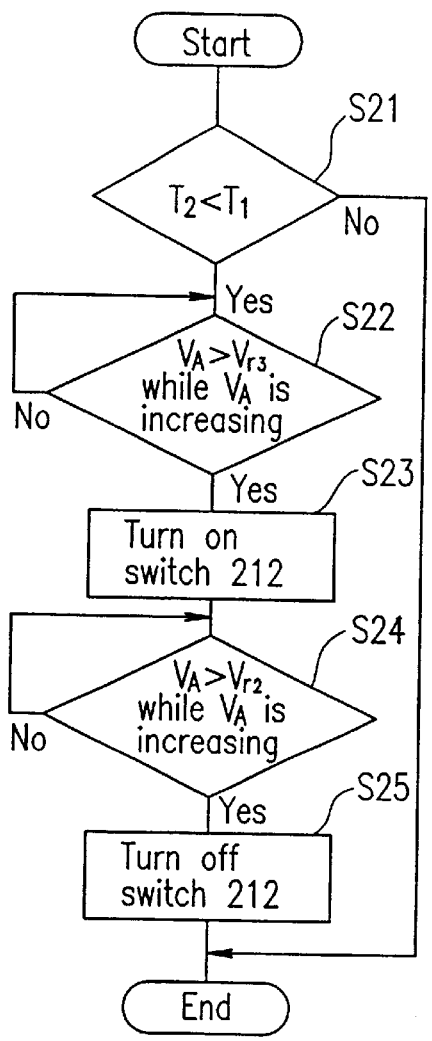
FIG. 10B is a flow chart illustrating a procedure of a process for detecting static energy.

FIG. 10B illustrates a procedure of a process for detecting static energy. This process is executed by the control circuit 271 (see FIG. 8) for every predetermined period of time. Herein, $V_A$ denotes a voltage at the node 222, $V_P$, $V_{r1}$, $Vr_2$ and $V_{r3}$ denote reference voltages output from the reference voltage generation circuits 371–374, respectively, and $V_{DD}$ denotes the power supply voltage. These voltages satisfy the relationship $V_P<V_{r3}<V_{r2}<V_{r1}<V_{DD}$.

In step S21, it is determined whether the period $T_1$ is less than the period $T_2$. Herein, the period $T_1$ is defined as a period of time required from the time when the voltage $V_A$ exceeds the voltage $V_P$ to the time when the voltage $V_A$ then decreases below the voltage $V_P$ along the alternating-current voltage waveform (A). The period $T_2$ is defined as a period of time required from the time when the voltage $V_A$ exceeds the voltage $V_P$ to the time when the voltage $V_A$ then decreases below the voltage $V_P$ along the alternating-current voltage waveform (A'). The period $T_1$ and the period $T_2$ are determined by the control circuit 271 by measuring the period of time from the time when the output signal of the comparator 375 changes from L level to H level to the time when the output signal changes from H level to L level.

When it is determined that the period $T_1$ is less than period $T_2$, it is determined that static energy needs to be supplied from the energy supplying circuit 210 to the energy preserving circuit 220. Therefore, in this case, the process proceeds to step S22.

In step S22, it is determined whether the voltage $V_A$ has exceeded the voltage $V_{r3}$ while the voltage $V_A$ is increasing. That the voltage $V_A$ has exceeded the voltage $V_{r3}$ while the voltage $V_A$ is increasing is detected by a change in the output signal of the comparator 379 from L level to H level. When the voltage $V_A$ has exceeded the voltage $V_{r3}$ while the voltage $V_A$ is increasing, the control circuit 271 turns ON the switch 212 (step S23).

In step S24, it is determined whether the voltage $V_A$ has exceeded the voltage $V_{r2}$ while the voltage $V_A$ is increasing. That the voltage $V_A$ has exceeded the voltage $V_{r2}$ while the voltage $V_A$ is increasing is detected by a change in the output signal of the comparator 378 from L level to H level. When the voltage $V_A$ has exceeded the voltage $V_{r2}$ while the voltage $V_A$ is increasing, the control circuit 271 turns OFF the switch 212 (step S25).

Thus, when static energy preserved in the energy preserving circuit 220 decreases, the switch 212 is turned ON in the period $T_3$ during which the voltage $V_A$ is in the vicinity of the power supply voltage $V_{DD}$ and is decreasing. It is thus possible to supply static energy from the energy supplying circuit 210 to the energy preserving circuit 220.

4. Adjustment of Dynamic Energy

Figure 11A:
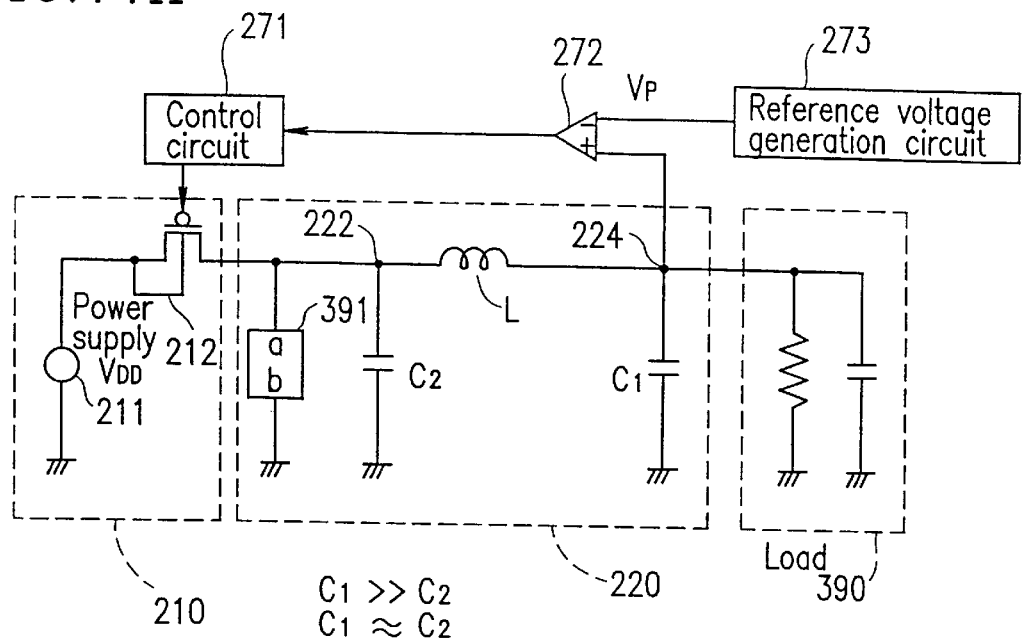
FIG. 11A is a diagram illustrating a structure of a power supply apparatus 1302.

FIG. 11A illustrates a structure of a power supply apparatus 1302 having a function of adjusting the amount of dynamic energy preserved in the energy preserving circuit 220. A load 390 is connected to the power supply apparatus 1302 at the node 224. The load 390 includes at least one of a capacitance component and a resistance component.

In addition to the basic elements, i.e., the energy supplying circuit 210 and the energy preserving circuit 220, the power supply apparatus 1302 further includes the control circuit 271, a comparator 272 and a reference voltage generation circuit 273.

When dynamic energy is excessively supplied to the energy preserving circuit 220, the oscillation amplitude of the alternating-current voltage waveform at the node 222 increases. The power supply apparatus 1302 is provided for the purpose of decreasing the oscillation amplitude of the alternating-current voltage waveform at the node 222 when the voltage at the node 222 becomes less than or equal to the ground voltage GND.

Element 391 is provided in the energy preserving circuit 220. Element 391 is connected to the node 222. For example, Element 391 is a diode with a terminal a as a cathode and a terminal b as an anode (see FIG. 11B). The diode may be a schottky barrier diode. Alternatively, element 391 may be a PMOS transistor having the terminal a as a drain, the terminal b as a source and the power supply $V_{DD}$ as a well, with the gate and the source being connected to each other (see FIG. 11C). The threshold value $V_T$ of such a PMOS transistor may be either high or low.

Figure 11B:
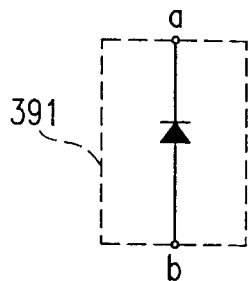
FIGS. 11B and 11C are diagrams each illustrating a structure of element 391.
Figure 11C:
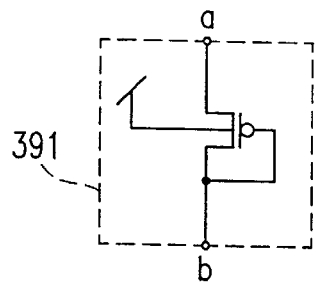
Figure 11D:
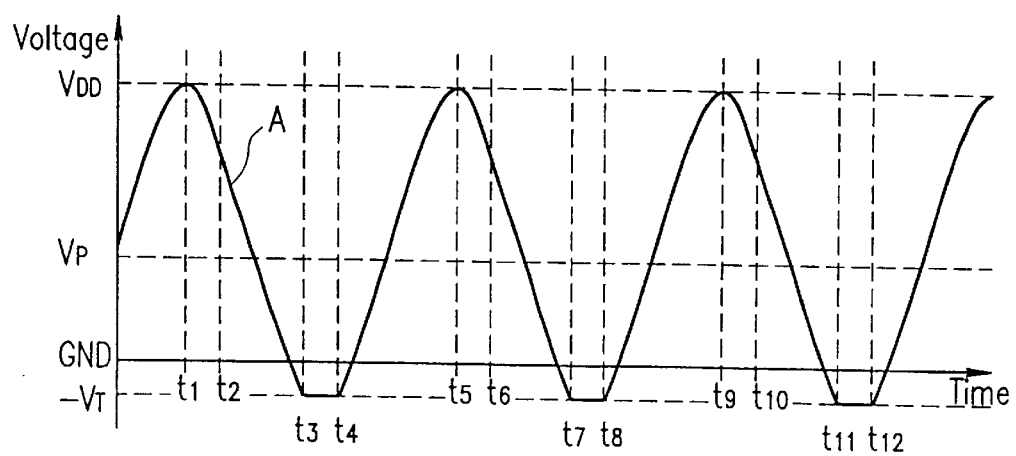
FIG. 11D is a diagram illustrating a voltage waveform at a node.

FIG. 11D illustrates an alternating-current voltage waveform (A) at the node 222.

In the case where the diode illustrated in FIG. 11B is used as element 391, the diode is forwardly biased when the voltage at the node 222 becomes less than or equal to the ground voltage GND. As a result, the voltage at the node 222 is fixed at a voltage which is lower than the ground voltage GND by the forward voltage $V_T$ of the diode (see, for example, the period $t_3$–$t_4$ in FIG. 11D). Since the diode is forwardly biased, a forward current flows. The forward current of the diode is generated by dynamic energy stored in the inductor. Therefore, the dynamic energy stored in the inductor is consumed by the diode. As a result, the oscillation amplitude of the alternating-current voltage waveform at the node 222 decreases. On the other hand, a charge is supplied to the energy preserving circuit 220 by the forward current of the diode. Thus, the static energy increases.

In the case where the PMOS transistor illustrated in FIG. 11C is used as element 391, the PMOS transistor becomes conductive when the voltage at the drain becomes equal to a voltage which is lower than the ground voltage GND by the threshold voltage $V_T$. As a result, a drain current flows from the terminal b (source) toward the terminal a (drain) of the PMOS transistor. The drain current is generated by dynamic energy stored in the inductor. Therefore, the dynamic energy stored in the inductor is consumed by the PMOS transistor. As a result, the oscillation amplitude of the alternating-current voltage waveform at the node 222 decreases. On the other hand, a charge is supplied to the energy preserving circuit 220 by the drain current. Thus, the static energy increases.

Figure 12:
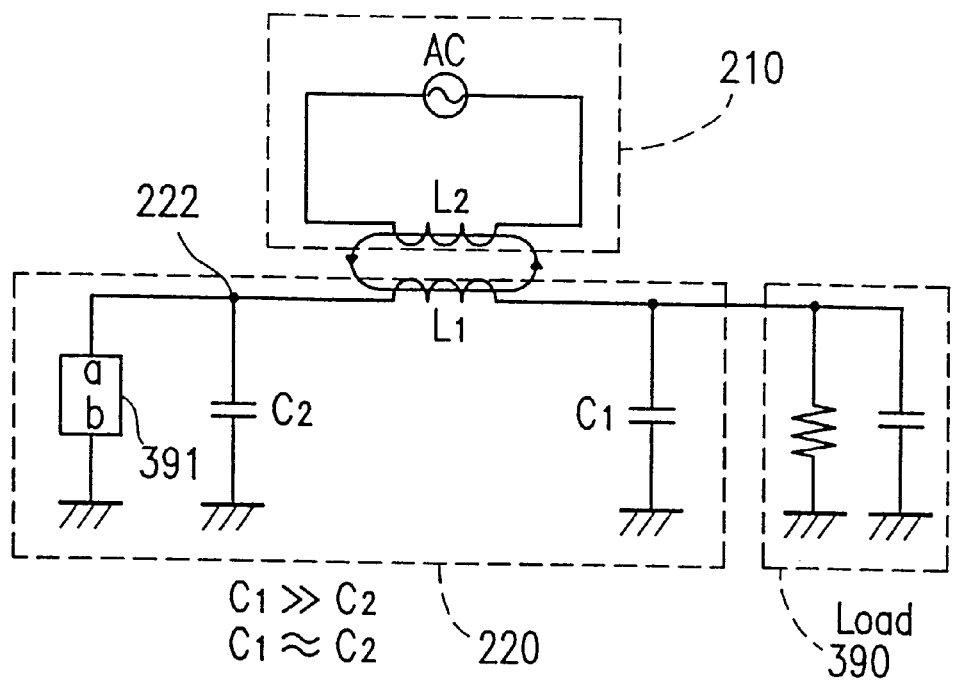
FIG. 12 is a diagram illustrating a structure of a power supply apparatus 1303.

FIG. 12 illustrates a structure of a power supply apparatus 1303 having a function of adjusting the amount of dynamic energy preserved in the energy preserving circuit 220. The power supply apparatus 1303 supplies energy from the energy supplying circuit 210 to the energy preserving circuit 220 utilizing magnetic coupling.

Element 391 is provided in the energy preserving circuit 220. Element 391 is connected to the node 222. The structure of element 391 is as described above.

When dynamic energy is excessively supplied to the energy preserving circuit 220, the dynamic energy stored in the inductor is consumed by element 391. As a result, the oscillation amplitude of the alternating-current voltage waveform at the node 222 decreases. On the other hand, a charge is supplied to the energy preserving circuit 220 by element 391. Thus, the static energy increases.

As the excessive dynamic energy is thus consumed by element 391, the oscillation amplitude of the alternating-current voltage waveform at the node 222 decays. Thus, the amount of dynamic energy preserved in the energy preserving circuit 220 is kept constant.

Figure 13A:
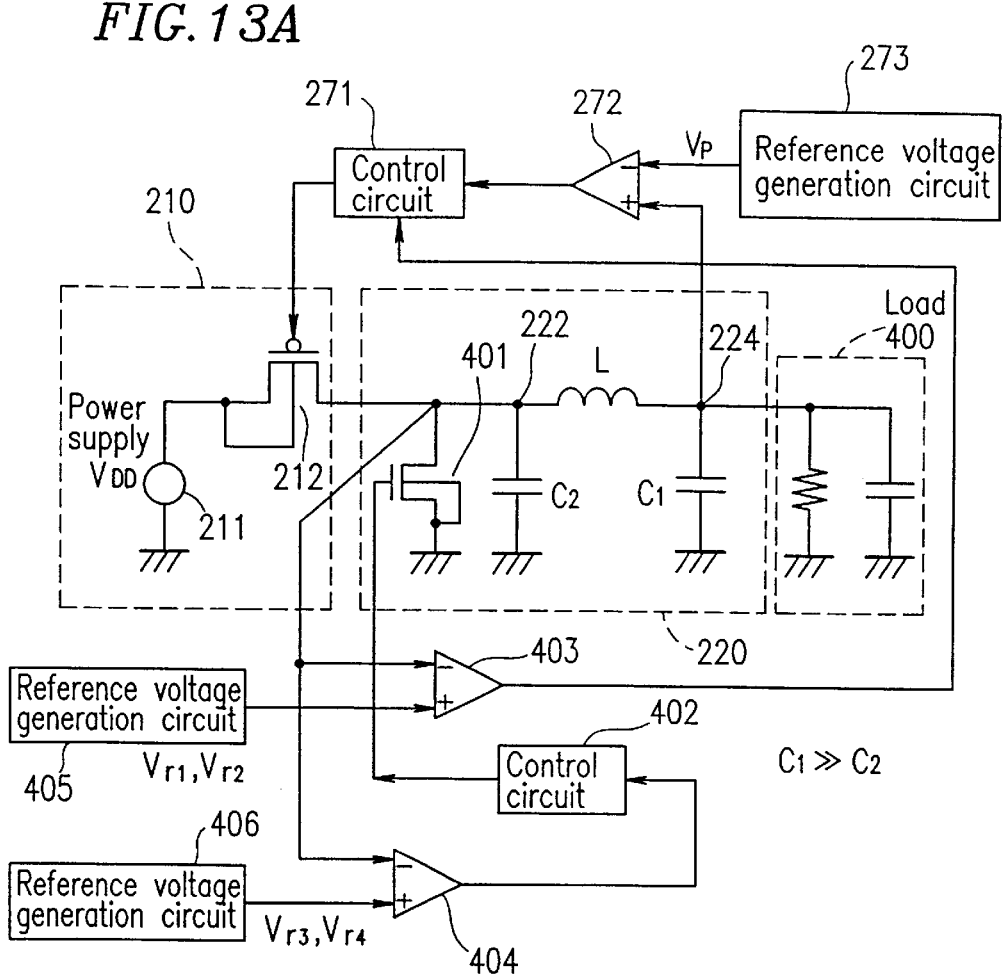
FIG. 13A is a diagram illustrating a structure of a power supply apparatus 1304.

FIG. 13A illustrates a structure of a power supply apparatus 1304 having a function of adjusting the amount of dynamic energy preserved in the energy preserving circuit 220. A load 400 is connected to the power supply apparatus 1304 at the node 224. The load 400 includes at least one of a capacitance component and a resistance component.

In addition to the basic elements, i.e., the energy supplying circuit 210 and the energy preserving circuit 220, the power supply apparatus 1304 further includes the control circuit 271, the comparator 272, the reference voltage generation circuit 273, a control circuit 402, comparators 403–404 and reference voltage generation circuits 405–406.

When dynamic energy is excessively supplied to the energy preserving circuit 220, the oscillation amplitude of the alternating-current voltage waveform at the node 222 increases. The power supply apparatus 1304 is provided for the purpose of decreasing the oscillation amplitude of the alternating-current voltage waveform at the node 222 when the voltage at the node 222 becomes less than or equal to the ground voltage GND.

A switch 401 is provided in the energy preserving circuit 220. The switch 401 is connected to the node 222. For example, the switch 401 may be a NMOS transistor. The timing to open/close the switch 401 is controlled by the control circuit 402.

The capacitance value $C_1$ and the capacitance value $C_2$ are set so as to satisfy the relationship $C_1 >> C_2$. Thus, an alternating-current voltage waveform is obtained at the node 222, and a direct-current voltage waveform is obtained at the node 224.

Figure 13B:
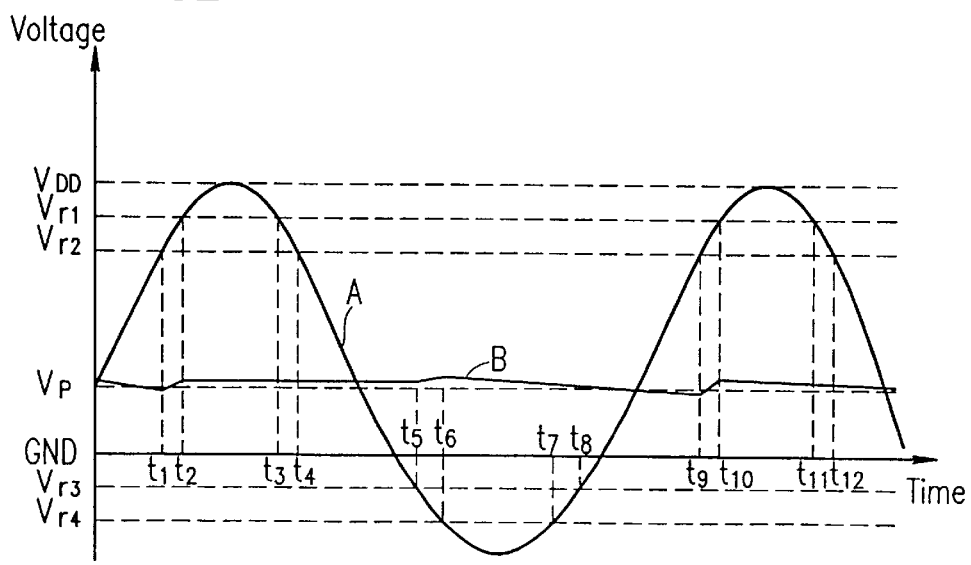
FIG. 13B is a diagram illustrating a voltage waveform at a node.

FIG. 13B illustrates an alternating-current voltage waveform (A) at the node 222 and a direct-current voltage waveform (B) at the node 224.

When the voltage at the node 224 decreases below the target voltage $V_P$, the control circuit 271 turns ON the switch 212. For example, the control circuit 271 turns ON the switch 212 in the period between times $t_3$–$t_4$. Alternatively, the period to turn ON the switch 212 may be the period between times $t_1$–$t_2$ or the period between times $t_1$–$t_4$. Thus, energy is supplied from the energy supplying circuit 210 to the energy preserving circuit 220. As a result, the oscillation amplitude of the alternating-current voltage waveform at the node 222 increases.

When dynamic energy is excessively supplied to the energy preserving circuit 220, the voltage at the node 222 is less than or equal to the ground voltage GND. This is similarly true when the static energy preserved in the energy preserving circuit 220 decreases, and the center of the oscillation of the alternating-current voltage waveform at the node 222 becomes smaller than 1/2 $V_{DD}$.

In a period during which the voltage at the node 222 is less than or equal to the ground voltage GND, the control circuit 402 turns ON the switch 401 in the period between times $t_5$–$t_6$. Alternatively, the period to turn ON the switch 401 may be the period between times $t_7$–$t_8$ or the period between times $t_5$–$t_8$. As a result, a current flows from the ground voltage GND toward the node 222. The current is generated by dynamic energy stored in the inductor. Therefore, the dynamic energy stored in the inductor is consumed by the switch 401. As a result, the oscillation amplitude of the alternating-current voltage waveform at the node 222 decreases. On the other hand, a charge is supplied to the energy preserving circuit 220 via the switch 401. Thus, the static energy increases.

By turning ON the switch 401 when the voltage at the node 222 is lower than the ground voltage GND as described above, a portion of the dynamic energy preserved in the energy preserving circuit 220 is converted to thermal energy and consumed by a parasitic resistance of the switch 401, and another portion of the dynamic energy is converted to static energy and is stored in the energy preserving circuit 220.

On the other hand, if the switch 401 is turned ON when the voltage at the node 222 is higher than the ground voltage GND, the static energy preserved in the energy preserving circuit 220 is discharged toward the ground voltage GND. A portion of the static energy discharged from the energy preserving circuit 220 is converted to thermal energy and consumed by the parasitic resistance of the switch 401, and another portion of the static energy is converted to dynamic energy due to a charge passing through the inductor 221.

In particular, by turning ON the switch 401 at a voltage lower than the ground voltage GND, it Is possible to reduce the dynamic energy preserved in the energy preserving circuit 220 and to increase the static energy. By turning ON the switch 401 at a voltage higher than the ground voltage GND, it is possible to increase the dynamic energy preserved in the energy preserving circuit 220 and to reduce the static energy.

By adjusting the timing to turn ON the switch 401, as described above, it is possible to adjust the dynamic energy and the static energy preserved in the energy preserving circuit 220. The timing to turn ON the switch 401 can be arbitrarily adjusted by adjusting the reference voltages $V_{r3}$ and $V_{r4}$ output from the reference voltage generation circuit 406.

Figure 14:
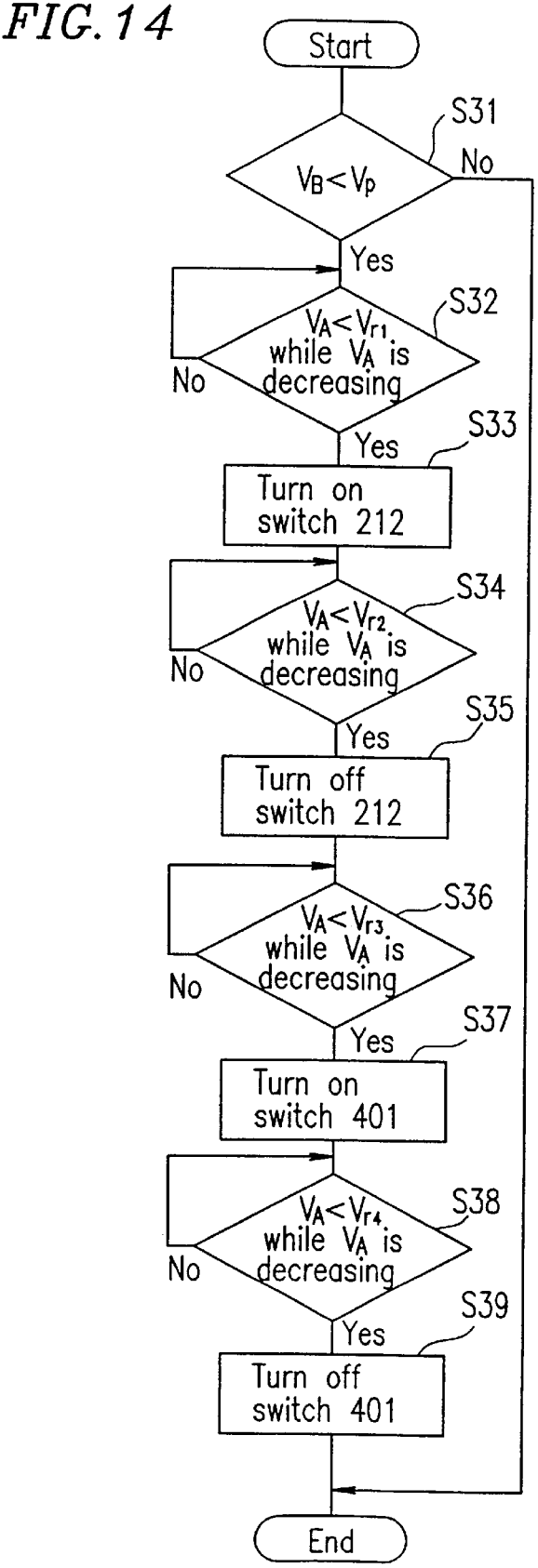
FIG. 14 is a flow chart illustrating a procedure of a process for adjusting dynamic energy.

FIG. 14 illustrates procedure of a process for adjusting the dynamic energy. This process is executed by the control circuit 271 (see FIG. 13A) for every predetermined period of time. Herein, $V_A$ denotes a voltage at the node 222, $V_B$ denotes a voltage at the node 224, $V_P$ denotes a reference voltage output from the reference voltage generation circuit 273, $V_{r1}$ and $V_{r2}$ denote reference voltages selectively output from the reference voltage generation circuit 405, $V_{r3}$ and $V_{r4}$ denote reference voltages selectively output from the reference voltage generation circuit 406, $V_{DD}$ denotes the power supply voltage, and GND denotes the ground voltage. These voltages satisfy the relationship $V_{r4}<V_{r3}<GND<V_P<V_{r2}<V_{r1}<V_{DD}$.

In step S31, it is determined whether the voltage $V_B$ has decreased below the voltage $V_P$. That the voltage $V_B$ has decreased below the voltage $V_P$ is detected by a change in the output signal of the comparator 272 from H level to L level. When the voltage $V_B$ has decreased below the voltage $V_P$, the process proceeds to step S32.

In step S32, it is determined whether the voltage $V_A$ has decreased below the voltage $V_{r1}$ while the voltage $V_A$ is decreasing. That the voltage $V_A$ has decreased below the voltage $V_{r1}$ while the voltage $V_A$ is decreasing is detected by a change in the output signal of the comparator 403 from L level to H level. When the voltage $V_A$ has decreased below the voltage $V_{r1}$ while the voltage $V_A$ is decreasing, the control circuit 271 turns ON the switch 212 (step S33).

In step S34, it is determined whether the voltage $V_A$ has decreased below the voltage $V_{r2}$ while the voltage $V_A$ is decreasing. That the voltage $V_A$ has decreased below the voltage $V_{r2}$ while the voltage $V_A$ is decreasing is detected by a change in the output signal of the comparator 403 from L level to H level. When the voltage $V_A$ has decreased below the voltage $V_{r2}$ while the voltage $V_A$ is decreasing, the control circuit 271 turns OFF the switch 212 (step S35).

In step S36, it is determined whether the voltage $V_A$ has decreased below the voltage $V_{r3}$ while the voltage $V_A$ is decreasing. That the voltage $V_A$ has decreased below the voltage $V_{r3}$ while the voltage $V_A$ is decreasing is detected by a change in the output signal of the comparator 404 from L level to H level. When the voltage $V_A$ has decreased below the voltage $V_{r3}$ while the voltage $V_A$ is decreasing, the control circuit 271 turns ON the switch 401 (step S37).

In step S38, it is determined whether the voltage $V_A$ has decreased below the voltage $Vr_4$ while the voltage $V_A$ is decreasing. That the voltage $V_A$ has decreased below the voltage $V_{r4}$ while the voltage $V_A$ Is de creasing is detected by a change in the output signal of the comparator 404 from L level to H level. When the voltage $V_A$ has decreased below the voltage $V_{r4}$ while the voltage $V_A$ is decreasing, the control circuit 271 turns OFF the switch 401 (step S39).

Thus, the switch 401 is turned ON in a period during which the voltage at the node 222 Is less than or equal to the ground voltage GND. As the excessive dynamic energy is consumed by the switch 401, the oscillation amplitude of the alternating-current voltage waveform at the node 222 decays. Thus, the amount of dynamic energy preserved in the energy preserving circuit 220 is kept constant.

5. Regarding Noise

As illustrated in FIG. 6A, in the case where energy is supplied from the energy supplying circuit 210 to the energy preserving circuit 220 via the switch 212, the total amount of supply of dynamic energy and static energy (or the amount of conversion of dynamic energy and static energy) is determined according to the length of the period during which the switch 212 is ON. As the dynamic energy and the static energy supplied from the energy preserving circuit 220 to the load increase, the switch 212 is controlled so as to be ON for a longer period of time. As the dynamic energy and the static energy supplied from the energy preserving circuit 220 to the load decrease, the switch 212 is controlled so as to be ON for a shorter period of time.

When the length of the period during which the switch 212 is ON changes as described above, the distortion of the sinusoidal wave oscillation at the node 222 also changes. As a result, the frequency spectrum of the distortion changes.

The sinusoidal wave oscillation at the node 222 conducts a current through the inductor 221. The current flowing through the inductor 221 generates an electromagnetic wave. The frequency of the electromagnetic wave is uniquely related to the frequency of the sinusoidal wave oscillation. The electromagnetic wave generated by the current flowing through the inductor 221 influences a circuit which is connected to another inductor while being coupled to the other inductor. This is so-called noise.

The noise can be removed with a filter. In order to facilitate noise removal with a filter, it is preferable that the frequency spectrum of the noise is generally constant and does not change. By keeping constant the length of the period during which the switch 212 is ON, it is possible to keep the frequency spectrum of the noise constant. In order to keep constant the length of the period during which the switch 212 is ON, the amount of supply, and the amount of conversion, of the energy can be adjusted by changing the parasitic resistance of the switch 212.

Changing the parasitic resistance of the switch 212 can be achieved by, for example, providing a plurality of switches which are serially connected to one another between the inductor 221 and the node 222, and changing the number of switches among the plurality of switches which are turned ON concurrently.

Figure 15:
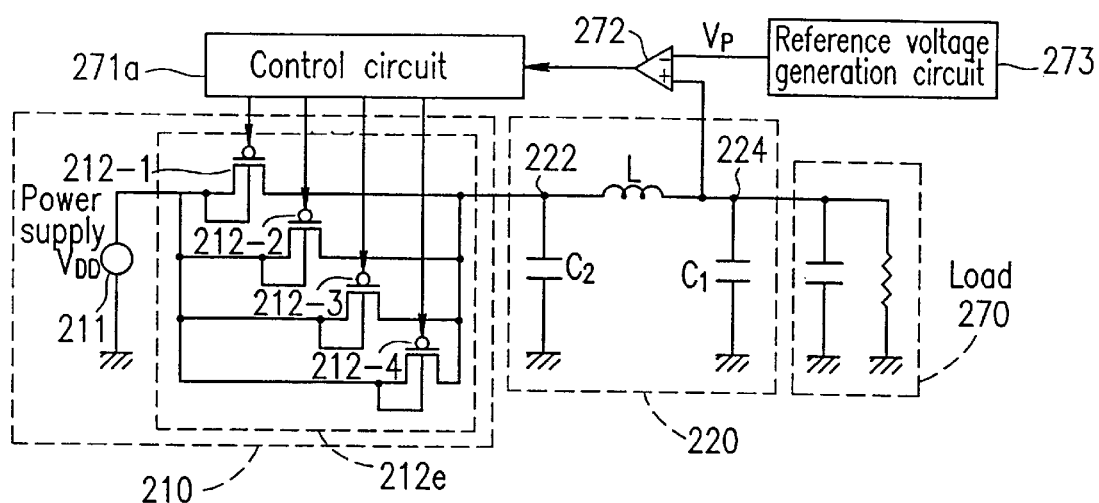
FIG. 15 is a diagram illustrating an exemplary structure of a switch section 212e.

FIG. 15 illustrates an exemplary structure of a switch section 212e. The switch section 212e includes four switches 212-1 to 212-4 which are connected in parallel to one another. During one period, only the switch 212-1 is turned ON. During another period, the switches 212-1 and 212-2 are turned ON. During still another period, the switches 212-1 to 212-3 are turned ON. During still another period, the switches 212-1 to 212-4 are turned ON. As the number of switches to be turned ON concurrently increases, the amount of supply, and the amount of conversion, of the energy increase.

By keeping constant the length of the period during which the switch 212 is ON, while adjusting the amount of supply, and the amount of conversion, of the energy by changing the parasitic resistance of the switch 212, as described above, it is possible to keep the frequency spectrum of the noise constant. Thus, the removal of noise with a filter is facilitated.

6. Regarding Resonance Operation

The frequency f of the sinusoidal wave oscillation at the node 222 of the energy preserving circuit 220 is represented by $f=1/\{2\pi \cdot \sqrt{(LC_2)}\}$ when the relationship $C_1 \gg C_2$ holds. Herein, L denotes the inductance of the inductor 221, and $C_1$ denotes the capacitance value of the capacitance 225, and $C_2$ denotes the capacitance value of the capacitance 223.

As the capacitance value $C_2$ is increased, the frequency f decreases. Moreover, as the inductance L is increased, the frequency f decreases.

The frequency f being low means that the rate of change of a signal input to a comparator used in various types of power supply circuit is small. Thus, the comparator can detect the voltage without error. This is because a comparator has a characteristic that it can detect a voltage more accurately as the signal to be detected is slower. Moreover, when the comparator has a capability of detecting a voltage with sufficient accuracy, it is possible to reduce the power consumption of the comparator by reducing the detection accuracy of the comparator. In addition, the energy can be supplied from the energy supplying circuit 210 to the energy preserving circuit 220 aiming at a timing at which a voltage difference between the terminals of the switch 212 is small, whereby it is possible to avoid generation of noise due to an inrush current which occurs due to a large voltage difference occurring between the terminals of the switch 212.

Thus, the energy preserving circuit 220 has a characteristic of being able to increase and decrease the frequency f of the sinusoidal wave oscillation at the node 222 by changing the capacitance value and/or the inductance. Therefore, it is possible to increase and decrease the frequency of the noise in a resonance operation.

When the capacitance value $C_2$ is increased under a condition that the amplitude of the sinusoidal wave oscillation at the node 222 is kept constant, the amount of charge to be charged in the capacitance 223 increases. As a result, the current flowing into the capacitance 223 increases.

When a charge is supplied to a load using a sinusoidal wave oscillation, or when a charge is collected from the load, the amount of charge varies depending upon the load. Therefore, the circuit design of the energy preserving circuit 220 needs to be made in consideration of the frequency f and the amount of charge supplied to the load (and/or the amount of charge collected from the load).

7. Regarding Noise Reduction based on LC Oscillation Operation

As the integration density of LSIs increases, it is expected that memory circuits, such as DRAMs, digital circuits and analog circuits will be formed on a single chip. It is believed that, as these various circuits are mixed on a single chip, the influence of noise mixed in the operating frequency band of an intermediate frequency analog circuit on the characteristics of the analog circuit will gradually become problematic in the future.

Figure 75:
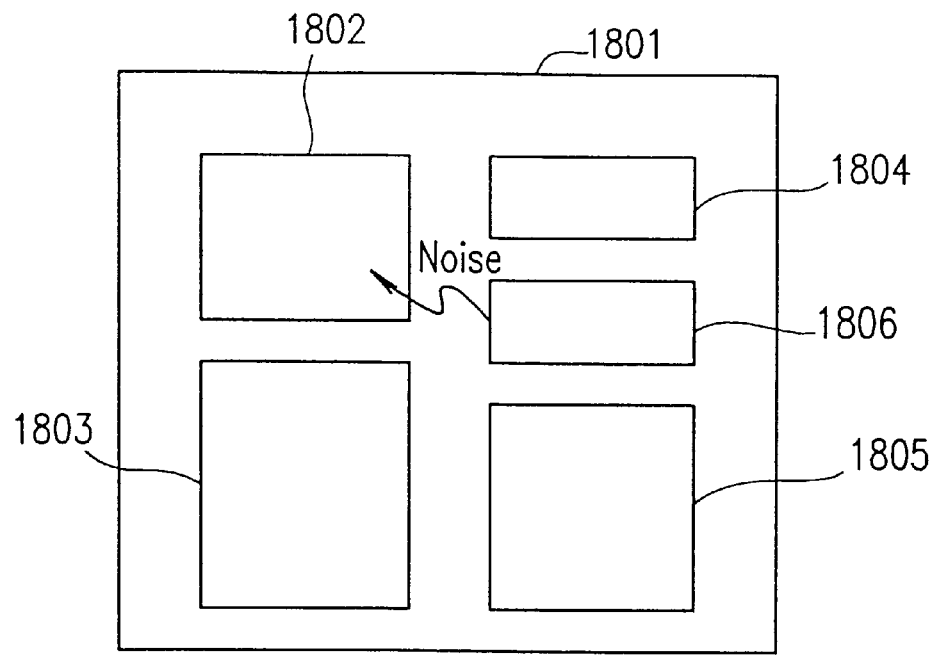
FIG. 75 is a diagram illustrating one embodiment of a system LSI.

FIG. 75 illustrates one embodiment of a system LSI. For example, a system LSI 1801 has a function of receiving and demodulating a transmitted high frequency radio wave, such as that of a portable telephone.

The system LSI 1801 includes: an intermediate frequency and high frequency analog circuit block 1802 having a function of receiving a high frequency signal and demodulating it to an intermediate frequency; a DRAM block 1803 for storing a program which is required for the demodulation; a low frequency analog circuit block 1804 for controlling the demodulation operation and including an A/D converter for converting the demodulated signal to a digital signal; a digital circuit block 1805 for performing signal processing such as noise removal of the digital demodulated signal; and a power supply apparatus 1806 which includes an LC resonance circuit. The circuit blocks 1802–1805 and the power supply apparatus 1806 are formed on a single silicon chip. The power supply apparatus 1806 supplies a power supply voltage to at least one of the circuit blocks 1802–1805.

As illustrated in FIG. 75, the intermediate frequency and high frequency analog circuit block 1802 and the power supply apparatus 1806 are located adjacent to each other, whereby the noise generated due to the inductance of the LC resonance circuit is introduced into the intermediate frequency and high frequency analog circuit block 1802. On the other hand, since the characteristics of the intermediate frequency and high frequency analog circuit block 1802 are significantly reduced by noise, the acceptable noise intensity is specified by the standard for each form of application such as signal transmission. For example, one standard prohibits noise equal to or greater than −60 dBm from being introduced into a 10–20 MHz frequency band.

For preventing noise from being introduced, there is a method which uses a power supply apparatus which does not include an inductor, e.g., a power supply apparatus using an operational amplifier. However, a power supply apparatus which does not include an inductor has a large energy loss, and thus is disadvantageous in reducing the power and heat generated by an LSI. When a power supply apparatus including an inductor is used, radiation noise is generated by a current flowing through the inductor. Therefore, it is necessary to ensure that noise is not introduced which has an intensity greater than the intensity accepted for the frequency band which influences the characteristics of the intermediate frequency and high frequency analog circuit block.

Figure 51A:
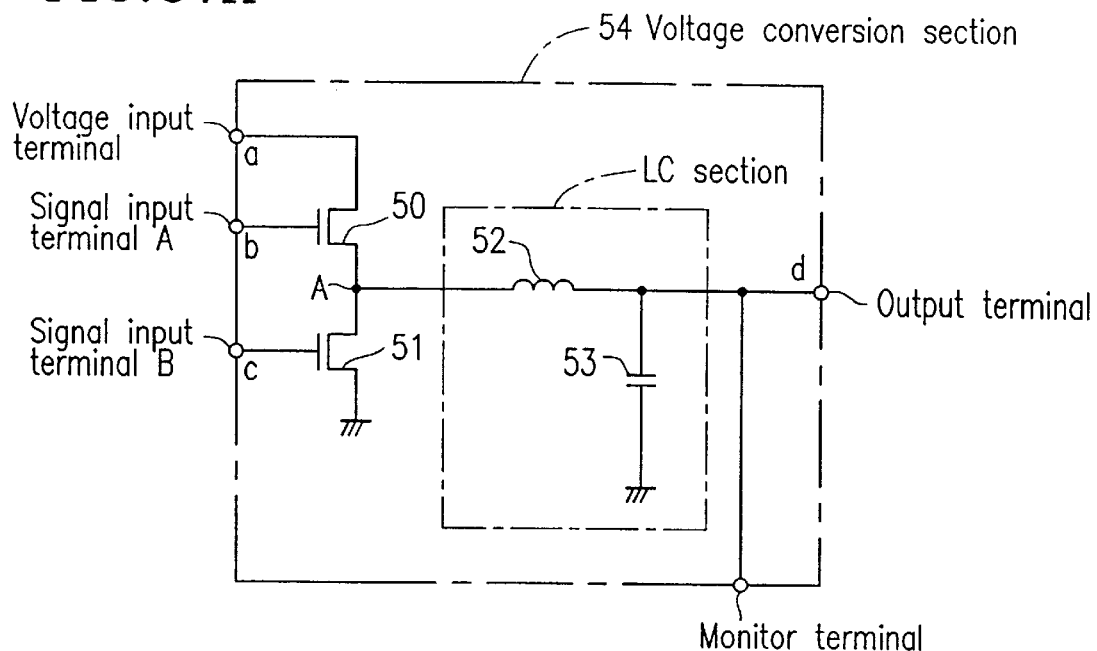
FIGS. 51A and 51B are diagrams each illustrating a structure of the conventional DC/DC converter 61.
Figure 51B:
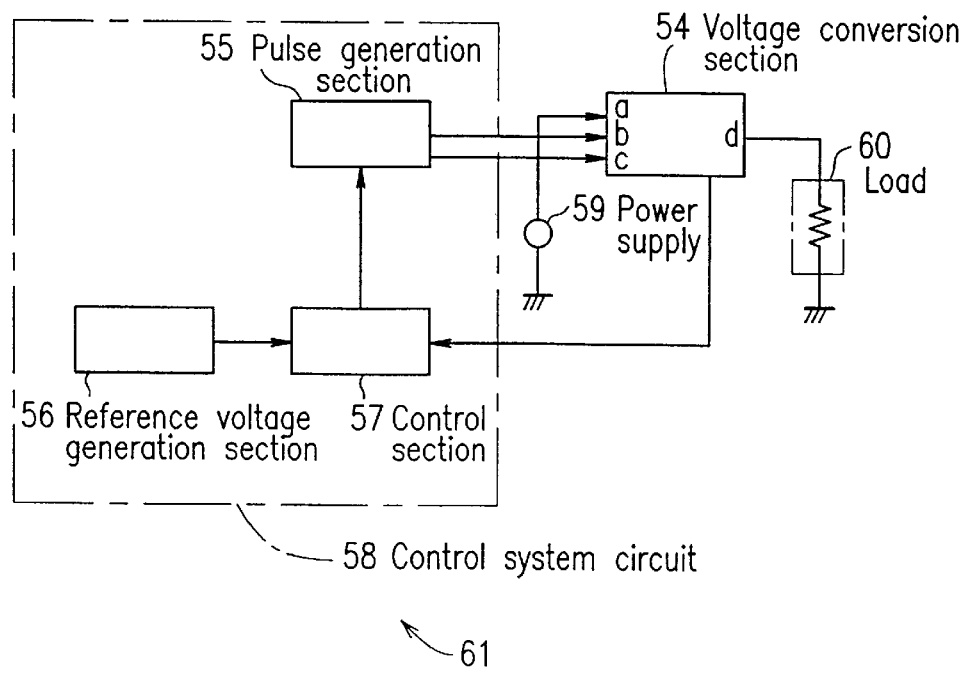

In the conventional DC/DC converter 61 having the voltage conversion section 54 as illustrated in FIG. 51A, when the current supply from the switch 50 is terminated, the switch 50 changes from the open state to the closed state. When the switch 50 changes from the open state to the closed state, the current flowing through the inductor 52 rapidly changes, whereby the voltage at the signal input terminal A instantly reaches the ground voltage according to the characteristics of the inductor 52. As a result, the noise generated from the inductor 52 has a noise distribution which reaches a high frequency according to the rapid change in the voltage at the signal input terminal A. This may cause introduction of noise having an intensity greater than the intensity accepted for the frequency band which influences the characteristics of the intermediate frequency and high frequency analog circuit block.

On the other hand, in the case of the power supply apparatus 1806 including an LC resonance circuit, it is possible to limit the change in the current flowing through the inductor by appropriately setting the resonance frequency of the LC resonance circuit. Thus, it is possible to decrease the frequency of the noise.

Figure 77:
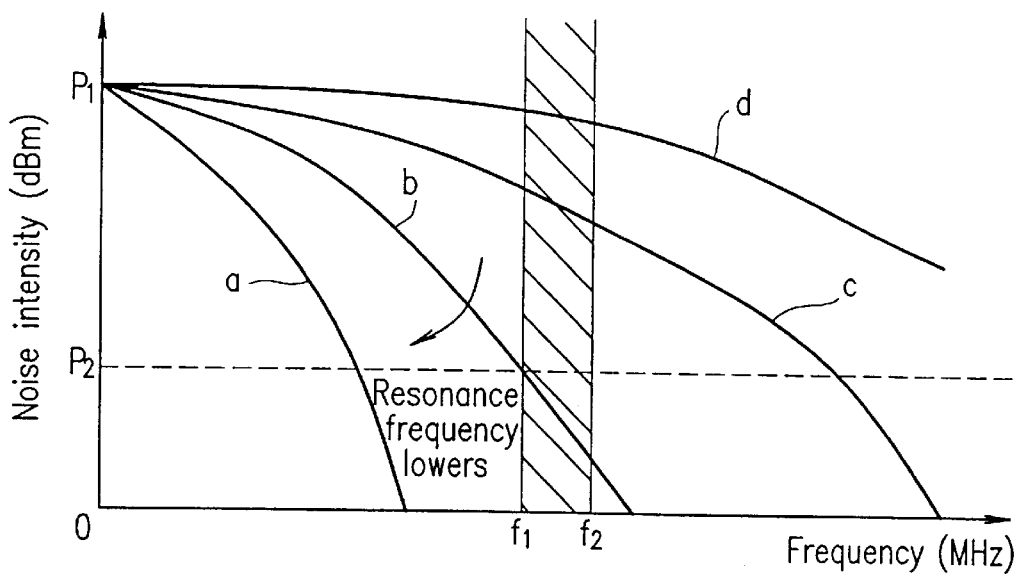
FIG. 77 is a diagram illustrating an example where a power supply apparatus 1806, including the LC resonance circuit, and an intermediate frequency and high frequency analog circuit block 1802 are formed on different chips.

FIG. 77 illustrates a distribution of noise intensity with respect to the resonance frequency of the LC resonance circuit. In FIG. 77, curves a, b and c respectively correspond to resonance frequencies $f_{La}$, $f_{Lb}$ and $f_{Lc}$ of the LC resonance circuit. Herein, the relationship $f_{La} < f_{Lb} < f_{Lc}$ holds. Each of the resonance frequencies $f_{La}$, $f_{Lb}$ and $f_{Lc}$ of the LC resonance circuit is set by appropriately setting, during a design process, the capacitance C (e.g., $C_2$ in FIG. 1) and the inductor L (e.g., L in FIG. 1). Thus, it is possible to appropriately select and set L and C during the design process. The resonance frequency f is represented by $f = 1/2\pi\sqrt{VLC}$. It can be seen that a frequency band in which noise is distributed becomes narrower as the resonance frequency of the LC resonance circuit is decreased. A curve d represents a noise distribution by the above-described conventional DC/DC converter 61.

Assume that it is necessary to set the noise intensity in a particular frequency band (a band from frequency $f_1$ to frequency $f_2$) to be less than or equal to a predetermined value $P_2$ for the intermediate frequency and high frequency analog circuit block 1802. In this case, by setting the resonance frequency of the LC resonance circuit to $f_{La}$ or $f_{Lb}$, it is possible to set the noise intensity in the particular frequency band to be less than or equal to a predetermined value $P_2$. Thus, it is possible to prevent the characteristics of the intermediate frequency and high frequency analog circuit block 1802 from becoming lower due to noise. The frequency $f_1$ is 10 MHz, for example, and the frequency $f_2$ is 20 MHz, for example. The predetermined value $P_2$ is −60 dBm, for example.

Not only when various circuit blocks are mixed on a single silicon chip, but also when the LSI packaging density increases, such as in multi-chip modules or in high density packaging on a substrate, it is necessary to ensure that noise is not introduced which has an intensity greater than the intensity accepted for the frequency band which influences the characteristics of the intermediate frequency and high frequency analog circuit block.

Figure 76:
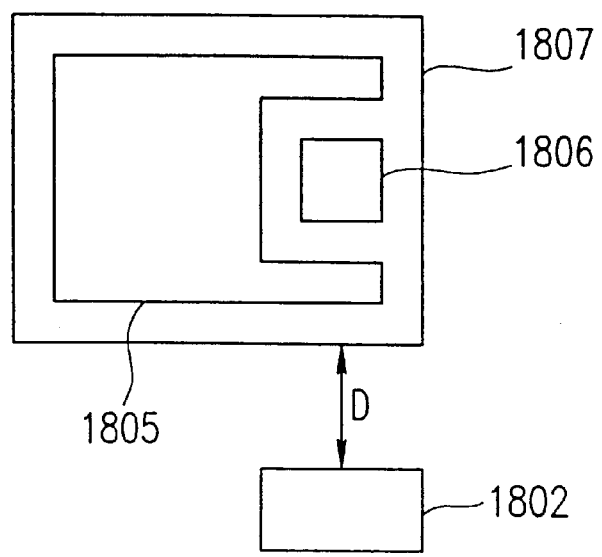
FIG. 76 is a diagram illustrating a distribution of noise intensity with respect to a resonance frequency of an LC resonance circuit.

FIG. 76 illustrates an example where the power supply apparatus 1806 including the LC resonance circuit and the intermediate frequency and high frequency analog circuit block 1802 are formed on different chips. A system LSI 1807 includes the digital circuit block 1805 and the power supply apparatus 1806. The system LSI 1807 and the intermediate frequency and high frequency analog circuit block 1802 are formed on different silicon chips. The power supply apparatus 1806 supplies a power supply voltage to at least one of the circuit blocks 1802 and 1805.

Figure 78:
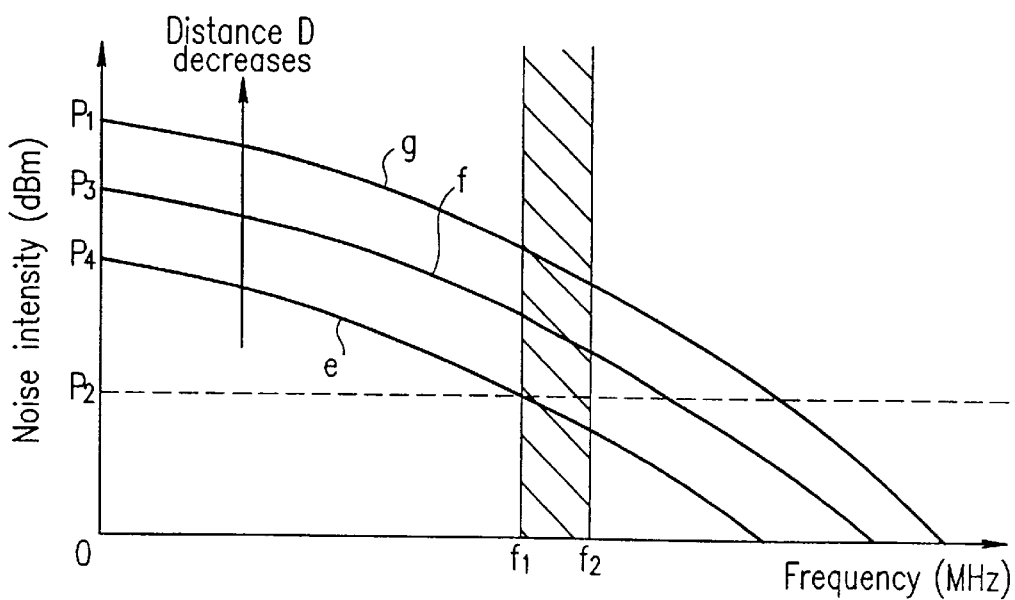
FIG. 78 is a diagram illustrating a distribution of noise intensity with respect to a distance D between a system LSI 1807 and the intermediate frequency and high frequency analog circuit block 1802.

FIG. 78 illustrates a distribution of noise intensity with respect to a distance D between the system LSI 1807 and the intermediate frequency and high frequency analog circuit block 1802. In FIG. 78, curves e, f and g respectively correspond to distances $D_e$, $D_f$ and $D_g$ between the system LSI 1807 and the intermediate frequency and high frequency analog circuit block 1802. Herein, the relationship $D_e > D_f > D_g$ holds. It can be seen that a frequency band in which noise is distributed becomes wider as the distance D between the system LSI 1807 and the intermediate frequency and high frequency analog circuit block 1802 decreases.

As described above, by setting the resonance frequency of the LC resonance circuit to be sufficiently small, it is possible to set noise intensity in a particular frequency band to be less than or equal to a predetermined value. Thus, it is possible to prevent the characteristics of the intermediate frequency and high frequency analog circuit block 1802 from becoming lower due to noise.

As the power supply apparatus 1806 including the LC resonance circuit, any type of power supply apparatus described in Chapter 8 and Chapter 9 of this specification can be used. However, it is not indispensable for the LC resonance circuit to include a structure in which the first capacitance is connected to one end of the inductor while the second capacitance is connected to the other end of the inductor (hereinafter, referred to as the C-L-C structure). The LC resonance circuit may include a structure in which a capacitance is connected to only one end of the inductor (hereinafter, referred to as the L-C structure).

Figure 79:
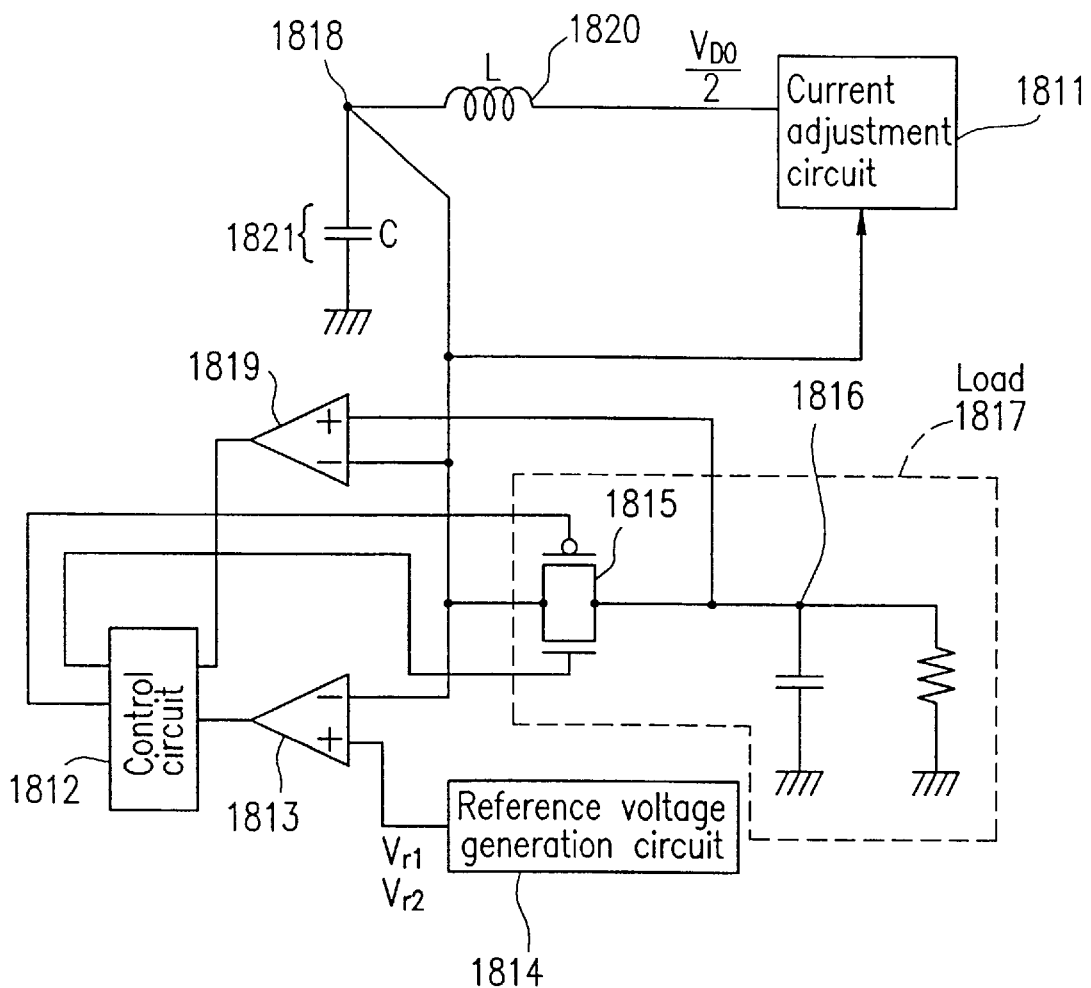
FIG. 79 is a diagram illustrating a structure of the power supply apparatus 1806 including an LC resonance circuit having an L-C structure.

FIG. 79 illustrates a structure of the power supply apparatus 1806 including an LC resonance circuit having the L-C structure. The power supply apparatus 1806 supplies a direct-current power supply voltage to at least one of the plurality of circuit blocks. The power supply apparatus 1806 and the plurality of circuit blocks may be formed on a single semiconductor chip or on different semiconductor chips.

The LC resonance circuit is formed of an inductor 1820 and a capacitance 1821. A current adjustment circuit 1811 is connected to the LC resonance circuit. The voltage at a terminal of the inductor 1820 to which the current adjustment circuit 1811 is connected is set to $V_{DD}/2$. Herein, the power supply voltage is assumed to be $V_{DD}$.

When the current flowing through the inductor 1820 is flowing from the current adjustment circuit 1811 toward the capacitance 1821, the voltage at a node 1818 increases. When the current flowing through the inductor 1820 is flowing from the capacitance 1821 toward the current adjustment circuit 1811, the voltage at the node 1818 decreases.

The current adjustment circuit 1811 adjusts input/output of a current while monitoring the voltage at the node 1818 so that the voltage at the node 1818 oscillates in an LC oscillation with a predetermined voltage amplitude. In order to convert the oscillation voltage at the node 1818 to a direct-current voltage, comparators 1813 and 1819, a reference voltage generation circuit 1814 and a control circuit 1812 are provided. By opening/closing the switch 1815 by means of the control circuit 1812, the voltage at a node 1816 of a load 1817 is converted to a direct-current voltage. Such a conversion method is similar to the conversion method for a power supply apparatus which will be described below with reference to FIG. 17A. The control circuit 1812, the comparators 1819 and 1813, the switch 1815, the load 1817 and the reference voltage generation circuit 1814 illustrated in FIG. 79 respectively correspond to a control circuit 283, comparators 284 and 285, a switch 282, a load 280 and a reference voltage generation circuit 286 illustrated in FIG. 17A.

8. Type of Power Supply Apparatus 200

The power supply apparatus 200 is generally classified into the following four types (1)–(4).

(1) DC Type: A type which uses a direct-current voltage waveform supplied from one of the node 222 and the node 224 of the energy preserving circuit 220.

(2) AC Type: A type which uses an alternating-current voltage waveform supplied from one of the node 222 and the node 224 of the energy preserving circuit 220.

(3) DC-AC Type: A type which uses a direct-current voltage waveform supplied from one of the node 222 and the node 224 of the energy preserving circuit 220 and an alternating-current voltage waveform supplied from the other one of the node 222 and the node 224.

(4) AC—AC Type: A type which uses an alternating-current voltage waveform supplied from one of the node 222 and the node 224 of the energy preserving circuit 220 and an alternating-current voltage waveform supplied from the other one of the node 222 and the node 224.

8.1 DC Type Power Supply Apparatus

Figure 16A:
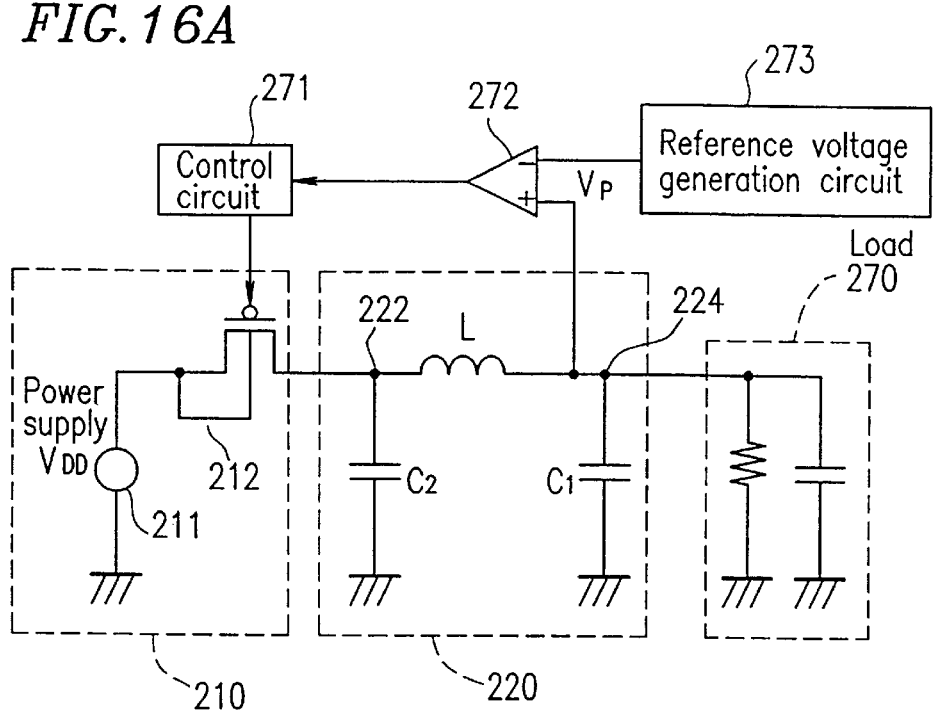
FIG. 16A is a diagram illustrating a structure of a DC type power supply apparatus 201.

FIG. 16A illustrates a structure of a DC type power supply apparatus 201 which supplies a direct-current voltage waveform to a load 270 connected to the node 224. The load 270 includes at least one of a capacitance component and a resistance component.

In addition to the basic elements, i.e., the energy supplying circuit 210 and the energy preserving circuit 220, the power supply apparatus 201 further includes the control circuit 271, the comparator 272 and the reference voltage generation circuit 273. In the example illustrated in FIG. 16A, the energy supplying circuit 210 employs the structure as illustrated in FIG. 6A. However, any of the structures illustrated in FIGS. 6A–6D and 58A may be employed as the structure of the energy supplying circuit 210. The structure as illustrated in FIGS. 11A, 11B or 13A may be employed as means for adjusting the dynamic energy.

The capacitance value $C_1$ and the capacitance value $C_2$ are set so as to satisfy the relationship $C_1 \gg C_2$. Thus, an alternating-current voltage waveform is obtained at the node 222, and a direct-current voltage waveform is obtained at the node 224.

Figure 16B:
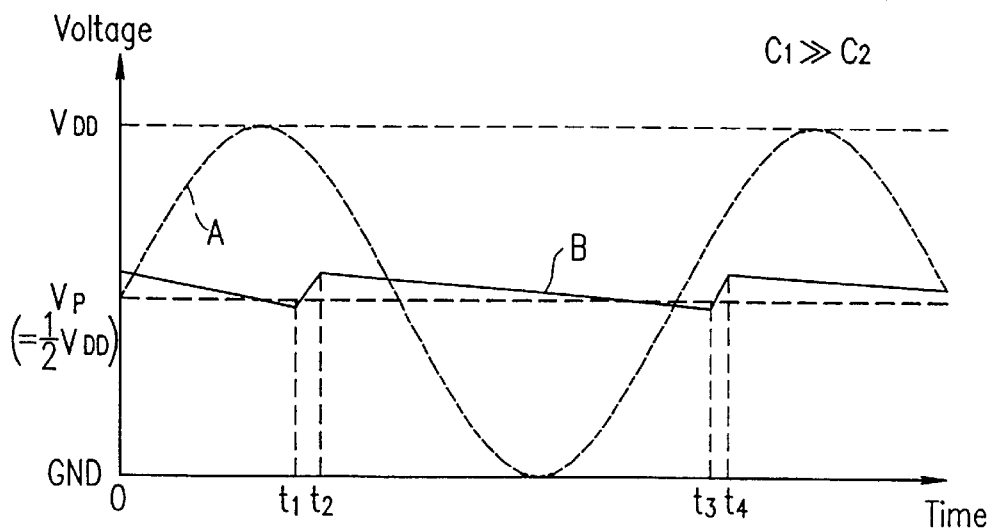
FIG. 16B is a diagram illustrating a voltage waveform at a node.

FIG. 16B illustrates an alternating-current voltage waveform (A) at the node 222 (indicated by a broken line), and a direct-current voltage waveform (B) at the node 224 (indicated by a solid line). Strictly speaking, the voltage waveform at the node 224 is also an alternating-current voltage waveform. However, the voltage waveform at the node 224 can be considered as a direct-current voltage waveform. This is because the voltage oscillation at the node 224 is sufficiently smaller than the voltage oscillation at the node 222.

As described above, by appropriately adjusting the ratio between static energy and dynamic energy supplied from the energy supplying circuit 210, it is possible to obtain the alternating-current voltage waveform (A) such that the center of the oscillation thereof is at the voltage $V_P$ and the amplitude thereof is $1/2$ $V_{DD}$. The direct-current voltage waveform (B) is generally equal to the center of the oscillation of the alternating-current voltage waveform (A).

An operation of the power supply apparatus 201 will now be described.

The comparator 272 compares the voltage at the node 224 with the voltage $V_P$ output from the reference voltage generation circuit 273 so as to detect whether the voltage at the node 224 has decreased below the voltage $V_P$. When the voltage at the node 224 is equal to or greater than the voltage $V_P$, the output signal of the comparator 272 is at H level. When the voltage at the node 224 is lower than the voltage $V_P$, the output signal of the comparator 272 is at L level.

When the voltage at the node 224 decreases below the voltage $V_P$ at time $t_1$, the output signal of the comparator 272 changes from H level to L level. In response to the change in the output signal of the comparator 272, the control circuit 271 turns ON the switch 212. Thus, the supply of energy to the energy preserving circuit 220 is initiated. As a result, the voltage at the node 224 increases.

When the voltage at the node 224 becomes equal to or greater than the voltage $V_P$ at time $t_2$, the output signal of the comparator 272 changes from L level to H level. In response to the change in the output signal of the comparator 272, the control circuit 271 turns OFF the switch 212. Thus, the supply of energy to the energy preserving circuit 220 is terminated.

Similarly, the supply of energy to the energy preserving circuit 220 is initiated at time $t_3$, and the supply of energy to the energy preserving circuit 220 is terminated at time $t_4$.

Thus, the energy consumed by the load 270 is detected by a decrease in the energy preserved in the energy preserving circuit 220. Energy is supplied to the energy preserving circuit 220 so as to recover the decreased energy.

Thus, the DC type power supply apparatus 201 can provide a voltage lower than the power supply voltage $V_{DD}$ to the load 270.

8.2 AC Type Power Supply Apparatus

Figure 17A:
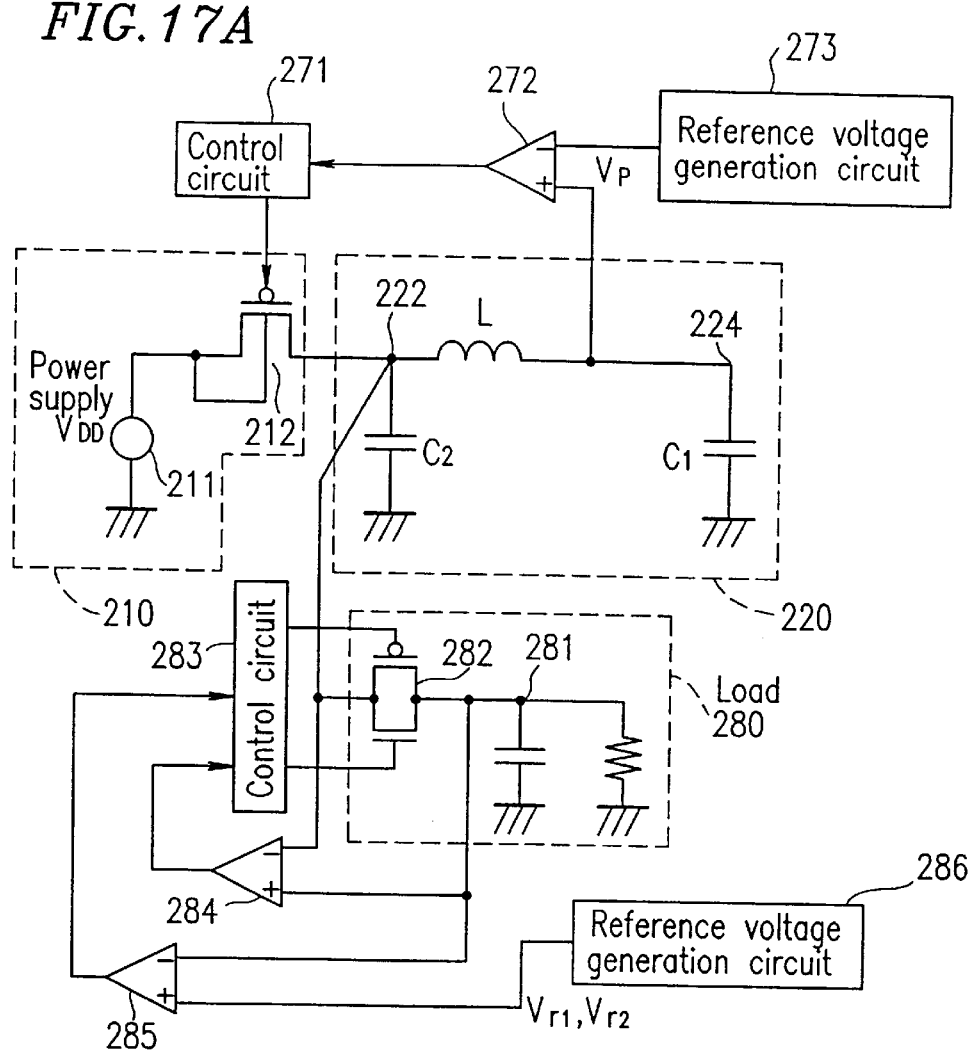
FIG. 17A is a diagram illustrating a structure of an AC type power supply apparatus 202.

FIG. 17A illustrates a structure of an AC type power supply apparatus 202 which charges the voltage at a node 281 in the load 280, which is connected to the node 222, to a desired voltage. The load 280 includes at least one of a capacitance component and a resistance component, and the switch 282.

In addition to the elements of the power supply apparatus 201 illustrated in FIG. 16A, the power supply apparatus 202 further includes the control circuit 283, the comparator 284, the comparator 285 and the reference voltage generation circuit 286. The structure illustrated in FIGS. 11A, 11B or 13A may be employed as means for adjusting dynamic energy.

The capacitance value $C_1$ and the capacitance value $C_2$ are set so as to satisfy the relationship $C_1 \gg C_2$. Thus, an alternating-current voltage waveform is obtained at the node 222, and a direct-current voltage waveform is obtained at the node 224.

Figure 17B:
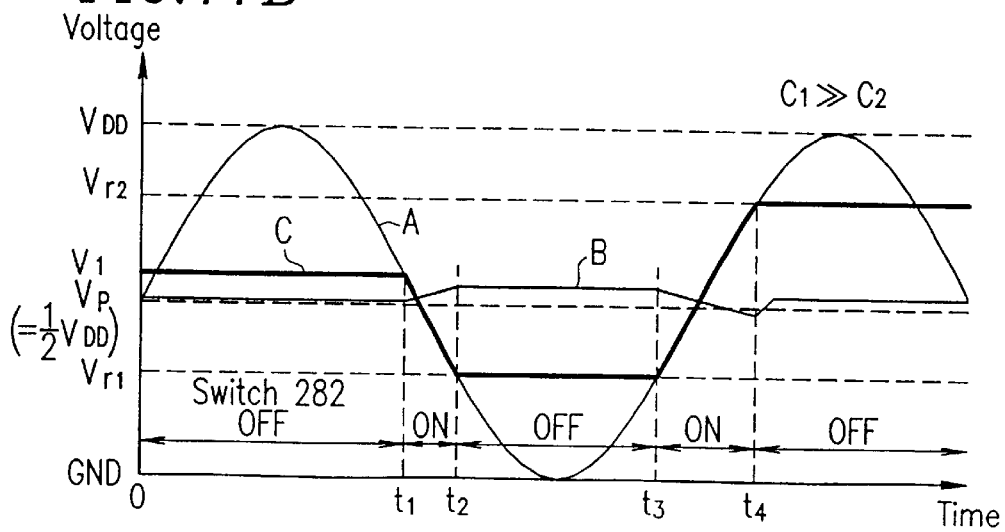
FIG. 17B is a diagram illustrating a voltage waveform at a node.

FIG. 17B illustrates an alternating-current voltage waveform (A) at the node 222, a direct-current voltage waveform (B) at the node 224, and a voltage waveform (C) at the node 281.

As described above, by appropriately adjusting the ratio between static energy and dynamic energy supplied from the energy supplying circuit 210, it is possible to obtain the alternating-current voltage waveform (A) such that the center of the amplitude thereof is at the voltage $V_P$ and the amplitude thereof is $1/2$ $V_{DD}$. The direct-current voltage waveform (B) is generally equal to the center of the oscillation of the alternating-current voltage waveform (A).

An operation of the power supply apparatus 202 for setting the voltage at the node 281 from the voltage $V_1$ to the voltage $V_{r1}$, which is lower than the voltage $V_1$, will now be described. It is assumed that the node 281 is charged to the voltage $V_1$ at time $t=0$.

The comparator 284 compares the voltage at the node 222 with the voltage at the node 281 so as to detect whether the voltage at the node 222 has reached the voltage $V_1$ while the alternating-current voltage waveform (A) is decreasing, or whether the voltage at the node 222 has reached the voltage $V_1$ while the alternating-current voltage waveform (A) is increasing. When the voltage at the node 222 has reached the voltage $V_1$ while the alternating-current voltage waveform (A) is decreasing, the output signal of the comparator 284 changes from L level to H level. When the voltage at the node 222 has reached the voltage $V_1$ while the alternating-current voltage waveform (A) is increasing, the output signal of the comparator 284 changes from H level to L level.

When the voltage at the node 222 reaches the voltage $V_1$ at time $t_1$ while the alternating-current voltage waveform (A) is decreasing, the output signal of the comparator 284 changes from L level to H level. In response to the change in the output signal of the comparator 284, the control circuit 283 turns ON the switch 282. Thus, the voltage at the node 281 changes along the alternating-current voltage waveform (A).

The comparator 285 compares the voltage at the node 281 with the voltage $V_{r1}$ output from the reference voltage generation circuit 286 so as to detect whether the voltage at the node 281 has reached the voltage $V_{r1}$.

When the voltage at the node 281 reaches the voltage $V_{r1}$ at time $t_2$, the output signal of the comparator 285 changes from L level to H level. In response to the change in the output signal of the comparator 285, the control circuit 283 turns OFF the switch 282. Thus, the voltage at the node 281 is kept at the voltage $V_{r1}$.

Next, when setting the voltage at the node 281 from the voltage $V_{r1}$ to the voltage $V_{r2}$, which is higher than the voltage $V_{r1}$, the increasing change of the alternating-current voltage waveform (A) is utilized.

When the voltage at the node 222 reaches the voltage $V_{r1}$ at time $t_3$ while the alternating-current voltage waveform (A) is increasing, the output signal of the comparator 284 changes from H level to L level. In response to the change in the output signal of the comparator 284, the control circuit 283 turns ON the switch 282. Thus, the voltage at the node 281 changes along the alternating-current voltage waveform (A).

The comparator 285 compares the voltage at the node 281 with the voltage $V_{r2}$ output from the reference voltage generation circuit 286 so as to detect whether the voltage at the node 281 has reached the voltage $V_{r2}$. Thus, the reference voltage generation circuit 286 outputs the voltage $V_{r1}$ and the voltage $V_{r2}$ which are alternated at a predetermined timing.

When the voltage at the node 281 reaches the voltage $V_{r2}$ at time $t_4$, the output signal of the comparator 285 changes from H level to L level. In response to the change in the output signal of the comparator 285, the control circuit 283 turns OFF the switch 282. Thus, the voltage at the node 281 is kept at the voltage $V_{r2}$.

The voltage at the node 281 of the load 280 can be charged to any voltage by adjusting the voltage output from the reference voltage generation circuit 286.

As in the DC type power supply apparatus 201, the energy consumed by the load 280 is detected by a decrease in the energy preserved in the energy preserving circuit 220. Energy is supplied to the energy preserving circuit 220 so as to recover the reduced energy.

Thus, the AC type power supply apparatus 202 can charge the voltage at the node 281 of the load 280, which is connected to the node 222, to a desired voltage, using an alternating-current voltage waveforni. The charging of the load 280, which includes a capacitance component, using an alternating-current voltage waveform is based on the above-described "principle of adiabatic charging". Therefore, the energy which is consumed by the load 280 when charging the load 280 is extremely little.

8.3 DC-AC Type Power Supply Apparatus

Figure 18A:
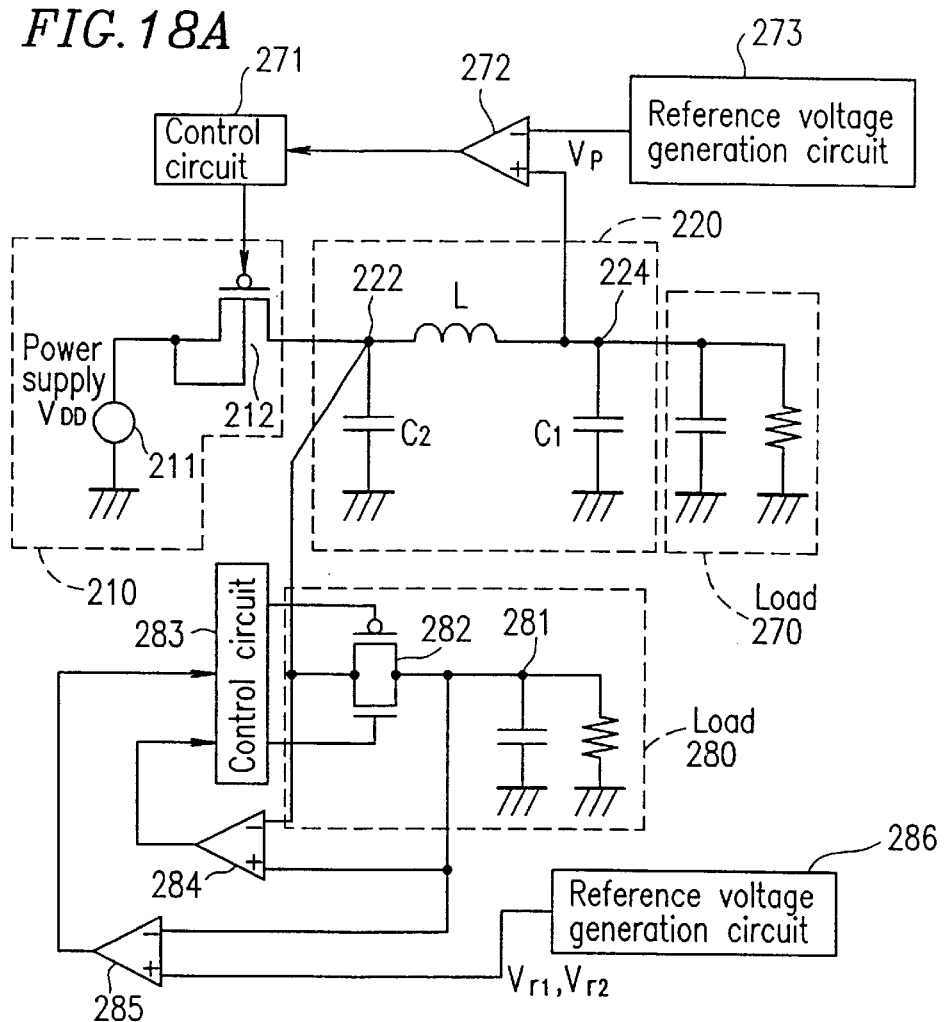
FIG. 18A is a diagram illustrating a structure of a DC-AC type power supply apparatus 203.

FIG. 18A illustrates a structure of a DC-AC type power supply apparatus 203. The structure of the power supply apparatus 203 is identical to the structure of the power supply apparatus 202 illustrated in FIG. 17A except that the load 270 is connected to the node 224.

By connecting the load 270 to the node 224, it is possible to supply a direct-current voltage waveform to the load 270. Moreover, by connecting the load 280 to the node 222, it is possible to charge the voltage at the node 281 of the load 280 to a desired voltage using an alternating-current voltage waveform.

Figure 18B:
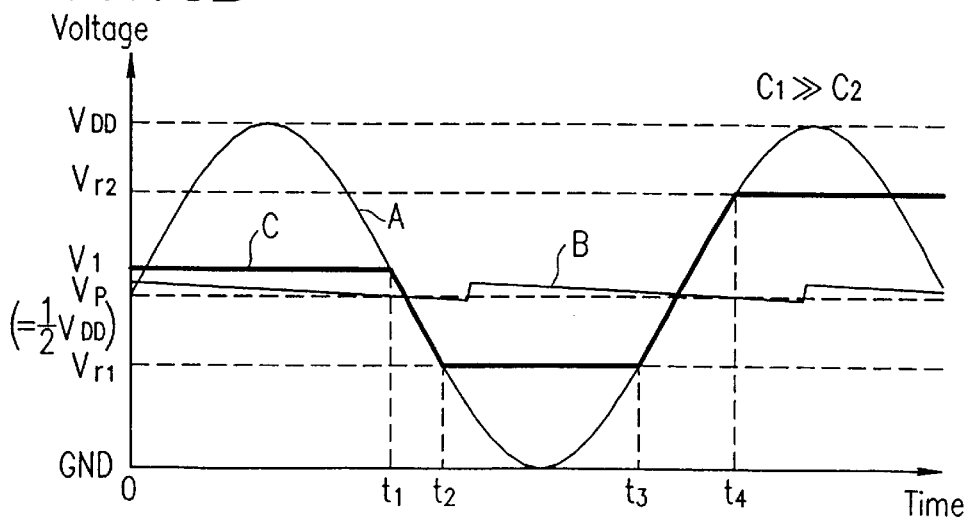
FIG. 18B is a diagram illustrating a voltage waveform at a node.

FIG. 18B illustrates an alternating-current voltage waveform (A) at the node 222, a direct-current voltage waveform (B) at the node 224, and a voltage waveform (C) at the node 281.

8.4 AC—AC Type Power Supply Apparatus (Variation 1)

Figure 19A:
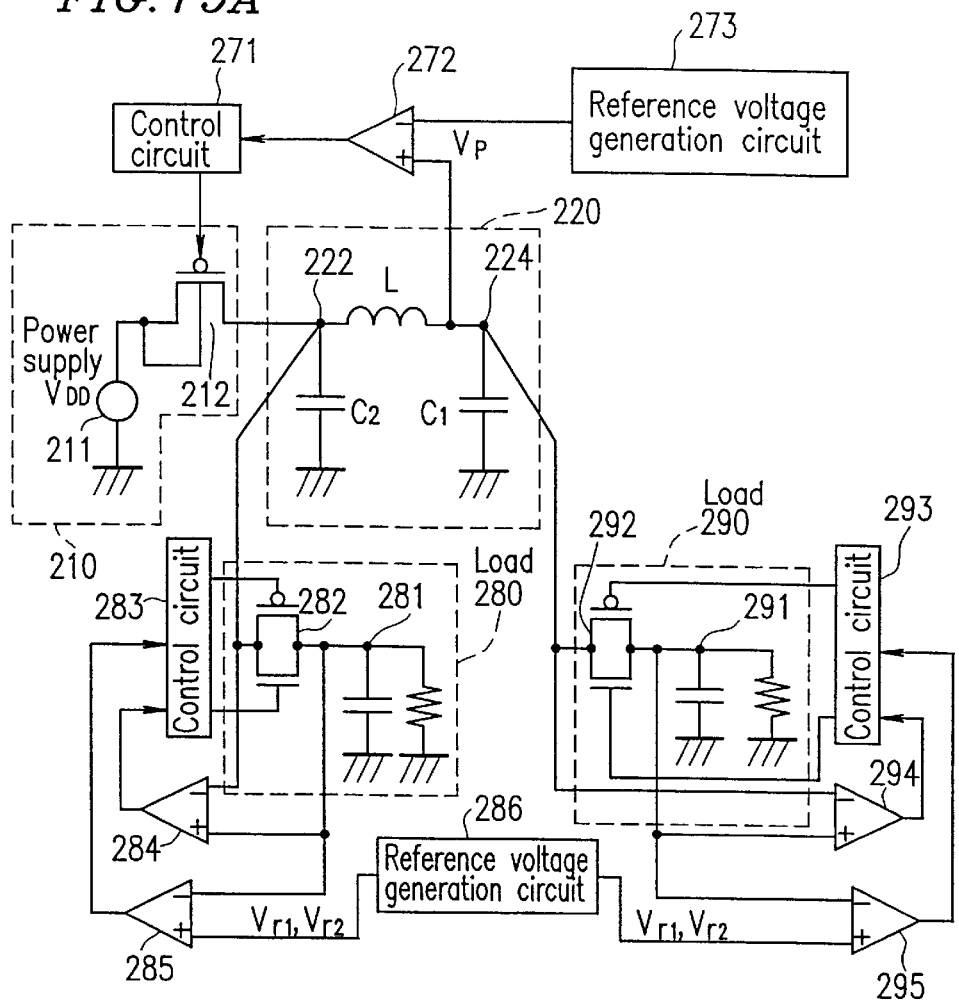
FIG. 19A is a diagram illustrating a structure of an AC—AC type power supply apparatus 204.

FIG. 19A illustrates a structure of an AC—AC type power supply apparatus 204. The power supply apparatus 204 charges the voltage at the node 281 of the load 280, which is connected to the node 222, to a desired voltage, using a first alternating-current voltage waveform, and charges the voltage at a node 291 of a load 290, which is connected to the node 224, to a desired voltage, using a second alternating-current voltage waveform whose phase is different from that of the first alternating-current voltage waveform by 180 degrees. The load 290 includes at least one of a capacitance component and a resistance component, and a switch 292.

In addition to the elements of the power supply apparatus 201 illustrated in FIG. 17A, the power supply apparatus 204 further includes a control circuit 293, a comparator 294 and a comparator 295. The function of the control circuit 293 is identical to the function of the control circuit 283. The function of the comparator 294 is identical to the function of the comparator 284. The function of the comparator 295 is identical to the function of the comparator 285. The structure illustrated in FIGS. 11A, 11B or 13A may be employed as means for adjusting dynamic energy.

The reference voltage generation circuit 286 outputs the voltage $V_{r1}$ and the voltage $V_{r2}$ which are alternated at a predetermined timing. The reference voltage generation circuit 286 outputs the voltage $V_{r1}$ to the comparator 285 while outputting the voltage $V_{r2}$ to the comparator 295. Moreover, the reference voltage generation circuit 286 outputs the voltage $V_{r2}$ to the comparator 285 while outputting the voltage $V_{r1}$ to the comparator 295.

The capacitance value $C_1$ and the capacitance value $C_2$ are set so as to satisfy the relationship $C_1 \approx C_2$. Thus, an alternating-current voltage waveform is obtained at the node 222, and an alternating-current voltage waveform is obtained at the node 224.

Figure 19B:
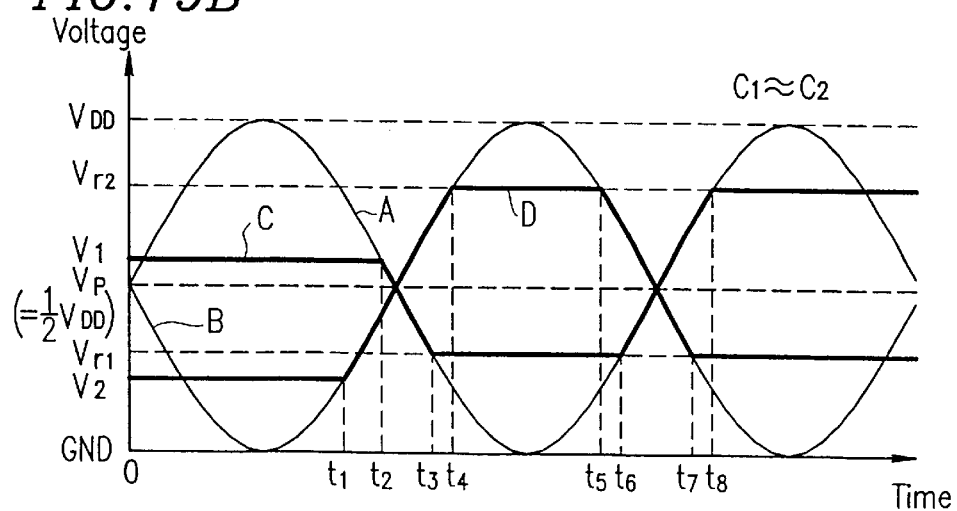
FIG. 19B is a diagram illustrating a voltage waveform at a node.

FIG. 19B illustrates an alternating-current voltage waveform (A) at the node 222, an alternating-current voltage waveform (B) at the node 224, a voltage waveform (C) at the node 281, and a voltage waveform (D) at the node 291. The alternating-current voltage waveform (A) and the alternating-current voltage waveform (B) are generally the same in terms of the center of the oscillation and the amplitude, but the phases thereof are different from each other by 180 degrees.

By using both the alternating-current voltage waveform (A) and the alternating-current voltage waveform (B), it is possible to set the voltage at the node 281 from the voltage $V_1$ to the voltage $V_{r1}$, which is lower than the voltage $V_1$, using the alternating-current voltage waveform (A) while it is decreasing while, in parallel to this, setting the voltage at the node 291 from the voltage $V_2$ to the voltage $V_{r2}$, which is higher than the voltage $V_2$, using the alternating-current voltage waveform (B) while it is increasing. Similarly, it is possible to set the voltage at the node 281 from the voltage VrI to the voltage $V_{r2}$, which is higher than the voltage $V_1$, using the alternating-current voltage waveform (A) while it is increasing while, in parallel to this, setting the voltage at the node 291 from the voltage $V_{r2}$ to the voltage $V_{r1}$, which is lower than the voltage $V_{r2}$, using the alternating-current voltage waveform (B) while it is decreasing. The relationship between the capacitance value $C_1$ and the capacitance value $C_2$ may be either $C_1 > C_2$ or $C_1 < C_2$.

8.5 AC—AC Type Power Supply Apparatus (Variation 2)

Figure 20A:
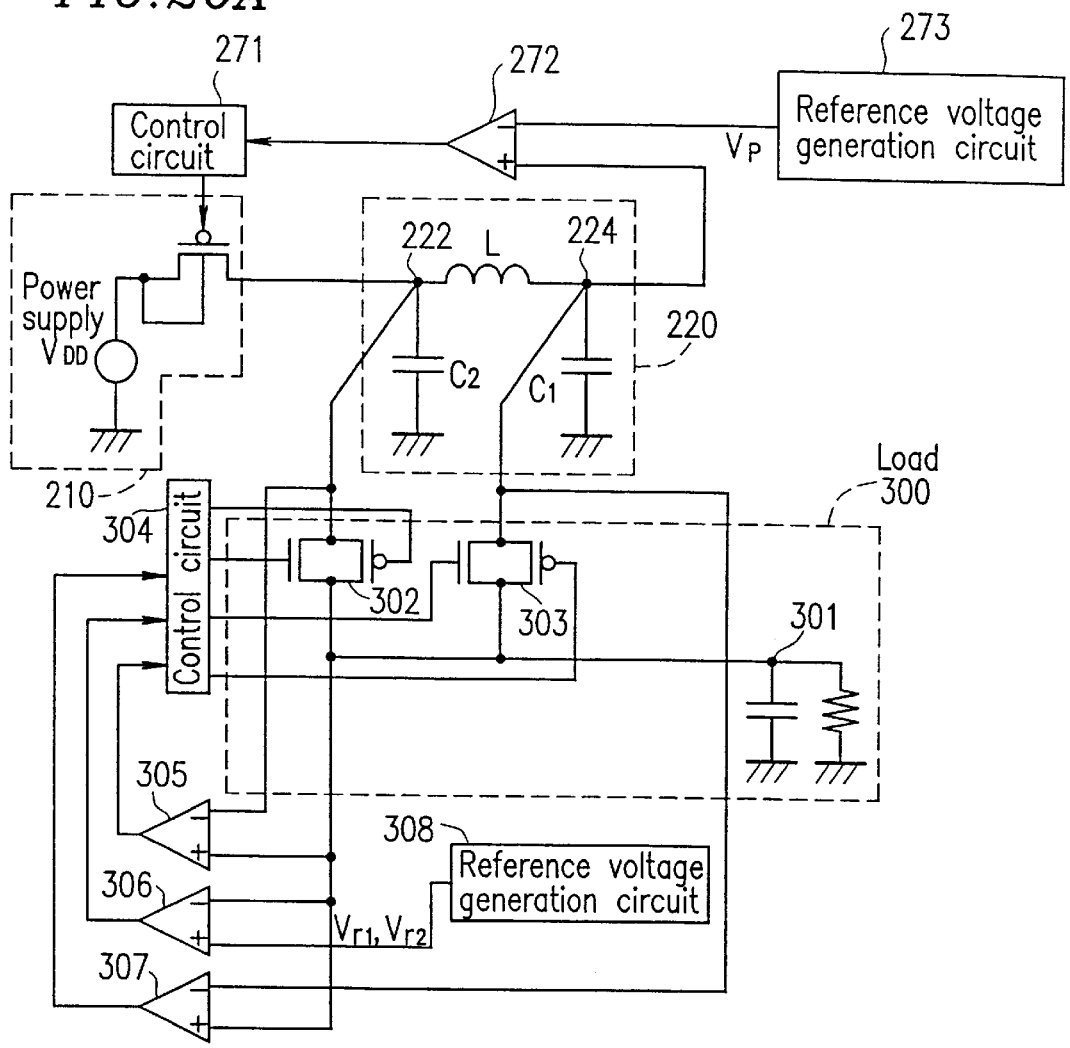
FIG. 20A is a diagram illustrating a structure of an AC—AC type power supply apparatus 205.

FIG. 20A illustrates a structure of an AC—AC type power supply apparatus 205. The power supply apparatus 205 selectively utilizes a first alternating-current voltage waveform and a second alternating-current voltage waveform whose phase is different from that of the first alternating-current voltage waveform so as to charge the voltage at a node 301 of a load 300, which is connected to the node 222 and the node 224, to a desired voltage. The load 300 includes at least one of a capacitance component and a resistance component, a switch 302, and a switch 303.

In addition to the elements of the power supply apparatus 201 illustrated in FIG. 16A, the power supply apparatus 205 further includes a control circuit 304, a comparator 305, a comparator 306, a comparator 307, and a reference voltage generation circuit 308. The structure illustrated in FIGS. 11A, 11B or 13A may be employed as means for adjusting dynamic energy.

The capacitance value $C_1$ and the capacitance value $C_2$ are set so as to satisfy the relationship $C_1 \approx C_2$. Thus, an alternating-current voltage waveform is obtained at the node 222, and an alternating-current voltage waveform is obtained at the node 224.

Figure 20B:
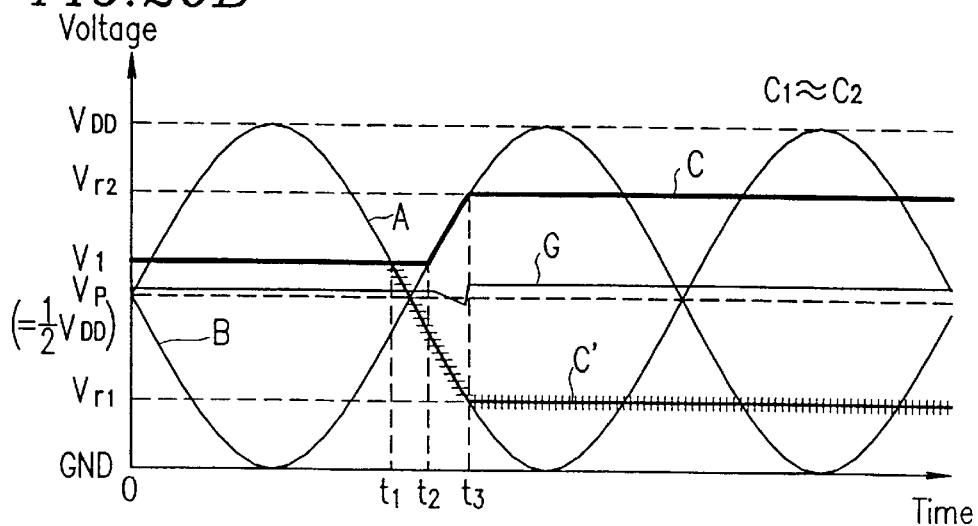
FIG. 20B is a diagram illustrating a voltage waveform at a node.

FIG. 20B illustrates an alternating-current voltage waveform (A) at the node 222, an alternating-current voltage waveform (B) at the node 224, and voltage waveforms (C) and (C') at the node 301. The alternating-current voltage waveform (A) and the alternating-current voltage waveform (B) are generally the same in terms of the center of the oscillation and the amplitude, but the phases thereof are different from each other by 180 degrees.

An operation of the power supply apparatus 205 for setting the voltage at the node 301 from the voltage $V_1$ to the voltage $V_{r2}$, which is higher than the voltage $V_1$, will now be described. It is assumed that the node 301 is charged to the voltage $V_1$ at time t=0.

The comparator 305 compares the voltage at the node 222 with the voltage at the node 301 so as to detect whether the voltage at the node 222 has reached the voltage $V_1$ while the alternating-current voltage waveform (A) is decreasing, or whether the voltage at the node 222 has reached the voltage $V_1$ while the alternating-current voltage waveform (A) is increasing. When the voltage at the node 222 reaches the voltage $V_1$ while the alternating-current voltage waveform (A) is decreasing, the output signal of the comparator 305 changes from L level to H level. When the voltage at the node 222 reaches the voltage $V_1$ while the alternating-current voltage waveform (A) is increasing, the output signal of the comparator 305 changes from H level to L level.

The comparator 307 compares the voltage at the node 224 with the voltage at the node 301 so as to detect whether the voltage at the node 224 has reached the voltage $V_1$ while the alternating-current voltage waveform (B) is decreasing, or whether the voltage at the node 224 has reached the voltage $V_1$ while the alternating-current voltage waveform (B) is increasing. When the voltage at the node 224 reaches the voltage $V_1$ while the alternating-current voltage waveform (B) is decreasing, the output signal of the comparator 307 changes from L level to H level. When the voltage at the node 224 reaches the voltage $V_1$ while the alternating-current voltage waveform (B) is increasing, the output signal of the comparator 307 changes from H level to L level.

When the voltage at the node 224 reaches the voltage $V_1$ at time $t_2$ while the alternating-current voltage waveform (B) is increasing, the output signal of the comparator 307 changes from H level to L level. In response to the change in the output signal of the comparator 307, the control circuit 304 turns ON the switch 303. Thus, the voltage at the node 301 changes along the alternating-current voltage waveform (B).

The comparator 306 compares the voltage at the node 301 with the voltage $V_{r2}$ output from the reference voltage generation circuit 308 so as to detect whether the voltage at the node 301 has reached the voltage $V_{r2}$.

When the voltage at the node 301 has reached the voltage $V_{r2}$ at time $t_3$, the output signal of the comparator 306 changes from L level to H level. In response to the change in the output signal of the comparator 306, the control circuit 304 turns OFF the switch 303. Thus, the voltage at the node 301 is kept at the voltage $V_{r2}$.

Next, an operation of the power supply apparatus 205 for setting the voltage at the node 301 from the voltage $V_1$ to the voltage $V_{r1}$, which is lower than the voltage $V_1$ will be described. It is assumed that the node 301 is charged to the voltage $V_1$ at time t=0.

When the voltage at the node 222 reaches the voltage $V_1$ at time $t_1$ while the alternating-current voltage waveform (A) is decreasing, the output signal of the comparator 305 changes from L level to H level. In response to the change in the comparator 305, the control circuit 304 turns ON the switch 302. Thus, the voltage at the node 301 changes along the alternating-current voltage waveform (A).

The comparator 306 compares the voltage at the node 301 with the voltage $V_{r1}$ output from the reference voltage generation circuit 308 so as to detect whether the voltage at the node 301 has reached the voltage $V_{r1}$. Thus, the reference voltage generation circuit 308 outputs the voltage $V_{r1}$ and the voltage $V_{r2}$ which are alternated at a predetermined timing.

When it is detected that the voltage at the node 301 has reached the voltage $V_1$ at time $t_3$, the output signal of the comparator 306 changes from L level to H level. In response to the change in the comparator 306, the control circuit 304 turns OFF the switch 302. Thus, the voltage at the node 301 is kept at the voltage $V_{r1}$.

The voltage at the node 301 of the load 300 can be charged to any voltage by adjusting the voltage output from the reference voltage generation circuit 308.

As in the DC type power supply apparatus 201, the energy consumed by the load 300 is detected by a decrease in the energy preserved in the energy preserving circuit 220. Energy is supplied to the energy preserving circuit 220 so as to recover the reduced energy.

Thus, it is possible to shorten the time required for charging the load 300 to a desired voltage by selectively using one voltage waveform of the alternating-current voltage waveform (A) and the alternating-current voltage waveform (B) with which the desired voltage is more quickly reached. The relationship between the capacitance value $C_1$ and the capacitance value $C_2$ may be either $C_1 > C_2$ or $C_1 < C_2$.

8.6 AC—AC Type Power Supply Apparatus (Variation 3)

Figure 21:
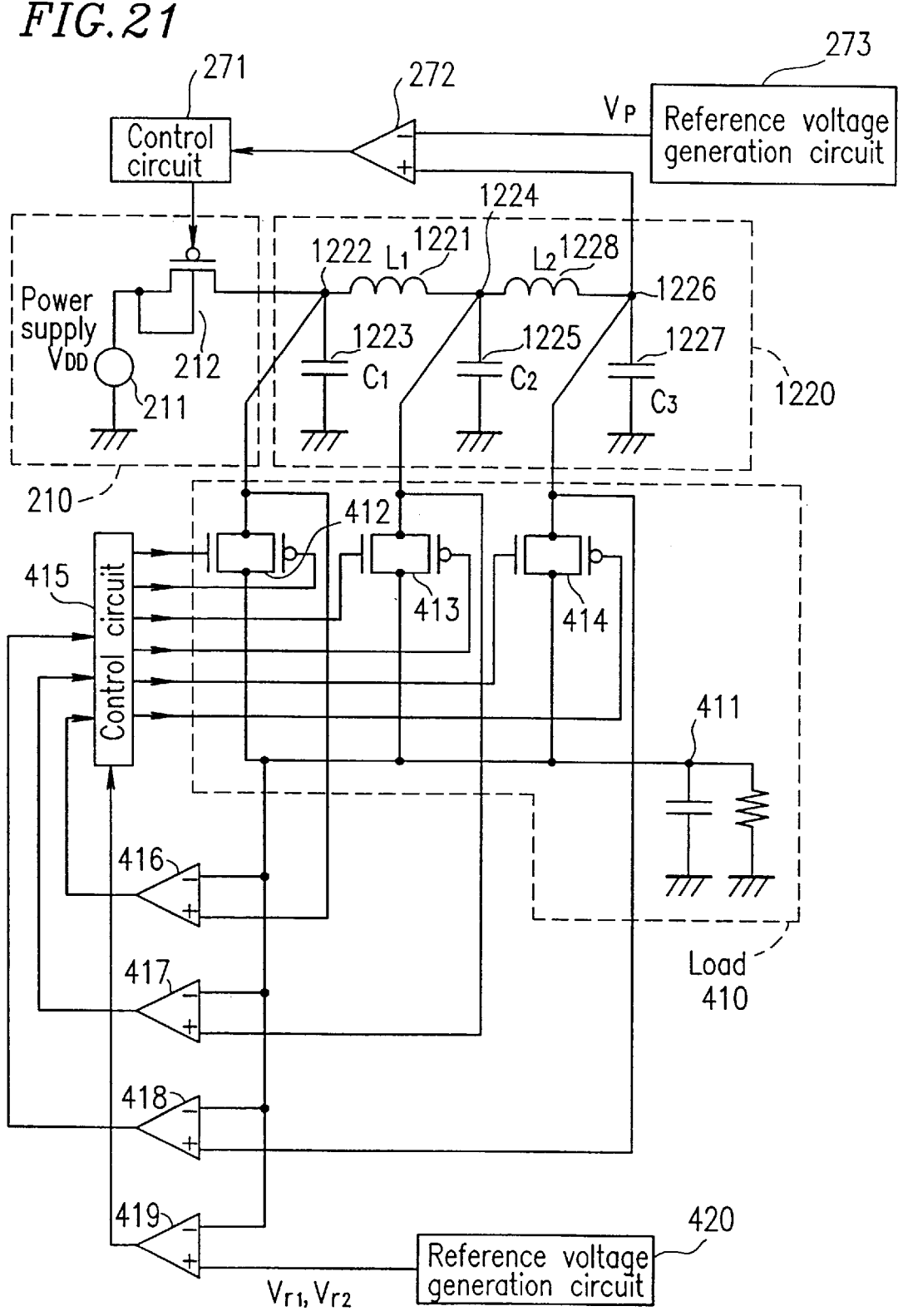
FIG. 21 is a diagram illustrating a structure of an AC—AC type power supply apparatus 206.

FIG. 21 illustrates a structure of an AC—AC type power supply apparatus 206. A load 410 is connected to the power supply apparatus 206 at a node 1222, a node 1224, and a node 1226. The load 410 includes at least one of a capacitance component and a resistance component, and switches 412–414.

The power supply apparatus 206 includes the energy supplying circuit 210 and an energy preserving circuit 1220. The structure illustrated in FIGS. 11A, 11B or 13A may be employed as means for adjusting dynamic energy.

The energy preserving circuit 1220 has a structure in which LC resonance circuits are connected in a cascade manner. More specifically, the energy preserving circuit 1220 includes an inductor 1221, an inductor 1228, a capacitance 1223, a capacitance 1225, and a capacitance 1227. The inductor 1221 and the inductor 1228 are serially connected via the node 1224. The capacitance 1223 is connected to the inductor 1221 at the node 1222. The capacitance 1225 is connected to the inductors 1221 and 1228 at the node 1224. The capacitance 1227 is connected to the inductor 1228 at the node 1226. Herein, $L_1$ and $L_2$ denote the inductances of the inductors 1221 and 1228, respectively. $C_1$–$C_3$ denote the capacitance values of the capacitances 1223, 1225 and 1227, respectively.

The power supply apparatus 206 further includes a control circuit 271, a comparator 272, a reference voltage generation circuit 273, a control circuit 415, comparators 416–419, and a reference voltage generation circuit 420.

The capacitance value $C_1$, the capacitance value $C_2$ and the capacitance value $C_3$ are set so as to satisfy the relationship $C_1 \approx C_2 \approx C_3$. Thus, an alternating-current voltage waveform is obtained at the node 1222, an alternating-current voltage waveform is obtained at the node 1224, and an alternating-current voltage waveform is obtained at the node 1226.

Figure 22:
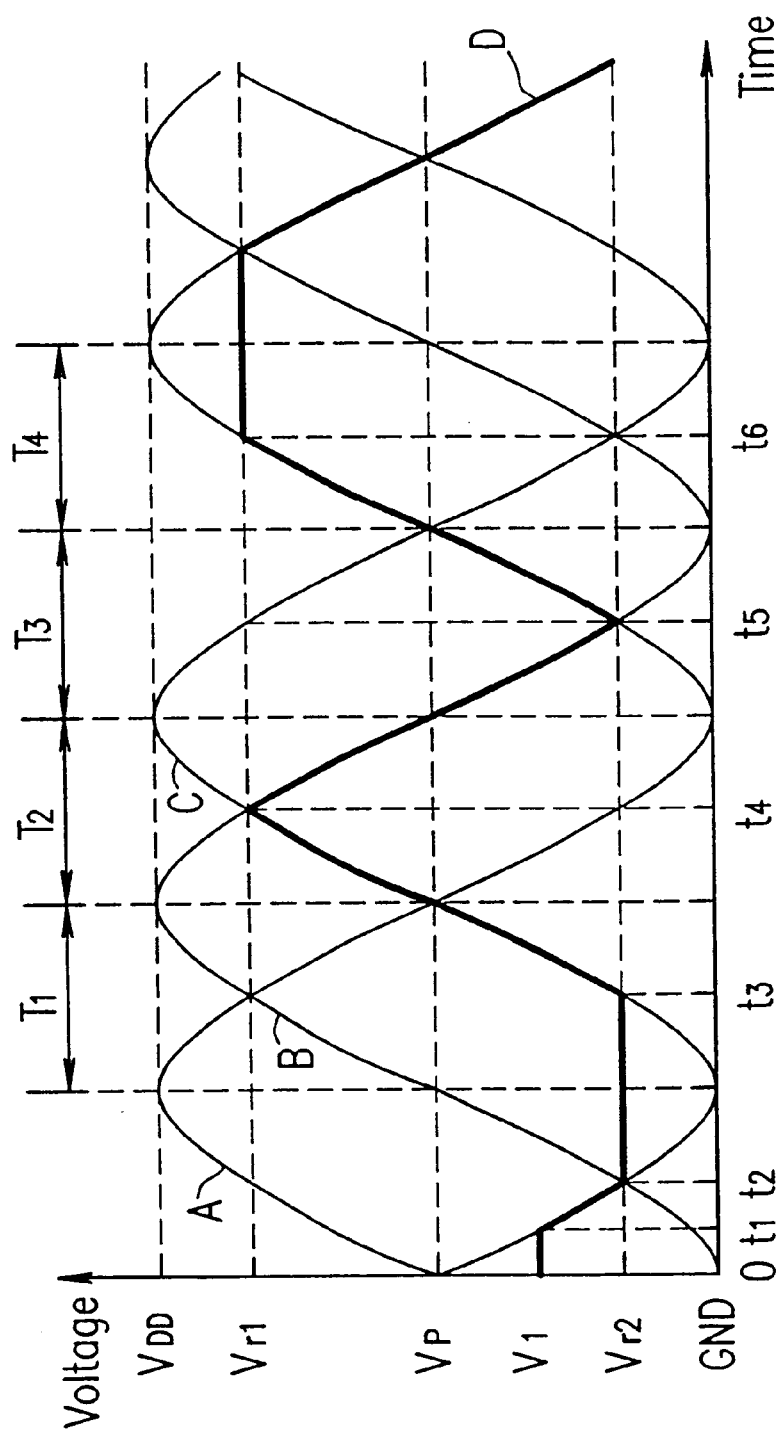
FIG. 22 is a diagram illustrating a voltage waveform at a node.

FIG. 22 illustrates an alternating-current voltage waveform (A) at the node 1222, an alternating-current voltage waveform (B) at the node 1224, an alternating-current voltage waveform (C) at the node 1226, and a voltage waveform (D) at a node 411 of the load 410. The alternating-current voltage waveforms (A)–(C) have generally the same center of the oscillation and amplitude. The phase of the alternating-current voltage waveform (A) is different from that of the alternating-current voltage waveform (C) by 180 degrees.

FIGS. 23A–23D illustrate movement of charges for periods $T_1$–$T_4$ illustrated in FIG. 22, respectively. Herein, $V_A$ is defined to denote a voltage at the node 1222, $V_B$ is defined to denote a voltage at the node 1224, and $V_C$ is defined to denote a voltage at the node 1226.

Figure 23A:
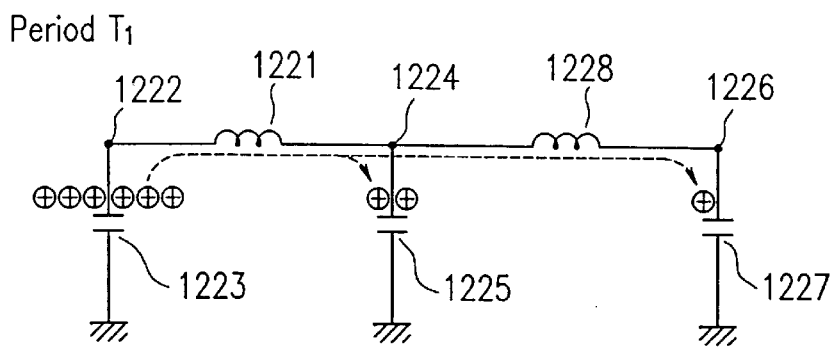
FIGS. 23A–23D are diagrams illustrating movement of charges for periods $T_1$–$T_4$, respectively.

In period $T_1$, the charge stored in the capacitance 1223 moves to the capacitance 1225 and the capacitance 1227 (FIG. 23A). Thus, the voltage $V_A$ decreases, and the voltage $V_B$ and the voltage $V_C$ increase.

Figure 23B:
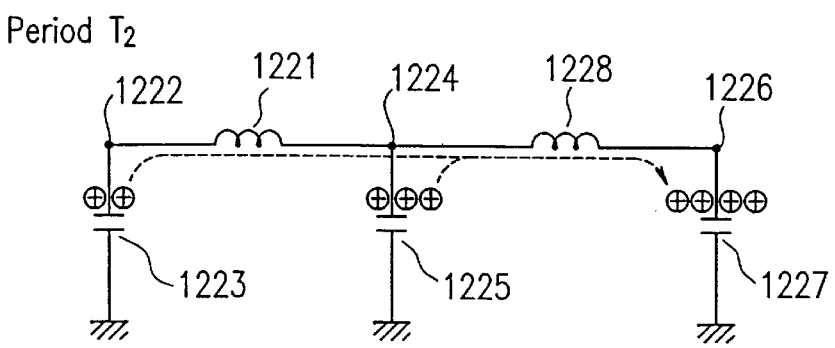

In period $T_2$, the charge stored in the capacitance 1223 and the charge stored in the capacitance 1225 move to the capacitance 1227 (FIG. 23B). Thus, the voltage $V_A$ and the voltage $V_B$ decrease, and the voltage $V_C$ increases.

Figure 23C:
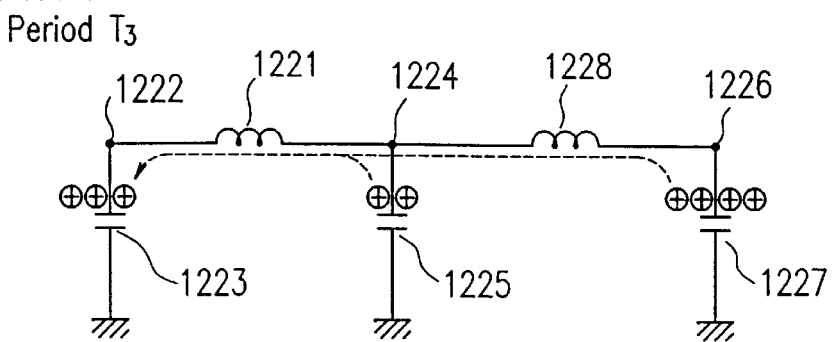

In period $T_3$, the charge stored in the capacitance 1225 and the charge stored in the capacitance 1227 move to the capacitance 1223 (FIG. 23C). Thus, the voltage $V_A$ increases, and the voltage $V_B$ and the voltage $V_C$ decrease.

Figure 23D:
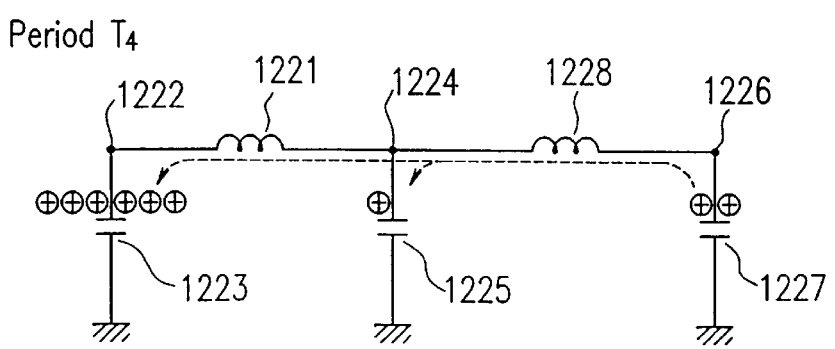

In period $T_4$, the charge stored in the capacitance 1227 moves to the capacitance 1223 and the capacitance 1225 (FIG. 23D). Thus, the voltage $V_A$ and the voltage $V_B$ increase, and the voltage $V_C$ decreases.

An operation of the power supply apparatus 206 for setting the voltage at the node 411 from the voltage $V_1$ to the voltage $V_{r1}$, which is lower than the voltage $V_1$, will now be described. It is assumed that the node 411 is charged to the voltage $V_1$ at time t=0.

When the voltage $V_C$ reaches the voltage at the node 411 (i.e., the voltage $V_1$) at time $t_1$ while the voltage $V_C$ is decreasing, the control circuit 415 turns ON the switch 414. As a result, the voltage at the node 411 decreases along the alternating-current voltage waveform (C).

When the voltage $V_C$ reaches the reference voltage $V_{r2}$, which is output from the reference voltage generation circuit 420, at time $t_2$, while the voltage $V_C$ is decreasing, the control circuit 415 turns OFF the switch 414. As a result, the voltage at the node 411 is kept at the voltage $V_{r2}$.

Next, an operation of the power supply apparatus 206 for setting the voltage at the node 411 from the voltage $V_{r2}$ to the voltage $V_{r1}$, which is higher than the voltage $V_{r2}$, will be described.

When the voltage $V_C$ reaches the reference voltage $V_{r2}$, which is output from the reference voltage generation circuit 420, at time $t_3$, while the voltage $V_C$ is increasing, the control circuit 415 turns ON the switch 414. As a result, the voltage at the node 411 increases along the alternating-current voltage waveform (C).

When the voltage $V_C$ reaches the reference voltage $V_{r1}$, which is output from the reference voltage generation circuit 420, at time $t_4$, while the voltage $V_C$ is increasing, the control circuit 415 turns OFF the switch 414. Thus, the capacitance component in the load 410 is adiabatically charged. The operation so far is similar to the operations of the above-described AC—AC type power supply apparatuses 204 and 205.

When setting the voltage at the node 411 from the voltage $V_{r1}$ to the voltage $V_{r2}$ at time $t_4$, it is effective to use the alternating-current voltage waveform (B) instead of the alternating-current voltage waveform (C). In order to decrease the voltage at the node 411 along the alternating-current voltage waveform (C), it is necessary to wait until time $t_5$ to turn ON the switch 414. This is because it is possible to turn ON the switch 413 at time $t_4$, which is earlier than time $t_5$, if the alternating-current voltage waveform (B) is used. Thus, by using the alternating-current voltage waveform (B), it is possible to increase the operating frequency.

Typically, when using a plurality of alternating-current voltage waveforms which are respectively generated by separate circuits, it is necessary to adjust the phase between/among the alternating-current voltage waveforms. On the contrary, with the power supply apparatus 206, it is not necessary to adjust the phase among the alternating-current voltage waveforms (A)–(C). This is because the phase of the alternating-current voltage waveform (B) is set between the alternating-current voltage waveform (A) and the alternating-current voltage waveform (C) due to the nature of the cascade connection of the LC resonance circuits.

Figure 24A:
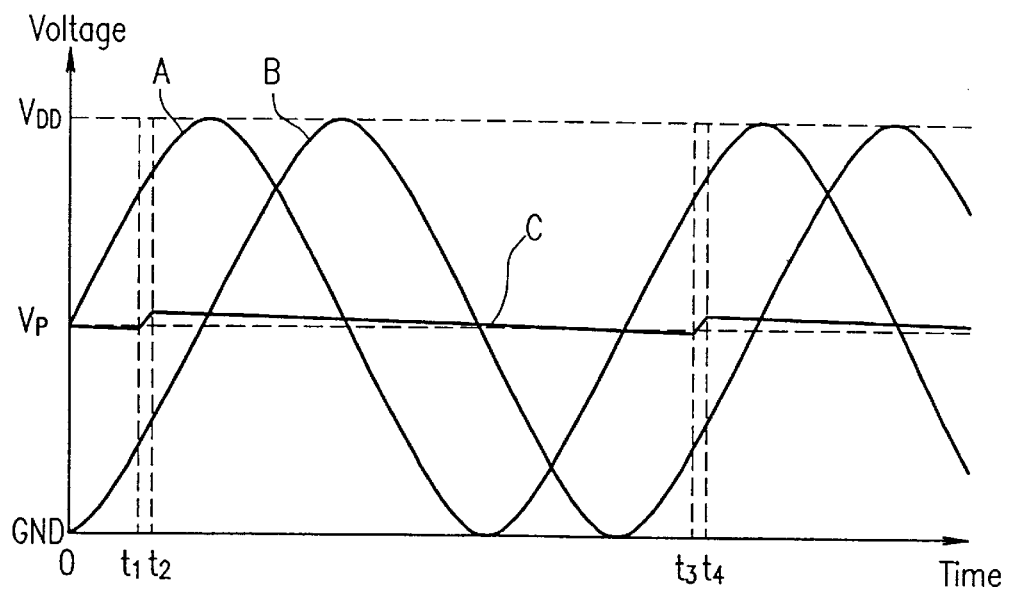
FIGS. 24A and 24B are diagrams each illustrating a voltage waveform at a node.

FIG. 24A illustrates voltage waveforms obtained at the respective nodes when the capacitance values $C_1$–$C_3$ are set so as to satisfy the relationship $C_1$, $C_2$<<$C_3$. An alternating-current voltage waveform (A) is obtained at the node 1222, an alternating-current voltage waveform (B) is obtained at the node 1224, and a direct-current voltage waveform (C) is obtained at the node 1226.

Figure 24B:
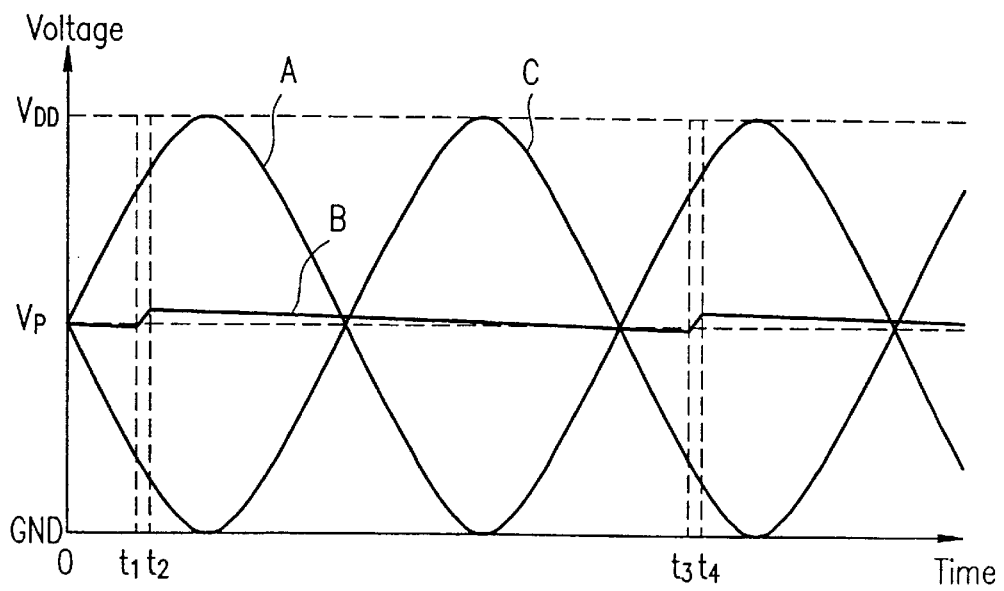

FIG. 24B illustrates voltage waveforms obtained at respective nodes when the capacitance values $C_1$–$C_3$ are set so as to satisfy the relationship $C_1$, $C_3$<<$C_2$. An alternating-current voltage waveform (A) is obtained at the node 1222, a direct-current voltage waveform (B) is obtained at the node 1224, and an alternating-current voltage waveform (C) is obtained at the node 1226.

Thus, by appropriately combining the capacitance values $C_1$–$C_3$, it is possible to generate various types of voltage waveforms.

Table 1 shows a summary of the combinations of the voltage waveforms obtained at the nodes 1222, 1224 and 1226, respectively.

TABLE 1

|   | Node 1222 | Node 1224 | Node 1226 |
|---|---|---|---|
| a | AC | AC | AC |
| b | AC | AC | DC |
| c | AC | DC | AC |
| d | DC | AC | AC |
| e | DC | DC | DC |
| f | DC | DC | AC |
| g | DC | AC | DC |
| h | AC | DC | DC |

9. Energy Reuse Types of Power Supply Apparatus 200

The power supply apparatus 200 is generally classified into the following five types (1)–(5).

(1) Energy Reuse AC Type: A type which reuses an energy by returning at least a portion of alternating-current voltage energy supplied from one of the node 222 and the node 224 of the energy preserving circuit 220, back to the energy preserving circuit 220 via the same node.

(2) Energy Reuse DC Type: A type which reuses an energy by returning at least a portion of direct-current voltage energy supplied from one of the node 222 and the node 224 of the energy preserving circuit 220, back to the energy preserving circuit 220 via the same node.

(3) Energy Reuse AC—AC Type: A type which reuses an energy by returning at least a portion of alternating-current voltage energy supplied from one of the node 222 and the node 224 of the energy preserving circuit 220, back to the energy preserving circuit 220 via the other node, as alternating-current voltage energy.

(4) Energy Reuse AC-DC Type: A type which reuses an energy by returning at least a portion of alternating-current voltage energy supplied from one of the node 222 and the node 224 of the energy preserving circuit 220, back to the energy preserving circuit 220 via the other node, as direct-current voltage energy.

(5) Energy Reuse DC-AC Type: A type which reuses an energy by returning at least a portion of direct-current voltage energy supplied from one of the node 222 and the node 224 of the energy preserving circuit 220, back to the energy preserving circuit 220 via the other node, as alternating-current voltage energy.

9.1 Energy Reuse AC Type Power Supply Apparatus

The AC—AC type power supply apparatus 204 illustrated in FIG. 19A corresponds to an energy reuse AC type power supply apparatus 1201. This is because energy is supplied from the energy preserving circuit 220 to the load 280 while the alternating-current voltage waveform (A) (see FIG. 19B) supplied from the node 222 of the energy preserving circuit 220 is increasing, whereas energy is returned from the load 280 to the energy preserving circuit 220 via the node 222 while the alternating-current voltage waveform (A) is decreasing. This is similarly true for the alternating-current voltage waveform (B) supplied from the node 224 of the energy preserving circuit 220.

Thus, energy is reused by returning as the charge stored in the capacitance components of the load 280 and the load 290 to the energy preserving circuit 220. Thus, it is possible to charge/discharge the load 280 and the load 290 with little energy loss.

9.2 Energy Reuse DC Type Power Supply Apparatus

Figure 25A:
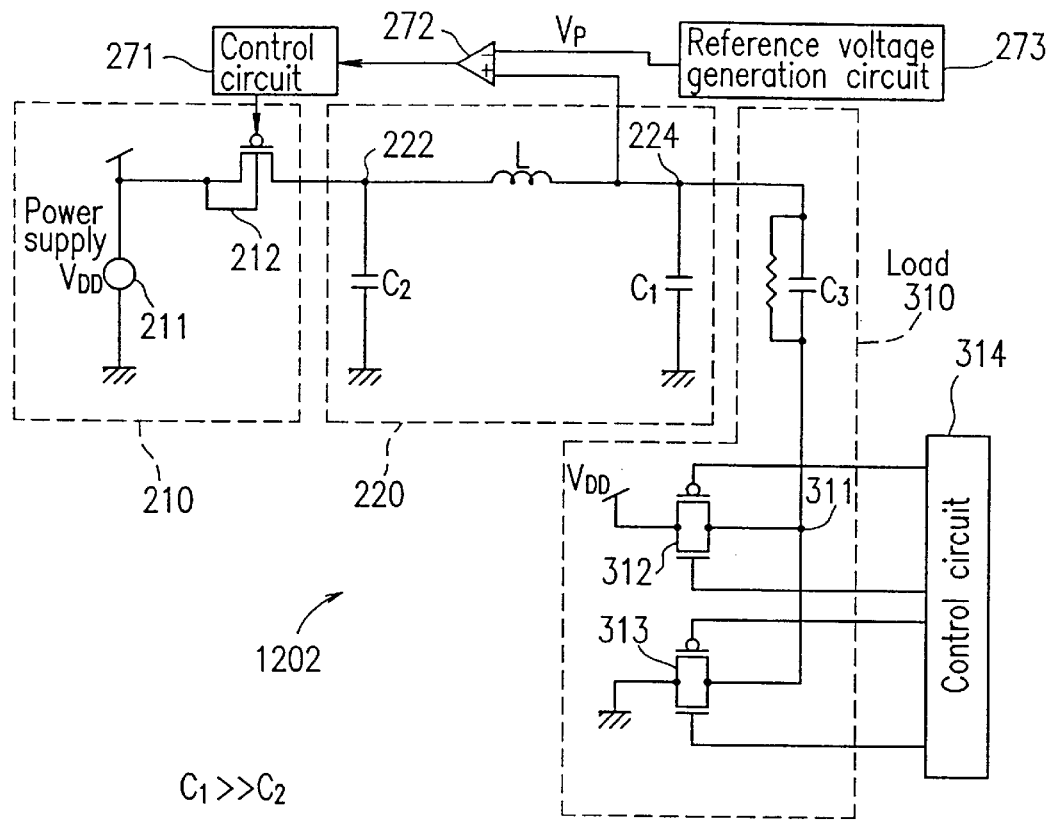
FIG. 25A is a diagram illustrating a structure of an energy reuse DC type power supply apparatus 1202.

FIG. 25A illustrates a structure of an energy reuse DC type power supply apparatus 1202. A load 310 is connected to the power supply apparatus 1202 at the node 224. The load 310 includes a capacitance component $C_3$, a switch 312 and a switch 313.

The power supply apparatus 1202 supplies a direct-current voltage waveform to the load 310 via the node 224. The energy supplied from the power supply apparatus 1202 via the node 224 is stored in the capacitance component $C_3$ of the load 310. At least a portion of the energy stored in the capacitance component $C_3$ of the load 310 is returned to the power supply apparatus 1202 via the node 224. Thus, energy is reused.

In addition to the basic elements, i.e., the energy supplying circuit 210 and the energy preserving circuit 220, the power supply apparatus 1202 further includes the control circuit 271, the comparator 272, the reference voltage generation circuit 273, and a control circuit 314. In the example illustrated in FIG. 25A, the energy supplying circuit 210 employs the structure as illustrated in FIG. 6A. However, any of the structures illustrated in FIGS. 6A–6D and 58A may be employed as the structure of the energy supplying circuit 210. The structure as illustrated in FIGS. 11A, 11B or 13A may be employed as means for adjusting the dynamic energy.

The capacitance value $C_1$ and the capacitance value $C_2$ are set so as to satisfy the relationship $C_1 \gg C_2$. Thus, an alternating-current voltage waveform is obtained at the node 222, and a direct-current voltage waveform is obtained at the node 224.

Figure 25B:
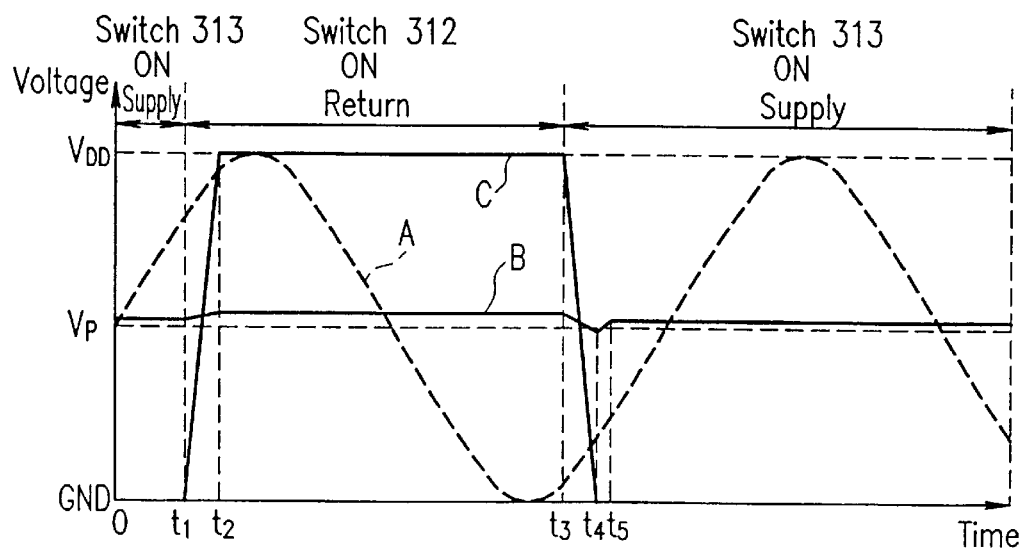
FIG. 25B is a diagram illustrating a voltage waveform at a node.

FIG. 25B illustrates an alternating-current voltage waveform (A) at the node 222, a direct-current voltage waveform (B) at the node 224, and a voltage waveform (C) at a node 311.

An operation of the power supply apparatus 1202 will now be described.

The comparator 272 compares the voltage at the node 224 and the voltage $V_P$ output from the reference voltage generation circuit 273 so as to detect whether the voltage at the node 224 has decreased below the voltage $V_P$. When the voltage at the node 224 is equal to or greater than the voltage $V_P$, the output signal of the comparator 272 is at H level. When the voltage at the node 224 is lower than the voltage $V_P$, the output signal of the comparator 272 is at L level.

At time t=0, the switch 312 is OFF, while the switch 313 is ON. Therefore, the voltage at the node 311 of the load 310 is set to the ground voltage GND.

At time $t_1$, the control circuit 314 turns ON the switch 312, and turns OFF the switch 313. As a result, the voltage at the node 311 is charged toward the power supply voltage $V_{DD}$. Since the voltage at the node 311 increases in the period from time $t_1$ to time $t_2$, the charge stored in the capacitance component $C_3$ of the load 310 is returned to the energy preserving circuit 220 via the node 224.

At time $t_3$, the control circuit 314 turns OFF the switch 312, and turns ON the switch 313. As a result, the voltage at the node 311 is charged toward the ground voltage GND. Since the voltage at the node 311 decreases in the period from time $t_3$ to time $t_4$, the charge supplied from the energy preserving circuit 220 via the node 224 is stored in the capacitance component $C_3$ of the load 310.

By supplying energy to the load 310, the voltage at the node 224 of the energy preserving circuit 220 decreases.

When the voltage at the node 224 decreases below the voltage $V_P$ at time $t_4$, the output signal of the comparator 272 changes from H level to L level. In response to the change in the output signal of the comparator 272, the control circuit 271 turns ON the switch 212. Thus, the supply of energy to the energy preserving circuit 220 is initiated. As a result, the voltage at the node 224 increases.

When the voltage at the node 224 becomes equal to or greater than the voltage $V_P$ at time $t_5$, the output signal of the comparator 272 changes from L level to H level. In response to the change in the output signal of the comparator 272, the control circuit 271 turns OFF the switch 212. Thus, the supply of energy to the energy preserving circuit 220 is terminated.

The voltage at the node 311 of the load 310 is controlled so as to increase from the ground voltage GND to the power supply voltage $V_{DD}$, or to decrease from the power supply voltage $V_{DD}$ to the ground voltage GND. When the voltage at the node 311 increases, the charge stored in the capacitance component $C_3$ of the load 310 is returned to the energy preserving circuit 220 via the node 224. When the voltage at the node 311 of the load 310 decreases, the charge supplied from the energy preserving circuit 220 via the node 224 is stored in the capacitance component $C_3$ of the load 310.

Thus, energy is reused by returning the charge stored in the capacitance component $C_3$ of the load 310 to the energy preserving circuit 220. Thus, it is possible to charge/discharge the load 310 with little energy loss.

9.3 Energy Reuse AC—AC Type Power Supply Apparatus

Figure 26A:
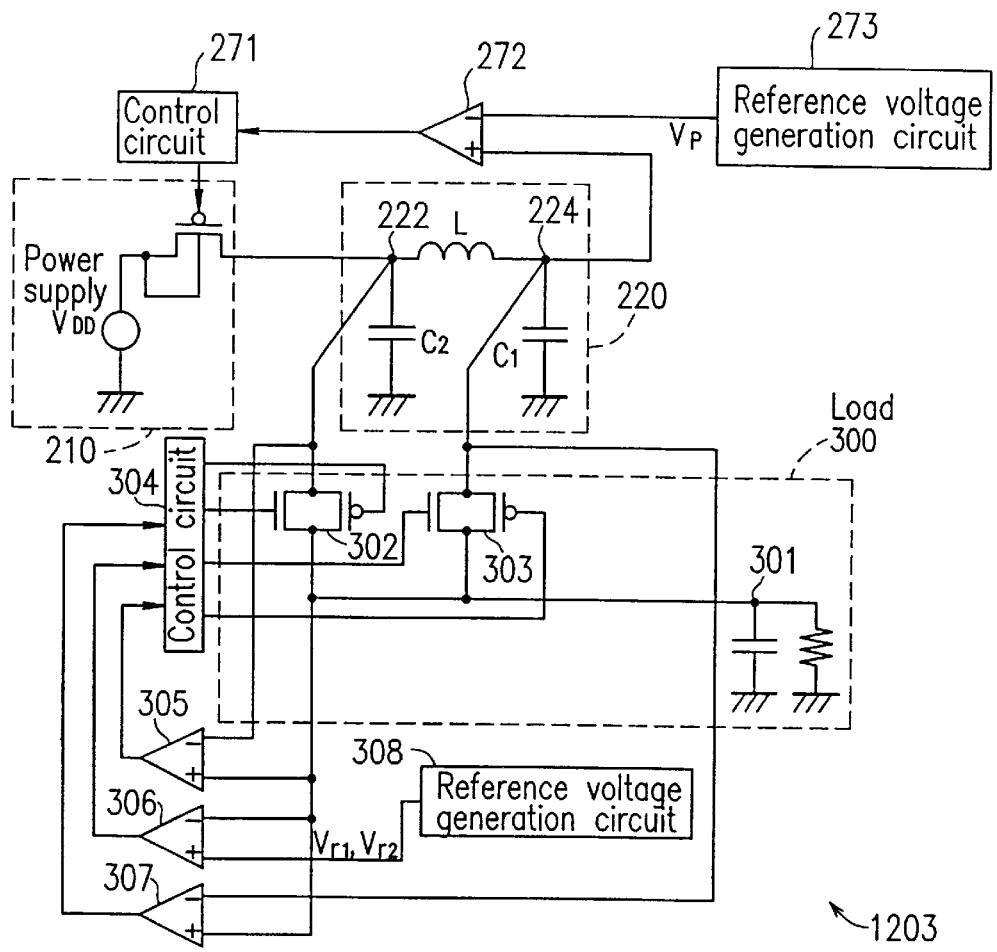
FIG. 26A is a diagram illustrating a structure of an energy reuse AC—AC type power supply apparatus 1203.

FIG. 26A illustrates a structure of an energy reuse AC—AC type power supply apparatus 1203. The structure of the power supply apparatus 1203 is identical to the structure of the AC—AC type power supply apparatus 205 illustrated in FIG. 20A. The load 300 is connected to the power supply apparatus 1203 at the node 222 and the node 224. The load 300 includes the capacitance component $C_3$, the switch 302, and the switch 303. The structure as illustrated in FIGS. 11A, 11B or 13A may be employed as means for adjusting the dynamic energy.

The power supply apparatus 1203 supplies an alternating-current voltage waveform to the load 300 via the node 222, and supplies an alternating-current voltage waveform to the load 300 via the node 224. The energy supplied from the power supply apparatus 1203 via the node 224 is stored in the capacitance component $C_3$ of the load 300. At least a portion of the energy stored in the capacitance component $C_3$ of the load 300 is returned to the power supply apparatus 1203 via the node 222. Thus, energy is reused.

Figure 26B:
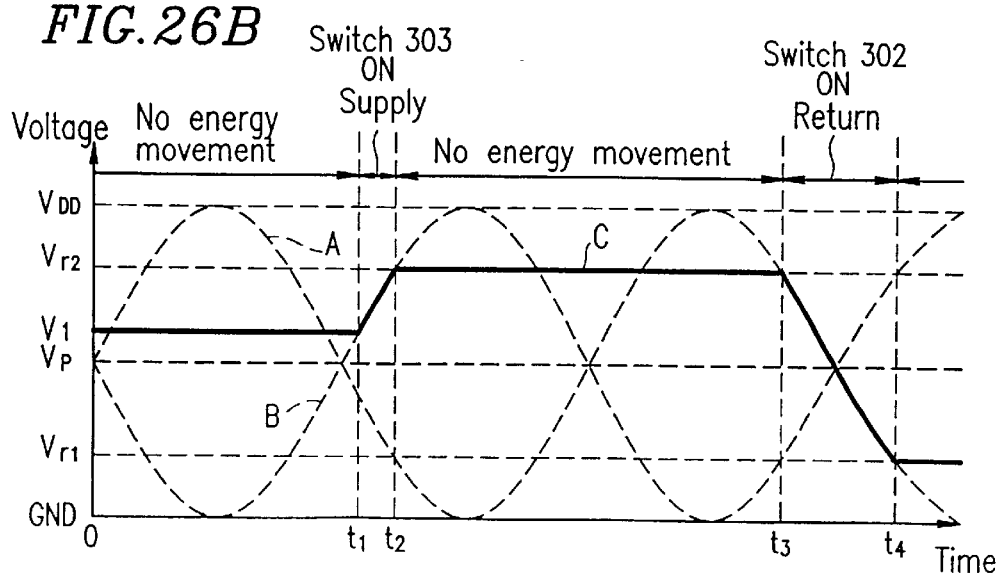
FIG. 26B is a diagram illustrating a voltage waveform at a node.

FIG. 26B illustrates an alternating-current voltage waveform (A) at the node 222, an alternating-current voltage waveform (B) at the node 224, and a voltage waveform (C) at the node 301. The alternating-current voltage waveform (A) and the alternating-current voltage waveform (B) are generally the same in terms of the center of the oscillation and the amplitude, but the phases thereof are different from each other by 180 degrees.

An operation of the power supply apparatus 1203 will now be described.

It is assumed that the node 301 is charged to the voltage $V_1$ at time t=0. The switch 302 is OFF, while the switch 303 is OFF.

When the voltage at the node 224 reaches the voltage at the node 301 (i.e., the voltage $V_1$) at time $t_1$ while the alternating-current voltage waveform (B) is increasing, the output signal of the comparator 307 changes from H level to L level. In response to the change in the output signal of the comparator 307, the control circuit 304 turns ON the switch 303. Thus, the voltage at the node 301 changes along the alternating-current voltage waveform (B).

The comparator 306 compares the voltage at the node 301 with the voltage $V_{r2}$ output from the reference voltage generation circuit 308 so as to detect whether the voltage at the node 301 has reached the voltage $V_{r2}$.

When the voltage at the node 301 reaches the voltage $V_{r2}$ at time $t_2$, the output signal of the comparator 306 changes from L level to H level. In response to the change in the output signal of the comparator 306, the control circuit 304 turns OFF the switch 303. Thus, the voltage at the node 301 is kept at the voltage $V_{r2}$.

When the voltage at the node 222 reaches the voltage at the node 301 (i.e., $V_{r2}$) at time $t_3$ while the alternating-current voltage waveform (A) is decreasing, the output signal of the comparator 305 changes from L level to H level. In response to the change in the output signal of the comparator 305, the control circuit 304 turns ON the switch 302. Thus, the voltage at the node 301 changes along the alternating-current voltage waveform (A).

The comparator 306 compares the voltage at the node 301 with the voltage $V_{r1}$ output from the reference voltage generation circuit 308 so as to detect whether the voltage at the node 301 has reached the voltage $V_{r1}$. Thus, the reference voltage generation circuit 308 outputs the voltage $V_{r1}$ and the voltage $V_{r2}$ which are alternated at a predetermined timing.

When it is detected that the voltage at the node 301 has reached the voltage $V_1$ at time $t_4$, the output signal of the comparator 306 changes from H level to L level. In response to the change in the output signal of the comparator 306, the control circuit 304 turns OFF the switch 302. Thus, the voltage at the node 301 is kept at the voltage $V_{r1}$.

In the period from time t=0 to time $t_1$, there is no movement of an energy between the energy preserving circuit 220 and the load 300. This is because the switch 302 and the switch 303 are both OFF, and the energy preserving circuit 220 and the load 300 are electrically separated from each other during this period.

During the period from time $t_1$ to time $t_2$, energy is supplied from the energy preserving circuit 220 to the load 300 via the node 224. This is because the switch 302 is OFF, while the switch 303 is ON during this period. As a result, the voltage at the node 301 of the load 300 increases.

During the period from time $t_2$ to time $t_3$, there is no movement of an energy between the energy preserving circuit 220 and the load 300. This is because the switch 302 and the switch 303 are both OFF, and the energy preserving circuit 220 and the load 300 are electrically separated from each other during this period.

During the period from time $t_3$ to time $t_4$, energy is returned from the load 300 to the energy preserving circuit 220 via the node 222. This is because the switch 302 is ON, while the switch 303 is OFF during this period. As a result, the voltage at the node 301 of the load 300 decreases.

Thus, at least a portion of the energy supplied from the energy preserving circuit 220 to the load 300 via the node 224 is returned from the load 300 to the energy preserving circuit 220 via the node 222, thereby reusing the energy. Thus, it is possible to charge/discharge the load 300 with little energy loss. The relationship between the capacitance value $C_1$ and the capacitance value $C_2$ may be either $C_1 > C_2$ or $C_1 < C_2$.

9.4 Energy Reuse AC-DC Type Power Supply Apparatus

Figure 27A:
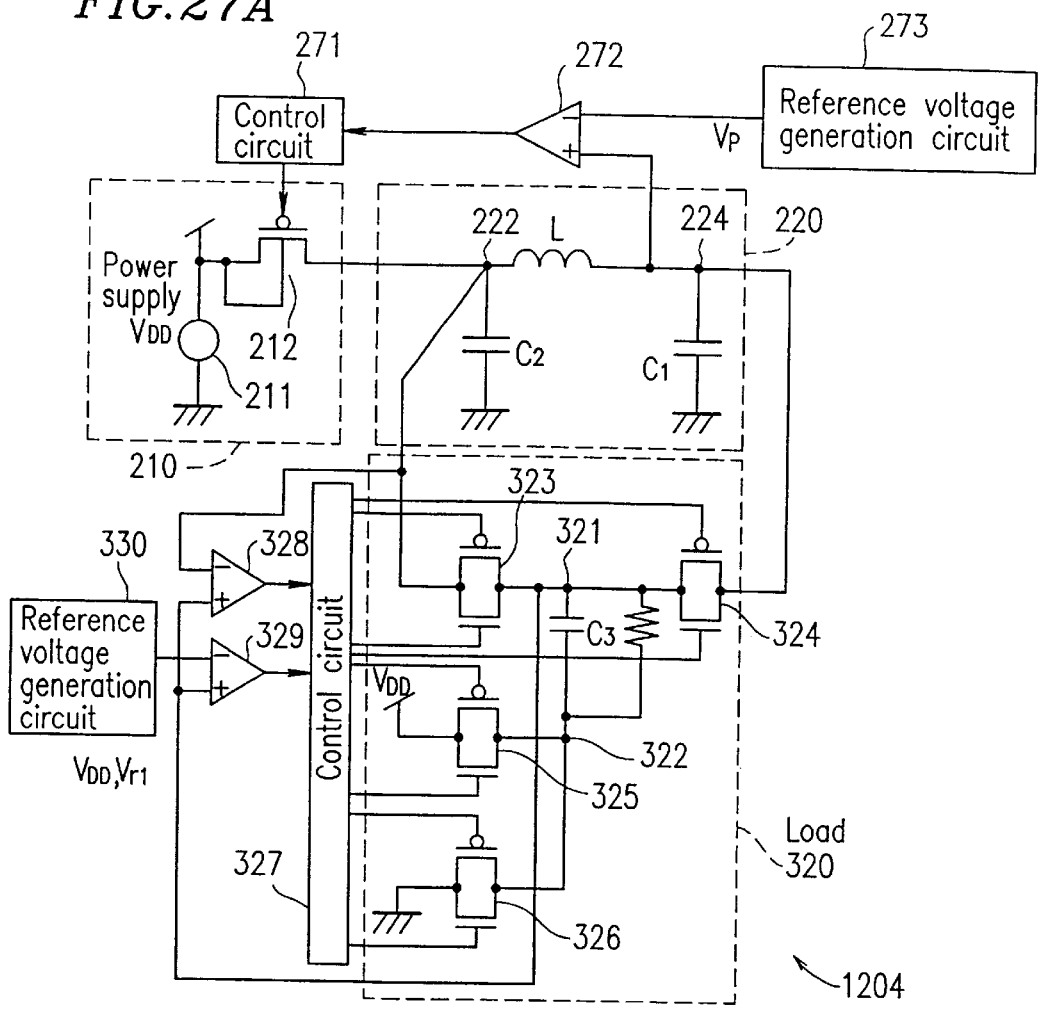
FIG. 27A is a diagram illustrating a structure of an energy reuse AC-DC, type power supply apparatus 1204.

FIG. 27A illustrates a structure of an energy reuse AC-DC power supply apparatus 1204. A load 320 is connected to the power supply apparatus 1204 at the node 222 and the node 224. The load 320 includes a capacitance component $C_3$ and switches 323–326. The structure as illustrated in FIGS. 11A, 11B or 13A may be employed as means for adjusting the dynamic energy.

The power supply apparatus 1204 supplies an alternating-current voltage waveform to the load 320 via the node 222 and a direct-current voltage waveform to the load 320 via the node 224. The energy supplied from the power supply apparatus 1204 via the node 222 is stored in the capacitance component $C_3$ of the load 320. At least a portion of the energy stored in the capacitance component $C_3$ of the load 320 is returned to the power supply apparatus 1204 via the node 224. Thus, energy is reused.

In addition to the basic elements, i.e., the energy supplying circuit 210 and the energy preserving circuit 220, the power supply apparatus 1204 further includes the control circuit 271, the comparator 272, the reference voltage generation circuit 273, a control circuit 327, a comparator 328, a comparator 329, and a reference voltage generation circuit 330. In the example illustrated in FIG. 27A, the energy supplying circuit 210 employs the structure as illustrated in FIG. 6A. However, any of the structures illustrated in FIGS. 6A–6C may be employed as the structure of the energy supplying circuit 210.

The capacitance value $C_1$ and the capacitance value $C_2$ are set so as to satisfy the relationship $C_1 \gg C_2$. Thus, an alternating-current voltage waveform is obtained at the node 222, and a direct-current voltage waveform is obtained at the node 224.

Figure 27B:
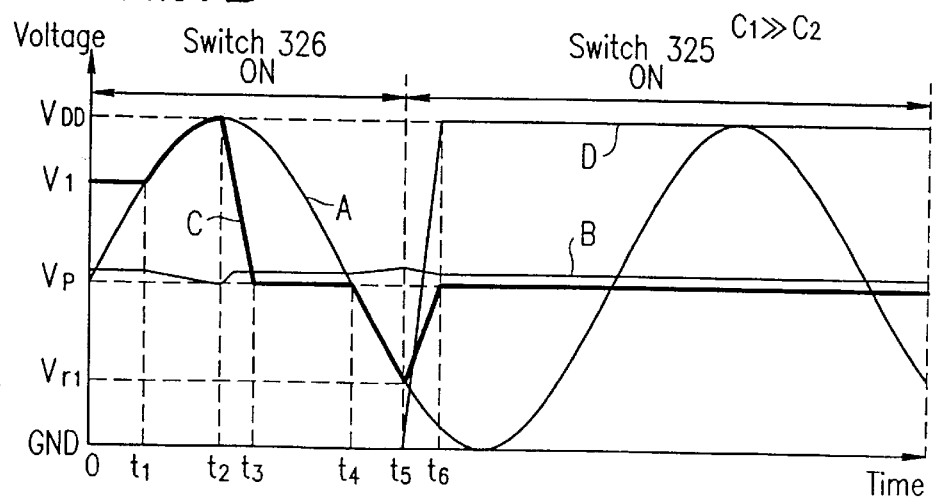
FIG. 27B is a diagram illustrating a voltage waveform at a node.

FIG. 27B illustrates an alternating-current voltage waveform (A) at the node 222, a direct-current voltage waveform (B) at the node 224, a voltage waveform (C) at a node 321, and a voltage waveform (D) at a node 322.

An operation of the power supply apparatus 1204 will now be described.

It is assumed that the node 321 of the load 320 is charged to the voltage $V_1$ at time t=0. The switches 323–325 are OFF, while the switch 326 is ON.

When the voltage at the node 222 reaches the voltage at the node 321 (i.e., voltage $V_1$) at time $t_1$ while the alternating-current voltage waveform (A) is increasing, the output signal of the comparator 328 changes from H level to L level. In response to the change in the output signal of the comparator 328, the control circuit 327 turns ON the switch 323. Thus, the voltage at the node 321 changes along the alternating-current voltage waveform (A).

The comparator 329 compares the voltage at the node 321 with the power supply voltage $V_{DD}$ output from the reference voltage generation circuit 330 so as to detect whether the voltage at the node 321 has reached the power supply voltage $V_{DD}$.

When the voltage at the node 321 reaches the power supply voltage $V_{DD}$ at time $t_2$, the output signal of the comparator 329 changes from L level to H level. In response to the change in the output signal of the comparator 329, the control circuit 327 turns OFF the switch 323 and turns ON the switch 324. Thus, the voltage at the node 321 changes toward the voltage at the node 224 (i.e., the voltage $V_P$).

At time $t_3$, the voltage at the node 321 reaches the voltage $V_P$.

In the period from time $t_1$ to time $t_2$, energy is supplied from the energy preserving circuit 220 to the load 320 via the node 222. The energy supplied from the energy preserving circuit 220 is stored in the capacitance component $C_3$ of the load 320. In the period from time $t_2$ to time $t_3$, the energy is returned from the load 320 to the energy preserving circuit 220 via the node 224.

Thus, at least a portion of the energy supplied from the energy preserving circuit 220 to the load 320 via the node 222 is returned from the load 320 to the energy preserving circuit 220 via the node 224, thereby reusing the energy. Thus, it is possible to charge/discharge the load 320 with little energy loss.

When the voltage at the node 222 reaches the voltage at the node 321 (i.e., the voltage $V_P$) at time $t_4$ while the alternating-current voltage waveform (A) is decreasing, the output signal of the comparator 328 changes from L level to H level. In response to the change in the output signal of the comparator 328, the control circuit 327 turns ON the switch 323, and turns OFF the switch 324. Thus, the voltage at the node 321 changes along the alternating-current voltage waveform (A).

When it is detected that the voltage at the node 321 has reached the voltage $V_{r1}$ at time $t_5$, the output signal of the comparator 329 changes from H level to L level. In response to the change in the output signal of the comparator 329, the control circuit 327 turns OFF the switch 323, and turns ON the switch 324. Moreover, in response to the change in the output signal of the comparator 329, the control circuit 327 turns ON the switch 325, and turns OFF the switch 326. Thus, the voltage at the node 321 changes toward the voltage at the node 224 (i.e., the voltage $V_P$).

At time $t_6$, the voltage at the node 321 reaches the voltage $V_P$.

In the period from time $t_4$ to time $t_5$, energy is returned from the load 320 to the energy preserving circuit 220 via the node 222. In the period from time $t_5$ to time $t_6$, energy is supplied from the energy preserving circuit 220 to the load 320 via the node 224. The energy supplied from the energy preserving circuit 220 is stored in the capacitance component $C_3$ of the load 320.

Thus, at least a portion of the energy supplied from the energy preserving circuit 220 to the load 320 via the node 224 is returned from the load 320 to the energy preserving circuit 220 via the node 222, thereby reusing the energy. Thus, it is possible to charge/discharge the load 320 with little energy loss.

The voltage at the node 224 of the energy preserving circuit 220 decreases by supplying energy to the load 320. In the example illustrated in FIG. 27B, the voltage at the node 224 has decreased below the voltage $V_P$ at time $t_2$. When the voltage at the node 224 decreases below the voltage $V_P$, the output signal of the comparator 272 changes from H level L level. In response to the change in the output signal of the comparator 272, the control circuit 271 turns ON the switch 212 for a predetermined period of time. As a result, the voltage at the node 224 increases.

9.5 Energy Reuse DC-AC Type Power Supply Apparatus

Figure 28A:
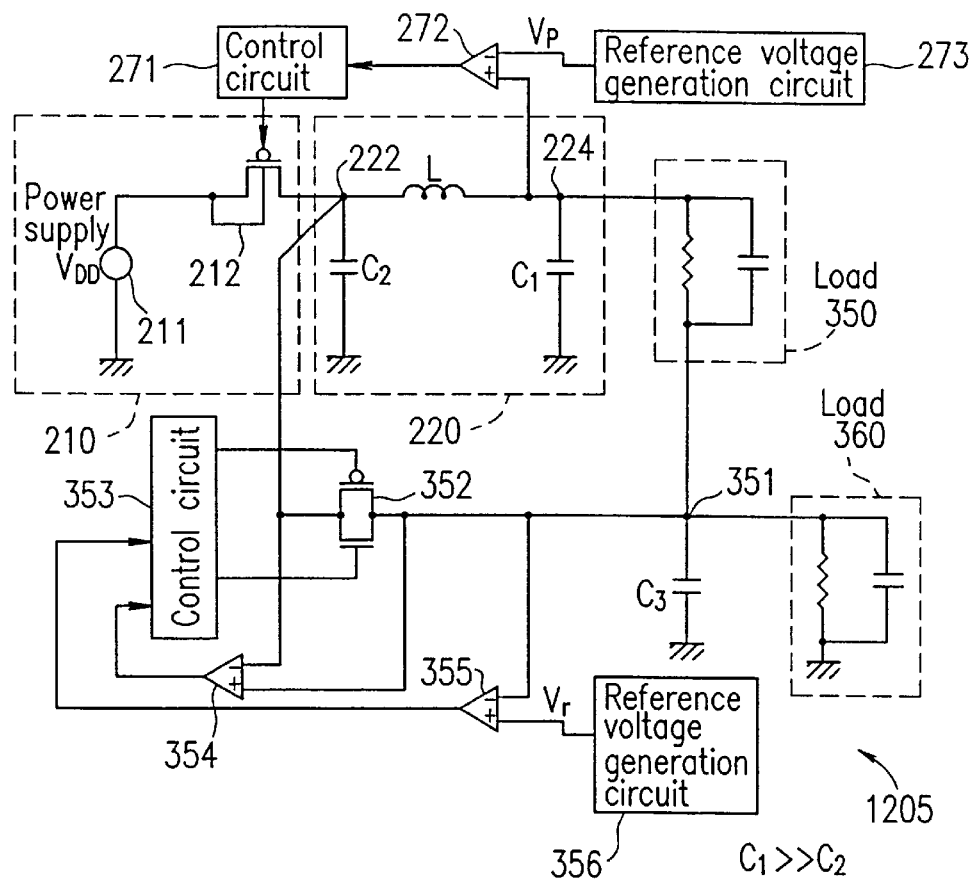
FIG. 28A is a diagram illustrating a structure of an energy reuse DC-AC type power supply apparatus 1205.

FIG. 28A illustrates a structure of an energy reuse DC-AC type power supply apparatus 1205. A load 350 is provided between the node 224 and a node 351 of the power supply apparatus 1205. The capacitance component $C_3$ is connected to the node 351.

The power supply apparatus 1205 supplies a direct-current voltage waveform to the load 350 via the node 224. The energy supplied from the power supply apparatus 1205 via the node 224 is stored in the capacitance component $C_3$. At least a portion of the energy stored in the capacitance component $C_3$ is returned to the power supply apparatus 1205 via the node 222. Thus, energy is reused.

In addition to the basic elements, i.e., the energy supplying circuit 210 and the energy preserving circuit 220, the power supply apparatus 1205 further includes the control circuit 271, the comparator 272, the reference voltage generation circuit 273, a switch 352, a control circuit 353, a comparator 354, a comparator 355, and a reference voltage generation circuit 356. In the example illustrated in FIG. 28A, the energy supplying circuit 210 employs the structure as illustrated in FIG. 6A. However, any of the structures illustrated in FIGS. 6A–6D and 58A may be employed as the structure of the energy supplying circuit 210. The structure as illustrated in FIGS. 11A, 11B or 13A may be employed as means for adjusting the dynamic energy.

The capacitance value $C_1$ and the capacitance value $C_2$ are set so as to satisfy the relationship $C_1 \gg C_2$. Thus, an alternating-current voltage waveform is obtained at the node 222, and a direct-current voltage waveform is obtained at the node 224.

Figure 28B:
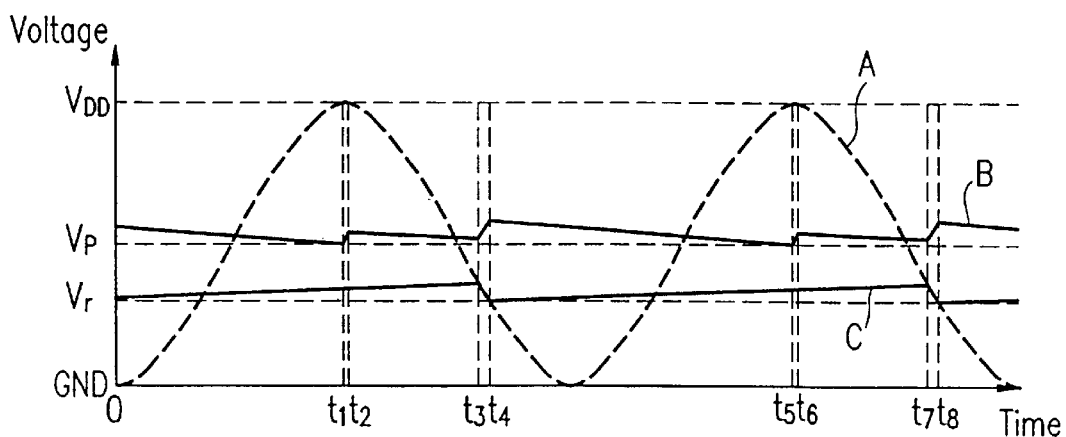
FIG. 28B is a diagram illustrating a voltage waveform at a node.

FIG. 28B illustrates an alternating-current voltage waveform (A) at the node 222, a direct-current voltage waveform (B) at the node 224, and a voltage waveform (C) at the node 351.

An operation of the power supply apparatus 1205 will now be described.

In the period from time t=0 to time $t_1$, a charge is supplied from the energy preserving circuit 220 to the load 350 via the node 224. As a result, the voltage at the node 224 gradually decreases. A portion of the charge, which has passed through the load 350, passes through a load 360 to reach the ground. The rest of the charge is stored in the capacitance component $C_3$. As a result, the voltage at the node 351 gradually increases.

When the voltage at the node 224 decreases below the voltage $V_P$ at time $t_1$, the output signal of the comparator 272 changes from H level to L level. In response to the change in the output signal of the comparator 272, the control circuit 271 turns ON the switch 212 for the period from time $t_1$ to time $t_2$. Thus, energy is supplied from the energy supplying circuit 210 to the energy preserving circuit 220. As a result, the voltage at the node 224 increases.

In the period from time $t_2$ to time $t_3$, no energy is supplied from the energy supplying circuit 210 to the energy preserving circuit 220. As a result, the voltage at the node 224 gradually decreases.

When the voltage at the node 222 reaches the voltage at the node 351 at time $t_3$ while the alternating-current voltage waveform (A) is decreasing, the output signal of the comparator 354 changes from L level to H level. In response to the change in the output signal of the comparator 354, the control circuit 353 turns ON the switch 352. Thus, the voltage at the node 351 changes along the alternating-current voltage waveform (A).

In the period from time $t_3$ to time $t_4$, the charge stored in the capacitance component $C_3$ is returned to the energy preserving circuit 220 via the switch 352 and the node 222.

When the voltage at the node 351 reaches the voltage $V_r$ at time $t_4$, the output signal of the comparator 355 changes from H level to L level. Herein, the reference voltage generation circuit is outputting the voltage $V_r$ as a reference voltage to the comparator 355. In response to the change in the output signal of the comparator 355, the control circuit 353 turns OFF the switch 352.

In the period for time $t_4$ to time $t_5$, no energy is supplied from the energy supplying circuit 210 to the energy preserving circuit 220, whereby the voltage at the node 224 gradually decreases, and the charge stored in the capacitance component $C_3$ is not returned to the energy preserving circuit 220, whereby the voltage at the node 351 gradually increases. The decrease in the voltage at the node 224 is switched to an increase as the charge stored in the capacitance component $C_3$ is returned to the energy preserving circuit 220. Thus, the voltage at the node 224 and the voltage at the node 351 are both maintained in the vicinity of the desired voltage.

In the example illustrated in FIG. 28A, the load 350 is provided between the node 224 and the node 351, and the load 360 is provided between the node 351 and the ground. In addition to the load 350 and the load 360, another load may further be provided between the node 224 and the ground. Alternatively, the load 350 may be provided between the node 224 and the node 351, while providing the load 360 between the node 224 and the ground. Alternatively, only the load 350 may be provided while not providing the load 360.

10. Applications of Present Invention to Voltage Converter

Applications of the present invention to a voltage converter (DC/DC converter) will now be described.

(Embodiment 1)

Figure 29:
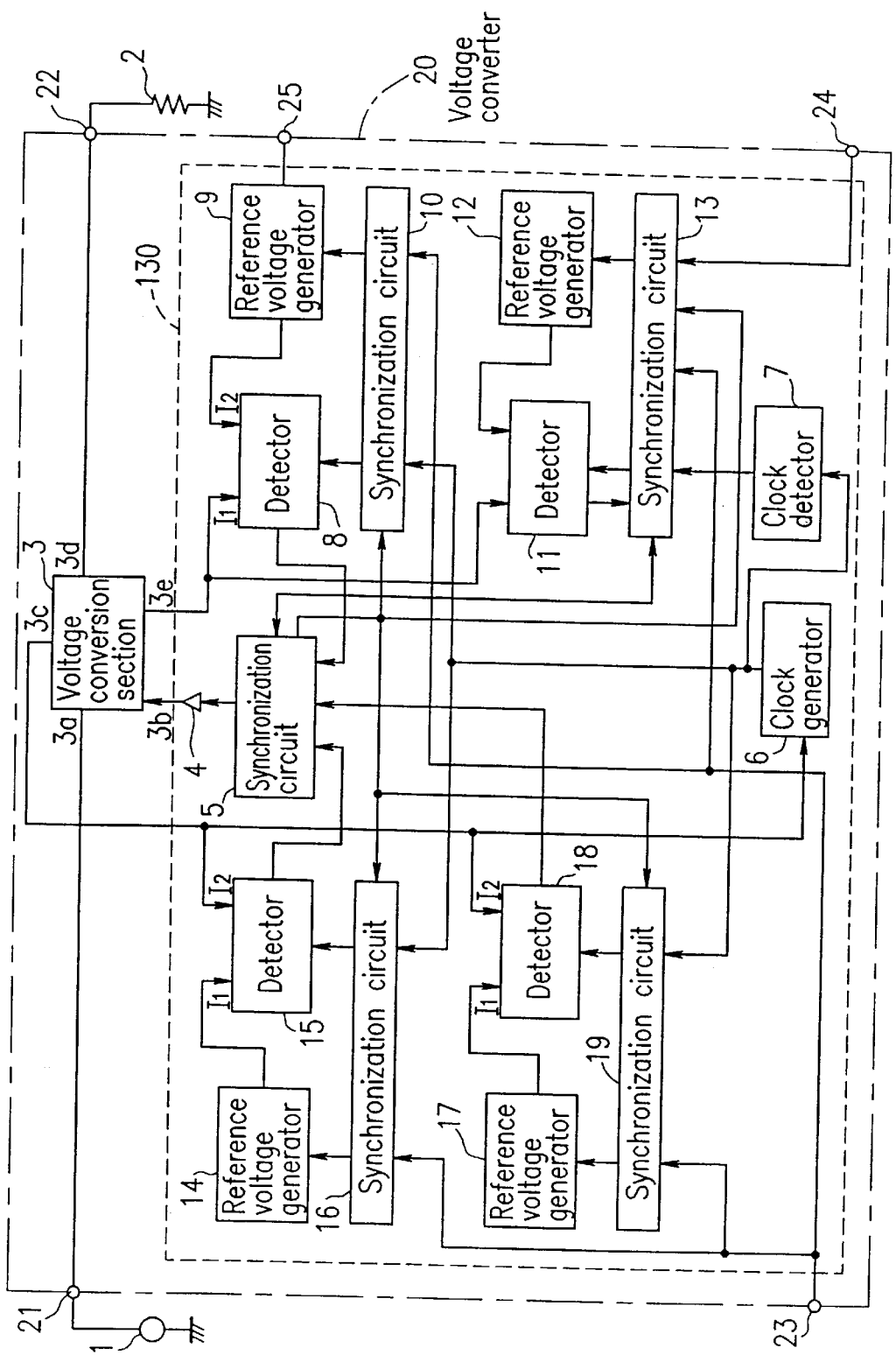
FIG. 29 is a diagram illustrating a structure of a voltage converter 20 according to the present invention.

FIG. 29 illustrates a structure of a voltage converter 20 according to the present invention. The voltage converter 20 includes a voltage conversion section 3 for converting a voltage supplied from a power supply 1 to another voltage and supplying the other voltage to a voltage receiving circuit (load) 2, and a control section 130 for controlling the voltage conversion section 3 so as to supply a power, which is substantially equal to the power consumed by the load 2, from the power supply 1 to the voltage conversion section 3. The power supply 1 is connected to the voltage converter 20 at a terminal 21. The load 2 is connected to the voltage converter 20 at a terminal 22.

The control section 130 includes a driving circuit 4 for opening/closing a switch 26 (not shown in FIG. 29; see FIG. 30) included in the voltage conversion section 3, and a synchronization circuit 5 for determining the open/closed state of the switch 26 based on a signal output from detectors 8, 15 and 18.

The control section 130 further includes a clock generator 6 for generating a clock pulse for defining the operating cycle of the voltage conversion section 3, and a clock detector 7 for detecting the clock pulse output from the clock generator 6.

The control section 130 further includes: the detector 8 for comparing the voltage output from a terminal 3e of the voltage conversion section 3 with a target voltage; a reference voltage generator 9 for generating the target voltage; and a synchronization circuit 10 for controlling the operation timing of the detector 8 and the reference voltage generator 9 based on a control clock pulse and a clock pulse output from the clock generator 6. The control clock pulse is supplied to the synchronization circuit 10 via a terminal 23. Moreover, a signal indicating the target voltage is supplied to the reference voltage generator 9 via a terminal 25.

The control section 130 further includes: a detector 11 for comparing the voltage output from the terminal 3e of the voltage conversion section 3 with an initial voltage; a reference voltage generator 12 for generating the initial voltage; and a synchronization circuit 13 for controlling the operation timing of the detector 11 and the reference voltage generator 12 based on a start signal, a control clock pulse, a signal output from the synchronization circuit 5, and a signal output from the clock detector 7. The start signal is supplied to the synchronization circuit 13 via a terminal 24. The control clock pulse is supplied to the synchronization circuit 13 via the terminal 23.

The control section 130 further includes: a reference voltage generator 14 for generating a voltage which defines the timing at which the state of the switch 26 (not shown in FIG. 29; see FIG. 30) included in the voltage conversion section 3 changes from the open state to the closed state; the detector 15 for comparing the voltage output from the reference voltage generator 14 with the voltage output from a terminal 3a of the voltage conversion section 3; and a synchronization circuit 16 for controlling the operation timing of the reference voltage generator 14 and the detector 15 based on a control clock pulse and a clock pulse output from the clock generator 6. The control clock pulse is supplied to the synchronization circuit 16 via the terminal 23.

The control section 130 further includes: a reference voltage generator 17 for generating a voltage which defines the timing at which the state of the switch 26 (not shown in FIG. 29; see FIG. 30) included in the voltage conversion section 3 changes from the open state to the closed state; the detector 18 for comparing the voltage output from the reference voltage generator 17 with the voltage output from the terminal 3c of the voltage conversion section 3; anda synchronization circuit 19 for controlling the operation timing of the reference voltage generator 17 and the detector 18 based on a control clock pulse and a clock pulse output from the clock generator 6. The control clock pulse is supplied to the synchronization circuit 19 via the terminal 23.

Figure 30:
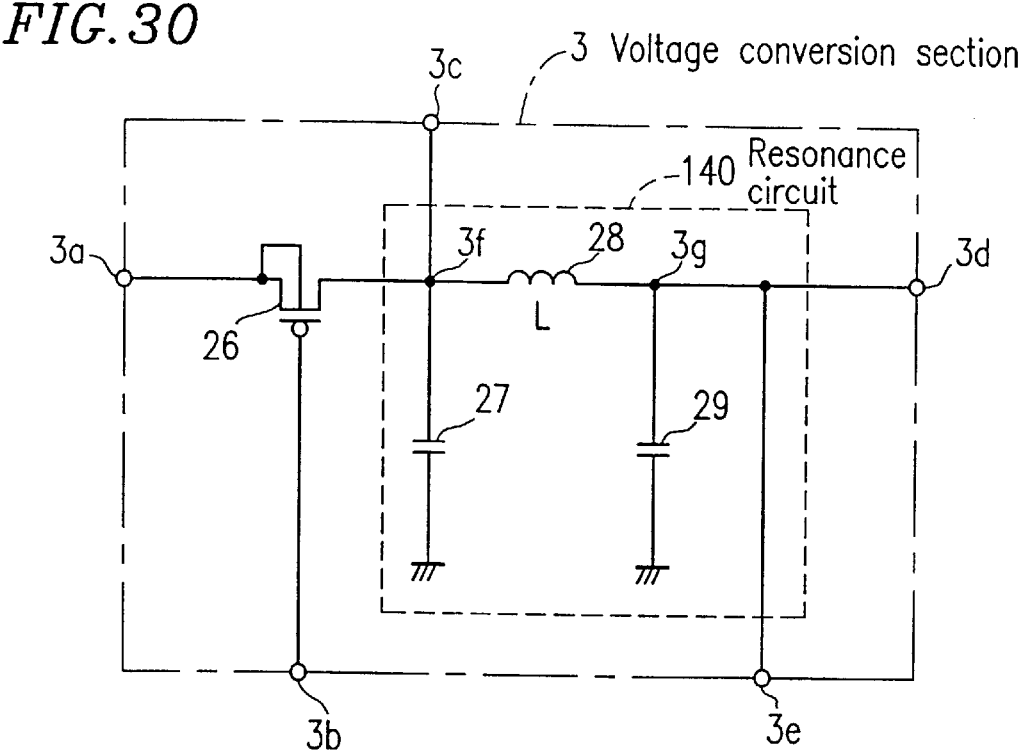
FIG. 30 is a diagram illustrating a structure of a voltage conversion section 3.

FIG. 30 illustrates a structure of the voltage conversion section 3. The voltage conversion section 3 has terminals 3a–3e. The terminal 3a is connected to the power supply 1 via the terminal 21. The terminal 3b is connected to the driving circuit 4. The terminal 3c is connected to the detector 15, the detector 18, and the clock generator 6. The terminal 3d is connected to the load 2 via the terminal 22. The terminal 3e is connected to the detector 8 and the detector 11.

The voltage conversion section 3 includes a resonance circuit 140, and a switch 26 which electrically connects the power supply 1 and the resonance circuit 140.

The switch 26 may be a PMOS transistor, for example.

The resonance circuit 140 includes an inductor 28 and capacitances 27 and 29.

One end of the inductor 28 and the capacitance 27 are connected at a node 3f. The node 3f is connected to the terminal 3c. In the following description, the node 3f and the terminal 3c are treated as being the same. The switch 26 is connected to the node 3f of the resonance circuit 140.

The other end of the inductor 28 and the capacitance 29 are connected at a node 3g. The node 3g is connected to the terminal 3d and the terminal 3e. In the following description, the node 3g, the terminal 3d, and the terminal 3e are treated as being the same.

A signal which controls the open/closed state of the switch 26 is input to the terminal 3b.

An operation of the voltage conversion section 3 will now be described. Herein, the respective capacitance values of the capacitances 29 and 27 are denoted by $C_1$ and $C_2$, and the inductance value of the inductor 28 is denoted by L.

In the resonance circuit 140, a portion of the charge stored in the capacitance 29 is carried to the capacitance 27 via the inductor 28. Moreover, the charge carried to the capacitance 27 is re-carried to the capacitance 29 via the inductor 28. Thus, charge is exchanged between the capacitance 27 and the capacitance 29 via the inductor 28.

Figure 31:
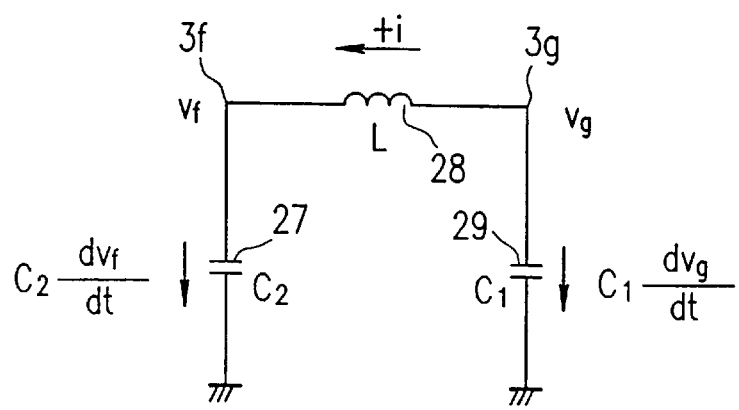
FIG. 31 is a diagram illustrating an equivalent circuit of a resonance circuit 140.

FIG. 31 illustrates an equivalent circuit of the resonance circuit 140 where the switch 26 is open, while the load 2 is not connected to the terminal 3d. When the switch 26 is open, while the load 2 is not connected to the terminal 3d, the current flowing through the capacitance 27 and the current flowing through the capacitance 29 are in the opposite directions and have the same magnitude. Thus, (Expression 1) below holds.

$$C_1 \cdot (dv_g(t))/(dt) + C_2 \cdot (dv_f(t))/(dt) = 0 \quad \text{(Expression 1)}$$

Herein, $v_f(t)$ and $v_g(t)$ represent the voltages at the terminals 3f and 3g at time t, respectively.

The terminal voltage of the inductor 28 is represented by (Expression 2) below.

$$v_g(t) - v_f(t) = L \cdot (di)/(dt) \quad \text{(Expression 2)}$$

Herein, i represents a current flowing through the inductor 28, with a current flowing from the terminal 3g to the terminal 3f being provided with the positive sign. Moreover, the current i flowing through the inductor 28 is equal to the current flowing through the capacitance 27. Thus, (Expression 3) below holds.

$$i = C_2 \cdot (dv_f(t))/(dt) \quad \text{(Expression 3)}$$

By rearranging (Expression 1) to (Expression 3) with respect to $v_f(t)$ and $v_g(t)$, (Expression 4) and (Expression 5) below are obtained.

$$v_f(t) = \left( v_f(0) + \frac{i(0)}{C_2} - \frac{C_1 v_g(0) + C_2 v_f(0)}{C_1 + C_2} \right) \cos\sqrt{\frac{C_1 + C_2}{LC_1 C_2}}\, t + \frac{C_1 v_g(0) + C_2 v_f(0)}{C_1 + C_2} \quad \text{(Expression 4)}$$

$$v_g(t) = \left\{ \left( \frac{C_2(v_g(0) - v_f(0))}{C_1 + C_2} \right)^2 + \left( \frac{i(0)}{C_2} \right)^2 \frac{LC_1 C_2}{C_1 + C_2} \right\}^{\frac{1}{2}} \cos\left( \sqrt{\frac{C_1 + C_2}{LC_1 C_2}}\, t + \alpha \right) + \frac{C_1 v_g(0) + C_2 v_f(0)}{C_1 + C_2} \quad \text{(Expression 5)}$$

To make (Expression 4) and (Expression 5) simpler to understand, the following conditions of (Expression 6) to (Expression 8) below are introduced in view of practical design values.

$$C_1 >> C_2 \quad \text{(Expression 6)}$$

$$C_2/C_1 \cdot v_f(0) \approx 0 \quad \text{(Expression 7)}$$

$$C_2/C_1 \cdot (v_g(0) - v_f(0)) \approx 0 \quad \text{(Expression 8)}$$

(Expression 4) and (Expression 5) are simplified as shown in (Expression 9) and (Expression 10) below by applying the conditions of (Expression 6) to (Expression 8) to (Expression 4) and (Expression 5).

$$v_f(t) \approx \left( v_f(0) - v_g(0) + \frac{i(0)}{C_2} \right) \cos\sqrt{\frac{1}{LC_2}}\, t + v_g(0) \quad \text{(Expression 9)}$$

$$v_g(t) \approx \frac{i(0)}{C_1} \sqrt{LC_2} \cos\left( \sqrt{\frac{1}{LC_2}}\, t - \alpha \right) + v_g(0) \quad \text{(Expression 10)}$$

Herein, $v_f(0)$ and $v_g(0)$ represent the voltages at the terminals 3f and 3g at time t=0, respectively. i(0) represents an inductance current i at time t=0. Moreover, α is represented by (Expression 11) below.

$$\tan\alpha = -\frac{i(0)}{v_g(0) - v_f(0)} \sqrt{\frac{L(C_1 + C_2)}{C_1 C_2}} \quad \text{(Expression 11)}$$

(Expression 11) is simplified as shown in (Expression 12) below by applying the conditions of (Expression 6) to (Expression 8) to (Expression 11).

$$\tan\alpha \approx -\frac{i(0)}{v_g(0) - v_f(0)} \sqrt{\frac{L}{C_2}} \quad \text{(Expression 12)}$$

It is understood from (Expression 9) that the voltage $v_f(t)$ at the terminal 3f is represented by the alternating-current component of the first term, which is expressed by a cosine function, and the direct-current component of the second term. The frequency $f_R$ of the alternating-current component is obtained from the coefficient (angular velocity) of time t of the cosine function. In particular, the frequency $f_R$ of the alternating-current component is represented by (Expression 13) below.

$$f_R=1/(2\pi \cdot \sqrt{(LC_2)}) \quad \text{(Expression 13)}$$

The amplitude $A_f$ of the alternating-current component is the coefficient of the cosine function. In particular, the amplitude $A_f$ of the alternating-current component is represented by (Expression 14) below.

$$A_f=v_f(0)-v_g(0)+i(0)/C_2 \quad \text{(Expression 14)}$$

It is understood from (Expression 10) that the voltage $v_g(t)$ at the terminal $3g$ is represented by the alternating-current component of the first term, which is expressed by a cosine function, and the direct-current component of the second term. The frequency of the alternating-current component of the voltage $v_g(t)$ at the terminal $3g$ is equal to the frequency of the alternating-current component of the voltage $v_f(t)$ at the terminal $3f$.

The amplitude $A_g$ of the alternating-current component is the coefficient of the cosine function. In particular, the amplitude $A_g$ of the alternating-current component is represented by (Expression 15) below.

$$A_g=(i(0)/C_1)\cdot\sqrt{(LC_2)} \quad \text{(Expression 15)}$$

In a practical design, a condition of (Expression 16) below can be applied.

$$v_f(0)-v_g(0), i(0)/C_2 >> i(0)/C_1 \quad \text{(Expression 16)}$$

It can be seen from (Expression 16) that the amplitudes of the alternating-current components of the terminals $3f$ and $3g$ have the following relationship.

$$A_f >> A_g \quad \text{(Expression 17)}$$

In a practical design, the amplitude at the terminal $3g$ is about $\frac{1}{50}$–$\frac{1}{100}$ of the amplitude of at the terminal $3f$.

For example, assume that the voltage supplied from the power supply to be converted is 3 V, and the voltage output from the voltage converter 20 is 1.5 V. According to a simulation result where $C_1$=50 [$\mu$F], $C_2$=5[$\mu$F], L=100[nH], the amplitude of the voltage at the terminal $3f$ is 1.5 V, and the amplitude of the voltage at the terminal $3g$ is 20 mV. The frequency was 500 [kHz]. Therefore, the amplitude of the voltage at the terminal $3g$ is $\frac{1}{75}$ of the amplitude of the voltage at the terminal $3f$.

Thus, the alternating-current component of the voltage $v_f(t)$ at the terminal $3f$ has a large amplitude. It can be seen that the alternating-current component of the voltage $v_g(t)$ at the terminal $3g$, on the other hand, has a negligibly small amplitude as compared to the voltage $v_f(t)$ at the terminal $3f$.

The direct-current component of the voltage $v_f(t)$ at the terminal $3f$ is approximately equal to the direct-current component of the voltage $v_g(t)$ at the terminal $3g$. As an example, assuming that the voltage output from the voltage converter 20 (the voltage $v_g(t)$ at the terminal g) is 1.5 V, the direct-current component of the voltage $v_f(t)$ at the terminal $3f$ is 1.5 V. Therefore, it can be seen that the voltage $v_f(t)$ at the terminal $3f$ oscillates from 3 V to 0 V with 1.5 V being at the center therebetween.

Figure 34:
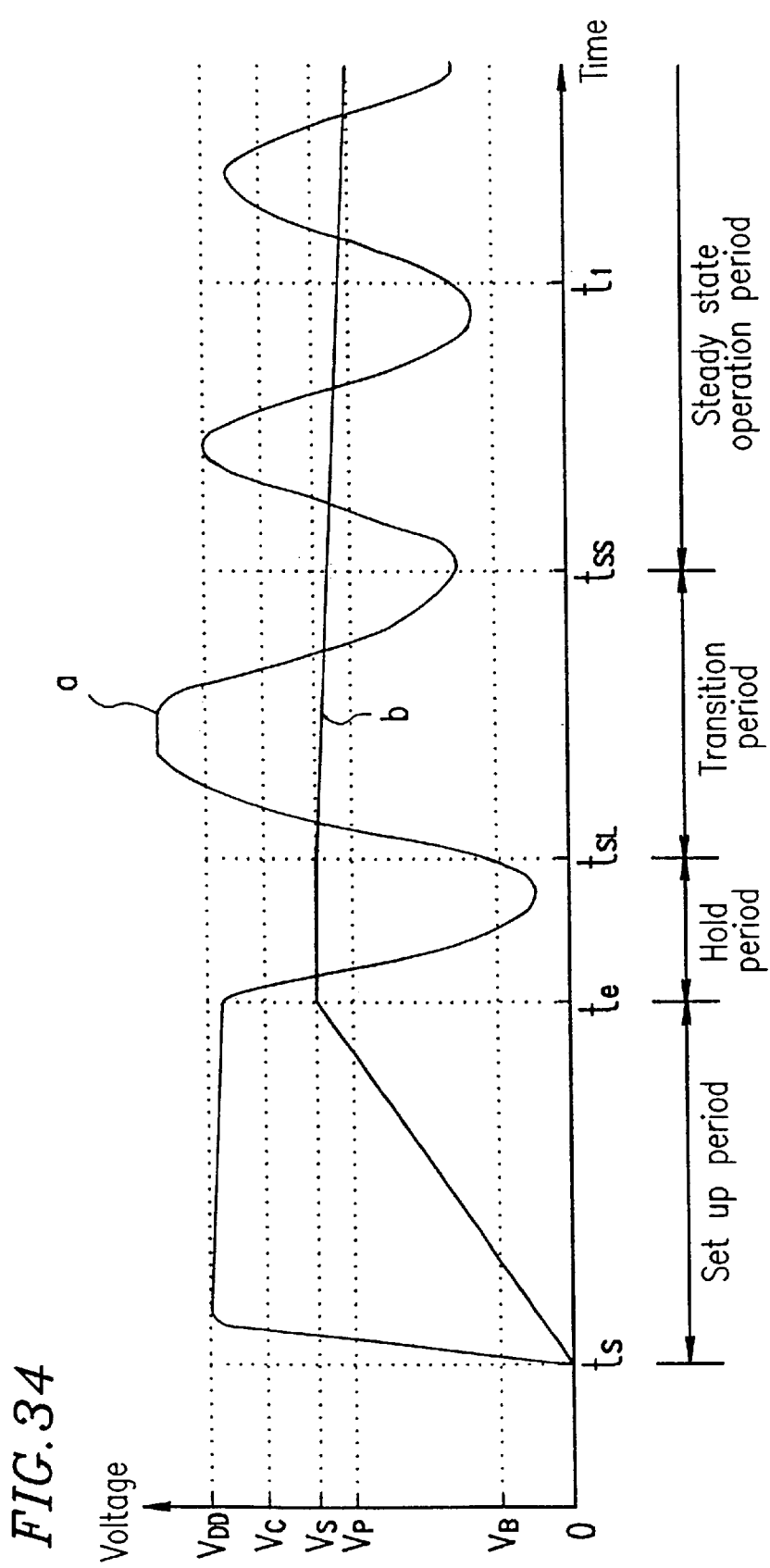
FIG. 34 is a diagram illustrating a voltage change at a terminal 3c of the voltage conversion section 3 (waveform a) and a voltage change at a terminal 3e of the voltage conversion section 3 (waveform b).

In FIG. 34, a curve a shows a change in the voltage at the terminal $3f$. Curve a oscillates in a cosine wave after time tss. Herein, the cosine wave decays with time because the load 2 is connected to the output terminal 22 of the voltage converter 20.

The above discussion made with reference to FIG. 31, assumed a case where the load 2 is not connected to the output terminal 22 of the voltage converter 20, whereby no decay term appeared in (Expression 4). or (Expression 5). In practice, the load 2 is connected to the terminal 22 of the voltage converter 20, whereby a decay term appears in (Expression 4) and (Expression 5). This is because a current flows out from the voltage converter 20 through the load 2.

As illustrated in FIG. 34, the cosine wave decays. In FIG. 34, $V_{DD}$ denotes the voltage of the power supply 1, and $V_P$ denotes the target output voltage.

Next, with reference to FIGS. 29–34, control of the opening/closing operation for the switch (PMOS transistor) 26 of the voltage conversion section 3 will be described in detail.

First, with reference to FIG. 32, an operation of the voltage converter 20 will be described.

The start signal is input to the voltage converter 20 via the terminal 24. Before the start signal is input to the voltage converter 20, the reference voltage generator 12 and the detector 11 do not consume a current. Such an operation where the reference voltage generator 12 and the detector 11 do not consume a current is called Sleep.

In response to the start signal, the operation of the reference voltage generator 12 transitions from Sleep to Reference Voltage Output. In the reference voltage output period, the reference voltage generator 12 starts operating and outputs the reference voltage $V_S$ (the volt age $V_S$ in FIG. 34) to the detector 11.

In response to the start signal, the operation of the detector 11 transitions from Sleep to Set. In the set period, the detector 11 samples and holds the reference voltage $V_S$ output from the reference voltage generator 12.

In response to the start signal, the state of the switch 26 changes from the open state (OFF) to the closed state (ON).

After outputting the reference voltage $V_S$ to the detector 11, the operation of the reference voltage generator 12 returns from Reference Voltage Output to Sleep.

After sampling and holding the reference voltage $V_S$, the operation of the detector 11 transitions from Set to Detection. In the detection period, the detector 11 compares the voltage at the terminal $3e$ (the same as the terminals d and g) of the voltage conversion section 3 with the reference voltage $V_S$ so as to detect whether the voltage at the terminal $3e$ is higher than the reference voltage $V_S$.

Figure 32:
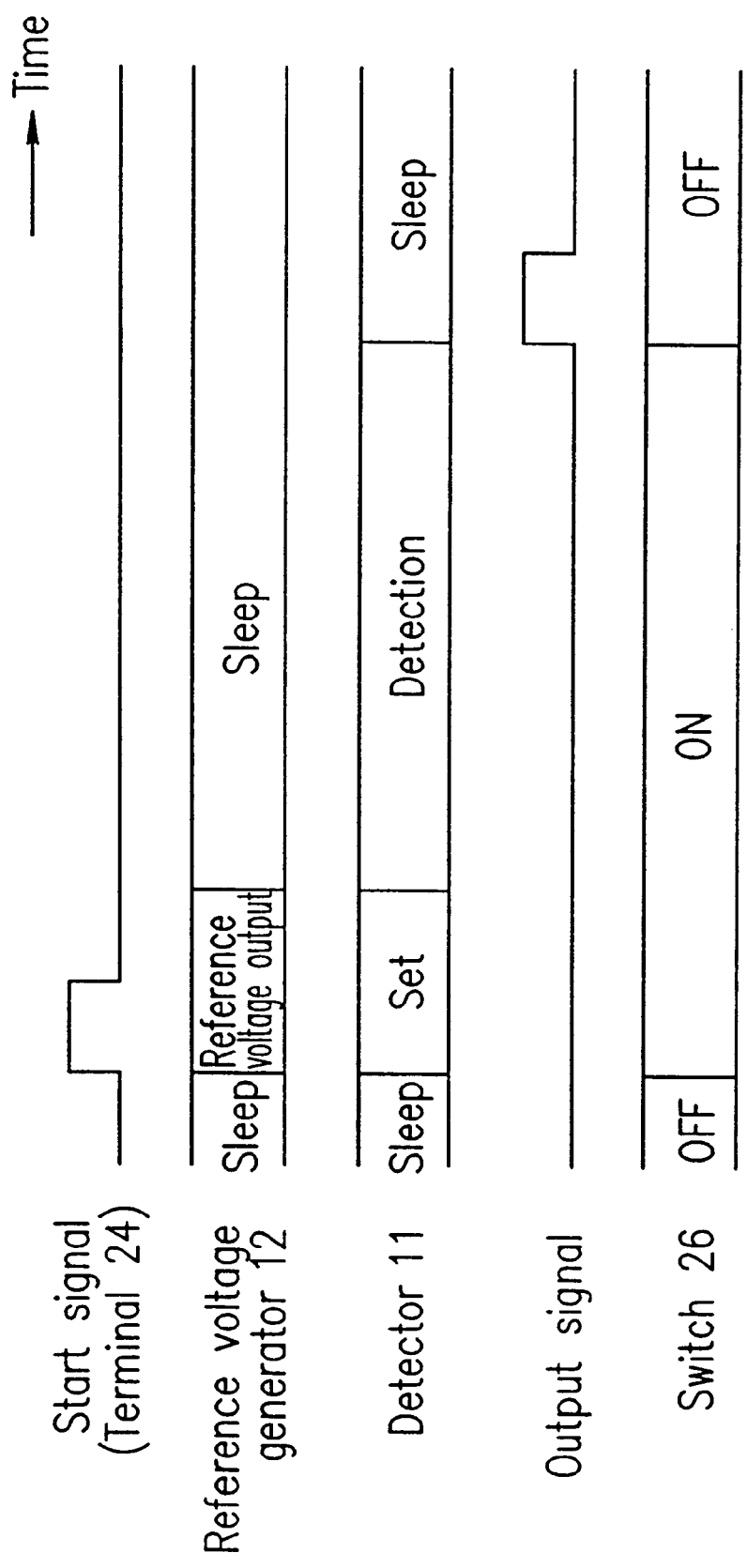
FIG. 32 is a diagram illustrating an operation of the voltage converter 20.

As the detector 11 detects that the voltage at the terminal $3e$ is higher than the reference voltage $V_S$, the detector 11 outputs a pulse signal (the output signal in FIG. 32). After outputting the output signal, the operation of the detector 11 returns from Detection to Sleep.

In response to the output signal, the state of the switch 26 changes from the closed state (ON) to the open state (OFF).

Next, with reference to FIG. 34, an operation of the voltage converter 20 will be described. In FIG. 34, a waveform a illustrates a voltage change at the terminal $3c$ of the voltage conversion section 3, and a waveform b illustrates a voltage change at the terminal $3e$ of the voltage conversion section 3.

The start signal is input to the voltage converter 20. Thus, the voltage converter 20 starts operating. At time $t_s$, the state of the switch 26 changes from the open state (OFF) to the closed state (ON).

In the period from time $t_s$ to time $t_e$, the voltages at the terminals $3c$ and $3e$ of the voltage conversion section 3 increase to the reference voltage $V_S$ (the initial voltage of the voltage converter 20). This period is called the set up period. In the set up period, the voltage at the terminal 3c (indicated by the waveform a in FIG. 34) and the voltage at the terminal 3e (indicated by the waveform b in FIG. 34) increase according to the condition of (Expression 6). The voltage at the terminal 3c increases more rapidly as compared to the voltage at the terminal 3e.

It is assumed that the load 2 is not connected to the terminal 3d in the period from time $t_e$ to time $t_{SL}$. This period is called the hold period. Such an assumption can be made because it is typical that an LSI connected to the output terminal 22 of the voltage converter 20 (the terminal 3d of the voltage conversion section 3) does not operate immediately after the end of the set up period for the voltage converter 20, but operates after passage of a certain period of time after the end of the set up period for the voltage converter 20.

In FIG. 29, the load 2 is represented by a resistor symbol. This is because the operating speed of the LSI connected to the terminal 22 is sufficiently faster than the operating speed of the voltage converter 20, whereby the load of the LSI can be approximately replaced with a load of a resistor. While the operation of the voltage converter 20 is about 500 kHz, the operation of the LSI is typically 20 MHz or greater.

In the hold period, the voltage at the terminal 3d of the voltage conversion section 3 is held. This is because the load 2 is not connected to the output terminal 22 of the voltage conversion section 3. The holding of the voltage at the terminal 3d during the hold period is shown by the waveform b in FIG. 34 being parallel to the horizontal axis during the hold period.

According to (Expression 4) and (Expression 5), the voltage at the terminal 3c (waveform a) and the voltage at the terminal 3e (waveform b) both start oscillating in a sinusoidal wave. Herein, although the voltage at the terminal 3e is oscillating in a sinusoidal wave, FIG. 34 does not show the voltage at the terminal 3e (waveform b) oscillating in a sinusoidal wave. This is because the amplitude of the voltage at the terminal 3e (waveform b) is sufficiently smaller than the amplitude of the voltage at the terminal 3c (waveform a), as can be seen from (Expression 17).

The amplitude of the voltage at the terminal 3c of the voltage conversion section 3 during the hold period is larger than that during the other periods. This is because the voltage at the terminal 3c decreases below the power supply voltage $V_{DD}$ at time $t_e$ due to a voltage change during the set up period. Thus, the diode formed of the drain region of the PMOS switch 26 which is on the side of the terminal 3f and the well region thereof is forwardly biased. As a result, the sinusoidal wave a is clamped.

After time $t_{SS}$, the voltage at the terminal 3f of the voltage conversion section 3 is not clamped. This is because once the voltage at the terminal 3f (waveform a) is clamped during the transition period (the period from time $t_{SL}$ to time $t_{SS}$), the oscillation energy decays, and the amplitude of the v at the terminal 3f (waveform a) decreases.

The period after time $t_{SS}$ is called the steady state operation period. In the steady state operation period, the voltages at the terminals 3f and 3g of the voltage conversion section 3 oscillate in a sinusoidal wave. However, in the steady state operation period, the LSI connected to the output terminal 22 starts operating (because the load 2 is connected thereto), whereby the oscillation will be a decay-type sinusoidal wave oscillation. Although the sinusoidal wave oscillation is actually decaying, the voltage s at the terminals 3f and 3g, respectively, can be considered, for one cycle or so of the sinusoidal wave oscillation, to be oscillating according to (Expression 4) and (Expression 5). This is because the amount of decay is sufficiently small.

Figure 35:
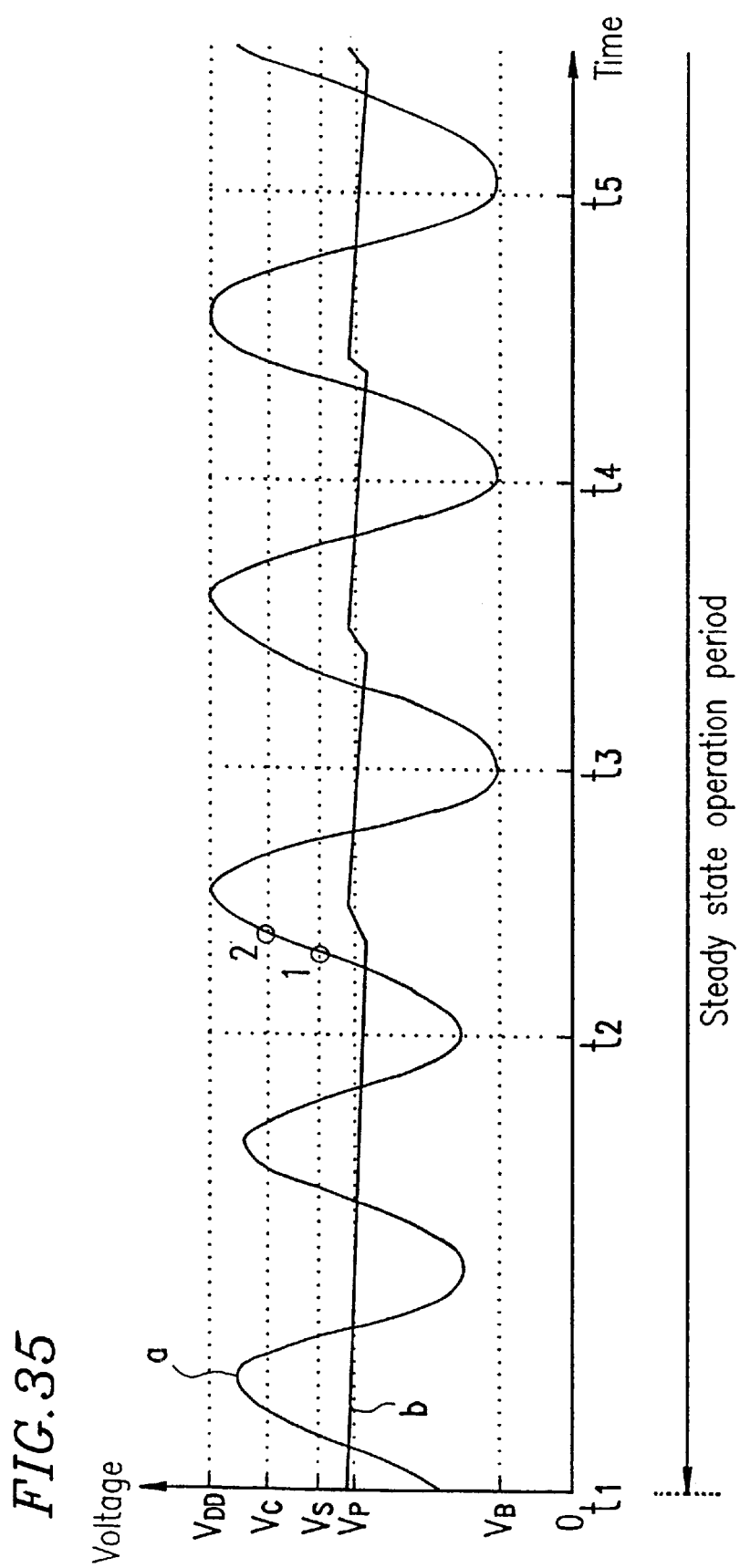
FIG. 35 is a diagram illustrating the waveform a and the waveform b in a steady state operation state.

FIG. 35 illustrates the waveform a and the waveform b after time $t_1$ illustrated in FIG. 34. An observation of the waveform a and the waveform b over a period time equal to or greater than one cycle of the sinusoidal wave oscillation during the steady state operation period shows that the amplitude and the direct-current component of the sinusoidal wave of the waveforms a and b decay. This is because a current flows through the load 2.

Figure 33:
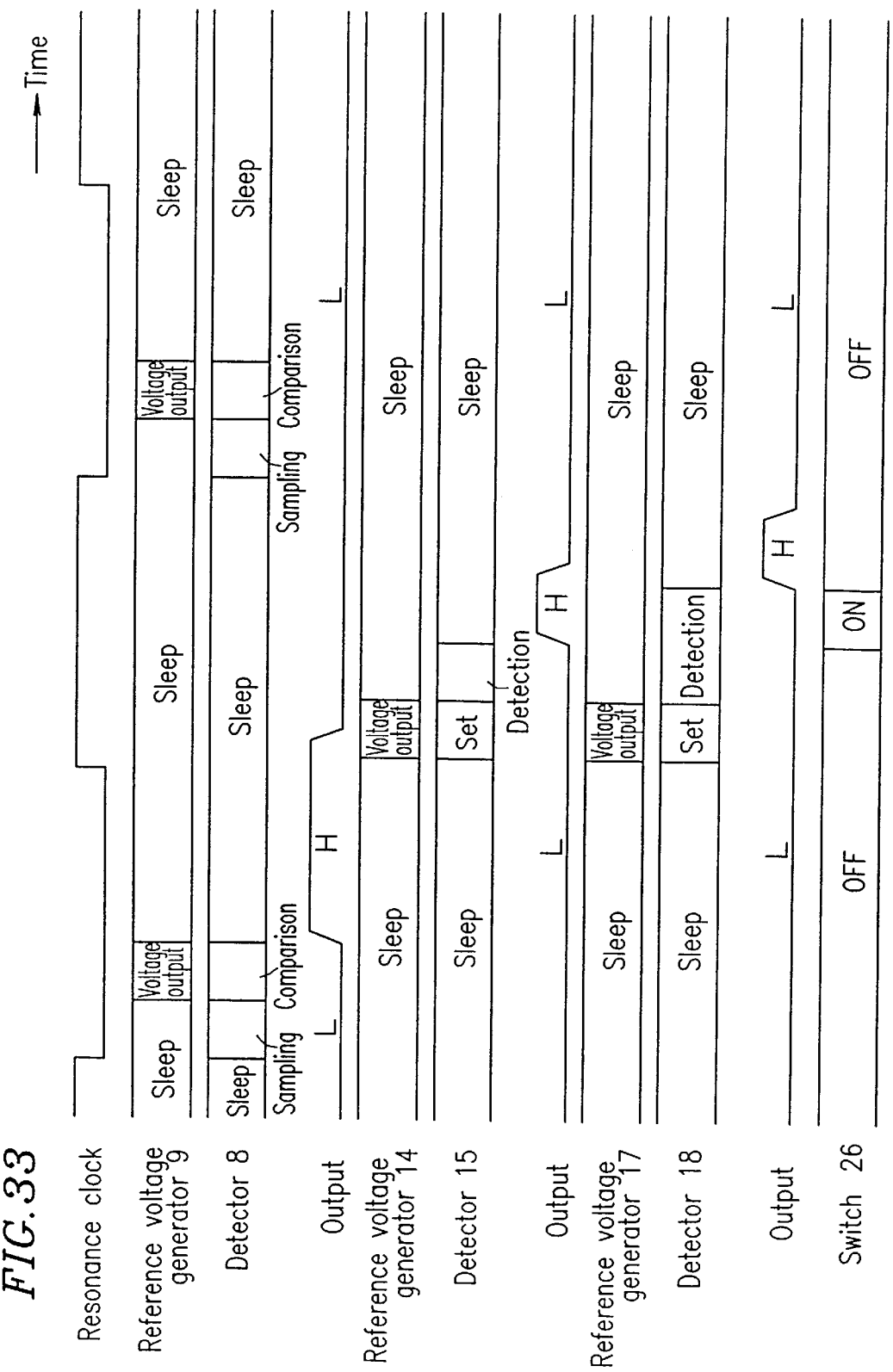
FIG. 33 is a diagram illustrating an operation of the voltage converter 20 during a steady state operation period.

FIG. 33 illustrates an operation of the voltage converter 20 in the steady state operation period.

FIG. 33 illustrates the waveform of the resonance clock. The resonance clock is obtained by shaping the sinusoidal wave oscillation at the terminal 3f of the voltage conversion section 3 into a clock pulse by means of the clock generator 6.

In response to a change in the resonance clock level from H level to L level, the operation of the detector 8 transitions from Sleep to Sampling. During the sampling period, the detector 8 performs a so-called sampling operation to follow and hold the voltage at the terminal 3g of the voltage conversion section 3. Alternatively, the operation of the detector 8 may start in synchronization with the timing at which the voltage receiving circuit (load) 2 operates.

After the end of the sampling period, the operation of the detector 8 transitions from Sampling to Comparison. In the comparison period, the detector 8 compares the desired voltage $V_P$ output from the reference voltage generator 9 and the sampled voltage. As a result, when the desired voltage $V_P$ is larger than the sampled voltage (i.e., the sampled voltage is smaller than the desired voltage $V_P$), the level of the signal output from the detector 8 changes from L level to H level. After the end of the comparison period, the operation of the detector 8 returns to Sleep.

In synchronization with the transition of the operation of the detector 8 from Sampling to Comparison, the operation of the reference voltage generator 9 transitions from Sleep to Voltage Output. In the voltage output period, the reference voltage generator 9 outputs the desired voltage $V_P$ to the detector 8. After the end of the power output period, the operation of the reference voltage generator 9 returns to Sleep.

When the level of the signal output from the detector 8 is H level, in response to the change in the level of the resonance clock from L level to H level, the operation of the reference voltage generator 14 transitions from Sleep to Voltage Output. In the voltage output period, the reference voltage generator 14 outputs the reference voltage $V_S$ to the detector 15. The reference voltage $V_S$ is used to determine the timing to close the switch 26. The end of the voltage output period, the operation of the reference voltage generator 14 returns to Sleep.

In synchronization with the transition of the operation of the reference voltage generator 14 from Sleep to Voltage Output, the operation of the detector 15 transitions from Sleep to Set. In the set period, the detector 15 samples and holds the reference voltage $V_S$ output from the reference voltage generator 14. Thereafter, the operation of the detector 15 transitions from Set to Detection. In the detection period, the detector 15 compares the voltage at the terminal 3f (waveform a in FIG. 35) of the voltage conversion section 3 and the reference voltage $V_S$ so as to detect whether the voltage at the terminal 3f (waveform a in FIG. 35) has reached the reference voltage $V_S$. When the voltage at the terminal 3f (waveform a in FIG. 35) reaches the reference voltage $V_S$ (point 1 in FIG. 35), the level of the signal output from the detector 15 changes from L level to H level. The change in the level of the signal output from the detector 15 is communicated to the synchronization circuit 5. In response to the change in the level of the signal, the synchronization circuit 5 causes the state of the switch 26 to change from the open state to the closed state. After the end of the detection period, the operation of the detector 15 returns to Sleep.

When the level of the signal output from the detector 8 is H level, in response to the change in the level of the resonance clock from L level to H level, the operation of the reference voltage generator 17 transitions from Sleep to Voltage Output. In the voltage output period, the reference voltage generator 17 outputs a reference voltage $V_C$ to the detector 15. The reference voltage $V_C$ is used to determine the timing to open the switch 26. After the end of the voltage output period, the operation of the reference voltage generator 17 returns to Sleep.

In synchronization with the transition of the operation of the reference voltage generator 17 from Sleep to Voltage Output, the operation of the detector 18 transitions from Sleep to Set. In the set period, the detector 18 samples and holds the reference voltage $V_C$ output from the reference voltage generator 17. Thereafter, the operation of the detector 18 transitions from Set to Detection. In the detection period, the detector 18 compares the voltage at the terminal 3f of the voltage conversion section 3 (waveform a in FIG. 35) with the reference voltage $V_C$ so as to determine whether the voltage at the terminal 3f (waveform a In FIG. 35) has reached the reference voltage $V_C$. When the voltage at the terminal 3f (waveform a in FIG. 35) reaches the reference voltage $V_C$ (point 2 in FIG. 35), the level of the signal output from the detector 18 changes from L level to H level. The change in the level of the signal output from the detector 18 is communicated to the synchronization circuit 5. In response to the change in the level of the signal, the synchronization circuit 5 causes the state of the switch 26 to change from the closed state to the open state. After the end of the detection period, the operation of the detector 18 returns to Sleep.

The switch 26 is closed (ON) during a period from when the signal output from the detector 15 changes from L level to H level until when the signal output from the detector 18 changes from L level to H level, and is open (OFF) during the other periods. Thus, the switch 26 is opened/closed in a period during which the voltage at the terminal 3f is smaller than the voltage $V_{DD}$ and larger than the target voltage $V_P$.

The operation of the voltage conversion section 3 in the above-described steady state operation period is summarized as follows.

When the detector 8 detects that the voltage at the terminal 3g of the voltage conversion section 3 has decreased below the desired voltage $V_P$, the operation start signal is sent from the detector 8 via the synchronization circuit 5 to the detector 15 and the detector 18. In response to the operation start signal, an operation of injecting a charge from the power supply 1 into the voltage conversion section 3 is initiated.

In response to the operation start signal from the detector 8, the detector 15 and the detector 18 start the respective operations. When the detector 15 detects that the voltage at the terminal 3f has reached the reference voltage $V_S$, the switch 26 is controlled to change from the open state to the closed state. Thereafter, when the detector 18 detects that the voltage at the terminal 3f has reached the reference voltage $V_C$ (>reference voltage $V_S$), the switch 26 is controlled to change from the closed state to the open state.

Alternatively, the switch 26 may be controlled to change from the closed state to the open state after passage of a certain period of time since the end of the set up period for the voltage converter 20. Alternatively, the switch 26 may be controlled to change from the closed state to the open state after passage of a certain period of time since when the detector 18 detects that the voltage at the terminal 3f has reached the reference voltage $V_C$ (>reference voltage $V_S$) after the switch 26 is controlled to change from the open state to the closed state.

In the period of time during which the switch 26 is closed, the power supply 1 to be converted and the voltage conversion section 3 are connected to each other. As a result, a charge is injected from the power supply 1 to be converted into the voltage conversion section 3, thereby supplying a power.

The voltage converter 20 according to the present invention has an advantage that the power consumption is extremely small. The reason for this will be described below.

In the period of time during which the switch 26 is closed, a current flows from the power supply 1 to be converted to the voltage conversion section 3. The current, which flows from the power supply 1 to be converted into the voltage conversion section 3, flows from the source terminal of the PMOS switch 26 (the terminal which is connected to the power supply 1 to be converted) to the drain terminal thereof (the terminal which is connected on the side of the terminal 3f). There is a resistance between the source terminal and the drain terminal of the PMOS switch 26. Therefore, a voltage is generated between the terminal (between the source terminal and the drain terminal) of the PMOS switch 26, and the power is consumed by the current flowing between the terminals. Such a consumption of the power is the conversion energy loss occurring through voltage conversion. The conversion energy loss rate $\eta_C$ is defined by (Expression 18) below.

$\eta_C$=(the power consumed between the source terminal and the drain terminal of the PMOS switch 26)/(the power consumed by the load 2)  (Expression 18)

A voltage converter with a poor conversion efficiency means a voltage converter which has a large conversion energy loss rate $\eta_C$. Conversely, a voltage converter with a desirable conversion efficiency means a voltage converter which has a small conversion energy loss rate $\eta_C$. The denominator of (Expression 18) is constant based on Ohm's law where the resistance value of the load 2 and the converted voltage are constant. Accordingly, it is necessary to decrease the numerator in order to decrease the conversion energy loss rate $\eta_C$. Where the voltage generated between the source terminal and the drain terminal of the PMOS switch 26 is denoted by $V_{ds}$ and the current flowing between the terminals is denoted by $I_d$ (it is assumed that the direction of the current flowing from the source terminal to the drain terminal is positive), the power consumption $P_t$ is represented by the following expression.

$P_t = V_{ds} \cdot I_d$  (Expression 19)

When the resistance value of the load 2 and the converted voltage are constant, the current $I_d$ which needs to be supplied (the total amount of charge which needs to be supplied) is constant. Therefore, reduction of the power consumption $P_t$ can be achieved by reduction of the inter-terminal voltage $V_{ds}$.

The voltage converter 20 closes the PMOS switch 26 by oscillating the voltage at the terminal 3f of the voltage conversion section 3, as illustrated in FIG. 35, so as to place the voltage $V_{DD}$ of the power supply 1 to be converted, which is connected to the source terminal of the PMOS switch 26, and the voltage at the terminal 3$f$ (waveform a) close to each other. By closing the PMOS switch 26 by placing the voltage $V_{DD}$ of the power supply 1 to be converted and the voltage at the terminal 3$f$ close to each other, it is possible to reduce the power consumption $P_t$. This is because by closing the PMOS switch 26 at such a timing, the voltage $V_{ds}$ generated between the source terminal and the drain terminal can be decreased under a condition that the current $I_d$ flowing between the source terminal and the drain terminal is the same.

Moreover, since the resistance component in the voltage conversion section 3 is the resistance between the source terminal and the drain terminal of the PMOS switch 26, the power consumption in this portion is small as described above. From this point, there is generally no heat generation in the voltage conversion section 3.

Furthermore, when the result of the comparison made by the detector 8 between the reference voltage $V_P$ (the desired voltage) output from the reference voltage generator 9 and the voltage at the terminal 3$d$ of the voltage conversion section 3 shows that the reference voltage $V_P$ (the desired voltage) is lower than the voltage at the terminal 3$d$, the detector 15, the reference voltage generator 14, the synchronization circuit 16, the detector 18, the reference voltage generator 17 and the synchronization circuit 19 do not operate. This corresponds to the operation in the second cycle illustrated in FIG. 33, for example. Thus, the power consumption is reduced by the control section 130 performing a conditional operation. In order to further reduce the power consumption, the operating cycles of the detector 8 and the reference voltage generator 9 can be prolonged when the output current which is output from the voltage converter 20 is small.

Moreover, the voltage converter 20 according to the present invention has the following advantage. The power consumed by the detector 8, the reference voltage generator 9, the detector 11, the reference voltage generator 12, the detector 15, the reference voltage generator 14, the detector 18 and the reference voltage generator 17 accounts for the majority of the power which is consumed by the entire control section 130. Typically, a main factor for the power consumption by the control circuit system is that a high-precision and/or high-speed operation is required. For example, for a reference voltage generator, the power consumption increases as a voltage output with a higher precision is required. Moreover, for a detector, the power consumption increases as a detection is required to be performed with a higher precision and at a higher speed. Therefore, in view of reducing the power consumption, it is preferable for the control circuit system to perform a voltage output with a low precision and to perform a low-precision and low-speed detection. Since the resonance frequency of the voltage conversion section 3 in the voltage converter 20 according to the present invention is about 1 MHz–500 kHz, as described above, the voltage at the terminal 3$f$ of the voltage conversion section 3 changes very slowly. Therefore, the control section 130 which controls the voltage conversion section 3 is not required to perform a high-precision and high-speed operation. For example, a low-speed and low-precision detection is sufficient for detecting the points 1 and 2 in FIG. 35 (though a high-precision and high-speed detection is required for a high-speed operation).

Thus, it is possible to reduce the power consumption of the control section 130 to be extremely small. In a practical design, it has been confirmed that the power consumption of the control section 130 can be suppressed to be 1 mW or less. This means that the power consumption of the control section 130 is only about 10% of the power consumption of the load 2 even when the power consumption of the load 2 is 10 mW or less. Since the resonance frequency can be set to be low, it is possible to decrease the noise frequency due to the resonance operation.

Figure 53A:
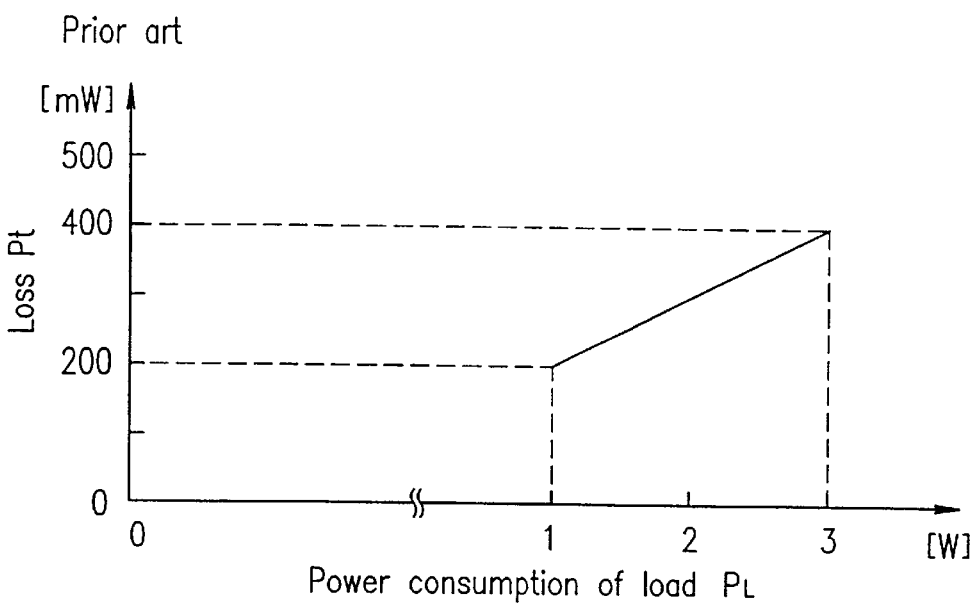
FIG. 53A is a diagram illustrating a relationship between a power consumption $P_L$ of a load and a conversion loss $P_t$ in the conventional DC/DC converter 61.
Figure 53B:
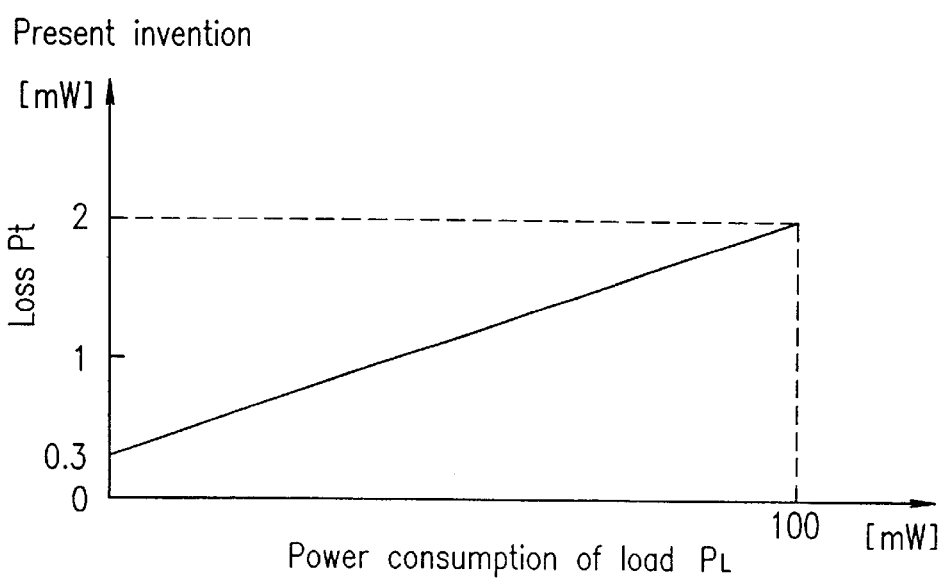
FIG. 53B is a diagram illustrating a relationship between a power consumption $P_L$ of a load and a conversion loss $P_t$ in the voltage converter 20 according to the present invention.

FIG. 53A illustrates the relationship between the power consumption $P_L$ and the conversion loss $P_t$ in a conventional DC/DC converter. FIG. 53B illustrates the relationship between the power consumption $P_L$ and the conversion loss $P_t$ in the voltage converter 20 according to the present invention. Herein, the conversion loss $P_t$ is obtained by adding the power consumption $P_C$ of the control system circuit and the power consumption $P_S$ of the voltage conversion section. Thus, $P_t=P_c+P_s$.

Figure 54A:
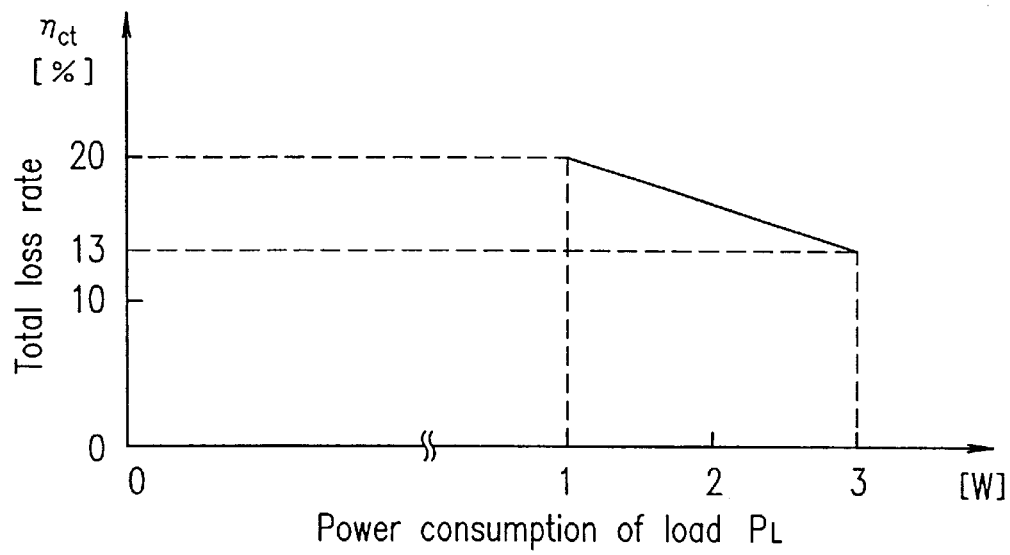
FIG. 54A is a diagram illustrating a relationship between a power consumption $P_L$ of a load and a total loss rate $\eta_{Ct}$ in the conventional DC/DC converter 61.
Figure 54B:
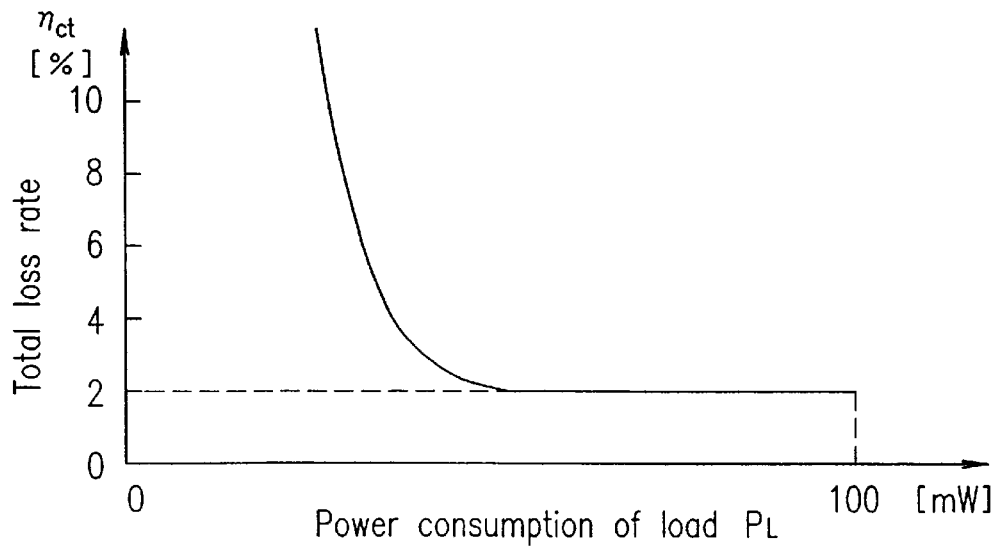
FIG. 54B is a diagram illustrating a relationship between a power consumption $P_L$ of a load and a total loss rate $\eta_{Ct}$ in the voltage converter 20 according to the present invention.

FIG. 54A illustrates the relationship between the power consumption $P_L$ of a load and the total loss rate $\eta_{Ct}$ in the conventional DC/DC converter. FIG. 54B illustrates the relationship between the power consumption $P_L$ of a load and the total loss rate $\eta_{Ct}$ in the voltage converter 20 according to the present invention. Herein, the total loss rate $\eta_{Ct}$ is obtained by dividing the conversion loss $P_t$ by the power consumption $P_L$ of the load. Thus, $\eta_{Ct}=P_t/P_L=(P_C+P_S)/P_L$.

The characteristics of the conventional DC/DC converter 61 and the voltage converter 20 according to the present invention are summarized in Table 2.

TABLE 2

|  | DC/DC Converter 61 | Voltage Converter 20 |
|---|---|---|
| Output Current | Large current | Small, minute current |
| Conversion Efficiency | Good | Good |
| Output Voltage Controllability | Poor | Good |
| Applicable LSI | Processor | Low power LSI |

Moreover, the voltage converter 20 of the present invention has an advantage that the on-chip implementation is easy. The reason for this will be described below.

About 100 nH is sufficient for the value of the inductor 28 of the resonance circuit 140. Thus, the value of the inductor 28 is sufficiently small, whereby it is easy to form the voltage converter 20 on a silicon substrate. Moreover, since the value of the inductor 28 is sufficiently small, substantially no radiating electromagnetic noise is generated. In addition, a large voltage is not generated between the terminal of the switch 26, whereby noise caused by an inrush current which occurs due to a large voltage difference occurring between the terminals of the switch 26 is not generated.

Furthermore, When a PMOS transistor is used as the switch 26, the ON resistance of the switch 26 can be set to be about 500 mΩ. Thus, since the ON resistance of the switch 26 is sufficiently large, it is easy to form the voltage converter 20 on a silicon substrate. Even when a switch having an ON resistance of about 500 mΩ, a conversion efficiency of 90% or more can be ensured.

A non-steady state operation of the voltage converter 20 will now be described. A sinusoidal wave oscillation voltage at the terminal 3$f$ of the voltage conversion section 3 is converted to a square wave clock pulse by the clock generator 6. The clock pulse output from the clock generator 6 is supplied to the synchronization circuits 10, 16 and 19. Therefore, incorrect output of the clock pulse causes the voltage converter 20 to malfunction. This is because the detectors 8, 15 and 18 and the reference voltage generators 9, 14 and 17 operate in synchronization with the clock pulse supplied from the synchronization circuits 10, 16 and 19.

The clock detector 7 is provided to bring the operation of the voltage converter 20 back to a normal operation when the clock pulse is not correctly output from the clock generator 6. Incorrect output of the clock pulse may occur when, for example, an abnormality occurs In the voltage variation at the terminal 3f of the voltage conversion section 3. The clock detection section 7 outputs a reset signal to the synchronization circuit 13 when it detects that the clock pulse is not correctly output from the clock generator 6.

In response to the reset signal, the synchronization circuit 13 resumes the operation of the voltage converter 20. The operation of the voltage converter 20 after the synchronization circuit 13 receives the reset signal is similar to the operation of the voltage converter 20 after the synchronization circuit 13 receives the start signal via the terminal 24. The resonance operation in the voltage conversion section 3 is thus reproduced, and the clock pulse output from the clock generator 6 is reproduced. As a result, the operation of the voltage converter 20 returns to the steady state operation.

Another non-steady state operation of the voltage converter 20 will now be described.

When the oscillation amplitude at the terminal 3f decreases, a case may occur where the voltage at the terminal 3f reaches the reference voltage $V_S$, but does not reach the reference voltage $V_C$. In such a case, after the state of the PMOS switch 26 changes from the open state to the closed state, it stays in the closed state and cannot be changed from the closed state to the open state.

Such a non-steady state operation is detected by the synchronization circuit 5. The synchronization circuit 5 outputs a reset signal to the synchronization circuit 13 when it detects that any one of the following three signals is not generated within a predetermined period which is determined by the capacitances 27 and 29 and the inductor 28 of the voltage conversion section 3 (the oscillation cycle of the resonance circuit).

An operation start signal which is output from the detector 8 via the synchronization circuit 5 to the detector 15 and the detector 18.

A signal which is output from the detector 15 to the synchronization circuit 5 and which defines the timing to change the state of the PMOS switch 26 from the open state to the closed state.

A signal which is output from the detector 18 to the synchronization circuit 5 and which defines the timing to change the state of the PMOS switch 26 from the closed state to the open state.

In response to the reset signal, the synchronization circuit 13 resumes the operation of the voltage converter 20. The operation of the voltage converter 20 after the synchronization circuit 13 receives the reset signal is similar to the operation of the voltage converter 20 after the synchronization circuit 13 receives the start signal via the terminal 24. The resonance operation in the voltage conversion section 3 is thus reproduced. As a result, the operation of the voltage converter 20 returns to the steady state operation.

A further operation of the voltage converter 20 which is different from the steady state operation will be described.

The voltage output from the voltage converter 20 (the voltage at the terminal 22) is varied so that the voltage at the terminal 3e of the voltage converter 20 matches the reference voltage $V_P$ (the desired voltage) output from the reference voltage generator 9. The desired voltage $V_P$ is designated by a signal input to the reference voltage generator 9 via the terminal 25. As an alteration of the desired voltage $V_P$ is instructed by the signal input to the reference voltage generator 9, the voltage output from the voltage converter 20 (the voltage at the terminal 22) changes toward the altered desired voltage $V_P$.

When the voltage output from the voltage converter 20 decreases, the oscillation amplitude at the terminal 3f of the voltage conversion section 3 decays, so that if the voltage difference from the previous desired voltage to the next desired voltage is large, the decay of the oscillation amplitude at the terminal 3f is also large. In order to hold the oscillation amplitude at the terminal 3f, an intermediate voltage may be provided between the previous desired voltage and the next desired voltage, so that the detectors 15 and 18 are operated to open/close the PMOS switch 26 when the voltage output from the voltage converter 20 decreases below the intermediate voltage. By supplying a charge (resonance energy) to the resonance circuit of the voltage conversion section 3, it is possible to recover the oscillation amplitude at the terminal 3f.

Next, another method for supplying a charge to the voltage conversion section 3 will be described. According to the method described above with reference to FIG. 35, the timing to supply a charge to the voltage conversion section 3 is controlled so that the state of the PMOS switch 26 changes from the open state to the closed state at the point 1, and the state of the PMOS switch 26 changes from the closed state to the open state at the point 2 in the period during which the voltage at the terminal 3f increases.

The charge may be supplied to the voltage conversion section 3 in the period during which the voltage at the terminal 3f decreases, instead of the period during which the voltage at the terminal 3f increases.

Figure 36:
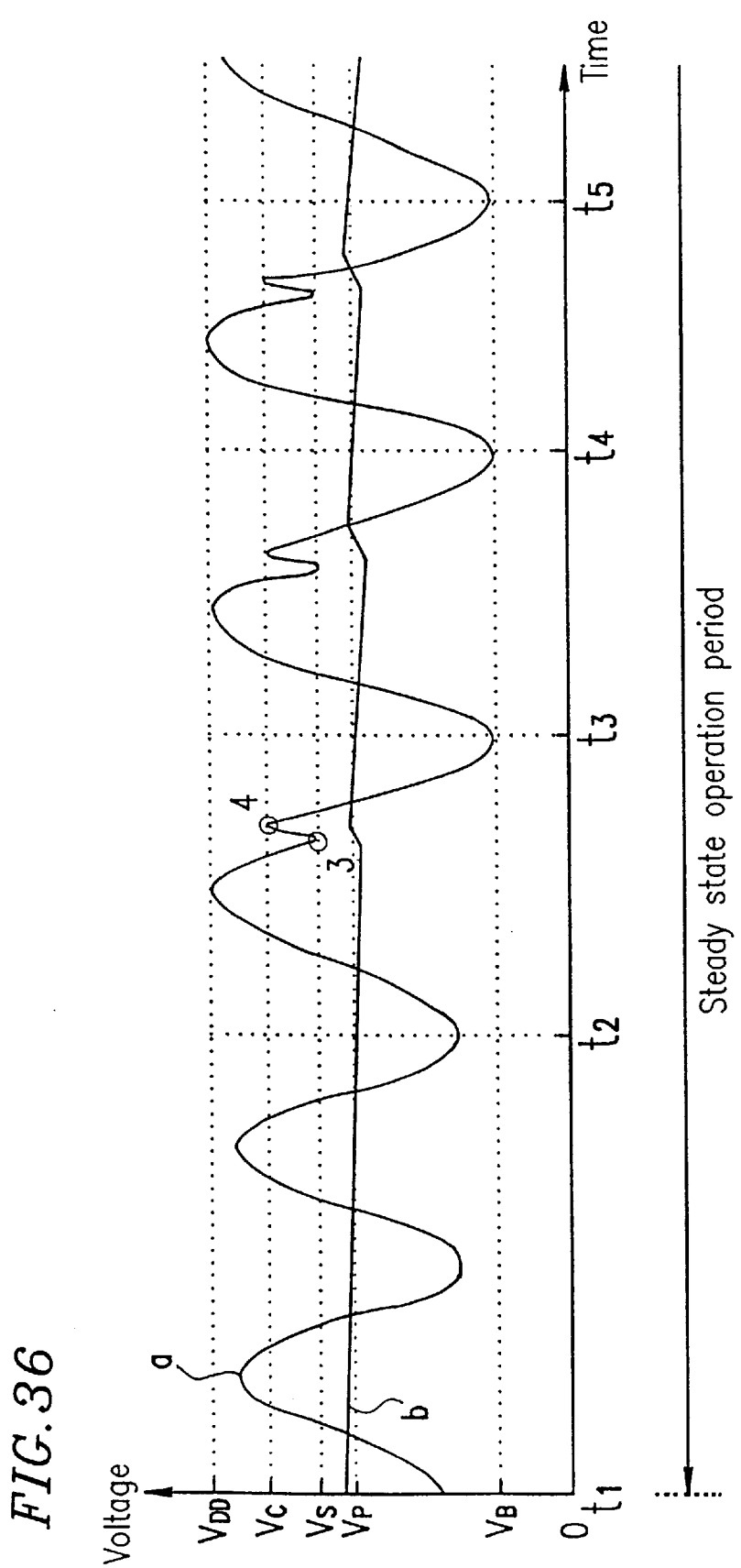
FIG. 36 is a diagram illustrating the waveform a and the waveform b in a steady state operation state.

FIG. 36 illustrates the voltage change at the terminal 3f (waveform a) and the voltage change at the terminal 3e (waveform b) in the steady state operation. As illustrated in FIG. 36, the timing to supply a charge to the voltage conversion section 3 may be controlled so that the state of the PMOS switch 26 changes from the open state to the closed state at the point (point 3) where the voltage at the terminal 3f reaches the reference voltage $V_S$, and the state of the PMOS switch 26 changes from the closed state to the open state at the point (point 4) where the voltage at the terminal 3f reaches the reference voltage $V_C$.

Of course, it is possible to combine the operation of supplying a charge to the voltage conversion section 3 in the period during which the voltage at the terminal 3f increases (FIG. 35), and the operation of supplying a charge to the voltage conversion section 3 in the period during which the voltage at the terminal 3f decreases (FIG. 36). By combining such two operations together, it is possible to realize a voltage conversion operation with a higher efficiency than that of the voltage conversion operation based on a single operation. Such a combination of the two operations is preferable in terms of the conversion efficiency and is not preferable in that the control of the PMOS switch 26 is complicated. However, it can be considered a superior voltage conversion operation because the increase in the circuit scale is negligibly small. However, since the power consumption by the control circuit for controlling the operation of the PMOS switch 26 increases, it is preferable to combine the two controls when the output current value from the voltage converter 20 is large, whereas an operation based on a single control is suitable when the output current value from the voltage converter 20 is small.

Figure 37A:
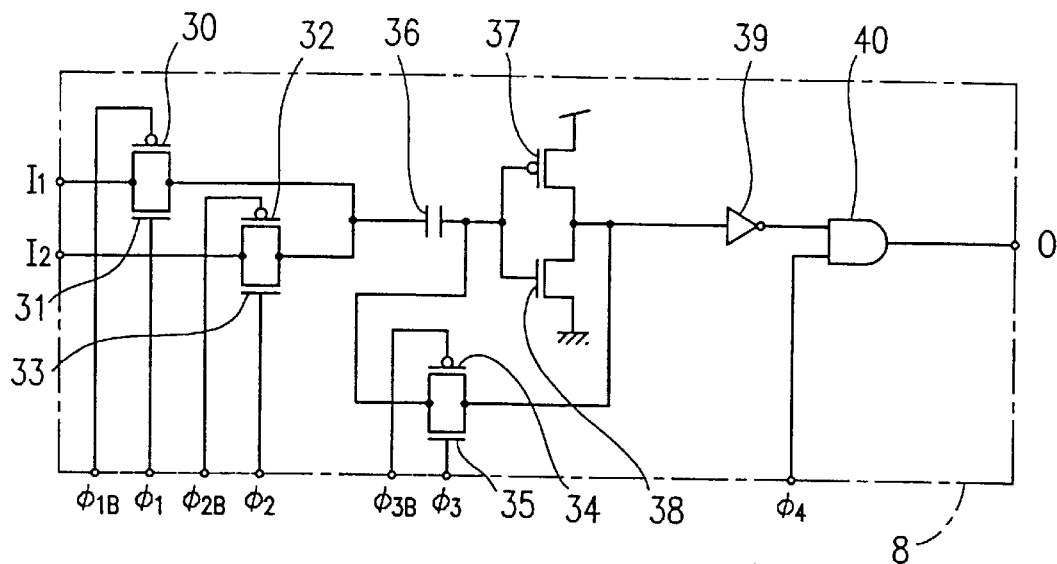
FIG. 37A is a diagram illustrating a structure of a detector 8.
Figure 37B:
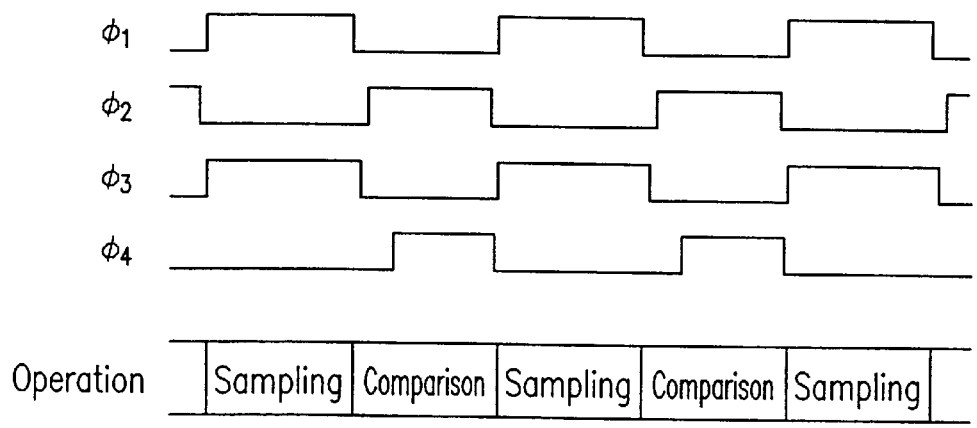
FIG. 37B is a diagram illustrating an operation of the detector 8.

FIGS. 37A and 37B illustrate a structure and an operation of the detector 8. In FIG. 37A, an input terminal $I_1$ is connected to the terminal 3e (the terminal 3g) of the voltage conversion section 3. A voltage output from the reference voltage generator 9 is input to an input terminal I$_2$. The detector 8 includes: a chopper comparator which includes transistors 30–35, 37 and 38, and a capacitance 36; and logic gates 39 and 40.

The chopper comparator compares the voltage at the terminal 3g of the voltage conversion section 3 (the terminals 3e and 3d, the output terminal 22) with the voltage output from the reference voltage generator 9, according to the operation as illustrated in FIG. 37B. In the period during which a clock pulse $\phi_1$ ($\phi_{1B}$ is an inverted clock pulse of $\phi_1$) is changed from L level to H level (the sampling period in FIG. 37B), the voltage at the terminal 3g of the voltage conversion section 3 (the terminals 3e and 3d, and the output terminal 22) is followed and held. In the period during which the clock pulse $\phi_1$ is changed from H level to L level (the comparison period in FIG. 37B), the voltage output from the reference voltage generator 9 is input to the terminal I$_2$. When the voltage at the terminal 3g is smaller than the voltage output from the reference voltage generator 9, an L level signal is output at the output terminal of the inverter (the transistors 37 and 38).

When a clock pulse $\phi_4$ ($\phi_{4B}$ is an inverted clock pulse of $\phi_4$) changes from L level to H level, the detector 8 can output the result of the comparison between the voltage at the terminal 3g and the voltage output from the reference voltage generator 9, and an output terminal O changes from L level to H level (when the voltage at the terminal 3g is smaller than the voltage output from the reference voltage generator 9). The time at which the clock pulse $\phi_4$ changes from L level to H level is delayed from the time when the chopper comparator enters the comparison period (when a clock pulse $\phi_2$ changes to H level). This is to prevent an unstable signal from being output from the detector 8 since the output value of the chopper comparator is unstable initially in a comparison period. The detector 8 compares the sampled voltage with the voltage output from the reference voltage generator 9 after holding (after sampling) the voltage output from the reference voltage generator 9 (the voltage at terminal 3e). The reason why the voltage at the terminal 3e is sampled is to reduce the influence of noise when the load 2 is a digital LSI. By sampling the voltage at the terminal 3e, it is possible to avoid a case where the detector 8 detects the voltage to which noise superimposed on the terminal 22 has been added.

Figure 38:
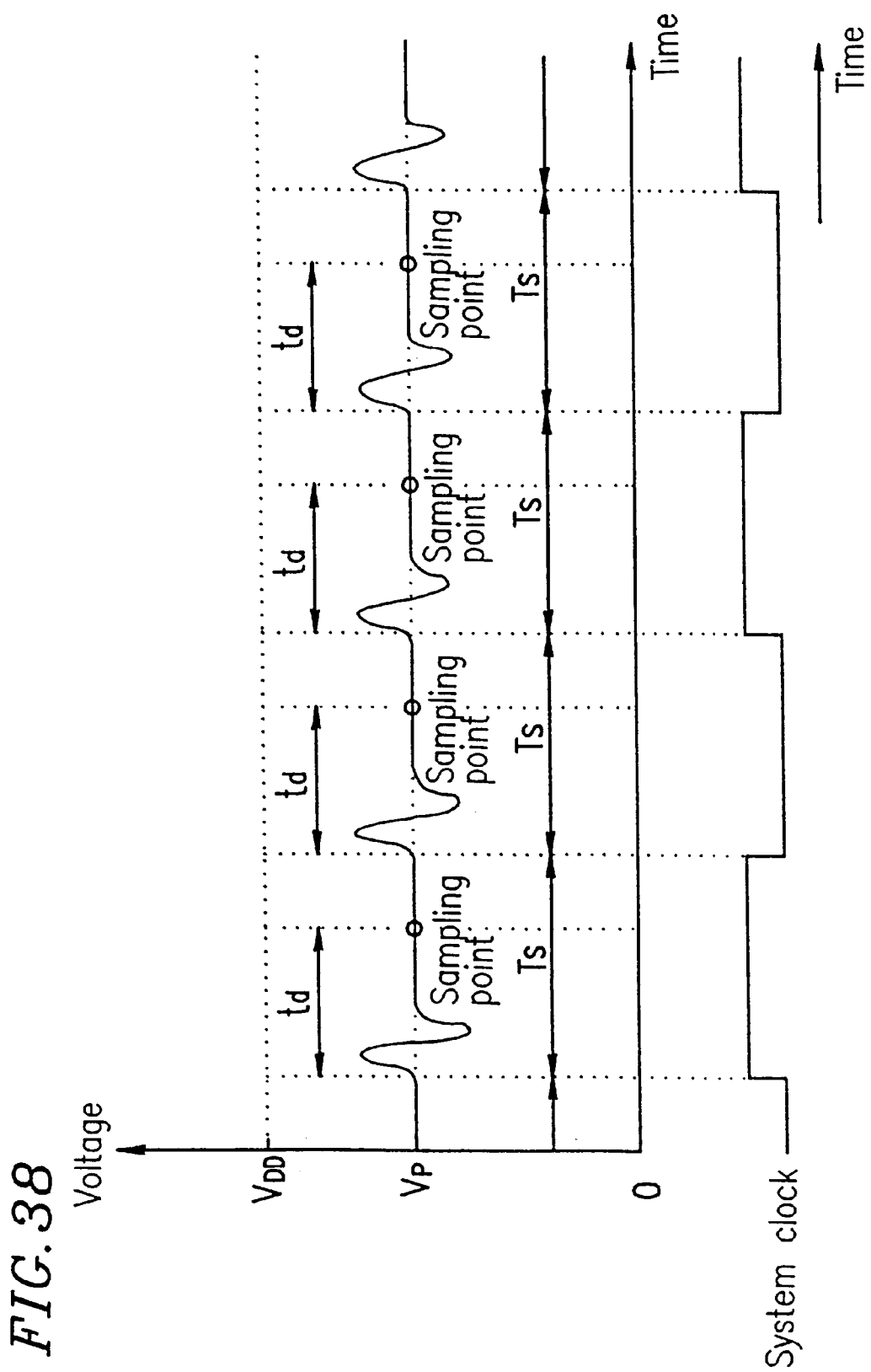
FIG. 38 is a diagram illustrating a method for reducing an effect of noise when a load 2 is a digital LSI.

FIG. 38 illustrates a method for reducing the influence of noise when the load 2 is a digital LSI. By using the clock pulse input to the synchronization circuit 10 via the terminal 23 as a clock pulse (synchronization clock pulse) for the digital LSI connected to the terminal 22, it is possible to measure the timing of, and avoid, the noise generated from the digital LSI. In FIG. 38, the system clock is an operating clock pulse which is input to the digital LSI (load 2). In FIG. 38, the generation of noise by the digital LSI at the point where the system clock changes is represented by superimposing noise on the voltage V$_P$ which is output from the voltage converter 20. Since the superimposed noise decays after passage of a certain period of time t$_d$ since the changing point of the system clock, it is possible to avoid the noise by using the detector 8 to hold the voltage at the terminal 3e of the voltage conversion section 3 after passage of time t$_d$. The clock pulse input to the terminal 23 is not required to have the same cycle as that of the clock pulse input to the digital LSI which is connected to the terminal 22, but is required to be synchronized.

Figure 52:
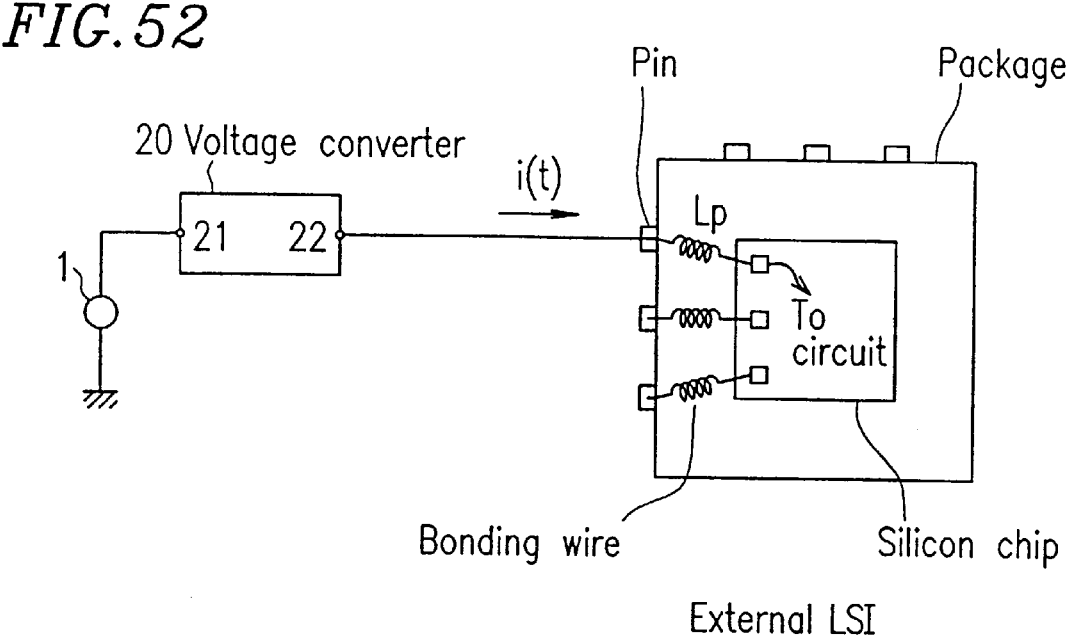
FIG. 52 is a diagram for illustrating a noise generation mechanism of LSI.

Referring to FIG. 52, the mechanism of noise generation in an LSI will be described. The LSI includes a silicon chip built in a package. Pins of the package and the silicon chip are connected to each other with a bonding wire. The bonding wire has an inductance L$_p$. As the system clock changes, a current i(t) flows through the silicon chip. As the current i(t) changes, a voltage is generated due to the inductance L$_p$. The voltage becomes noise.

Figure 39A:
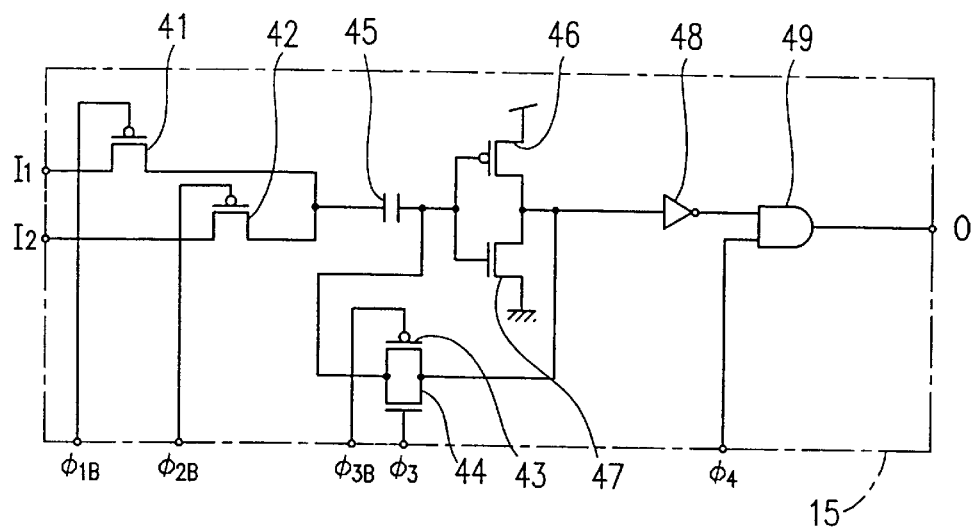
FIG. 39A is a diagram illustrating a structure of a detector 15.

FIG. 39A illustrates a structure of the detector 15. Because the structure of the detector 18 is the same as the structure of the detector 15, the detector 15 will be described in detail, while the description of the detector 18 will be omitted.

The difference from FIG. 37A is that the switches connected to the terminals I$_1$ and I$_2$ are PMOS switches 41 and 42. The PMOS switches 41 and 42 are used as the switches for the following reason. When the voltage output from the voltage converter 20 is smaller than ½ of the voltage of the power supply 1 to be converted, the voltage at the terminal I$_2$ (the terminal to which the voltage at the terminal 3f of the voltage conversion section 3 is input) oscillates below 0 V. In a structure where NMOS transistors or parallelly-connected PMOS transistors are used as the switches, the diode formed of the drain (source) and the well of the NMOS transistor is forwardly biased, whereby a charge is lost from the voltage conversion section 3 through the diode. The charge loss is a loss of the charge supplied to the resonance circuit, and reduces the voltage conversion efficiency.

The PMOS switches 41 and 42 are used to avoid such a charge loss.

An AND gate is used at the output terminal so as to change the signal output from the detector 15 from L level to H level when the voltage output from the reference voltage generator 14 exceeds the voltage output from the voltage conversion section 3. The time at which the clock pulse $\phi_4$ changes from L level to H level is delayed from the time when the chopper comparator enters the comparison period (when the clock pulse $\phi_{2B}$ changes to L level). This is to prevent an unstable signal from being output from the detector 15 since the output value of the chopper comparator is unstable initially in a comparison period.

Figure 39B:
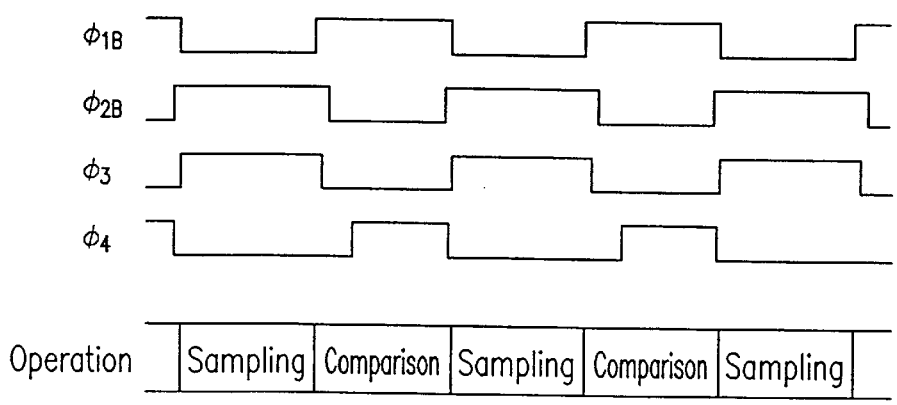
FIG. 39B is a diagram illustrating an operation of the detector 15.

FIG. 39B illustrates an operation of the detector 15. The clock pulse $\phi_{1B}$ changes to L level during the sampling period (sampling the voltage of the reference voltage generator 14), and the clock pulse $\phi_{2B}$ changes to L level during the comparison period.

While the clock pulse converted by the clock generator 6 has a cycle as that of the sinusoidal wave oscillation voltage at the terminal 3f, it may have a cycle which is a multiple of that of the sinusoidal wave oscillation voltage at the terminal 3f. When the clock pulse has a cycle which is twice as long as that of the sinusoidal wave oscillation cycle at the terminal 3f, the detector 8 samples the output voltage the voltage conversion section 3 (the voltage at the terminal 3g) with a cycle which is twice as long as the operating cycle as illustrated in FIG. 33. As the operating cycle of the detector 8 is lower, the power consumed by the entire voltage converter 20 is smaller. However, since the power consumed by the PMOS switch 26 tends to increase as the output voltage of the voltage converter 20 increases, the output voltage needs to be designed appropriately according to the magnitude of the load 2.

(Embodiment 2)

Figure 40:
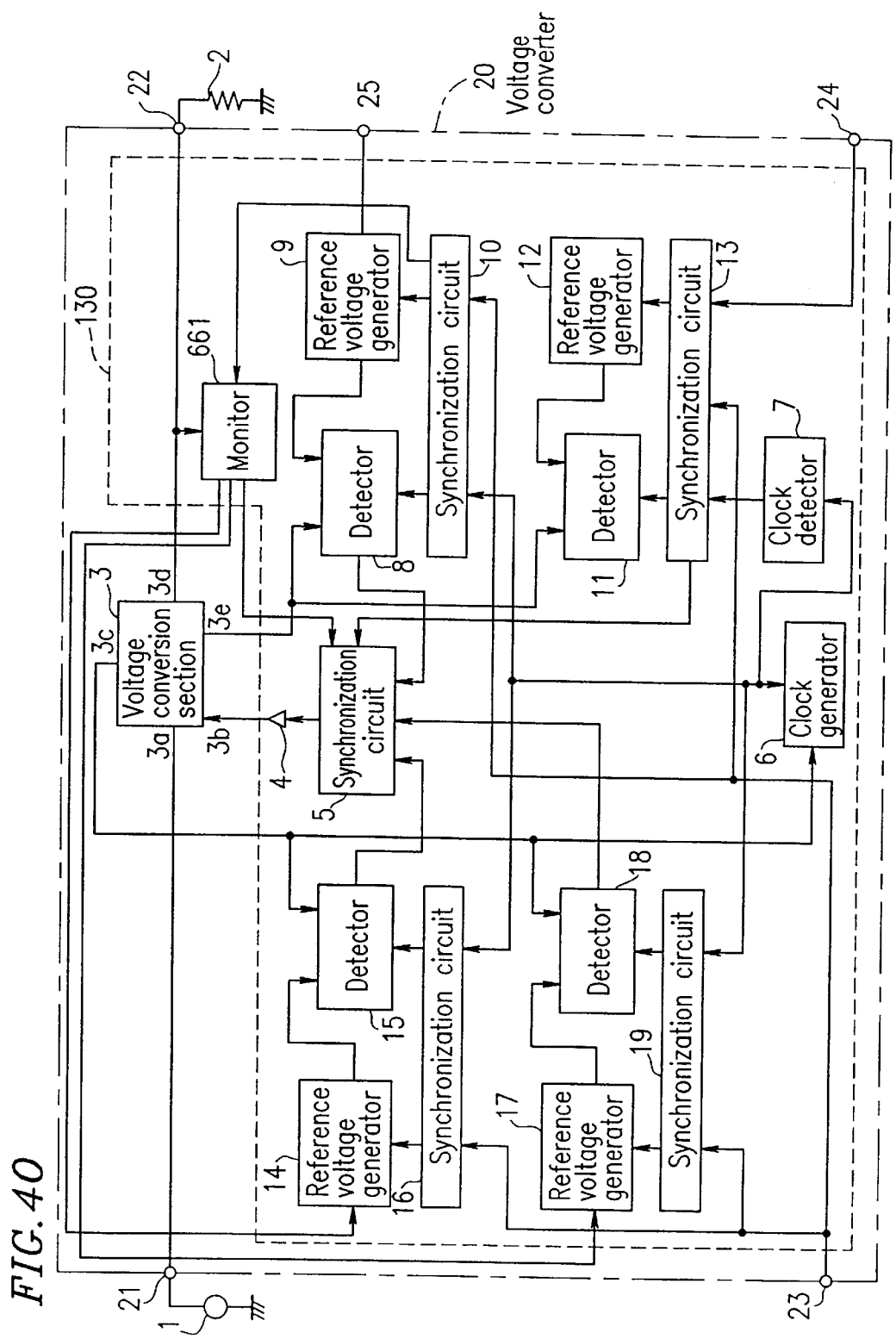
FIG. 40 is a diagram illustrating another structure of the voltage converter 20.

FIG. 40 illustrates another structure of the voltage converter 20. The structure of the voltage converter illustrated in FIG. 40 is identical to the structure of the voltage converter 20 illustrated in FIG. 29 except for a monitor 661.

The monitor 661 has two input terminals and three output terminals. One of the input terminal of the monitor 661 is connected to the terminal 3d of the voltage conversion section 3. The other input terminal of the monitor 661 is connected to the synchronization circuit 10. The three output terminals are connected to the synchronization circuit 5, and the reference voltage generators 14 and 17, respectively. The monitor 661 detects a current (voltage decrease per a unit time) at the output terminal 3d of the voltage conversion section 3. This is because the current (voltage decrease per a unit time) flowing into the load 2 can be obtained from this current. The monitor 661 supplies a power substantially equal to the power consumed by the load 2 from the power supply 1 to the voltage conversion section 3. For example, when the monitor 661 detects that the current consumed by the load 2 increases, the monitor 661 increases the amount of charge supplied to the voltage conversion section 3 by increasing the period during which the PMOS switch 26 included in the voltage conversion section 3 is closed.

In order to increase the period during which the PMOS switch 26 is closed, for example, the voltage output from the reference voltage generator 14 (the timing at which the switch 26 changes from the open state to the closed state is determined by the voltage) may be decreased, and the voltage output from the reference voltage generator 17 (the timing at which the switch 26 changes from the closed state to the open state is determined by the voltage) may be increased.

The following consideration may be made regarding the voltage conversion efficiency. It is preferable in view of improving the voltage conversion efficiency that the period during which the PMOS switch 26 is closed is short and the period during which the switch 26 is closed is provided at a point where the oscillation voltage at the terminal 3f of the voltage conversion section 3 is close to the voltage of the power supply 1 to be converted. It is desirable to adjust the voltages output from the reference voltage generators 14 and 17 so as to realize a better conversion efficiency.

The voltages output from the reference voltage generators 14 and 17 may be adjusted according to the operation state of the detector 8 so as to increase the period during which the PMOS switch 26 is closed. For example, when the result of the comparison between the voltage at the terminal 3e of the voltage conversion section 3 and the voltage output from the reference voltage generator 9 shows that the voltage at the terminal 3e decreases below the voltage output from the reference voltage generator 9 for two consecutive times, the result means that the amount of charge consumed by the load 2 is larger than the amount of charge supplied from the power supply 1 to be converted by closing the PMOS switch 26. In such a case, the voltage at the output terminal 22 of the voltage converter 20 cannot be maintained at the desired voltage unless the period during which the PMOS switch 26 is closed is increased. Thus, the detector 8 sends to the monitor 661 a signal which indicates that the voltage at the terminal 3e decreases below the voltage output from the reference voltage generator 9. In response to the detector 8, the monitor 661 adjusts the voltage output from the reference voltage generators 14 and 17 so as to increase the period during which the PMOS switch 26 is closed.

Thus, it is possible to increase the period during which the PMOS switch 26 is closed, by using the monitor 661 to detect the frequency with which the voltage at the terminal 3e decreases below the voltage output from the reference voltage generator 9 in the result of the comparison between the voltage at the terminal 3e and the voltage output from the reference voltage generator 9, instead of using the monitor 661 to detect the output current of the voltage conversion section 3.

Moreover, the timing at which the state of the PMOS switch 26 included in the voltage conversion section 3 changes from the closed state to the open state can be delayed not only by increasing the voltage output from the reference voltage generator 17, but also by delaying an operation signal from the synchronization circuit 5 for changing the PMOS switch 26 from the closed state to the open state by using the signal from the monitor 661. When the operation signal from the synchronization circuit 5 for changing the PMOS switch 26 from the closed state to the open state is delayed, a fine adjustment can be achieved without increasing the circuit scale. Therefore, a desirable adjustment method may be to make a coarse adjustment by the reference voltage generator 17, and to make a fine adjustment by delaying the operation signal from the synchronization circuit 5 for changing the PMOS switch 26 from the closed state to the open state.

Figure 41:
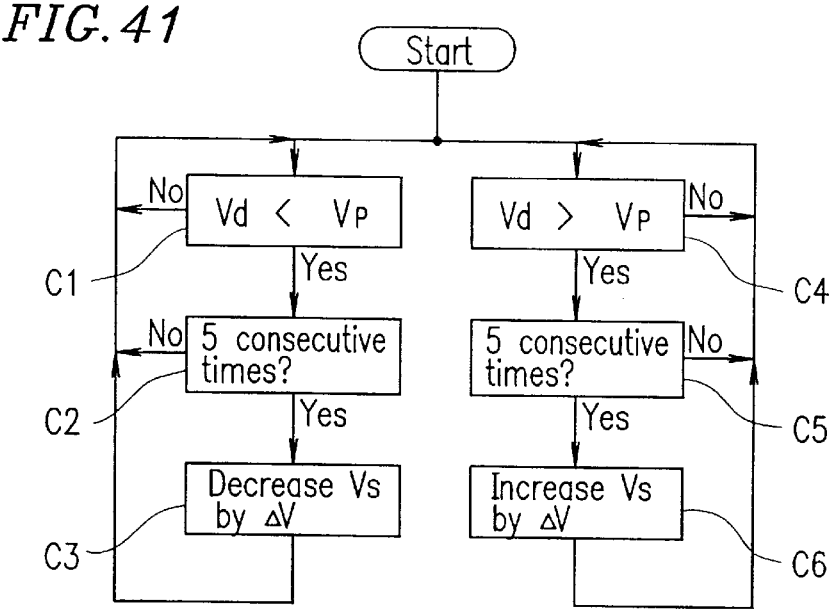
FIG. 41 is a control flow illustrating a procedure of a process of a monitor 661.

FIG. 41 is a control flow illustrating a procedure of a process of the monitor 661.

In a control block C1, the voltage $V_d$ at the terminal 3d of the voltage conversion section 3 is compared with the target voltage (i.e., the voltage output from the reference voltage generator 9) $V_p$. When the voltage $V_d$ is smaller than the voltage $V_p$, the process proceeds to a control block C2. When the voltage $V_d$ is larger than the voltage $V_p$, the process of a control block C3 is repeated. The result of the comparison between the voltage $V_d$ and the voltage $V_p$ made in the control block C1 is stored in the control block C2. In the control block C2, a case where the comparison result in the control block C1 is $V_d<V_p$ for five consecutive times is detected. When $V_d<V_p$ holds for five consecutive times, the voltage $V_S$ is decreased by $\Delta V$ in the control block C3. Herein, the voltage $V_S$ is a voltage output from the reference voltage generator 14, and the voltage $\Delta V$ is the minimum voltage width by which the voltage $V_S$ is varied. After the end of the process of the control block C3, the process returns to the control block C1.

Detecting that $V_d<V_p$ holds for five consecutive times in the control block C2 means that the power supplied from the power supply 1 to the voltage conversion section 3 is smaller than the power consumed by the load 2. Waiting until $V_d<V_p$ holds for five consecutive times is done to provide a margin. When the voltage $V_d$ is smaller than the voltage $V_p$, a power is supplied from the power supply 1 to the voltage conversion section 3. When the supplied power is smaller than the power consumed by the load 2, the voltage $V_d$ will be smaller than the voltage $V_p$ again in the next comparison in the control block C1. Therefore, $V_d<V_p$ for two consecutive times means that the power supplied from the power supply 1 to the voltage conversion section 3 is insufficient. However, the comparison between the voltage $V_d$ and the voltage $V_p$ is susceptible to noise. Especially, as the voltage $V_d$ becomes closer to the voltage $V_p$, the comparison is more susceptible to noise. In order to make the comparison less susceptible to noise, it is more preferable to determine that the power supplied from the power supply 1 to the voltage conversion section 3 is insufficient when $V_d<V_p$ holds for five consecutive times, than to determine that the power supplied from the power supply 1 to the voltage conversion section 3 is insufficient when $V_d<V_p$ holds for two consecutive times. This is because since a margin corresponding to three process cycles is provided, erroneous comparison due to noise is eliminated, whereby the determination is more reliable. Decreasing the voltage $V_S$ by $\Delta V$ in the control block C3 means increasing the power supplied from the power supply 1 to the voltage conversion section 3. This is because the period during which the switch 26 is closed is prolonged as the voltage $V_S$ is decreased.

In control blocks C4–C6, processes similar to those in the control blocks C1–C3 are performed. In particular, the voltage $V_d$ and voltage $V_p$ are compared with each other in the control block C4. When it is detected that $V_d>V_p$ holds for five consecutive times in the control block C5, the voltage $V_S$ is increased by $\Delta V$ in the control block C6. Detecting that $V_d>V_p$ holds for five consecutive times in the control block C5 means that the power supplied from the power supply 1 to the voltage conversion section 3 is larger than the power consumed by the load 2. Increasing the voltage $V_S$ by $\Delta V$ in the control block C6 means decreasing the power supplied from the power supply 1 to the voltage conversion section 3. This is because the period during which the switch 26 is closed is shortened as the voltage $V_S$ is increased.

Figure 42:
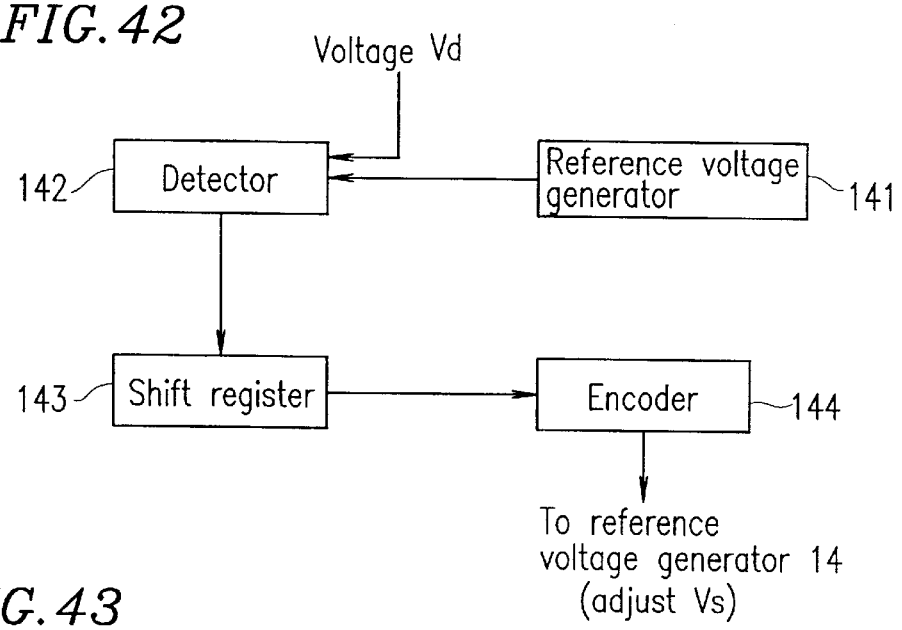
FIG. 42 is a diagram illustrating an exemplary circuit configuration for implementing the control flow of FIG. 41.

FIG. 42 illustrates an exemplary circuit configuration for implementing the control flow of FIG. 41. A reference voltage generator 141 generates the voltage $V_p$. A detector 142 compares the voltage $V_d$ with the voltage $V_p$. The detector 142 outputs "0" to the shift register 143 when $V_d<V_p$ and outputs "1" to the shift register 143 when $V_d>V_p$. The shift register 143 holds output signals "0" and "1" from the detector 142 for five cycles. An encoder 144 decreases the voltage $V_S$ output from the reference voltage generator 14 by $\Delta V$ when the data points held in the shift register 143 for the five cycles are all "0" (i.e., when "0" has occurred five consecutive times), and increases the voltage $V_S$ output from the reference voltage generator 14 by $\Delta V$ when the data points held in the shift register 143 for the five cycles are all "1" (i.e., when "1" has occurred five consecutive times). Thus, the control illustrated in FIG. 41 is implemented.

Figure 43:
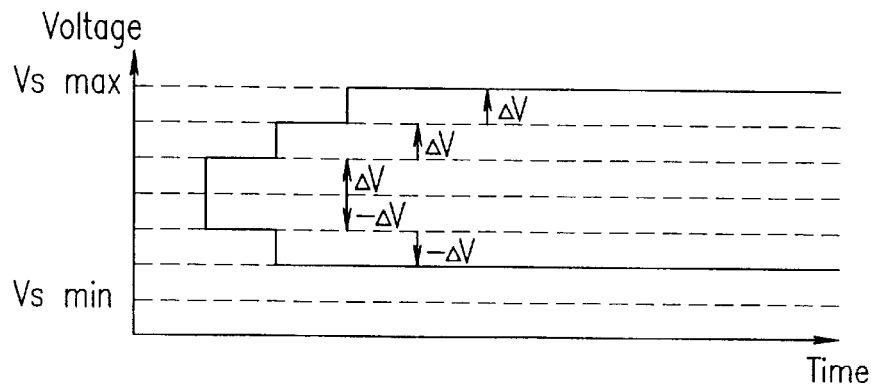
FIG. 43 is a diagram illustrating how a voltage $V_S$ output from a reference voltage generator 14 changes.

FIG. 43 illustrates how the voltage $V_S$ output from the reference voltage generator 14 changes. When a single voltage change is not sufficient, the voltage change is further repeated until the power supplied from the power supply 1 to the voltage conversion section 3 is equal to the power consumed by the load 2.

Figure 44:
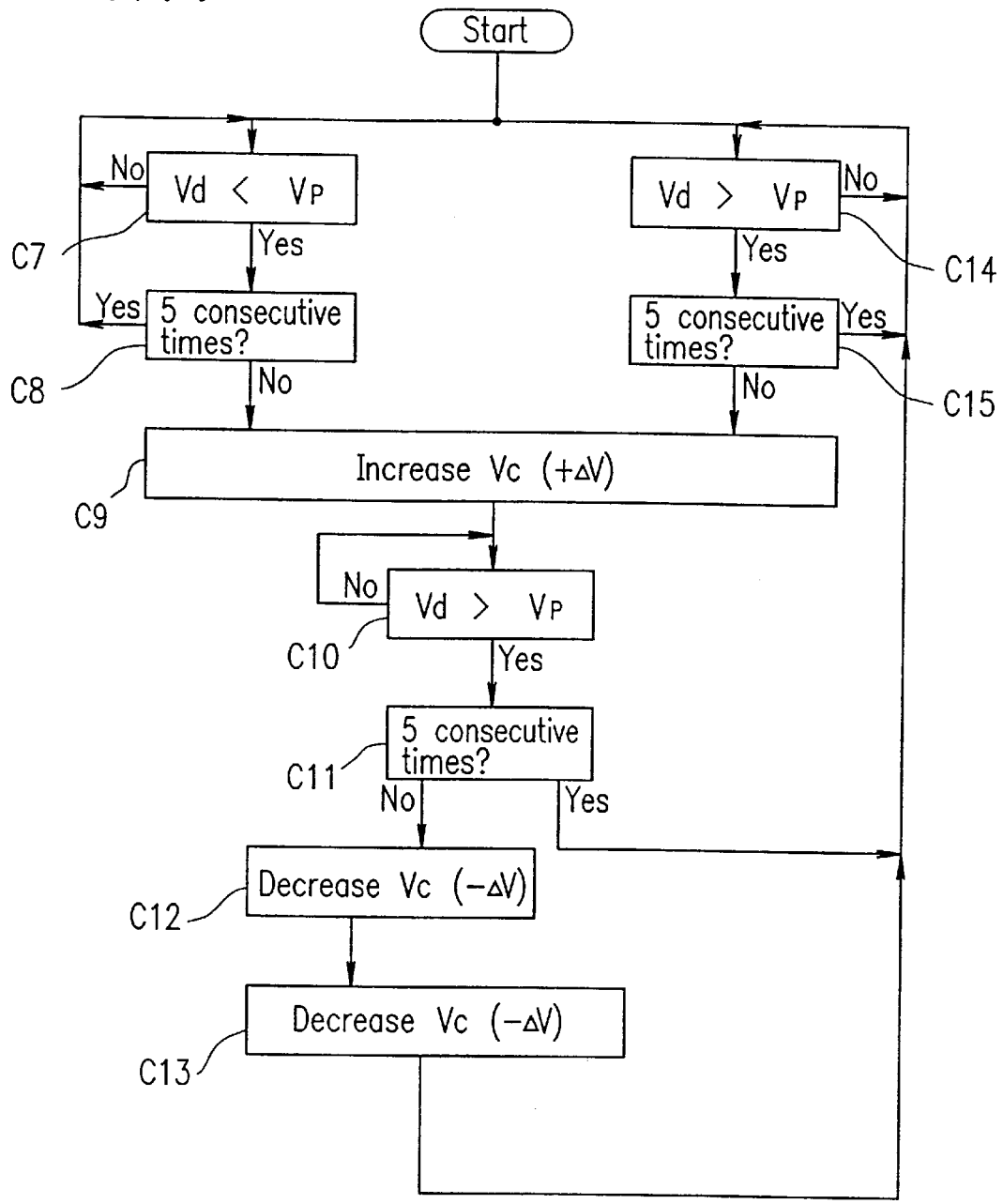
FIG. 44 is a control flow illustrating a procedure of a process for determining a voltage $V_C$.

FIG. 44 is a control flow illustrating a procedure of a process for determining the voltage $V_C$.

In a control block C7, the voltage $V_d$ at the terminal 3d of the voltage conversion section 3 is compared with the target voltage (i.e., the voltage output from the reference voltage generator 9) $V_P$. When the voltage $V_d$ is smaller than the voltage $V_p$, the process proceeds to a control block C8 or, otherwise, the process of the control block C7 is repeated. In the control block C8, it is determined whether $V_d<V_p$ has held for five consecutive times. When $V_d<V_p$ has held for five consecutive times, the process returns to the control block C7. Otherwise, the process proceeds to a control block C9. In the control block C9, the voltage $V_C$ is increased by $\Delta V$. Then, the process proceeds to a control block C10. In the control block C10, the voltage $V_d$ is compared with the voltage $V_p$. When the voltage $V_d$ is larger than the voltage $V_p$, the process proceeds to a control block C11 or, otherwise, the process of the control block C10 is repeated. In the control block C11, it is determined whether $V_d>V_p$ has held for five consecutive times. When $V_d>V_p$ has held for five consecutive times, the process returns to the control blocks C7 and C14. Otherwise, the process proceeds to the control blocks C12 and C13, thereby decreasing the voltage $V_C$ by $2\Delta V$. Then, the process returns to the control blocks C7 and C14. In the control block C14, the voltage $V_d$ is compared with the voltage $V_p$. When the voltage $V_d$ is larger than the voltage $V_p$, the process proceeds to the control block C15 or, otherwise, the process of the control block C14 is repeated. In the control block C15, it is determined whether $V_d>V_p$ has held for five consecutive times. When $V_d>V_p$ has held for five consecutive times, the process returns to the control block C14. Otherwise, the process proceeds to the control block C9.

The meaning of the control blocks C7–C15 will be described below. The flow of the control blocks C7 and C8 means the "width" (the potential difference between the voltage $V_S$ and the voltage $V_c$) is being determined, as described for the control flow illustrated in FIG. 41, based on whether there have been five consecutive periods in which the voltage $V_d$ is smaller than the voltage $V_p$. This is similarly true for the flow of the control blocks C14 and C15. When the output of the control blocks C8 and C15 is "No", it means that the width has been determined. Once the width is determined, the "height" (voltage $V_C$) is determined. In the control block C9, the voltage $V_C$ is increased by $\Delta V$. This operation means that the voltage $V_C$ is intentionally varied from the appropriate width after the control illustrated in FIG. 41. When the appropriate width is intentionally widened (when the voltage $V_C$ is increased by $\Delta V$), the power supplied from the power supply 1 to the voltage conversion section 3 increases, whereby it is expected that $V_d>V_p$ would hold for five consecutive times in the comparison between the voltage $V_d$ and the voltage $V_p$ in the control block C10. When $V_d>V_p$ holds for five consecutive times, the control flow illustrated in FIG. 44 is completed. However, when $V_d>V_p$ has not held for five consecutive times, it means that the voltage $V_C$ has been increased excessively. By increasing the voltage $V_C$, the power supplied from the power supply 1 to the voltage conversion section 3 should normally increase due to the increased width; however, the power increase is actually too little ($V_d>V_p$ does not hold for five consecutive times), because the switch 26 is closed in the period during which the voltage at the terminal 3f of the voltage conversion section 3 is higher than the voltage of the power supply 1, whereby the power supplied to the voltage conversion section 3 flows back to the power supply 1. In such a case, the switch 26 has to transition from the closed state to the open state under a lower voltage $V_C$. Therefore, in such a case, the voltage $V_C$ is decreased by $2\Delta V$ in the control blocks C12 and C13 in view of that the voltage $V_C$ has once been increased by $\Delta V$ in the control block C9. The above is an exemplary procedure for adjusting the height of the voltage $V_C$.

The determination of the width, the determination of the height, and an intermittent operation are summarized in Table 3 below.

TABLE 3

| | |
|---|---|
| Determination of width (voltage difference between Vs and Vc) | As the width is smaller, the power consumption by the switch 26 is reduced, thereby increasing the efficiency. |
| Determination of height (voltage of Vc) | As the height is greater, the efficiency increases. When it is excessively high, however, a current backflow from the voltage conversion section 3 to the power supply 1 occurs, thereby reducing the efficiency. The voltage Vc is set to be as high as possible so that the backflow does not occur. |
| Intermittent operation | After the width is set to its minimum, the switch 26 transitions from the operation where it is opened/closed for every cycle, to an operation where it is opened/closed only in every other cycle. Thus, the number of times the control circuit operates is decreased, thereby reducing the power consumption. |

(Embodiment 3)

Figure 45:
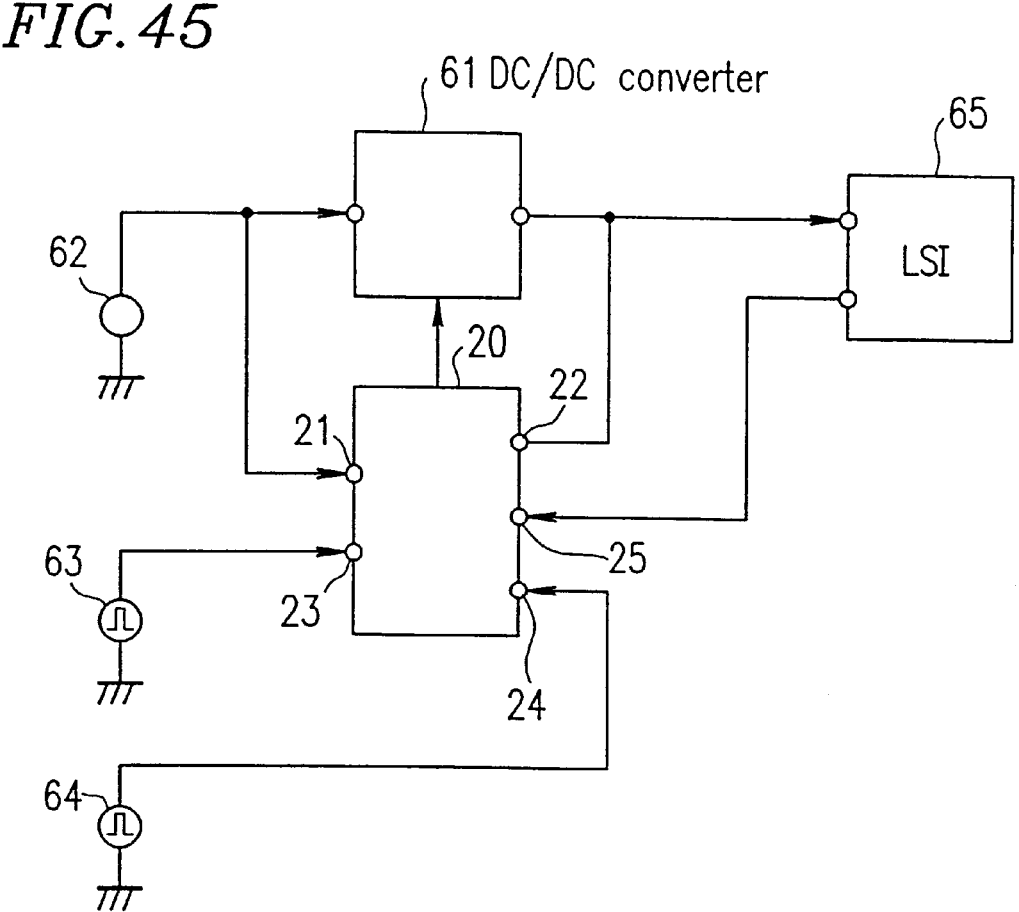
FIG. 45 is a diagram illustrating another structure of the voltage converter according to the present invention.

FIG. 45 illustrates another structure of the voltage converter according to the present invention. Reference numeral 61 denotes the conventional DC/DC converter. Reference numeral 62 denotes a power supply to be converted, 63 denotes a clock pulse generator connected to the terminal 23 of the voltage converter 20, and 64 denotes a start signal generator connected to the terminal 24. Reference numeral 65 denotes an LSI which is to be the load to which the converted voltage is supplied. From the LSI 65, the optimal supply voltage value is sent to the terminal 25 of the voltage converter 20. While the voltage converter 20 performs a high efficiency voltage conversion when the current supplied to the LSI 65 is small, the conversion efficiency is reduced to be lower than the conversion efficiency of the conventional DC/DC converter 61 when the supply current increases.

The structure of the voltage converter 20 illustrated in FIG. 45 is similar to the structure of the voltage converter 20 illustrated in FIG. 40. The voltage converter 20 includes a current detector for detecting a current flowing from the terminal 22 to the LSI 65. Alternatively, the current detector may be provided externally to the voltage converter 20.

The voltage converter 20 operates when the current detected by the current detector is smaller than a predetermined current. The DC/DC converter 61 operates when the current detected by the current detector is larger than the predetermined current.

Alternatively, the voltage converter 20 may operate when the voltage output from the terminal 22 to the LSI 65 is larger than a time integration value of a predetermined voltage, and the DC/DC converter 61 may operate when the voltage output from the terminal 22 to the LSI 65 is smaller than the time integration value of the predetermined voltage.

Thus, when the voltage conversion efficiency of the DC/DC converter 61 is higher than that of the voltage converter 20, the supply from the voltage converter 20 is stopped, and a current is supplied from the DC/DC converter 61.

Moreover, in addition to accounting for changes in the power consumption of the LSI 65, the transition to the desired voltage is performed by the DC/DC converter 61 when the desired voltage greatly changes. After the desired voltage is reached, the current supply is initiated by the voltage converter 20. Thus, the speed of the transition to the desired voltage (settling) increases. In addition to the switching of the DC/DC converter 61 during the transition period between desired voltages, start-up and reset operations of the voltage converter 20 may be performed by the DC/DC converter 61.

Figure 46:
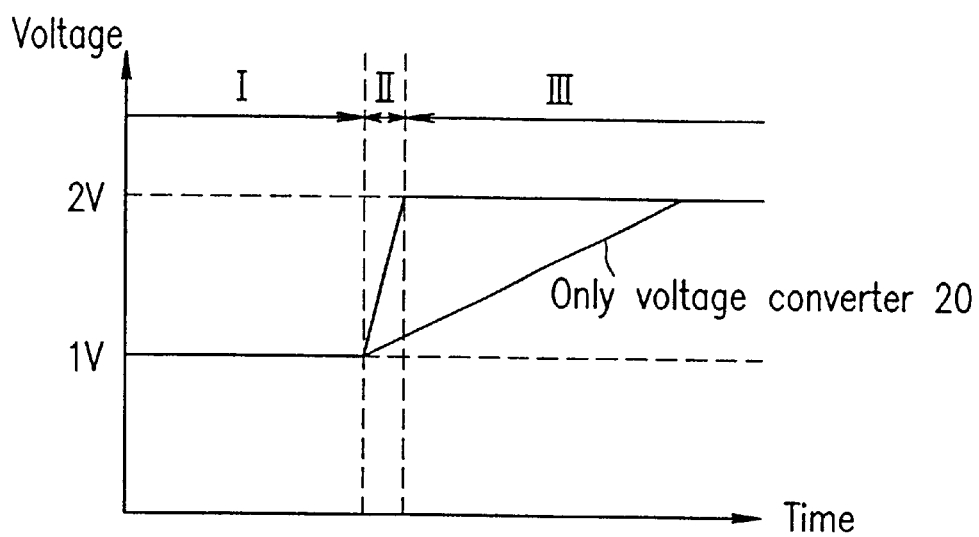
FIG. 46 is a diagram illustrating how a speed of voltage change is increased by combining the voltage converter 20 and the conventional DC/DC converter 61.

FIG. 46 illustrates how the speed of the voltage change is increased by combining the voltage converter 20 and the conventional DC/DC converter 61.

In FIG. 46, only the voltage converter 20 operates during periods I and III. Therefore, the power is supplied to the load 2 with a high conversion efficiency during these periods. During a period II, the voltage converter 20 and the DC/DC converter 61 operate concurrently, whereby the output voltage is more rapidly raised from 1 V to 2 V, as compared to the case where only the voltage converter 20 operates. However, the conversion efficiency is reduced in this period.

Figure 47:
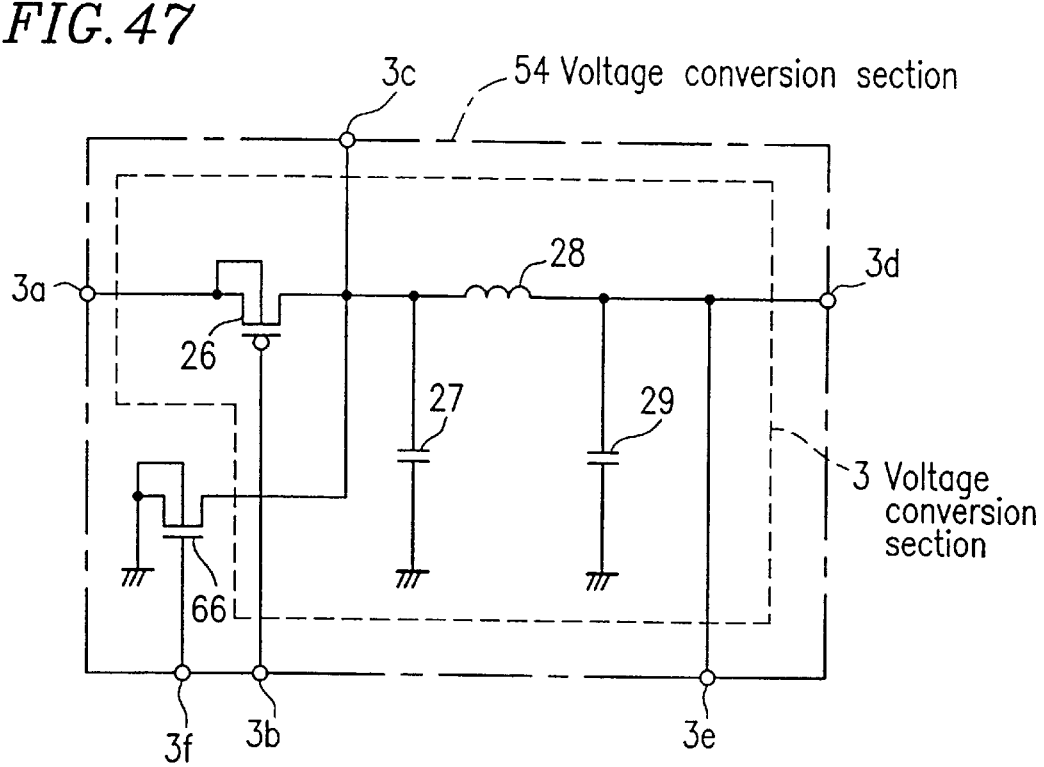
FIG. 47 is a diagram illustrating that there is a circuit portion which can be shared by the voltage conversion section 54 of the DC/DC converter 61 and the voltage conversion section 3 of the voltage converter 20.

FIG. 47 illustrates that there are circuit portions which can be shared by the voltage conversion section 54 of the DC/DC converter 61 and the voltage conversion section 3 of the voltage converter 20. Switches 26 and 66, capacitances 27 and 29, and the inductor 28 have the greatest influence on the circuit scale of the DC/DC converter 61 and the voltage converter 20. Therefore, by sharing the circuit portions, the DC/DC converter 61 can be incorporated into the voltage converter 20 without increasing the circuit scale. In particular, it is possible to provide the voltage conversion section 54 of the DC/DC converter 61 by connecting the NMOS switch 66 to the terminal 3f of the voltage conversion section 3 as illustrated in FIG. 47. Since the circuit portions can be shared by the voltage conversion section 54 and the voltage conversion section 3, it is possible to implement the DC/DC converter 61 and the voltage converter 20 without substantially increasing the circuit scale by employing the structure illustrated in FIG. 47.

(Embodiment 4)

Figure 48A:
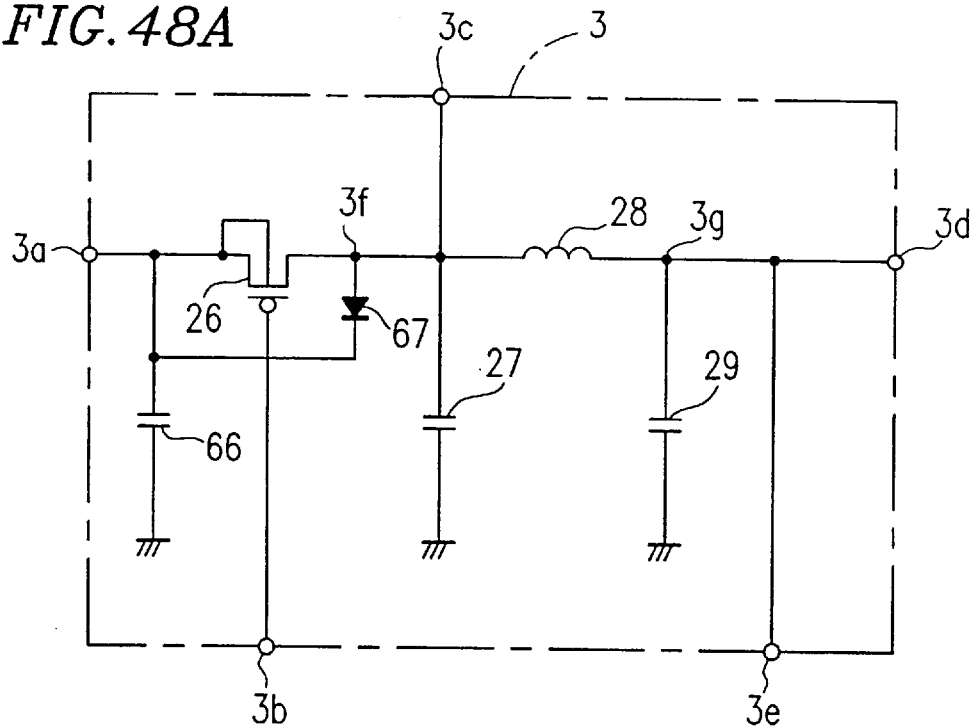
FIGS. 48A and 48B are diagrams each illustrating another structure of the voltage conversion section 3.
Figure 48B:
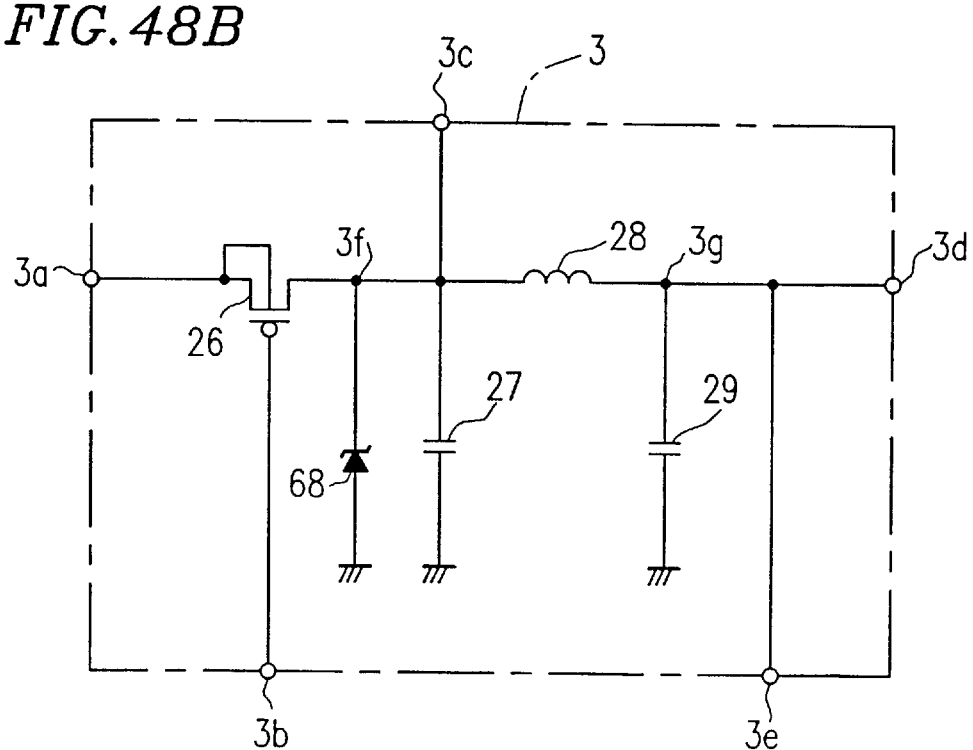

FIGS. 48A and 48B illustrate another structure of the voltage conversion section 3.

The structure of the voltage conversion section 3 illustrated in FIG. 48A is different from the structure of the voltage conversion section 3 illustrated in FIG. 30 in that a diode 67 and the capacitance 66 are connected to the switch 26. The diode 67 may be a schottky barrier diode, for example.

The structure of the voltage conversion section 3 illustrated in FIG. 48B is different from the structure of the voltage conversion section 3 illustrated in FIG. 30 in that a Zener diode 68 is connected to the switch 26.

Terminals 3a–3e illustrated in FIGS. 48A and 48B are identical to the terminals 3a–3e illustrated in FIG. 29. As illustrated in FIG. 33, the voltage at the terminal 3f (the voltage of the waveform a) is higher than the voltage $V_{DD}$ to be converted due to the operating characteristics of the voltage conversion section 3 during the set up period, so that a current flows from the drain toward the well when the diode, which is formed (parasitic) between the drain connected to the terminal 3f of the PMOS transistor 26 and the well, is forwardly biased. Depending upon the values of the capacitances 27 and 29 and the inductor 28, the current may have a large current value, thereby exceeding the forward breakdown current value of the diode between the drain and the well and destroying the PMOS transistor. Thus, the diode 67 is connected between the terminal 3f and the terminal 3a, and the capacitance 66 is connected between the terminal 3a and the ground. When the voltage at the terminal 3f becomes higher than the voltage of the power supply 1 to be converted (the voltage at the terminal 3a), thereby forwardly biasing the diode 67, a current flows from the terminal 3f toward the terminal 3a, and the current which has flowed into the terminal 3a flows into the capacitance 66. Herein, the diode 67 starts conducting a forward current at a smaller voltage than the voltage value at which the diode, which is formed between the drain and the well of the PMOS transistor 26, starts conducting a current in the forward direction. Since a large current does not flow through the PMOS transistor 26, no breakdown occurs. However, since the diode 67 is required to have a large breakdown current value, the diode 67 is typically provided as an external component, rather than being provided on a semiconductor integrated circuit. The capacitance 66 provides a forward current of the diode 67 to the power supply 1 to be converted, thereby reducing the amount of backflow.

FIG. 48B illustrates a structure in which a current is conducted from the terminal 3f to the ground terminal by the Zener diode 68 so as not to conduct a large current to the PMOS transistor 26. Herein, the Zener diode 68 is at a voltage which is lower than the voltage at which a current starts to flow between the drain and the well of the PMOS transistor 26, and which is higher than the voltage of the power supply 1 to be converted.

(Embodiment 5)

Figure 49A:
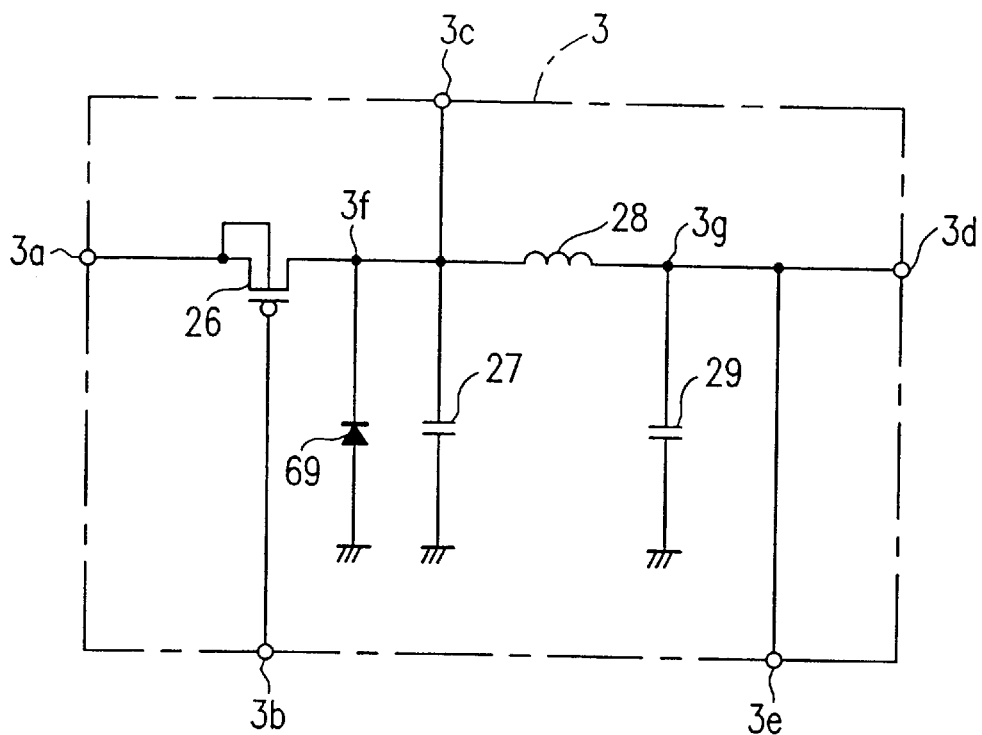
FIGS. 49A and 49B are diagrams each illustrating still another structure of the voltage conversion section 3.
Figure 49B:
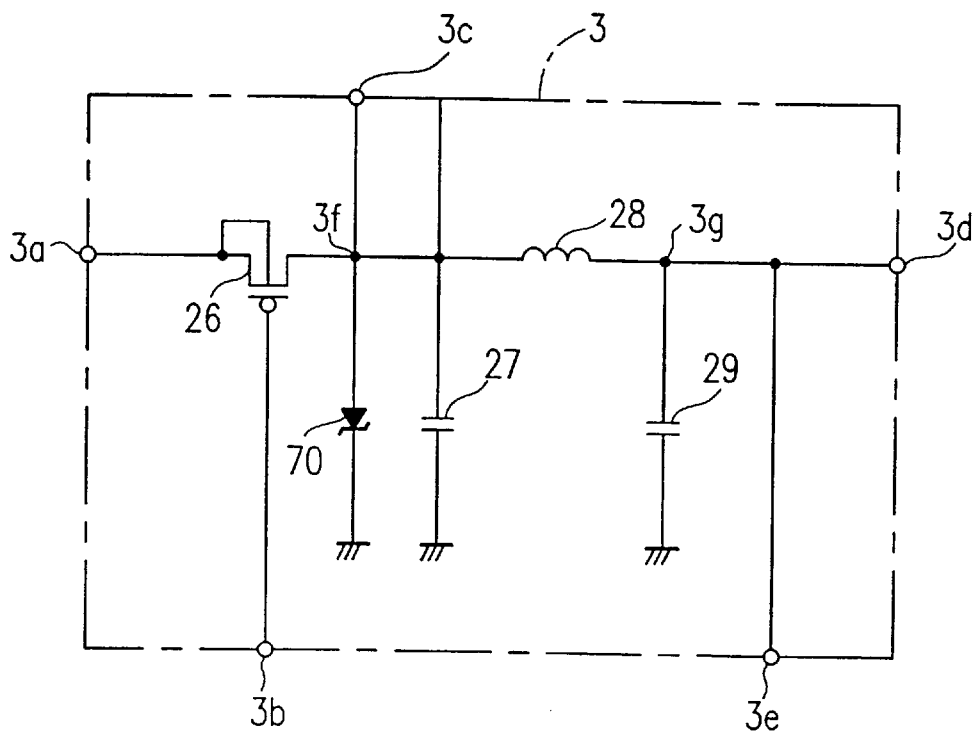

FIGS. 49A and 49B illustrate another structure of the voltage conversion section 3.

The structure of the voltage conversion section 3 illustrated in FIG. 49A is different from that of the voltage conversion section 3 illustrated in FIG. 30 in that a diode 69 is connected between the terminal 3f and the ground terminal. The diode 69 may be a schottky barrier diode, for example.

The structure of the voltage conversion section 3 illustrated in FIG. 49B is different from that of the voltage conversion section 3 illustrated in FIG. 30 in that a Zener diode 70 is connected between the terminal 3f and the ground terminal.

In the structure illustrated in FIG. 49A, a current flows from the ground terminal toward the terminal 3f when the voltage at the terminal 3f becomes lower than the ground voltage GND, thereby forwardly biasing the diode 69. The voltage at which a forward current starts flowing through the diode 69 may be set to be smaller than the reverse breakdown voltage of the diode, which is formed between the drain connected to the terminal 3f of the PMOS transistor 26 and the well, so as to prevent the breakdown of the PMOS transistor 26.

The structure illustrated in FIG. 49B is obtained by replacing the diode 69 illustrated in FIG. 49A with the Zener diode 70. The voltage at which a current starts flowing through the Zener diode 70 can be set to be smaller than the reverse breakdown voltage of the diode, which is formed between the drain connected to the terminal 3f of the PMOS transistor 26 and the well, so as to prevent the breakdown of the PMOS transistor 26. The diode 69 and the Zener diode 70 are typically provided as an external component, rather than being provided on a semiconductor integrated circuit.

(Embodiment 6)

Figure 50:
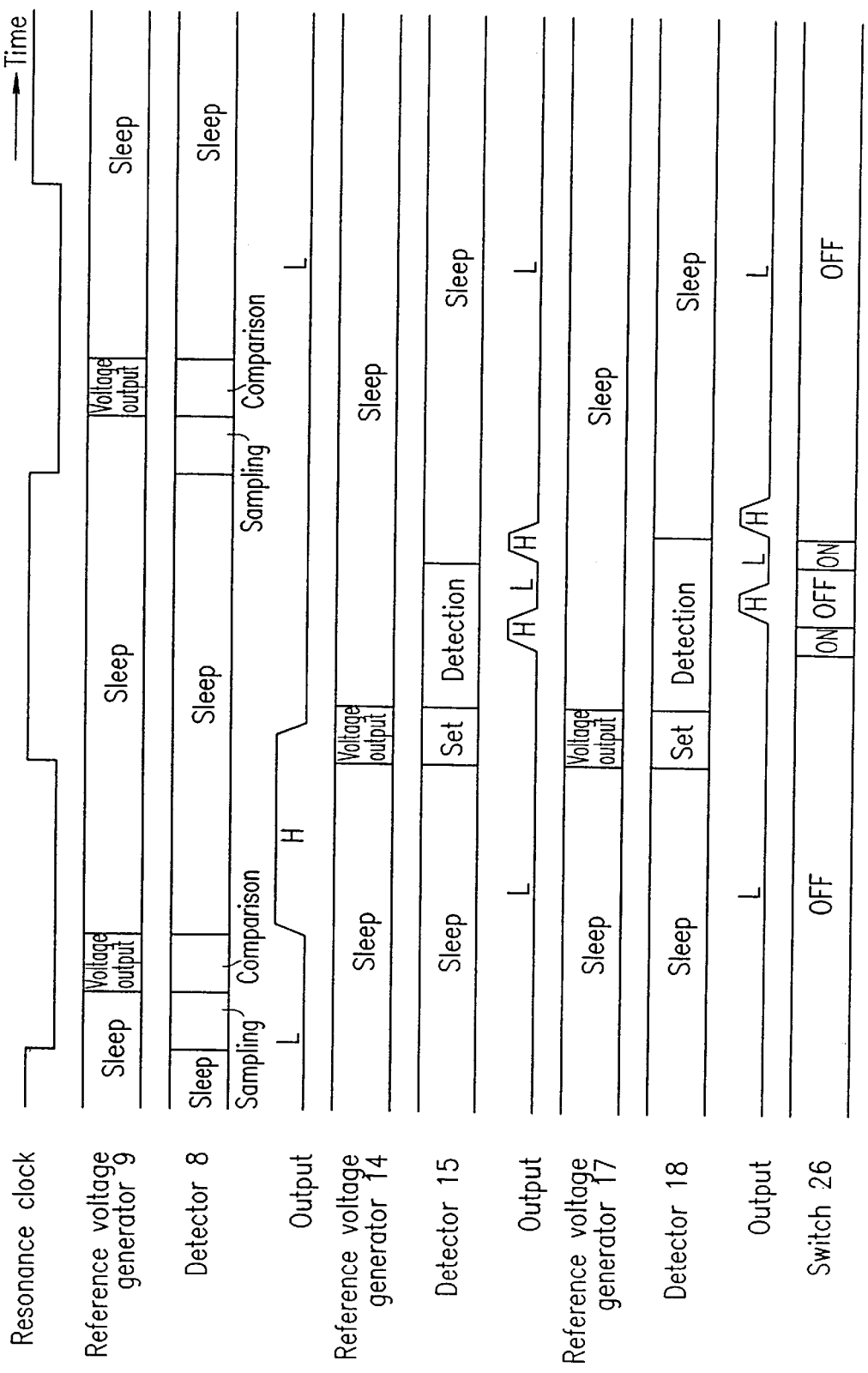
FIG. 50 is a diagram illustrating another operation procedure of the voltage converter 20.

FIG. 50 illustrates another operating procedure of the voltage converter 20. The operating procedure of the voltage converter 20 is different from the operating procedure of the voltage converter 20 illustrated in FIG. 33 in the detection period of the detectors 15 and 18, the output signal of the detectors 15 and 18, and the opening/closing operation of the PMOS transistor 26.

As the detector 15 enters the detection period, the detector 15 compares the voltage at the terminal 3f of the voltage conversion section 3 with the voltage $V_S$ output from the reference voltage generator 14, and outputs an H pulse as an output signal when the voltage at the terminal 3f exceeds the voltage $V_S$. Thereafter, when the voltage at the terminal 3f changes past its peak and starts decreasing, the voltage at the terminal 3f approaches the voltage $V_S$ again. The detector 15 again outputs the H pulse as an output signal when the voltage at the terminal 3f decreases below the voltage $V_S$.

As the detector 18 enters the detection period, the detector 18 compares the voltage at the terminal 3f of the voltage conversion section 3 with the voltage $V_C$ output from the reference voltage generator 17, and outputs the H pulse as an output signal when the voltage at the terminal 3f exceeds the voltage $V_C$. As the voltage at the terminal 3f starts increasing again after it has decreased to the voltage $V_S$, the voltage at the terminal 3f approaches the voltage $V_C$ again. The detector 18 outputs the H pulse as an output signal when the voltage $V_C$ is exceeded.

In response to the first H pulse of the detector 15 (the signal provided when the voltage at the terminal 3f exceeded the voltage $V_S$), the switch 26 transitions from the open state to the closed state. Thereafter, in response to the first H pulse of the detector 17 (the signal provided when the voltage at the terminal 3f exceeded the voltage $V_C$), the switch 26 transitions from the closed state to the open state.

Moreover, in response to the next H pulse of the detector 15 (the signal provided when the voltage at the terminal 3f fell below the voltage $V_S$), the switch 26 transitions from the open state to the closed state. Finally, in response to the next H pulse of the detector 17 (the signal provided when the voltage at the terminal 3f exceeded the voltage $V_C$), the switch 26 transitions from the closed state to the open state.

Thus, the PMOS switch 26 is closed between the point 1 and the point 2 illustrated in FIG. 35, and the PMOS switch 26 is again closed between the point 3 and the point 4 illustrated in FIG. 36.

By closing the PMOS switch 26 twice during a single cycle operation, as described above, it is possible to make the voltage $V_S$, which defines the positions of the point 1 and the point 3 at which a charge is supplied to the voltage conversion section 3, to be closer to the voltage of the power supply 1 to be converted. Thus, the voltage conversion efficiency is improved.

In the above-described embodiment, the timing at which the PMOS switch 26 transitions from the open state to the closed state, and the timing at which the PMOS switch 26 transitions from the closed state to the open state, are controlled independently of each other. Alternatively, the timing at which the PMOS switch 26 transitions from the closed state to the open state may be controlled dependently based on the timing at which the PMOS switch 26 transitions from the open state to the closed state. For example, the timing at which the PMOS switch 26 transitions from the closed state to the open state may be produced by delaying the timing at which the PMOS switch 26 transitions from the open state to the closed state.

(Embodiment 7)

Figure 59:
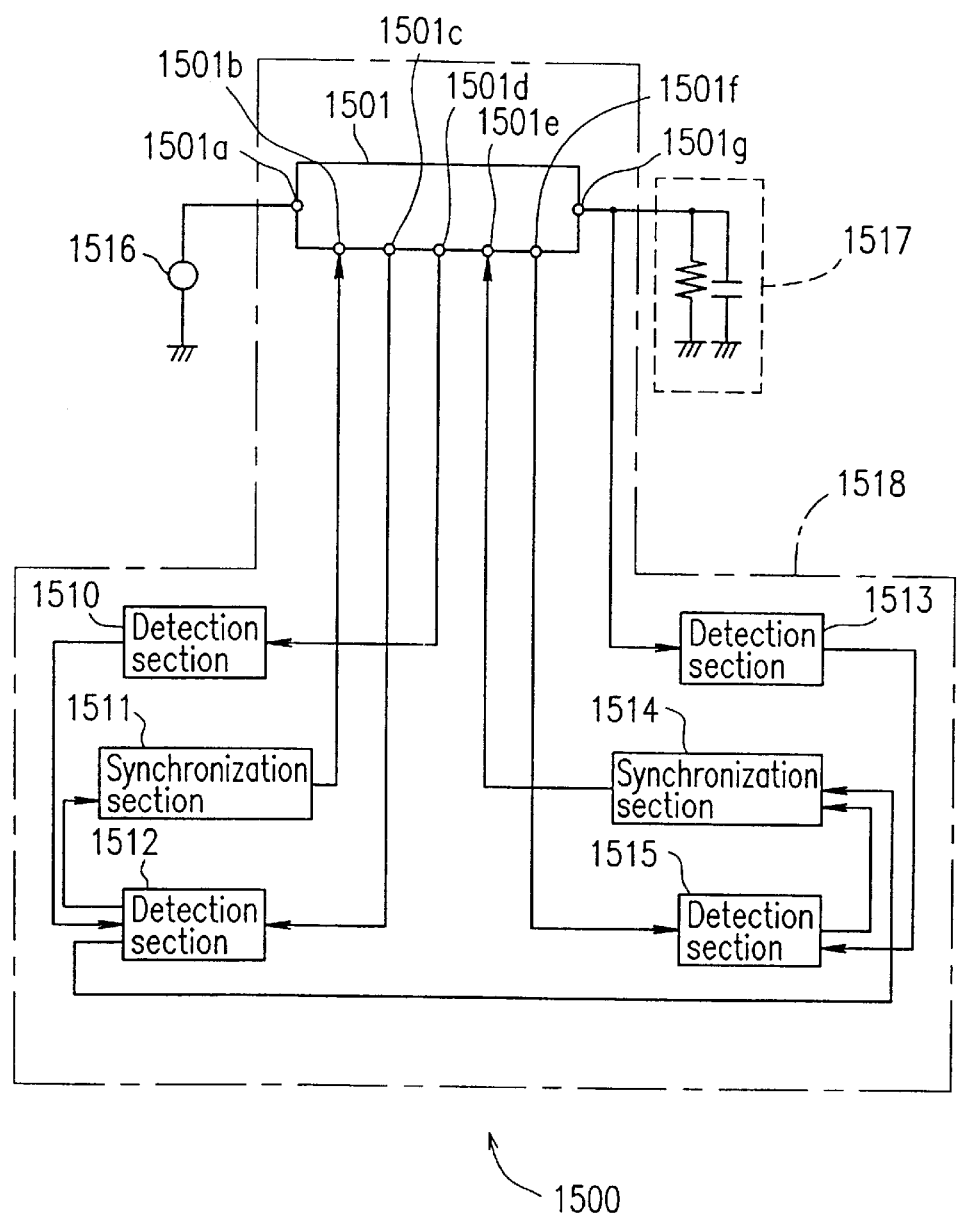
FIG. 59 is a diagram illustrating a structure of a voltage converter 1500.

FIG. 59 illustrates a structure of a voltage converter 1500. The voltage converter 1500 includes a voltage conversion section 1501 for converting a power supply voltage supplied from a power supply 1516 to a desired voltage, and a control section 1518 for controlling the voltage conversion section 1501.

The voltage conversion section 1501 includes terminals 1501a–1501f. The terminal 1501a is connected to the power supply 1516. The terminal 1501f is connected to a load 1517. The load 1517 includes at least one of a resistance component and a capacitance component. The desired voltage output from the voltage conversion section 1501 is supplied to the load 1517 via the terminal 1501f.

The control section 1518 includes detection sections 1510, 1512, 1513 and 1515, and synchronization sections 1511 and 1514.

Figure 60A:
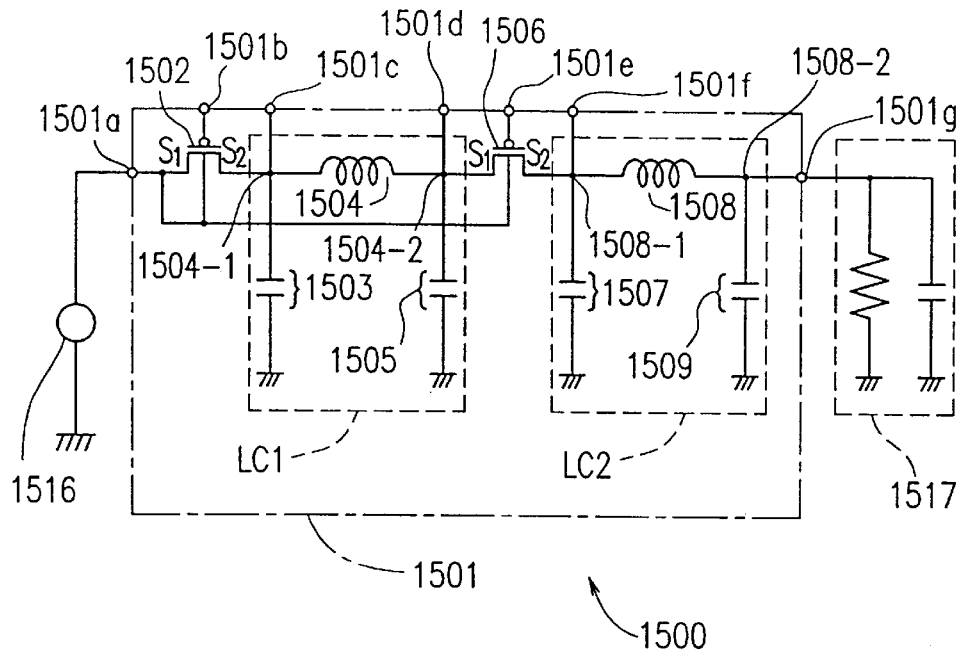
FIGS. 60A and 60B are diagrams each illustrating a structure of a voltage conversion section 1501.

FIG. 60A illustrates a structure of the voltage conversion section 1501. The voltage conversion section 1501 includes a switch 1502, a resonance circuit LC1, a switch 1506, and a resonance circuit LC2.

The resonance circuit LC1 includes an inductor 1504, a capacitance 1503 connected to one end of the inductor 1504 at a node 1504-1, and a capacitance 1505 connected to the other end of the inductor 1504 at a node 1504-2.

The switch 1502 has a terminal $S_1$ and a terminal $S_2$. In response to a control signal, the switch 1502 electrically connects the terminal $S_1$ and the terminal $S_2$ to each other, or electrically separates the terminal $S_1$ and the terminal $S_2$ from each other. The control signal is supplied from the synchronization section 1511 via the terminal 1501b. The terminal $S_1$ of the switch 1502 is connected to the power supply 1516 via the terminal 1501a. The terminal $S_2$ of the switch 1502 is connected to the node 1504-1 of the resonance circuit LC1.

The resonance circuit LC2 includes an inductor 1508, a capacitance 1507 connected to one end of the detection section 1508 at a node 1508-1, and a capacitance 1509 connected to the other end of the detection section 1508 at the node 1508-2.

The switch 1506 has a terminal $S_1$ and a terminal $S_2$. In response to a control signal, the switch 1506 electrically connects the terminal $S_1$ and the terminal $S_2$ to each other, or electrically separates the terminal $S_1$ and the terminal $S_2$ from each other. The control signal is supplied from the synchronization section 1514 via the terminal 1501e. The terminal $S_1$ of the switch 1506 is connected to the node 1504-2 of the resonance circuit LC1. The terminal $S_2$ of the switch 1506 is connected to the node 1508-1 of the resonance circuit LC2.

Herein, when a switch and a resonance circuit connected thereto are referred to as a "fundamental resonance, the voltage conversion section 1501 has a structure in which two fundamental resonance circuits are serially connected together. Of course, the number of the fundamental resonance circuits is not limited to two. The voltage conversion section 1501 may include N fundamental resonance circuits. Herein, N is any integer equal to or greater than 2.

The voltage conversion section 1501, having the structure in which fundamental resonance circuits are serially connected together, is suitable for efficiently decreasing the power supply voltage $V_{DD}$ supplied from the power supply 1516. This is because the voltage $V_p$ ($V_p<V_{DD}$) output from the first-stage fundamental resonance circuit can be utilized as a power supply voltage for the second-stage fundamental resonance circuit.

A method for decreasing the power supply voltage $V_{DD}$ using only one fundamental resonance circuit may include downwardly shifting the center of the oscillation of an alternating-current waveform, and decreasing the amplitude of the alternating-current waveform.

Figure 61A:
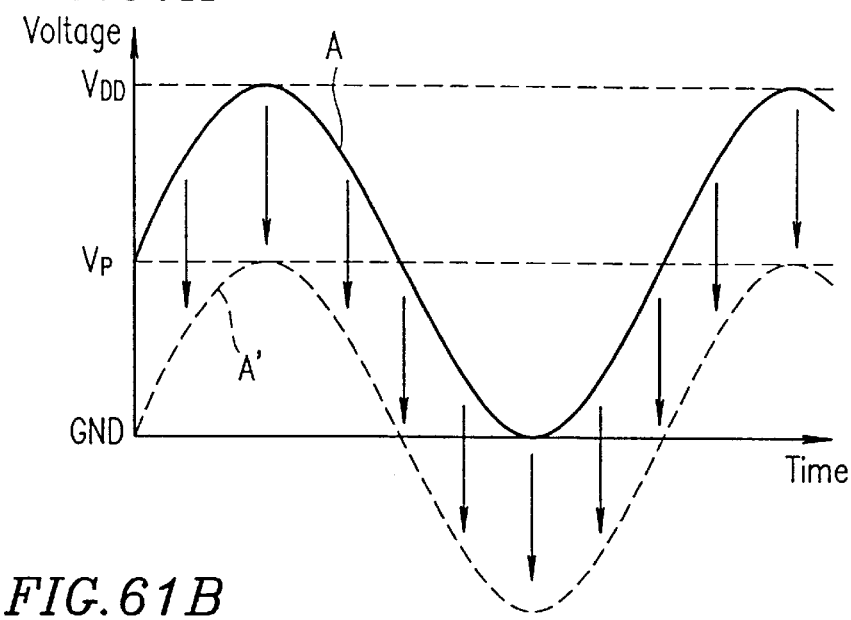
FIGS. 61A–61C are diagrams each illustrating how a power supply voltage $V_{DD}$ is decreased.

FIG. 61A illustrates how the power supply voltage $V_{DD}$ is decreased by downwardly shifting the center of the amplitude of the alternating-current waveform (A) by using only one fundamental resonance circuit. The waveform (A') is a waveform obtained by downwardly shifting the center of the amplitude of the alternating-current waveform (A). A portion of the waveform (A') thus obtained goes below the ground GND. This is not preferable in view of protecting the LSI.

Figure 61B:
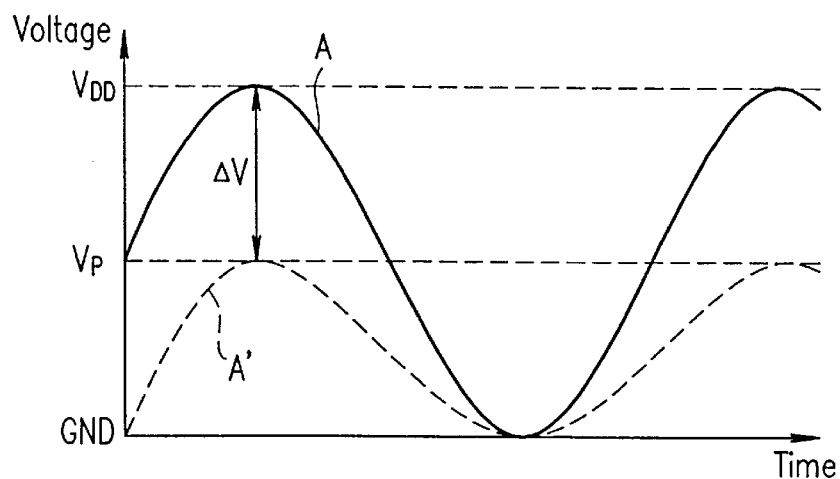

FIG. 61B illustrates how the power supply voltage $V_{DD}$ is decreased by decreasing the amplitude of the alternating-current waveform (A) by using only one fundamental resonance circuit. The waveform (A') is a waveform obtained by decreasing the amplitude of the alternating-current waveform (A). The voltage different $\Delta V$ between the voltage $V_p$ and the waveform (A') is ($V_{DD}-V_p$) at minimum. Therefore, there is a large energy loss occurring when the switch is turned ON.

Figure 61C:
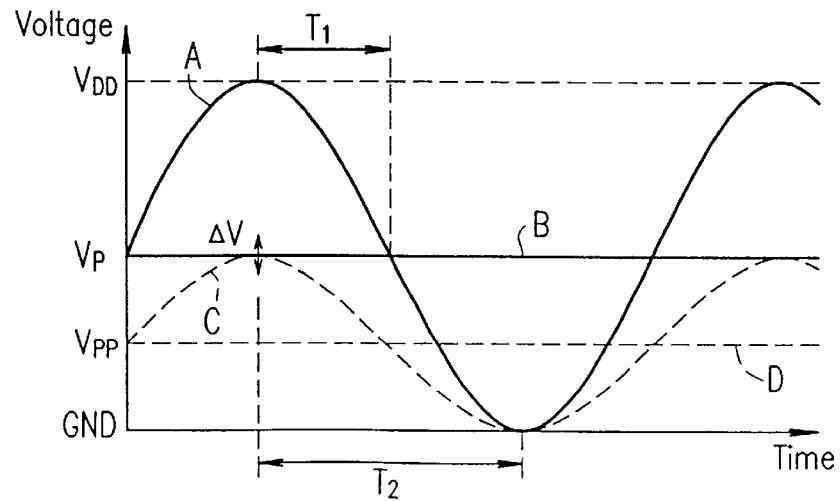

FIG. 61C illustrates how the power supply voltage $V_{DD}$ is decreased by using the voltage conversion section 1501 in which two fundamental resonance circuits are serially connected together. The structure in which fundamental resonance circuits are serially connected together solves the problems arising when the power supply voltage $V_{DD}$ is decreased by using only one fundamental resonance circuit.

In FIG. 61C, the waveform (A) represents a change in the voltage at the node 1504-1 of the resonance circuit LC1. The waveform (A) is an alternating-current waveform which oscillates between the power supply voltage $V_{DD}$ and the ground GND with the voltage $V_P$ being the center thereof. The waveform (B) represents a change in the voltage at the node 1504-2 of the resonance circuit LC1. The waveform (B) is a direct-current waveform of the voltage $V_P$. The waveform (C) represents a change in the voltage at the node 1508-1 of the resonance circuit LC2. The waveform (C) is an alternating-current waveform which oscillates between the voltage $V_P$ and the ground GND with the voltage $V_{PP}$ being the center thereof. The waveform (D) represents a change in the voltage at the node 1508-2 of the resonance circuit LC2. The waveform (D) is a direct-current waveform of the voltage $V_{PP}$. Herein, $V_{DD}>V_P>V_{PP}>\text{GND}$.

The resonance circuit LC2 can utilize the voltage $V_P$ output from the resonance circuit LC1 as a power supply voltage. Therefore, the switch 1502 can be turned ON in the period during which a potential difference $\Delta V$ exists between the voltage $V_P$ and the waveform (C). By controlling the ON period of the switch 1502 as described above, it is possible to minimize the energy loss occurring when turning ON the switch 1502. Moreover, $T_1<T_2$ in FIG. 61C. This shows that the waveform (C) is more suitable than the waveform (A) for the adiabatic charging.

Figure 60B:
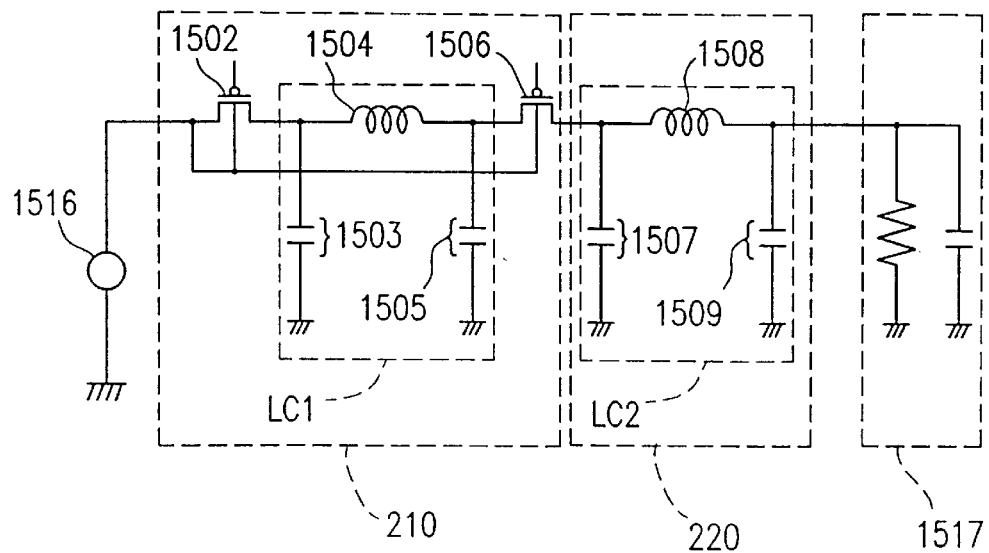

FIG. 60B illustrates what has been obtained by reviewing the structure of the voltage conversion section 1501 in view of the "energy supplying circuit 210" and the "energy preserving circuit 220". As illustrated in FIG. 60B, the switch 1502, the resonance circuit LC1 and the switch 1506 can be considered as the "energy supplying circuit 210", and the resonance circuit LC2 can be considered as the "energy preserving circuit 220". In this case, the resonance circuit LC1 has a function as a capacitor for temporarily storing a return current flowing from the resonance circuit LC2 through the switch 1506 toward the power supply 1516. In this sense, the voltage conversion section 1501 has a structure similar to that illustrated in FIG. 6D. When storing the current from the power supply 1516 in the resonance circuit LC1, the voltage conversion section 1501 has an advantage that the power is lower as compared to the structure illustrated in FIG. 6D. This is because the switch 1502 can be turned ON in the period during which the potential difference between the terminals of the switch 1502.

Figure 62A:
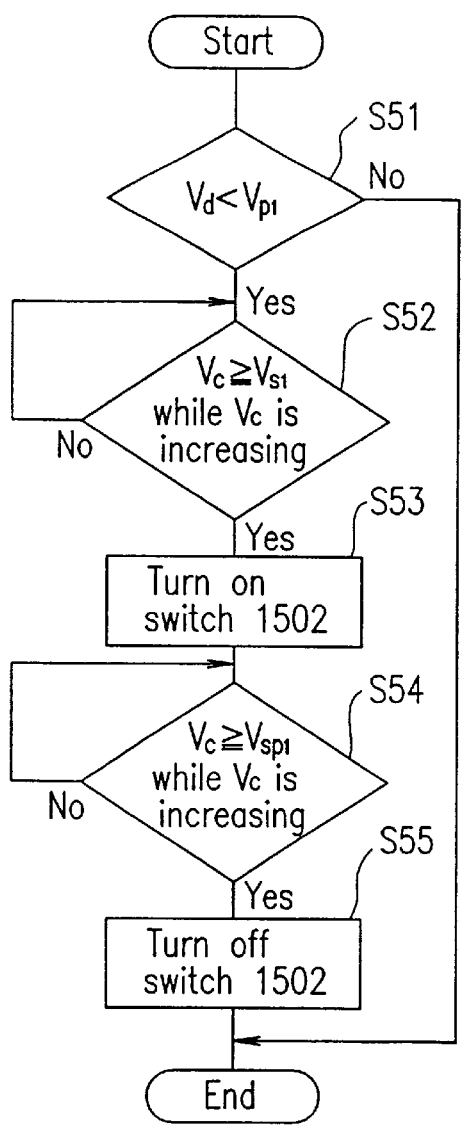
FIG. 62A is a control flow diagram illustrating a timing at which a control section 1518 turns ON/OFF a switch 1502 of the voltage conversion section 1501.

FIG. 62A is a control flow diagram illustrating the timing at which the control section 1518 turns ON/OFF the switch 1502 of the voltage conversion section 1501.

Step S51: The detection section 1510 compares the voltage $V_d$ at the terminal 1501d with the target voltage $V_{P1}$. When the voltage $V_d$ is smaller than the target voltage $V_{P1}$, the process proceeds to step S52. In such a case, the detection section 1510 outputs to the detection section 1512 a detection signal indicating that the voltage $V_d$ is smaller than the target voltage $V_{P1}$.

Step S52: The detection section 1512 determines whether the voltage $V_c$ has become equal to or greater than a predetermined voltage $V_{s1}$ while the voltage $V_c$ is increasing. The predetermined voltage $V_{s1}$ is used to determine the timing to turn the switch 1502 ON from OFF. When the voltage $V_c$ has become equal to or greater than the predetermined voltage $V_{s1}$ while the voltage $V_c$ is increasing, the process proceeds to step S53. In such a case, the detection section 1512 outputs to the synchronization section 1511 a detection signal indicating that the voltage $V_c$ has become equal to or greater than the predetermined voltage $V_{s1}$ while the voltage $V_c$ is increasing.

Step S53: The synchronization section 1511 turns ON the switch 1502.

Step S54: The detection section 1512 determines whether the voltage $V_c$ at the terminal 1501c has become equal to or greater than a predetermined voltage $V_{sp1}$ while the voltage $V_c$ is increasing. The predetermined voltage $V_{sp1}$ is used to determine the timing to turn the switch 1502 OFF from ON. When the voltage $V_c$ becomes equal to or greater than the predetermined voltage $V_{sp1}$ while the voltage $V_c$ is increasing, the process proceeds to step S55. In such a case, the detection section 1512 outputs to the synchronization section 1511 a detection signal indicating that the voltage $V_c$ has become equal to or greater than the predetermined voltage $V_{sp1}$ while the voltage $V_c$ is increasing.

Step S55: The synchronization section 1511 turns OFF the switch 1502.

Herein, the predetermined voltage $V_{sp1}$ is larger than the predetermined voltage $V_{s1}$. As the potential difference between the predetermined voltage $V_{sp1}$ and the predetermined voltage $V_{s1}$ becomes larger, the period during which the switch 1502 is ON is longer.

Figure 62B:
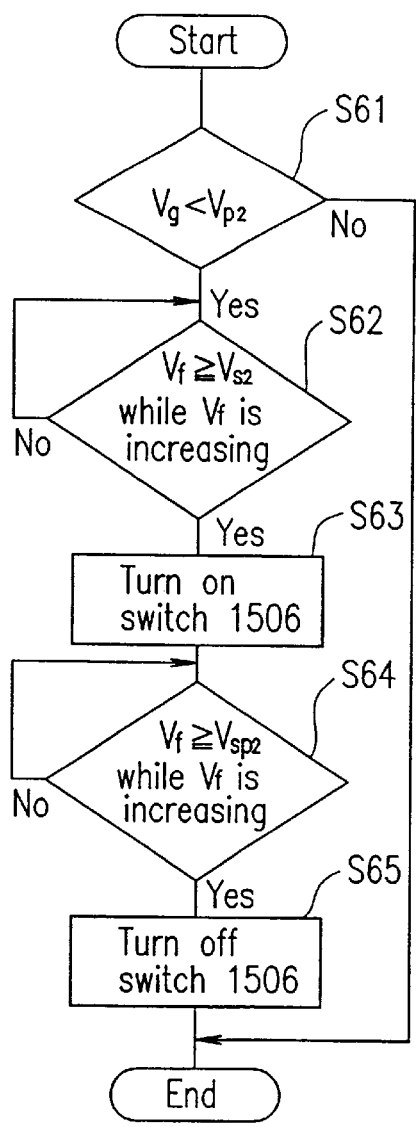
FIG. 62B is a control flow diagram illustrating a timing at which the control section 1518 turns ON/OFF a switch 1506 of the voltage conversion section 1501.

FIG. 62B is a control flow diagram illustrating the timing at which the control section 1518 turns ON/OFF the switch 1506 of the voltage conversion section 1501. The control flow diagram illustrated in FIG. 62B is similar to the control flow diagram illustrated in FIG. 62A except that a voltage $V_{p2}$ is used as the target voltage and that a voltage $V_{s2}$ and a voltage $V_{sp2}$ are used as voltages for determining the ON period of the switch 1506.

Thus, the ON/OFF of the switch 1506 can be controlled independently of the ON/OFF of the switch 1502.

When the voltage $V_d$ at the terminal 1501d is a direct current, the voltage conversion efficiency is not influenced even when the sinusoidal wave oscillation in the resonance circuit LC1 and the sinusoidal wave oscillation in the resonance circuit LC2 are operated independently of each other. This is because the resonance circuit LC2 operates with the voltage $V_d$ as the power supply voltage.

When the voltage $V_d$ at the terminal 1501 is an alternating current, on the other hand, whether the voltage $V_d$ at the terminal 1501d and the voltage $V_f$ at the terminal 1501f are synchronized with each other influences the conversion efficiency. In order to reduce the energy loss occurring when transferring energy from the resonance circuit LC1 to the resonance circuit LC2, it is necessary to control the amplitude and the phase of the voltage $V_f$ so that the switch 1506 is turned ON in the period during which the potential difference between the terminals of the switch 1506 (i.e., the potential difference between the voltage $V_d$ and the voltage $V_f$) is small. Such control can be achieved by, for example, variably controlling the voltage $V_{s2}$ and the voltage $V_{sp2}$ used to determine the ON period of the switch 1506.

FIG. 63A illustrates the timing to turn ON/OFF the switch 1506 in the case where the voltage $V_d$ and the voltage $V_f$ are synchronized with each other. FIG. 63B illustrates the timing to turn ON/OFF the switch 1506 in the case where the voltage $V_d$ and the voltage $V_f$ are not sufficiently synchronized with each other.

In FIGS. 63A and 63B, the waveform (A) represents a change in the voltage $V_d$, and the waveform (B) represents a change in the voltage $V_f$. The potential difference between the terminals of the switch 1506 during the ON period of the switch 1506 (i.e., the potential difference between the voltage $V_d$ and the voltage $V_f$) is smaller in FIG. 63A than in FIG. 63B. Therefore, the energy loss due to the switch 1506 is less in FIG. 63A than in FIG. 63B.

(Embodiment 8)

Figure 64:
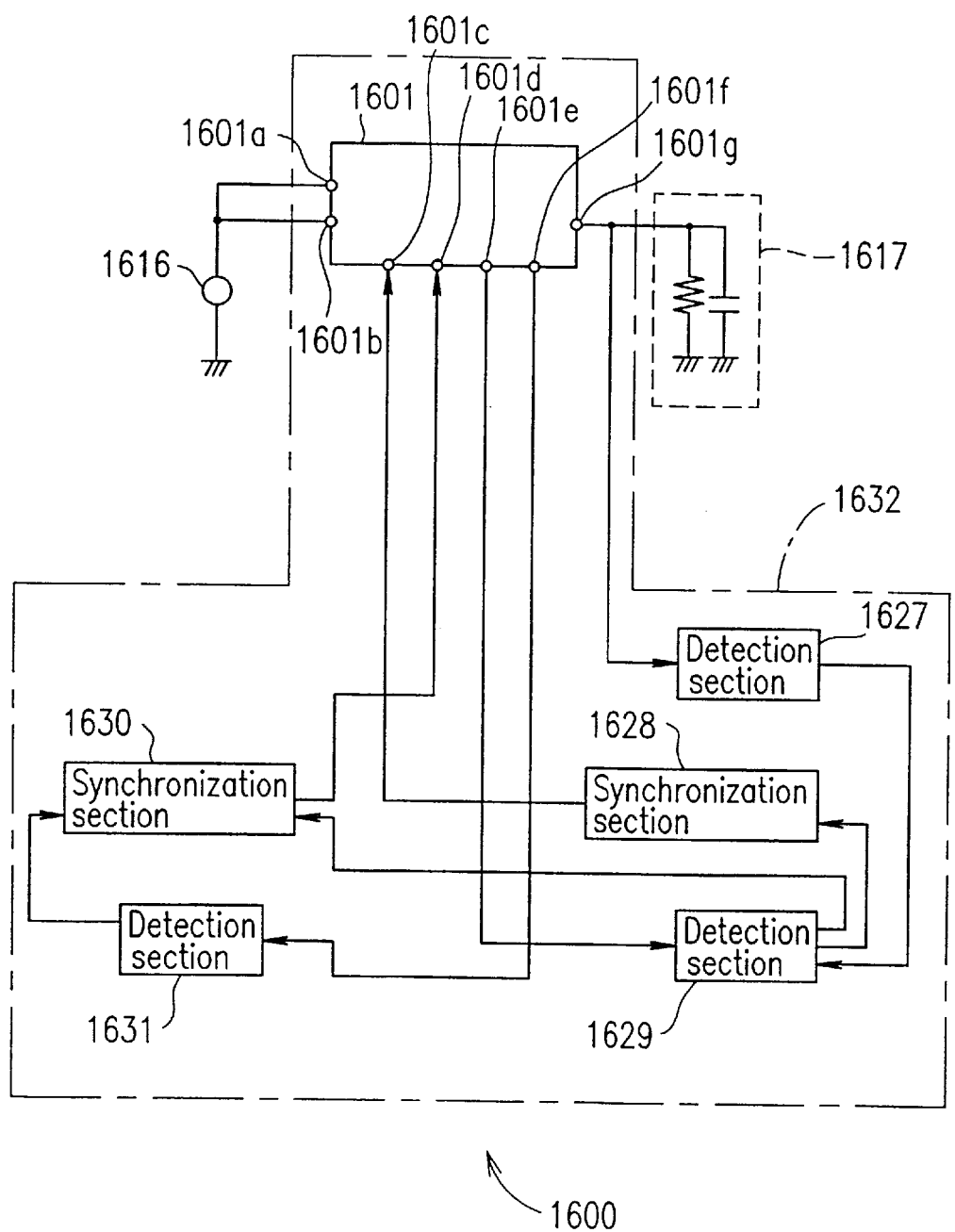
FIG. 64 is a diagram illustrating a structure of a voltage converter 1600.

FIG. 64 illustrates a structure of a voltage converter 1600. The voltage converter 1600 includes a voltage conversion section 1601 for converting a power supply voltage supplied from a power supply 1616 to a desired voltage, and a control section 1632 for controlling the voltage conversion section 1601.

The voltage conversion section 1601 includes terminals 1601a–1601g. The terminal 1601a and the terminal 1601b are connected to the power supply 1616. The terminal 1601g is connected to a load 1617. The load 1617 includes at least one of a resistance component and a capacitance component.

The desired voltage output from the voltage conversion section 1601 is supplied to the load 1617 via the terminal 1601g.

The control section 1632 includes detection sections 1627, 1629 and 1631, and synchronization sections 1628 and 1630.

Figure 65:
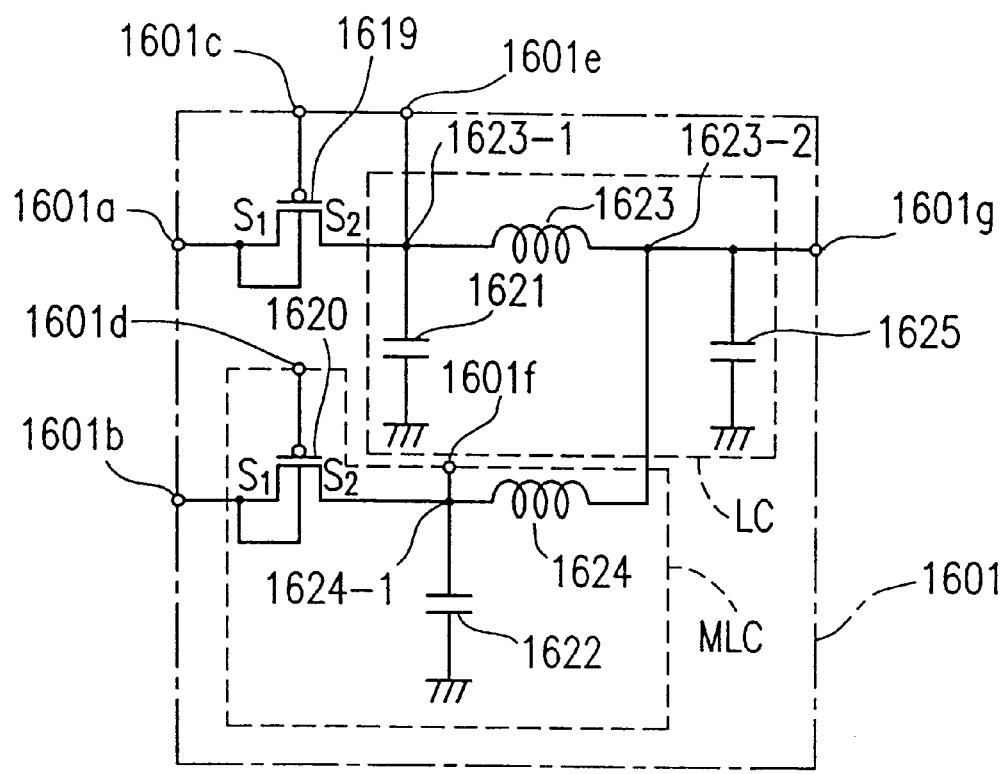
FIG. 65 is a diagram illustrating a structure of a voltage conversion section 1601.

FIG. 65 illustrates a structure of the voltage conversion section 1601. The voltage conversion section 1601 includes a switch 1619, a resonance circuit LC, and a modulation resonance circuit MLC.

The resonance circuit LC includes an inductor 1623, a capacitance 1621 connected to one end of the inductor 1623 at a node 1623-1, and a capacitance 1625 connected to the other end of the inductor 1623 at a node 1623-2.

The switch 1619 has a terminal $S_1$ and a terminal $S_2$. In response to a control signal, the switch 1619 electrically connects the terminal $S_1$ and the terminal $S_2$ to each other, or electrically separates the terminal $S_1$ and the terminal $S_2$ from each other. The control signal is supplied from the synchronization section 1628 via the terminal 1601c. The terminal $S_1$ of the switch 1619 is connected to the power supply 1616 via the terminal 1601a. The terminal $S_2$ of the switch 1619 is connected to the node 1623-1 of the resonance circuit LC.

The modulation resonance circuit MLC includes an inductor 1624, a capacitance 1622, and a switch 1620. One end of the inductor 1624 is connected to the capacitance 1622 at the node 1624-1. The other end of the inductor 1624 is connected to the node 1623-2 of the resonance circuit LC.

The switch 1620 has a terminal $S_1$ and a terminal $S_2$. In response to a control signal, the switch 1620 electrically connects the terminal $S_1$ and the terminal $S_2$ to each other, or electrically separates the terminal $S_1$ and the terminal $S_2$ from each other. The control signal is supplied from the synchronization section 1630 via the terminal 1601d. The terminal $S_1$ of the switch 1620 is connected to the power supply 1616 via the terminal 1601b. The terminal $S_2$ of the switch 1620 is connected to the node 1624-1.

The voltage conversion section 1601 can be considered as comprising a first fundamental resonance circuit including the switch 1619, the inductor 1623, and the capacitances 1621 and 1625, and a second fundamental resonance circuit including the switch 1620, the detection section 1624, and the capacitances 1622 and 1625. In particular, the capacitance 1625 functions as a capacitance which is common to the first fundamental resonance circuit and the second fundamental resonance circuit. The voltage conversion section 1601 has an advantage of outputting a ripple-less direct-current voltage from the terminal 1601g.

The voltage at the terminal 1601g is equal to a voltage which is obtained by superposing the voltage output from the first fundamental resonance circuit and the voltage output from the second fundamental resonance circuit on each other. Therefore, it is possible to obtain a direct-current voltage, in which ripple is eliminated, at the terminal 1601g by controlling the voltage conversion section 1601 so that the voltage output from the first fundamental resonance circuit and the voltage output from the second fundamental resonance circuit have the same amplitude and have inverted phases which are shifted by 180 degrees from each other.

Figure 66:
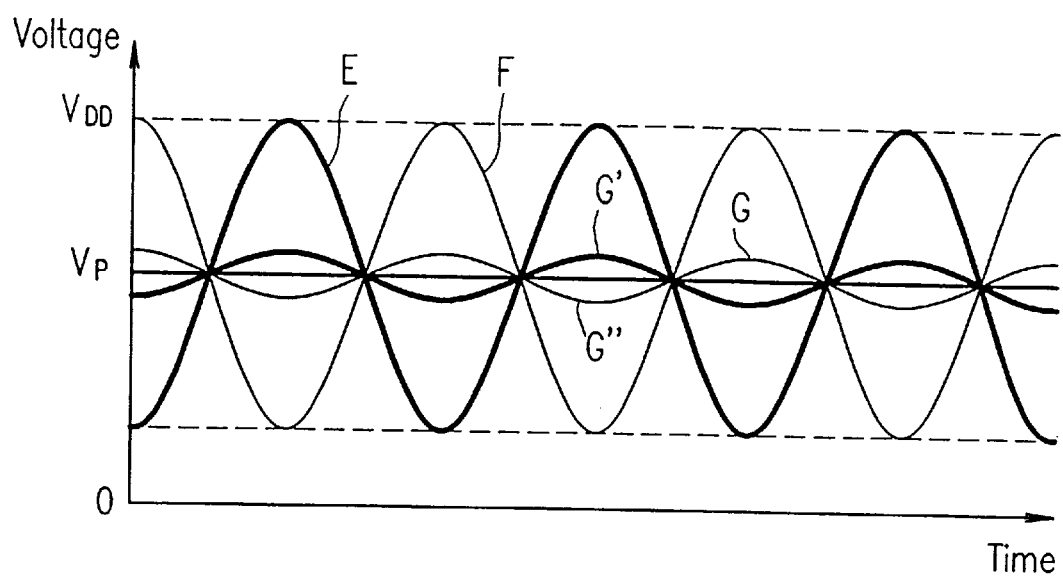
FIG. 66 is a diagram illustrating voltage changes at respective points in the voltage conversion section 1601 in a steady state.

FIG. 66 illustrates voltage changes at respective points in the voltage conversion section 1601 under a steady state. A curve E represents a voltage change at the terminal 1601e. A curve F represents a voltage change at the terminal 1601f. A curve G' represents a change in the voltage output from the second fundamental resonance circuit. A curve G" represents a change in the voltage output from the first fundamental resonance circuit. A curve G is obtained by superposing curve G' and curve G" on each other, based on the principle of superposition.

The control section 1632 controls the timing to open/close the switch 1620 so that the voltage at the terminal 1601e (curve E) and the voltage at the terminal 1601f (curve F) have the same amplitude and have the inverted phases which are shifted by 180 degrees from each other. Such control results in that the voltage output from the first fundamental resonance circuit (curve G") and the voltage output from the second fundamental resonance circuit (curve G') have the same amplitude and have the inverted phases which are shifted by 180 degrees from each other. As a result, the oscillation of curve G' and the oscillation of curve G' are canceled out by each other, thereby obtaining the direct-current voltage (curve G) with no oscillation. Thus, it is possible to eliminate ripple from the direct-current voltage output from the terminal 1601g.

When the voltage at the terminal 1601e and the voltage at the terminal 1601f do not have the inverted phases, the control section 1632 controls the timing to turn ON/OFF the switch 1620 so that the voltage at the terminal 1601e and the voltage at the terminal 1601f have the inverted phases. Specifically, the control section 1632 adjusts the relationship between the phase of the voltage at the terminal 1601e and the phase of the voltage at the terminal 1601f by advancing or delaying the phase of the voltage at the terminal 1601f with respect to the phase of the voltage at the terminal 1601e as a reference.

Figure 67:
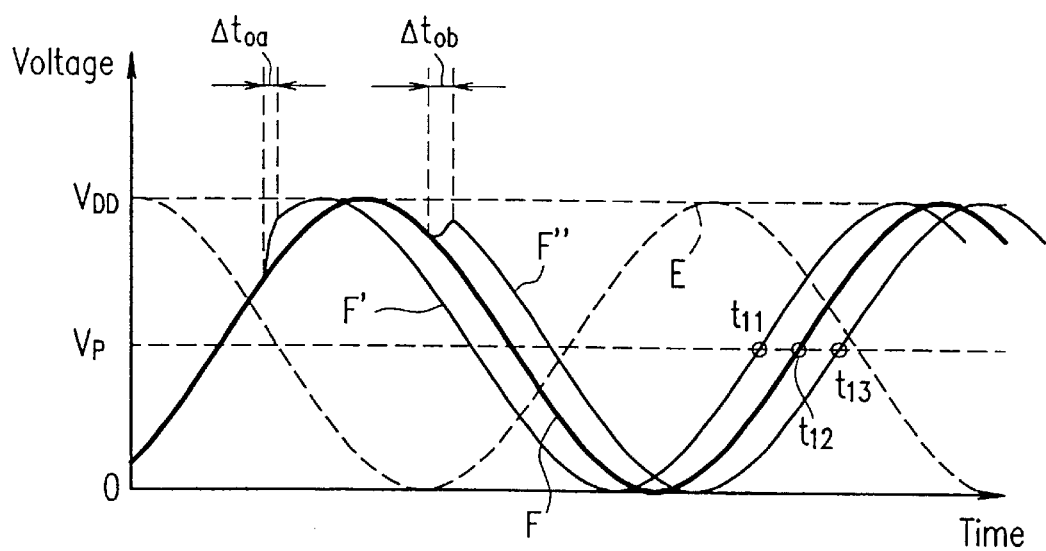
FIG. 67 is a diagram illustrating how a relationship between a phase of a voltage at a terminal 1601e and a phase of a voltage at a terminal 1601f is adjusted.

FIG. 67 illustrates how the relationship between the phase of the voltage at the terminal 1601e and the phase of the voltage at the terminal 1601f is adjusted. In FIG. 67, curve E represents a voltage change at the terminal 1601e, and curve F represents a voltage change at the terminal 1601f.

By turning ON the switch 1620 in the period $\Delta t_{oa}$ during which the voltage at the terminal 1601f is increasing, the voltage at the terminal 1601f is raised. Thus, curve F transitions to a curve F'. This means advancing the phase of curve F. Moreover, by adjusting the length of the period $\Delta t_{oa}$ during which the switch 1620 is turned ON, it is possible to adjust the degree by which the phase of curve F is advanced.

By turning ON the switch 1620 in the period $\Delta t_{ob}$ during which the voltage at the terminal 1601f is decreasing, the voltage at the terminal 1601f is raised. Thus, curve F transitions to curve F". This means delaying the phase of curve F. Moreover, by adjusting the length of the period $\Delta t_{ob}$ during which the switch 1620 is turned ON, it is possible to adjust the degree by which the phase of curve F is delayed.

Thus, the phase of the voltage at the terminal 1601f (curve F) can be advanced or delayed.

Figure 68A:
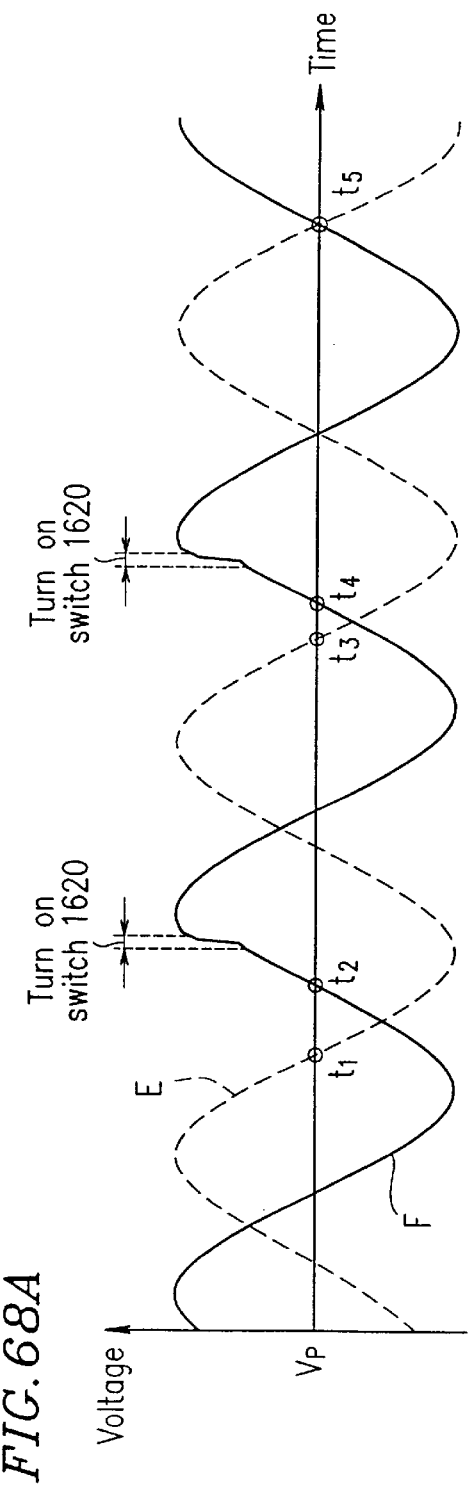
FIGS. 68A and 68B are diagrams each illustrating how a voltage at the terminal 1601e (curve E) and a voltage at the terminal 1601f (curve F) have inverted phases.

FIG. 68A illustrates how the voltage at the terminal 1601e (curve E) and the voltage at the terminal 1601f (curve F) are made to have the inverted phases by advancing the phase of the voltage at the terminal 1601f (curve F). In FIG. 68A, by turning ON the switch 1620 while the voltage at the terminal 1601f is increasing, the voltage at the terminal 1601e and the voltage at the terminal 1601f have the inverted phases at time $t_5$.

Figure 68B:
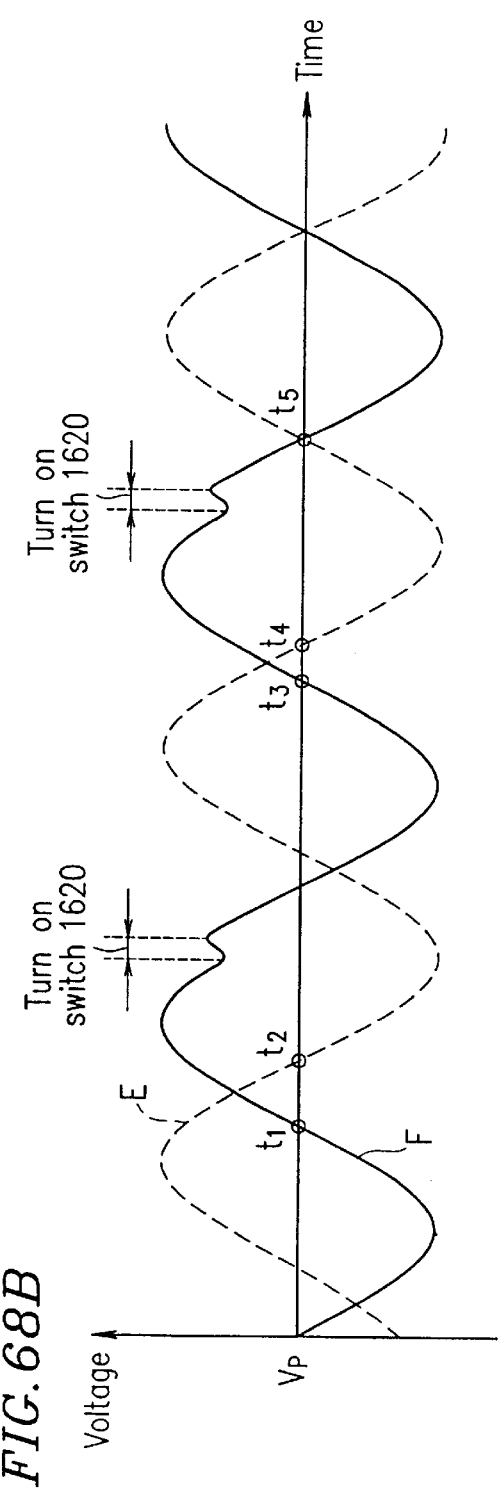

FIG. 68B illustrates how the voltage at the terminal 1601e (curve E) and the voltage at the terminal 1601f (curve F) are made to have the inverted phases by delaying the phase of the voltage at the terminal 1601f (curve F). In FIG. 68B, by turning ON the switch 1620 while the voltage at the terminal 1601f is decreasing, the voltage at the terminal 1601e and the voltage at the terminal 1601f have the inverted phases at time $t_5$.

An operation of the control section 1632 will now be described.

Figure 69:
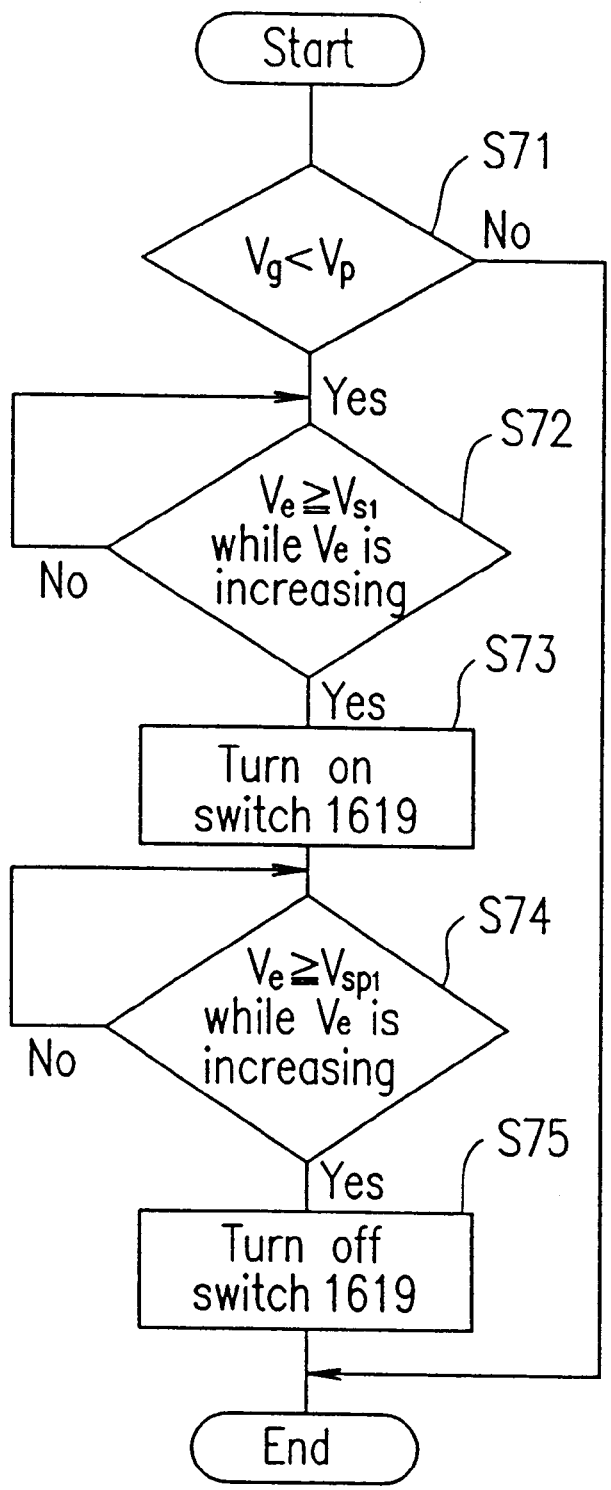
FIG. 69 is a control flow diagram illustrating a timing at which a control section 1632 turns ON/OFF a switch 1619 of the voltage conversion section 1601.

FIG. 69 is a control flow diagram illustrating the timing at which the control section 1632 turns ON/OFF the switch 1619 of the voltage conversion section 1601.

Step S71: The detection section 1627 compares the voltage $V_g$ at the terminal 1601g with the target voltage $V_p$. When the voltage $V_g$ is smaller than the target voltage $V_p$, the process proceeds to step S72. In this case, the detection section 1627 outputs to the detection section 1629 a detection signal indicating that the voltage $V_g$ is smaller than the target voltage $V_p$.

Step S72: The detection section 1629 determines whether the voltage $V_e$ at the terminal 1601e has become equal to or greater than a predetermined voltage $V_{s1}$ while the voltage $V_e$ at the terminal 1601e is increasing. The predetermined voltage $V_{s1}$ is used to determine the timing to turn the switch 1619 ON from OFF. When the voltage $V_e$ becomes equal to or greater than the predetermined voltage $V_{s1}$ while the voltage $V_e$ is increasing, the process proceeds to step S73. In this case, the detection section 1629 outputs to the synchronization section 1628 a detection signal indicating that the voltage $V_e$ has become equal to or greater than the predetermined voltage $V_{s1}$ while the voltage $V_e$ is increasing.

Step S73: The synchronization section 1628 turns ON the switch 1619.

Step S74: The synchronization section 1629 determines whether the voltage $V_e$ has become equal to or greater than a predetermined voltage $V_{sp1}$ while the voltage $V_e$ at the terminal 1601e is increasing. The predetermined voltage age $V_{sp1}$ is used to determine the timing to turn the switch 1619 OFF from ON. When the voltage $V_e$ becomes equal to or greater than the predetermined voltage $V_{sp1}$ while the voltage $V_e$ is increasing, the process proceeds to step S75. In this case, the detection section 1629 outputs to the synchronization section 1628 a detection signal indicating that the voltage $V_e$ has become equal to or greater than the predetermined voltage $V_{sp1}$ while the voltage $V_e$ is increasing.

Step S75: The synchronization section 1628 turns OFF the switch 1619.

Herein, the predetermined voltage $V_{sp1}$ is larger than the predetermined voltage $V_{s1}$. As the potential difference between the predetermined voltage $V_{sp1}$ and the predetermined voltage $V_{s1}$ becomes larger, the period during which the switch 1619 is ON is longer.

Figure 70:
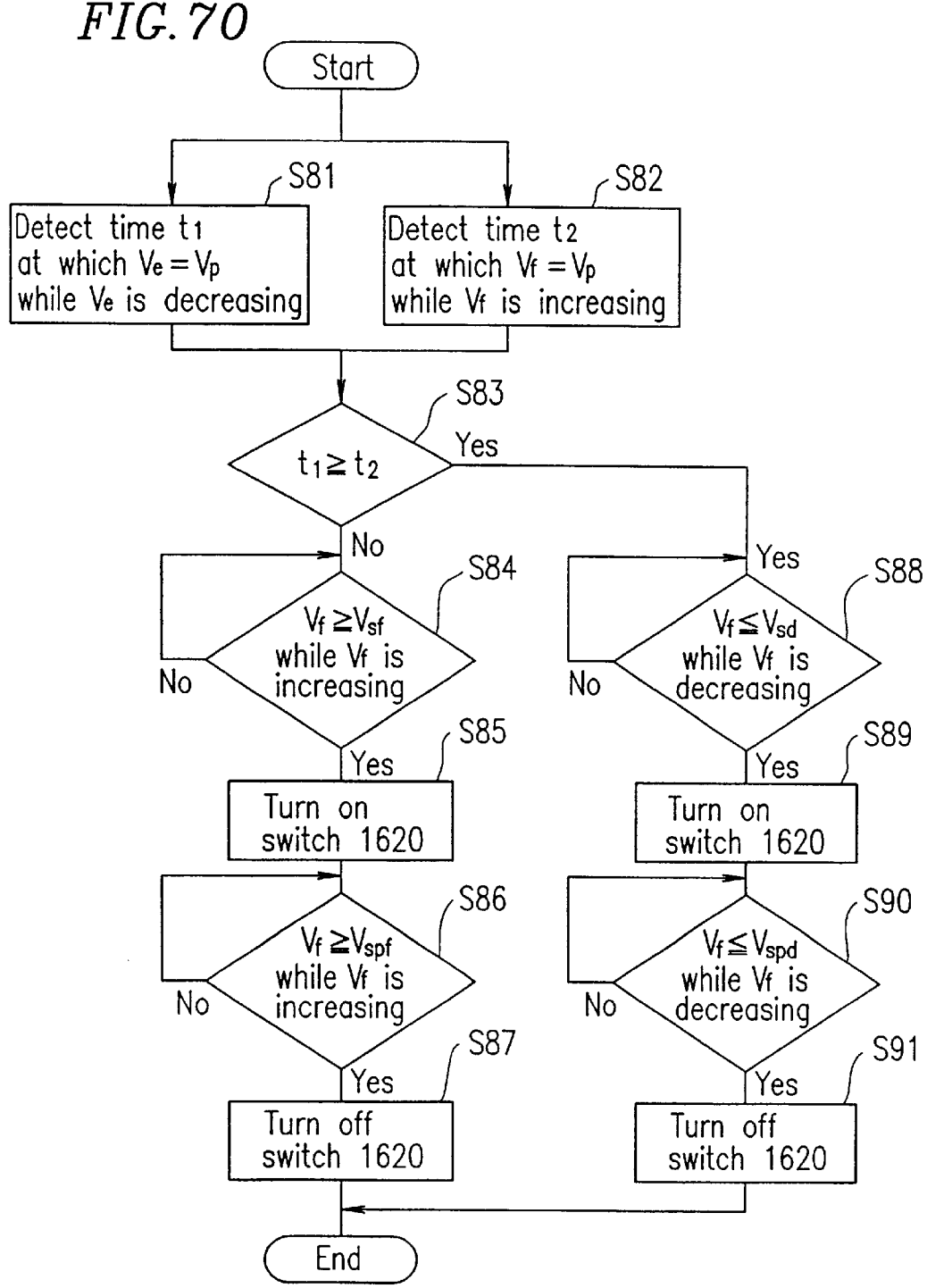
FIG. 70 is a control flow diagram illustrating a timing at which the control section 1632 turns ON/OFF a switch 1620 of the voltage conversion section 1601.

FIG. 70 is a control flow diagram illustrating the timing at which the control section 1632 turns ON/OFF the switch 1620 of the voltage conversion section 1601.

Step S81: The detection section 1629 detects time $t_1$ at which the voltage $V_e$ matches the target voltage $V_p$ while the voltage $V_e$ at the terminal 1601e is decreasing. The detected time $t_1$ is notified to the synchronization section 1630.

Step S82: The detection section 1631 detects time $t_2$ at which the voltage $V_f$ matches the target voltage $V_p$ while the voltage $V_f$ at the terminal 1601f is increasing. The detected time $t_2$ is notified to the synchronization section 1630.

Step S83: The synchronization section 1630 compares time $t_1$ with time $t_2$. When $t_1 < t_2$, the process proceeds to step S84. When $t_1 \geq t_2$, the process proceeds to step S88.

Step S84: The detection section 1631 determines whether the voltage $V_f$ has become equal to or greater than a predetermined voltage $V_{sf}$ while the voltage $V_f$ is increasing. The predetermined voltage $V_{sf}$ is used to determine the timing to turn the switch 1620 ON from OFF. When the voltage $V_f$ becomes equal to or greater than the predetermined voltage $V_{sf}$ while the voltage $V_f$ is increasing, the process proceeds to step S85. In this case, the detection section 1631 outputs to the synchronization section 1630 a detection signal indicating that the voltage $V_f$ has become equal to or greater than the predetermined voltage $V_{sf}$ while the voltage $V_f$ is increasing.

Step S85: The synchronization section 1630 turns ON the switch 1620.

Step S86: The detection section 1631 determines whether the voltage $V_f$ has become equal to or greater than a predetermined voltage $V_{spf}$ while the voltage $V_f$ is increasing. The predetermined voltage $V_{spf}$ is used to determine the timing to turn the switch 1620 OFF from ON. When the voltage $V_f$ becomes equal to or greater than the predetermined voltage $V_{spf}$ while the voltage $V_f$ is increasing, the process proceeds to step S87. In this case, the detection section 1631 outputs to the synchronization section 1630 a detection signal indicating that the voltage $V_f$ has become equal to or greater than the predetermined voltage $V_{spf}$ while the voltage $V_f$ is increasing.

Step S87: The synchronization section 1630 turns OFF the switch 1620.

Herein, the predetermined voltage $V_{spf}$ is larger than the predetermined voltage $V_{sf}$. As the potential difference between the predetermined voltage $V_{spf}$ and the predetermined voltage $V_{sf}$ becomes larger, the period during which the switch 1620 is ON is longer.

Step S88: The detection section 1631 determines whether the voltage $V_f$ has become less than or equal to a predetermined voltage $V_{sd}$ while the voltage $V_f$ is decreasing. The predetermined voltage $V_{sd}$ is used to determine the timing to turn the switch 1620 ON from OFF. When the voltage $V_f$ becomes less than or equal to the predetermined voltage $V_{sd}$ while the voltage $V_f$ is decreasing, the process proceeds to step S89. In this case, the detection section 1631 outputs to the synchronization section 1630 a detection signal indicating that the voltage $V_f$ has become less than or equal to the predetermined voltage $V_{sd}$ while the voltage $V_f$ is decreasing.

Step S89: The synchronization section 1630 turns ON the switch 1620.

Step S90: The detection section 1631 determines whether the voltage $V_f$ has become less than or equal to a predetermined voltage $V_{spd}$ while the voltage $V_f$ is decreasing. The predetermined voltage $V_{spd}$ is used to determine the timing to turn the switch 1620 OFF from ON. When the voltage $V_f$ becomes less than or equal to the predetermined voltage $V_{spd}$ while the voltage $V_f$ is decreasing, the process proceeds to step S91. In this case, the detection section 1631 outputs to the synchronization section 1630 a detection signal indicating that the voltage $V_f$ has become less than or equal to the predetermined voltage $V_{spd}$ while the voltage $V_f$ is decreasing.

Step S91: The synchronization section 1630 turns OFF the switch 1620.

Herein, the predetermined voltage $V_{spd}$ is smaller than the predetermined voltage $V_{sd}$. As the potential difference between the predetermined voltage $V_{spd}$ and the predetermined voltage $V_{sd}$ becomes larger, the period during which the switch 1620 is ON is longer.

(Embodiment 9)

Figure 71:
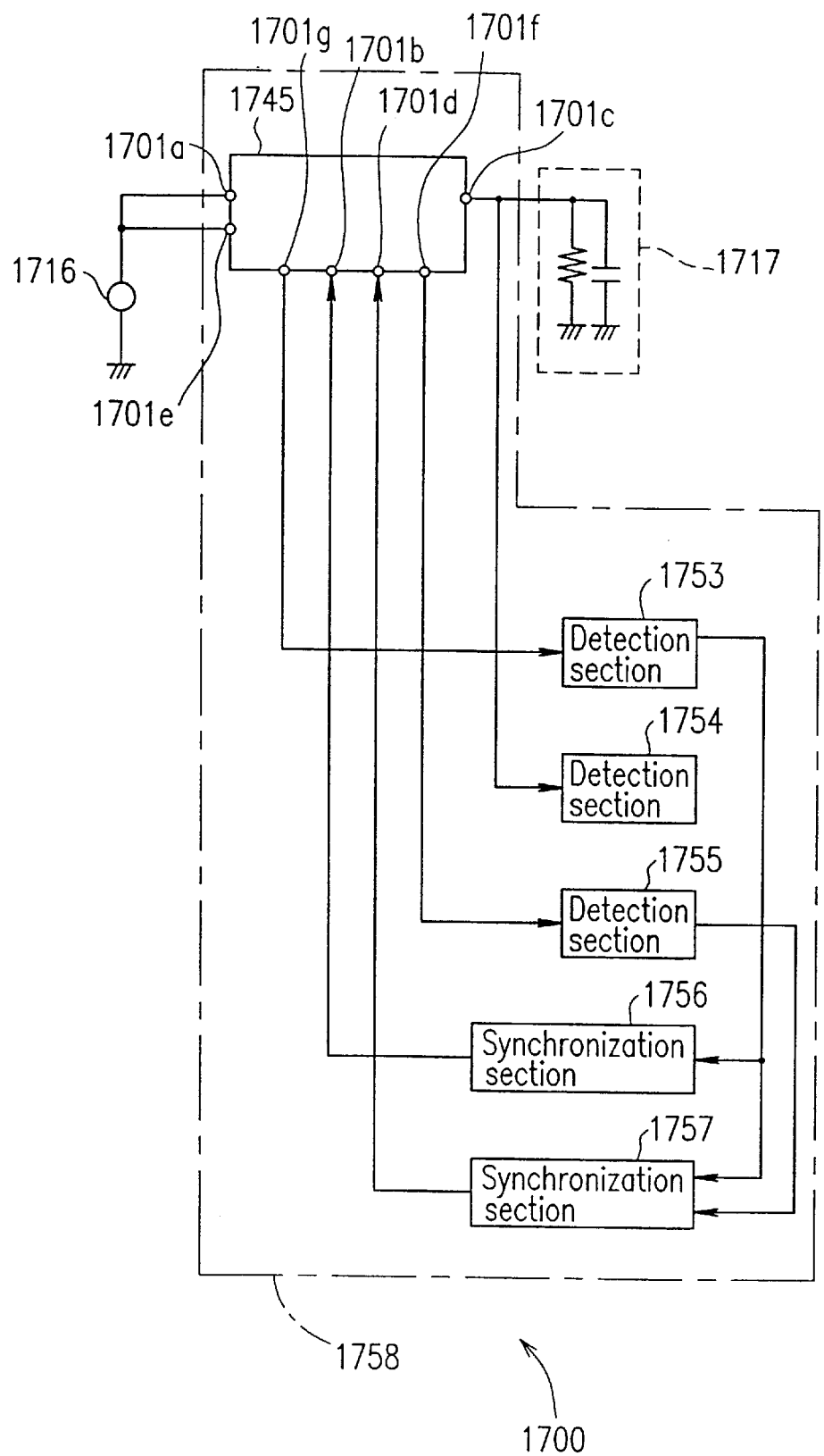
FIG. 71 is a diagram illustrating a structure of a voltage converter 1700.

FIG. 71 illustrates a structure of a voltage converter 1700. The voltage converter 1700 includes a voltage conversion section 1701 for converting a power supply voltage supplied from a power supply 1716 to a desired voltage, and a control section 1758 for controlling the voltage conversion section 1701.

The voltage conversion section 1701 includes terminals 1701a–1701g. The terminal 1701a and the terminal 1701e are connected to the power supply 1716. The terminal 1701c is connected to a load 1717. The load 1717 includes at least one of a resistance component and a capacitance component. The desired voltage output from the voltage conversion section 1701 is supplied to the load 1717 via the terminal 1701c.

The control section 1758 includes detection sections 1753–1755, and synchronization sections 1756 and 1757.

Figure 72:
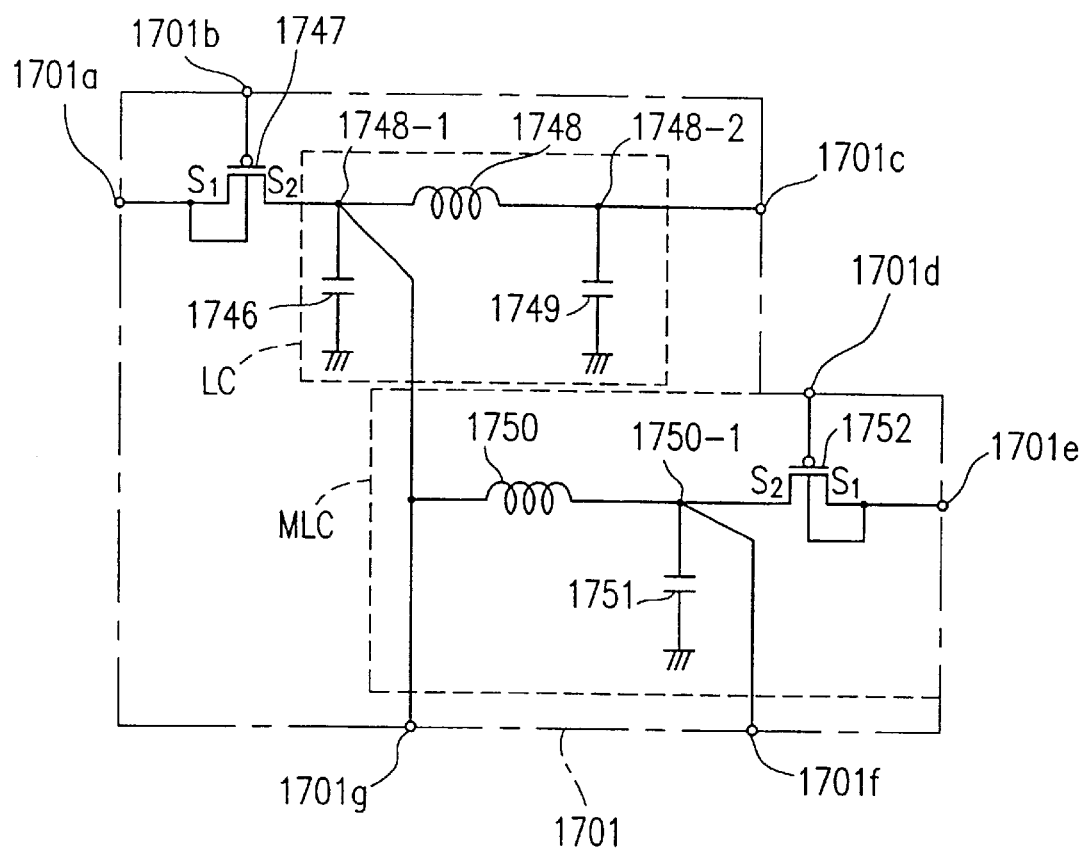
FIG. 72 is a diagram illustrating a structure of a voltage conversion section 1701.

FIG. 72 illustrates a structure of a voltage conversion section 1701. The voltage conversion section 1701 includes a switch 1747, a resonance circuit LC, and a modulation resonance circuit MLC.

The resonance circuit LC includes an inductor 1748, a capacitance 1746 connected to one end of the inductor 1748 at a node 1748-1, and a capacitance 1749 connected to the other end of the inductor 1748 at a node 1748-2.

The switch 1747 has a terminal $S_1$ and a terminal $S_2$. In response to a control signal, the switch 1747 electrically connects the terminal $S_1$ and the terminal $S_2$ to each other, or electrically separates the terminal $S_1$ and the terminal $S_2$ from each other. The control signal is supplied from the synchronization section 1756 via the terminal 1701b. The terminal $S_1$ of the switch 1747 is connected to the power supply 1716 via the terminal 1701a. The terminal $S_2$ of the switch 1747 is connected to the node 1748-1 of the resonance circuit LC.

The modulation resonance circuit MLC includes an inductor 1750, a capacitance 1751, and a switch 1752. One end of the inductor 1750 is connected to the capacitance 1751 at a node 1750-1. The other end of the inductor 1750 is connected to the node 1748-1 of the resonance circuit LC.

The switch 1752 has a terminal $S_1$ and a terminal $S_2$. In response to a control signal, the switch 1752 electrically connects the terminal $S_1$ and the terminal $S_2$ to each other, or electrically separates the terminal $S_1$ and the terminal $S_2$ from each other. The control signal is supplied from the synchronization section 1757 via the terminal 1701d. The terminal $S_1$ of the switch 1752 is connected to the power supply 1716 via the terminal 1701e. The terminal $S_2$ of the switch 1752 is connected to the node 1750-1.

Figure 73A:
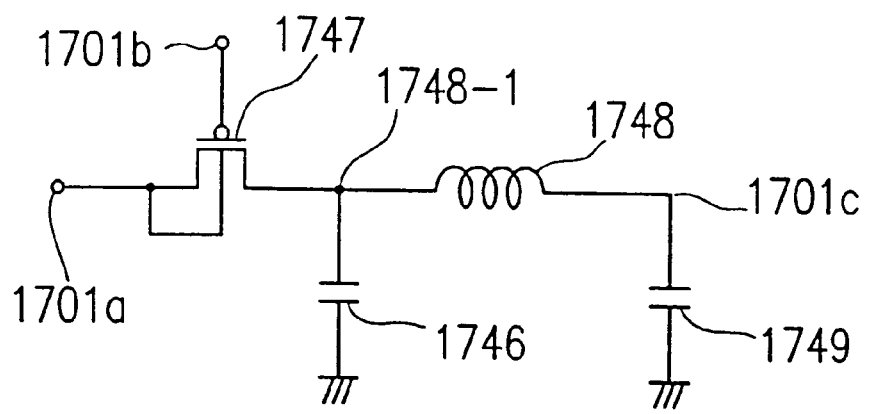
FIG. 73A is a diagram illustrating a structure of a first fundamental resonance circuit.
Figure 73B:
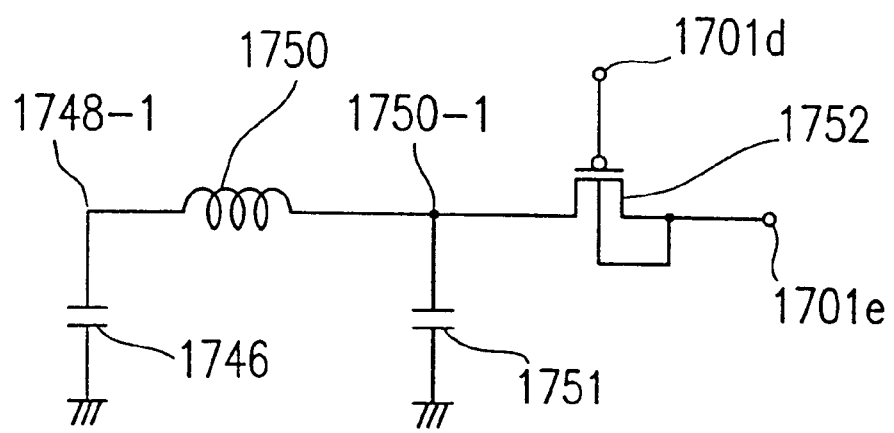
FIG. 73B is a diagram illustrating a structure of a second fundamental resonance circuit.

The voltage conversion section 1701 can be considered as comprising a first fundamental resonance circuit (see FIG. 73A) including the switch 1747, the inductor 1748, and the capacitances 1746 and 1749, and a second fundamental resonance circuit (see FIG. 73B) including the switch 1752, the inductor 1750, and the capacitances 1746 and 1751. In particular, the capacitance 1746 functions as a capacitance which is common to the first fundamental resonance circuit and the second fundamental resonance circuit. The voltage conversion section 1701 has an advantage of providing a long period of time during which the potential difference between the voltage at the terminal 1701g and the power supply voltage $V_{DD}$ is small.

The voltage at the terminal 1701g is equal to a voltage obtained by superposing the voltage at the node 1748-1 in the first fundamental resonance circuit and the voltage at the node 1748-1 in the second fundamental resonance circuit on each other.

Figure 74:
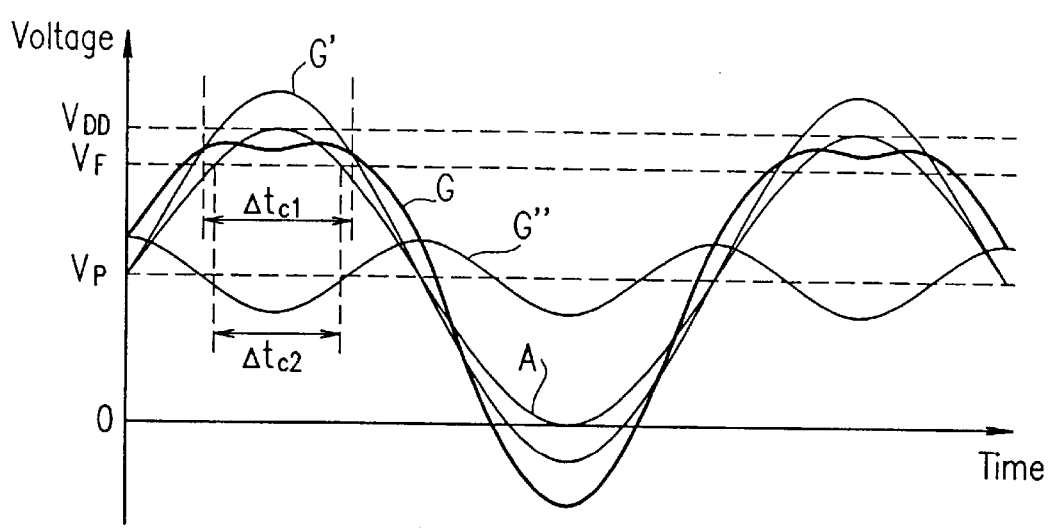
FIG. 74 is a diagram illustrating voltage changes at respective points in the voltage conversion section 1701 in a steady state.

FIG. 74 illustrates voltage changes at respective points in the voltage conversion section 1701 under a steady state. A curve G represents a voltage change at the terminal 1701g. A curve G' represents a voltage change at the node 1748-1 in the first fundamental resonance circuit. A curve G" represents a voltage change at the node 1748-1 in the second fundamental resonance circuit. Curve G is obtained by superposing curve G' and curve G" on each other, based on the principle of superposition.

The phase of curve G' and the phase of curve G" are adjusted by a method similar to the method described in Embodiment 8.

As illustrated in FIG. 74, the period $\Delta t_{c1}$ during which the potential difference between the potential of curve G and the potential of the power supply voltage $V_{DD}$ is longer than the period $\Delta t_{c2}$ during which the potential difference between a normal sinusoidal wave curve A and the potential of the power supply voltage $V_{DD}$. Therefore, by turning ON the switch 1747 in the period $\Delta t_{c1}$, it is possible to reduce the energy loss occurring due to the switch 1747. Thus, by providing the modulation resonance circuit MLC, it is possible to obtain a voltage converter with a higher efficiency which can accept a larger output current, as compared to the case where a normal sinusoidal wave oscillation is used.

11. As System Power Supply for LSI

The power supply apparatus of the present invention has a capability, as a system power supply for an LSI, of supplying different power supply voltages to a plurality of loads, respectively.

Figure 55:
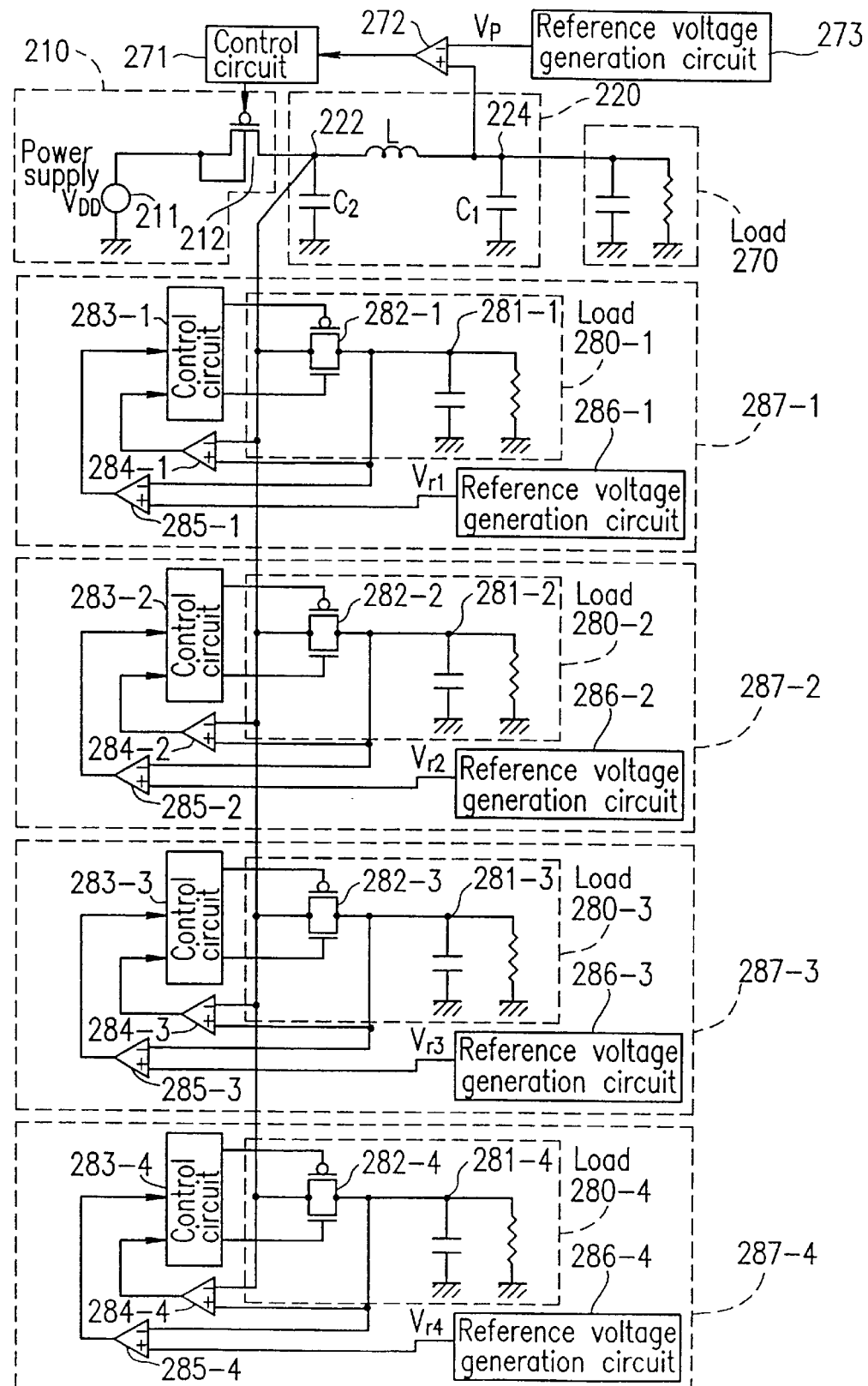
FIG. 55 is a diagram illustrating a structure of a power supply apparatus for supplying different power supply voltages to a plurality of loads.

FIG. 55 illustrates a structure of a power supply apparatus in which a plurality of loads 280-1 to 280-4 are connected to the node 222 of the energy preserving circuit 220. The structure of each of energy receiving sections 287-1 to 287-4, which includes loads 280-1 to 280-4, respectively, is similar to the structure thereof illustrated in FIG. 17A. The energy receiving sections 287-1 to 287-4 are different in that a reference voltage generation circuit 286-1 outputs a reference voltage $V_{r1}$, a reference voltage generation circuit 286-2 outputs a reference voltage $V_{r2}$, a reference voltage generation circuit 286-3 outputs a reference voltage $V_{r3}$, and a reference voltage generation circuit 286-4 outputs a reference voltage $V_{r4}$.

Figure 56:
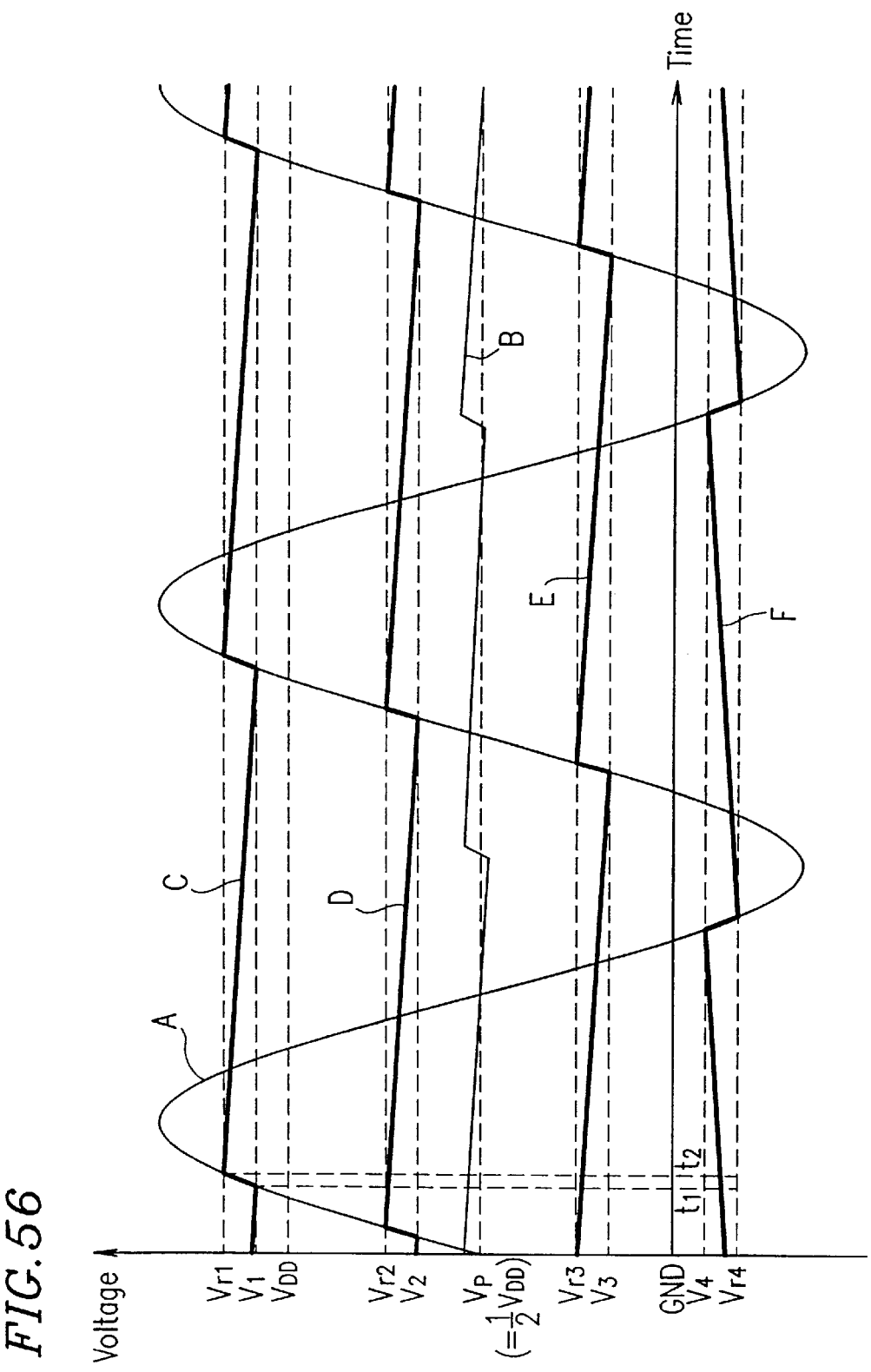
FIG. 56 is a diagram illustrating a voltage waveform at a node.

FIG. 56 illustrates an alternating-current voltage waveform (A) at the node 222, a direct-current voltage waveform (B) at the node 224, a voltage waveform (C) at a node 281-1 of the load 280-1, a voltage waveform (D) at a node 281-2 of the load 280-2, a voltage waveform (E) at a node 281-3 of the load 280-3, and a voltage waveform (F) at a node 281-4 of the load 280-4. Herein, the voltages satisfy the relationship: $V_{r4} < V_4 < GND < V_3 < V_{r3} < V_P < V_2 < V_{r2} < V_{DD} < V_1 < V_{r1}$. By increasing the dynamic energy preserved in the energy preserving circuit 220, it is possible to cause the alternating-current voltage waveform (A) to oscillate between a voltage, which is higher than the power supply voltage $V_{DD}$, and a voltage, which is lower than the ground GND. Herein, the center of the oscillation is set at the voltage $V_P$ ($=1/2\ V_{DD}$) The center of the oscillation of the alternating-current voltage waveform (A) can be set to any voltage.

When the voltage at the node 222 reaches the voltage at the node 281-1 of the load 280-1 at time $t_1$ while the voltage at the node 222 is increasing, a control circuit 283-1 causes a switch 282-1 to change from the OFF state to the ON state in response to the change in the output value of a comparator 284-1. As a result, the voltage at the node 281-1 increases along the alternating-current voltage waveform (A).

When the voltage at the node 222 reaches the reference voltage $V_{r1}$ at time $t_2$, the control circuit 283-1 causes the switch 282-1 to change from the ON state to the OFF state in response to the change in the output value of a comparator 285-1. As a result, the voltage at the node 281-1 is set to the voltage $V_{r1}$. Thereafter, the voltage at the node 281 gradually decreases toward the voltage $V_1$. This is because energy is consumed by the load 280-1.

When the voltage at the node 222 reaches again the voltage at the node 281-1 of the load 280-1 while the voltage at the node 222 is increasing, the control circuit 283-1 causes the switch 282-1 to change from the OFF state to the ON state in response to the change in the output value of the comparator 284-1. As a result, the voltage at the node 281-1 increases along the alternating-current voltage waveform (A).

Thus, the voltage at the node 281-1 repeatedly increases and decreases between the voltage $V_1$ and the voltage $V_{r1}$. By setting the difference between the voltage $V_1$ and the voltage $V_{r1}$ to be sufficiently small, it is possible to supply a voltage, which can be considered as a direct current, to the load 280-1. Herein, the voltage $V_{r1}$ may be set to any value.

Similarly, the voltage at the node 281-2 repeatedly increases and decreases between the voltage $V_2$ and the voltage $V_{r2}$. By setting the difference between the voltage $V_2$ and the voltage $V_{r2}$ to be sufficiently small, it is possible to supply a voltage, which can be considered as a direct current, to the load 280-2. The voltage at the node 281-3 repeatedly increases and decreases between the voltage $V_3$ and the voltage $V_{r3}$. By setting the difference between the voltage $V_3$ and the voltage $V_{r3}$ to be sufficiently small, it is possible to supply a voltage, which can be considered as a direct current, to the load 280-3.

The voltage $V_4$ and the voltage $V_{r4}$ are lower than the ground voltage GND. By causing a switch 282-4 to change from the OFF state to the ON state while the voltage at the node 222 is decreasing, the voltage at the node 281-4 decreases along the alternating-current voltage waveform (A). As a result, a charge is collected by the energy preserving circuit 220.

The voltage at the node 281-4 repeatedly increases and decreases between the voltage $V_4$ and the voltage $V_{r4}$. By setting the difference between the voltage $V_4$ and the voltage $V_{r4}$ to be sufficiently small, it is possible to supply a voltage, which can be considered as a direct current, to the load 280-4.

The voltages supplied to the loads 280-1 to 280-4 are different from one another. Thus, it is possible to supply different power supply voltages to a plurality of loads.

In the example illustrated in FIG. 55, the energy receiving sections 287-1 to 287-4, which are connected in parallel to the node 222, have the same type of structure. However, the energy receiving sections 287-1 to 287-4 may have different types of structure. For example, each of the energy receiving sections 287-1 to 287-4 may be replaced with a structure which corresponds to the energy receiving section connected to the node 222 or the node 224 in the power supply apparatus of any of the types referred to in Chapter 8. Moreover, each of the energy receiving sections 287-1 to 287-4 may be replaced with a structure which corresponds to the energy receiving section connected to the node 222 or the node 224 in the power supply apparatus of any of the types referred to in Chapter 9. This is similarly true in the case where a plurality of energy receiving sections are connected in parallel to the node 224.

It is possible to use the power supply apparatus of the present invention as a power supply for various types of circuits by appropriately combining: the basic principle of injecting and preserving energy in the energy preserving circuit 220; the method for highly efficiently injecting dynamic energy and static energy into the energy preserving circuit 220; the method for controlling the ratio between dynamic energy and static energy; the method for converting dynamic energy stored in the energy preserving circuit 220 to static energy (or the method for converting static energy stored in the energy preserving circuit 220 to dynamic energy); and the method for keeping constant a noise frequency by modulating the size of a switch. This is similarly true also in the case where the power supply apparatus of the present invention is applied to a voltage converter (DC/DC converter) referred to in Chapter 10.

The roll of the energy preserving circuit 220 will now be reconsidered in view of the flow of an energy.

Figure 57:
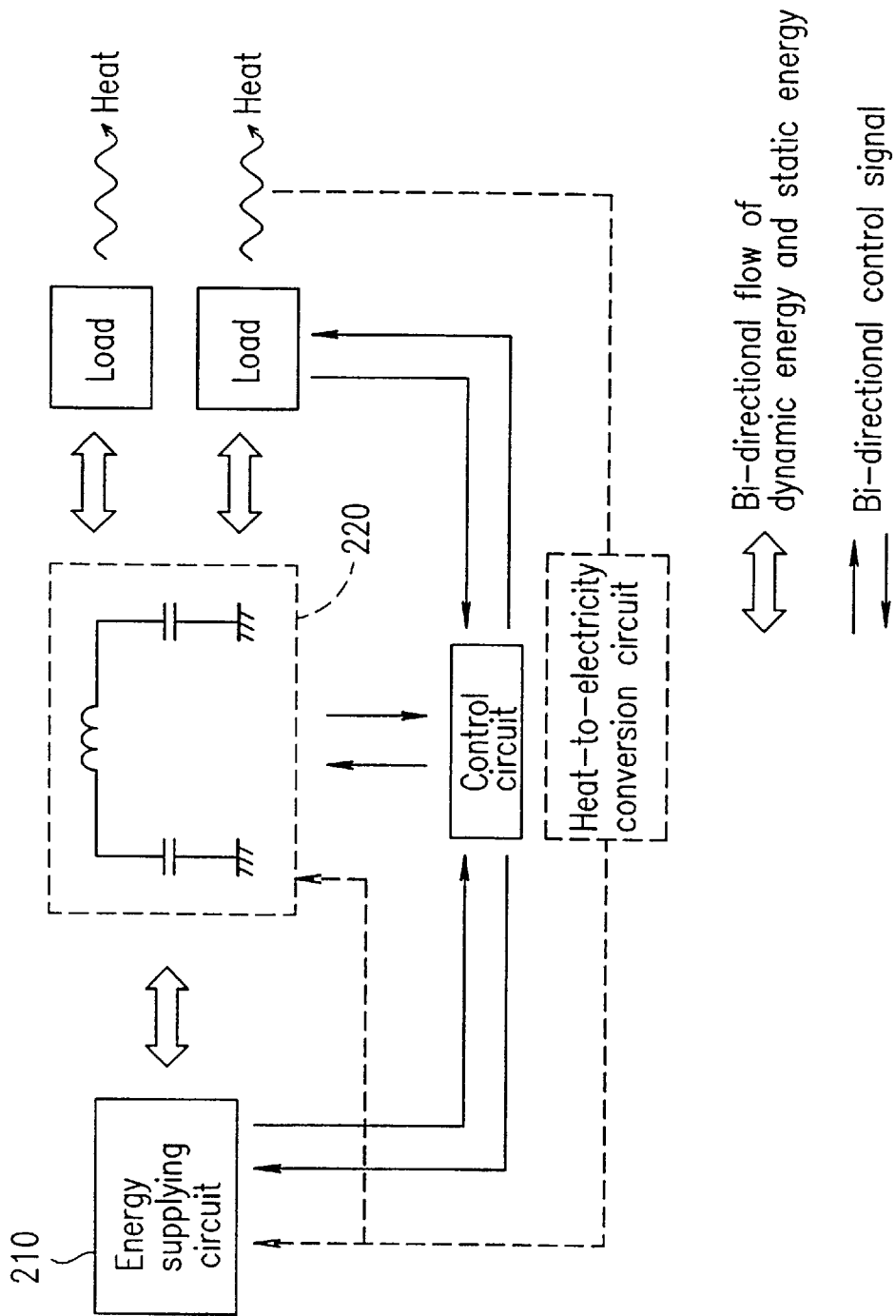
FIG. 57 is a diagram illustrating a flow of dynamic energy and static energy around the energy preserving circuit 220.

FIG. 57 illustrates the flow of dynamic energy and static energy with the energy preserving circuit 220 being in the center of the flow. The energy preserving circuit 220 realizes a bi-directional exchange of dynamic energy and static energy between the energy supplying circuit 210 and the energy preserving circuit 220 while minimizing the energy loss due to the resistance component in the circuit. Moreover, the energy preserving circuit 220 realizes a bi-directional exchange of dynamic energy and static energy between the energy preserving circuit 220 and a load while minimizing the energy loss due to the resistance component in the circuit.

Thus, it can be seen that there is a low-loss flow of dynamic energy and static energy to/from electronic circuits and components, such as the energy supplying circuit 210 and loads, with the energy preserving circuit 220 being in the center of the flow.

The dynamic energy and the static energy stored in the energy preserving circuit 220 can be appropriately controlled according to the total amounts and the ratio of dynamic energy and static energy which are required by the energy supplying circuit 210 and the load while exchanging control signals between a control circuit and each of the energy supplying circuit 210, the energy preserving circuit 220, and the load. Alternatively, it may be necessary to appropriately design the amount of energy consumed by the energy supplying circuit 210 and the load with respect to the dynamic energy and the static energy stored in the energy preserving circuit 220.

In the above-described embodiments, dynamic energy and static energy are converted to thermal energy by the resistance component in the circuit, and the thermal energy is dissipated to the outside the energy system of the electronic circuit system. A conversion circuit is provided for converting thermal energy to dynamic energy and static energy, and the dynamic energy and the static energy obtained from the conversion circuit are highly efficiently fed back to the energy supplying circuit 210 and/or energy preserving circuit 220, whereby it is possible to reduce the amount of energy which dissipates to the outside the energy system of the electronic circuit system.

The specification of the present application discloses the following.

A voltage converter of the present invention comprises: a voltage conversion section for converting a first voltage supplied from a power supply to a second voltage and supplying the second voltage to a voltage receiving circuit; and a control section for controlling the voltage conversion section. The voltage conversion section includes: a resonance circuit including an inductor, a first capacitance connected to one end of the inductor at a first node, and a second capacitance connected to another end of the inductor at a second node; and a switch having a first terminal and a second terminal, the first terminal being connected to the power supply, and the second terminal being connected to the first node of the resonance circuit, and the control section controls opening/closing of the switch.

The control section comprises a first detector for detecting that the second voltage output from the voltage conversion section has decreased below a desired voltage; and the control section controls opening/closing of the switch when the first detector detects that the second voltage output from the voltage conversion section has decreased below the desired voltage.

The control section further comprises: a second detector for detecting that a voltage at the first node has reached a predetermined first reference voltage; and a third detector for detecting that the voltage at the first node has reached a predetermined second reference voltage which is larger than the predetermined first reference voltage, wherein: when the second detector detects that the voltage at the first node has reached the predetermined first reference voltage, the control section controls the switch so that a state of the switch changes from an open state to a closed state; and when the third detector detects that the voltage at the first node has reached the predetermined second reference voltage, the control section controls the switch so that the state of the switch changes from the closed state to the open state.

The control section comprises: a clock signal generator for generating a clock signal according to a voltage change at the first node, wherein: when the first detector detects that the second voltage output from the voltage conversion section has decreased below the desired voltage during the first half of one cycle of the clock signal, the second detector and the third detector operate during the second half of one cycle of the clock signal which follows the first half.

The control section further comprises a second reference voltage generator for generating the first reference voltage, and the second reference voltage generator operates only within a period during which the second detector operates.

The control section further comprises a third reference voltage generator for generating the second reference voltage, and the third reference voltage generator operates only within a period during which the third detector operates.

The control section further comprises a second reference voltage generator for generating the first reference voltage and a monitor circuit for monitoring a change over time of the second voltage output from the voltage conversion section, wherein the second reference voltage generator varies the first reference voltage according to an output of the monitor circuit.

The control section further comprises a third reference voltage generator for generating the second reference voltage, a monitor circuit for monitoring a change over time of the second voltage output from the voltage conversion section, wherein the third reference voltage generator varies the second reference voltage according to an output of the monitor circuit.

When the monitor circuit detects that the second voltage output from the voltage conversion section does not reach the desired voltage, the second reference voltage generator decreases the first reference voltage.

When the monitor circuit detects that the second voltage output from the voltage conversion section does not reach the desired voltage, the third reference voltage generator increases the second reference voltage.

When the monitor circuit detects that the second voltage output from the voltage conversion section has reached the desired voltage, the second reference voltage generator increases the first reference voltage.

When the monitor circuit detects that the second voltage output from the voltage conversion section has reached the desired voltage, the third reference voltage generator decreases the second reference voltage.

The control section further comprises a monitor circuit for monitoring a change over time of the second voltage output from the voltage conversion section, wherein when the monitor circuit detects that the second voltage output from the voltage conversion section dose not reach the desired voltage, the control section controls the switch so that the state of the switch changes from the closed state to the open state after passage of a predetermined time since when the third detector detects that the voltage at the first node has reached the predetermined second voltage.

The control section controls the switch so that the state of the switch changes from the closed state to the open state after passage of a predetermined time since when the third detector detects that the voltage at the first node has reached the predetermined second voltage.

Industrial Applicability

The power supply apparatus of the present invention including an inductor, a first capacitance, and a second capacitance included in an energy preserving means, thereby forming a closed system having substantially no leakage of energy to the outside of the energy preserving means. Because the energy does not substantially leak to the outside of the energy preserving means, there is substantially no loss of energy in the power supply apparatus. Thus, it is possible to provide a low power consumption type power supply apparatus.

Moreover, by setting the first capacitance and the second capacitance to the respective predetermined values, it is possible to supply to the load various types of voltage waveforms from the first node and the second node, respectively. Furthermore, the power supply apparatus of the present invention is suitable as a power supply for an LSI.

According to the voltage converter of the present invention, the voltage conversion section is controlled so as to supply from the power supply to the voltage conversion section a power which is substantially equal to a power consumed by the voltage receiving circuit. Thus, it is possible to realize a high efficiency (90% or greater) voltage converter with little energy loss through voltage conversion.

Moreover, in another voltage converter of the present invention, a power supply and a resonance circuit are connected via a switch, and the opening/closing operation of the switch is controlled by the control section. The resonance circuit includes an inductor, a first capacitance connected to one end of the inductor at a first node, and a second capacitance connected to the other end of the inductor at the second node. By performing the opening/closing operation of the switch at a predetermined timing, it is possible to realize a voltage converter with little energy loss through voltage conversion.

In controlling the opening/closing operation of the switch, it is possible to inject a current into a resonance circuit while the voltage difference between the terminals of the switch is set to be small, by injecting a current from the power supply into the resonance circuit, with the switch being closed, when the voltage at the first node in the resonance circuit approaches the power supply voltage. Moreover, after the state of the switch has transitioned from the open state to the closed state, the state of the switch transitions from the closed state to the open state before the voltage at the first node in the resonance circuit becomes higher than the power supply voltage, thereby preventing a backflow of the current from the resonance circuit to the power supply. Where the current flowing for the power supply into the resonance circuit is constant (if the power consumed by the load is constant, the current flowing from the power supply into the resonance circuit is constant), as the voltage difference between the terminals of the switch is smaller, the power consumed by the switch is smaller, thereby improving the voltage conversion efficiency. Furthermore, by preventing the backflow of a current from the resonance circuit to the power supply, the power consumption is reduced.

According to another voltage converter of the present invention, it is possible to realize a voltage converter with a good conversion efficiency by combining two voltage converters of different conversion efficiencies.

According to a semiconductor integrated circuit of the present invention, a power supply includes an LC resonance circuit, and a resonance frequency of the LC resonance circuit is set so that an intensity of noise which is determined based on the resonance frequency is equal to or less than a predetermined value within a frequency band used by a circuit block to which the power supply voltage is supplied from the power supply voltage. Thus, it is possible to prevent the characteristics of the circuit block from becoming lower due to noise generated by the LC resonance circuit.

What is claimed is:

1. A power supply apparatus, comprising:
   energy supplying means for supplying energy at a predetermined timing; and
   energy preserving means for receiving the energy supplied from the energy supplying means and preserving the energy, wherein:
      the energy preserving means includes an inductor, a first capacitance connected to one end of the inductor at a first node, and a second capacitance connected to another end of the inductor at a second node;
      the energy is supplied to a load via at least one of the first node and the second node; and
      at least a portion of the energy supplied from the power supply apparatus to the load is returned to the power supply apparatus for reuse.

2. A power supply apparatus according to claim 1, wherein at least a portion of the energy supplied from the power supply apparatus to the load is returned to the power supply apparatus via one of the first node and the second node which is used when supplying the energy to the load.

3. A power supply apparatus according to claim 1, wherein at least a portion of the energy supplied from the power supply apparatus to the load is returned to the power supply apparatus via one of the first node and the second node which is different from one used when supplying the energy to the load.

4. A power supply apparatus according to claim 1, wherein the load is a semiconductor circuit having a structure which provides a rectification function.

5. A power supply apparatus according to claim 1, wherein the power supply apparatus and the load are formed on a single semiconductor chip.

* * * * *